(12) United States Patent
Zhou et al.

(10) Patent No.: US 10,763,939 B2
(45) Date of Patent: Sep. 1, 2020

(54) BASE STATION, USER EQUIPMENT, AND COMMUNICATION SIGNAL TRANSMITTING AND RECEIVING METHODS

(71) Applicant: Huawei Technologies Co., Ltd., Shenzhen (CN)

(72) Inventors: Yongxing Zhou, Beijing (CN); Jianguo Wang, Beijing (CN); Leiming Zhang, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 16/081,865

(22) PCT Filed: May 15, 2014

(86) PCT No.: PCT/CN2014/077595
§ 371 (c)(1),
(2) Date: Aug. 31, 2018

(87) PCT Pub. No.: WO2015/172364
PCT Pub. Date: Nov. 19, 2015

(65) Prior Publication Data
US 2019/0222288 A1    Jul. 18, 2019

(51) Int. Cl.
*H04B 7/06* (2006.01)
*H04L 5/00* (2006.01)
(Continued)

(52) U.S. Cl.
CPC ......... *H04B 7/0665* (2013.01); *H04B 7/0408* (2013.01); *H04B 7/0695* (2013.01);
(Continued)

(58) Field of Classification Search
CPC .............. H04B 7/0665; H04W 72/005; H04L 27/2613; H04L 27/2626
See application file for complete search history.

(56) References Cited

U.S. PATENT DOCUMENTS

2012/0243486 A1*  9/2012  Zeira ................... H04W 72/005
                                                                370/329
2013/0076566 A1    3/2013  Jiang et al.
(Continued)

FOREIGN PATENT DOCUMENTS

CN      101155406 A      4/2008
CN      101163123 A      4/2008
(Continued)

OTHER PUBLICATIONS

Samsung, "ePDCCH Design and RE Mapping," 3GPP TSG RAN WG1 #70, R1-123482, Qingdao, China, Aug. 13-17, 2012, 4 pages.
(Continued)

*Primary Examiner* — Walli Z Butt
*Assistant Examiner* — Ryan C Kavleski
(74) *Attorney, Agent, or Firm* — Slater Matsil, LLP

(57) ABSTRACT

Embodiments provide a base station, user equipment, and communication signal transmitting and receiving methods. The base station includes: a processing unit, configured to determine a resource configuration of a communication signal, where the resource configuration includes at least two different resource element groups; and a transmitting unit, configured to transmit the communication signal on each resource element group included in the resource configuration to user equipment, where the communication signal transmitted on each resource element group carries at least one piece of same information, and the same information is cell specific or user equipment group specific information.

36 Claims, 2 Drawing Sheets

(51) Int. Cl.
*H04B 7/0408* (2017.01)
*H04L 27/26* (2006.01)
*H04W 72/00* (2009.01)

(52) U.S. Cl.
CPC .......... *H04L 5/0023* (2013.01); *H04L 5/0044* (2013.01); *H04L 27/2613* (2013.01); *H04L 27/2626* (2013.01); *H04W 72/005* (2013.01)

(56) References Cited

U.S. PATENT DOCUMENTS

| | | | |
|---|---|---|---|
| 2013/0083750 A1* | 4/2013 | Nazar | H04W 72/042 370/329 |
| 2013/0301561 A1* | 11/2013 | Sartori | H04W 72/04 370/329 |
| 2014/0078987 A1 | 3/2014 | Park et al. | |
| 2014/0086217 A1 | 3/2014 | Park et al. | |
| 2015/0036625 A1 | 2/2015 | Nam et al. | |
| 2015/0063241 A1* | 3/2015 | Shimezawa | H04W 72/042 370/329 |
| 2015/0215904 A1 | 7/2015 | Dai et al. | |
| 2015/0223211 A1* | 8/2015 | Seo | H04W 72/042 370/329 |
| 2015/0296489 A1 | 10/2015 | Dai et al. | |
| 2015/0318973 A1 | 11/2015 | Wang et al. | |
| 2016/0014675 A1 | 1/2016 | Park et al. | |
| 2016/0261317 A1 | 9/2016 | Liu et al. | |

FOREIGN PATENT DOCUMENTS

| | | |
|---|---|---|
| CN | 101330356 A | 12/2008 |
| CN | 101578792 A | 11/2009 |
| CN | 101689928 A | 3/2010 |
| CN | 102263580 A | 11/2011 |
| CN | 102484550 A | 5/2012 |
| CN | 102638892 A | 8/2012 |
| CN | 102869049 A | 1/2013 |
| CN | 102892201 A | 1/2013 |
| CN | 102938694 A | 2/2013 |
| CN | 103220029 A | 7/2013 |
| CN | 103220103 A | 7/2013 |
| CN | 103312650 A | 9/2013 |
| CN | 103327610 A | 9/2013 |
| CN | 103347298 A | 10/2013 |
| CN | 103457688 A | 12/2013 |
| CN | 103580834 A | 2/2014 |
| CN | 103595501 A | 2/2014 |
| CN | 103795514 A | 5/2014 |
| WO | 2010105402 A1 | 9/2010 |

OTHER PUBLICATIONS

Yin, B. et al.,"High-Throughput Beamforming Receiver for Millimeter Wave Mobile Communication," Globecom 2013—Wireless Communications Symposium, pp. 3697-3702.

Samsung, "Multiplexing Distributed and Localized ePDCCHs in Same PRB Pairs," 3GPP TSG RAN WG1 #70, R1-123483, Qingdao, China, Aug. 13-17, 2012, 3 pages.

* cited by examiner

BASE STATION, USER EQUIPMENT, AND COMMUNICATION SIGNAL TRANSMITTING AND RECEIVING METHODS

CROSS-REFERENCE TO RELATED APPLICATIONS

This application is a national stage of International Application No. PCT/CN2014/077595, filed on May 15, 2014, the disclosure of which is hereby incorporated by reference in its entirety.

TECHNICAL FIELD

The present invention relates to the communications field, and more specifically, to a base station, user equipment, and communication signal transmitting and receiving methods.

BACKGROUND

A modern communications system, for example, a GSM (Global System for Mobile Communications) system, a CDMA (Code Division Multiple Access) 2000/WCDMA (Wideband Code Division Multiple Access) system, and a 3GPP (3rd Generation Partnership Project) LTE (Long Term Evolution) system, usually operates on a carrier frequency below 3 GHz. Generally multi-antenna technology is adopted to enhance system capacity and coverage or improve user experience. With emergence of intelligent terminals, especially, video services, current spectrum resources already hardly satisfy explosively growing capacity requirements of users. Currently, a high frequency band with a larger available bandwidth, especially, a millimeter wave band, increasingly becomes a candidate band in a next-generation communication system. On a basis of the multi-antenna technology, the high frequency band, especially, the millimeter wave band, can be used to reduce sizes of multi-antenna configurations, which facilitates site acquisition and multiple-antenna deployment. However, different from an operating band of an existing system such as LTE, the high frequency band will bring a larger path loss, and especially, a loss of radio propagation is further increased due to adverse impact of factors such as atmosphere and vegetation. Under this situation, a path loss caused by the high frequency band also affects transmission reliability of communication signal (for example, synchronization signal, control channel, and broadcast channel) in the existing communication system.

SUMMARY

The present invention provides a base station, user equipment, and communication signal transmitting and receiving methods to solve a problem in the prior art that a path loss caused by a high frequency band affects transmission reliability of communication signal.

According to a first aspect, the present invention provides a base station, including: a processing unit, configured to determine a resource configuration of a communication signal, where the resource configuration includes at least two different resource element groups; and a transmitting unit, configured to transmit the communication signal on each resource element group included in the resource configuration to user equipment, where the communication signal transmitted on each resource element group carries at least one piece of same information, and the same information is cell specific or user equipment group specific information.

In the present invention, the base station transmits the communication signal on each resource element group included in the resource configuration of the communication signal to the user equipment, and the communication signals transmitted on the at least two different resource element groups use two different antenna port groups respectively. User equipment in a cell (or a user equipment group) can measure, by using at least two different antenna port groups separately, a communication signal transmitted on a resource element group with favorable channel condition for the user equipment, and take advantage of space diversity gain provided by different antenna port groups to receive the cell (or user equipment group) specific same information, or utilize combinatorial reception of the communication signals transmitted on the at least two resource element groups to receive the cell (or user equipment group) specific same information. Therefore, transmission reliability of the cell (or user equipment group) specific information or the communication signal is effectively improved.

With reference to the first aspect, in a first possible implementation of the first aspect, the communication signal transmitted on each of the at least two resource element groups included in the resource configuration further carries at least one piece of indication information, where the indication information is used to indicate information about a resource used by the communication signal, or used to indicate one or more physical channels used by the user equipment, or used to indicate information about a resource used by one or more physical channels used by the user equipment, or used to indicate information about a resource used by one or more physical signals used by the user equipment.

With reference to the first possible implementation of the first aspect, in a second possible implementation of the first aspect, the information about the resource used by the communication signal is at least one of the following: identification information of the communication signal, information about a resource element group used by the communication signal, information about a sequence or a sequence group used by the communication signal, information about an antenna port or an antenna port group used by the communication signal, information about a time-frequency position used by the communication signal, information about precoding used by the communication signal, and information about a beam group used by the communication signal; and the information about the resource used by the one or more physical channels used by the user equipment or the information about the resource used by the one or more physical signals used by the user equipment is at least one of the following: identification information used by the physical channel or the physical signal, information about a resource element group used by the physical channel or the physical signal, information about an antenna port used by the physical channel or the physical signal, information about a reference signal used by the physical channel or the physical signal, information about a sequence or a sequence group used by the physical channel or the physical signal, information about an antenna port or an antenna port group used by the physical channel or the physical signal, information about a time-frequency position used by the physical channel or the physical signal, information about precoding used by the physical channel or the physical signal, and information about a beam group used by the physical channel or the physical signal.

With reference to any one of the first aspect, and the first and the second possible implementations of the first aspect, in a third possible implementation of the first aspect, the communication signals transmitted on the at least two resource element groups included in the resource configuration use different sequence groups or different antenna port groups.

With reference to any one of the first aspect, and the first to the third possible implementations of the first aspect, in a fourth possible implementation of the first aspect, the communication signals transmitted on the at least two resource element groups included in the resource configuration use different precoder or different beam groups.

With reference to any one of the first aspect, and the first to the fourth possible implementations of the first aspect, in a fifth possible implementation of the first aspect, the transmitting unit is further configured to: transmit a reference signal set to the user equipment, so that the user equipment determines at least one resource element group in the resource configuration of the communication signal based on the reference signal set and receives the communication signal on the determined at least one resource element group.

With reference to the fifth possible implementation of the first aspect, in a sixth possible implementation of the first aspect, the reference signal set is a cell specific reference signal set or a channel state information reference signal set.

With reference to any one of the first aspect, and the first to the sixth possible implementations of the first aspect, in a seventh possible implementation of the first aspect, the communication signal is a synchronization signal, and the same information is all or a part of information of a cell identifier, or all or a part of information of a user equipment group identifier.

With reference to the seventh possible implementation of the first aspect, in an eighth possible implementation of the first aspect, at least two different resource element groups included in a resource configuration of the synchronization signal are respectively located in different OFDM symbols or slots or subframes or radio frames or system frames.

With reference to the eighth possible implementation of the first aspect, in a ninth possible implementation of the first aspect, the resource configuration of the synchronization signal includes at least two different resource element groups $REG_1$ and $REG_2$, where $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = N_{symb}^{RB} - 1; n_s \bmod N_{slot}^F = 0, \frac{N_{slot}^F}{2}; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = N_{symb}^{RB} - 1; n_s \bmod N_{slot}^F = \frac{N_{slot}^F}{4}, \frac{3 \cdot N_{slot}^F}{4}; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = \frac{N_{symb}^{RB} - 1}{2}; n_s \bmod N_{slot}^F = 0, \frac{N_{slot}^F}{2}; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

-continued $$\left. N_{sc}^{SS} - 1; l = \frac{N_{symb}^{RB} - 1}{2}; n_s \bmod N_{slot}^F = \frac{N_{slot}^F}{4}, \frac{3 \cdot N_{slot}^F}{4}; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = N_{symb}^{RB} - 1; n_s \bmod N_{slot}^F = 0, \frac{N_{slot}^F}{2} n_f \bmod 2 = 0; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = N_{symb}^{RB} - 1; n_s \bmod N_{slot}^F = 0, \frac{N_{slot}^F}{2} n_f \bmod 2 = 1; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = \frac{N_{symb}^{RB} - 1}{2}; n_s \bmod N_{slot}^F = 0, \frac{N_{slot}^F}{2} n_f \bmod 2 = 0; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = \frac{N_{symb}^{RB} - 1}{2}; n_s \bmod N_{slot}^F = 0, \frac{N_{slot}^F}{2} n_f \bmod 2 = 1; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = \frac{N_{symb}^{RB} - 1}{2}; n_s \bmod N_{slot}^F = 0, \frac{N_{slot}^F}{2}; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = N_{symb}^{RB} - 1; n_s \bmod N_{slot}^F = 0, \frac{N_{slot}^F}{2}; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = N_{offset}, \right.$$

$$\left. \ldots, N_{offset} + N_{sc}^{SS} - 1; l = N_{symb}^{RB} - 1; n_s \bmod N_{slot}^F = 0, \frac{N_{slot}^F}{2}; \right\}$$

$$REG_2 = \left\{ (k, l, n_s, n_f) \mid k = n - 31 + \frac{N_{RB}^{BW} N_{sc}^{RB}}{2}, n = -N_{offset}, \ldots, \right.$$

$$\left. -N_{offset} + N_{sc}^{SS} - 1; l = N_{symb}^{RB} - 1; n_s \bmod N_{slot}^F = 0, \frac{N_{slot}^F}{2}; \right\}$$

where a position of each resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{offset}$ is a subcarrier position offset of the synchronization signal; or the resource configuration of the synchronization signal includes at least four different resource element groups $REG_1$, $REG_2$, $REG_3$, and $REG_4$, where $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 1; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = N_{offset}, \ldots, N_{offset} + N_{sc}^{SS} - 1; l = N_{symb}^{RB} - 1; \right.$$
$$\left. n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = N_{offset}, \ldots, N_{offset} + N_{sc}^{SS} - 1; l = N_{symb}^{RB} - 1; \right.$$
$$\left. n_s \bmod N_{slot}^F = 0, \frac{N_{slot}^F}{2}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = N_{offset}, \ldots, N_{offset} + N_{sc}^{SS} - 1; l = N_{symb}^{RB} - 1; \right.$$
$$\left. n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = N_{offset}, \ldots, N_{offset} + N_{sc}^{SS} - 1; l = N_{symb}^{RB} - 1; \right.$$
$$\left. n_s \bmod N_{slot}^F = 0, \frac{N_{slot}^F}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = N_{symb}^{RB} - 1; n_s \bmod N_{slot}^F = 0, \frac{N_{slot}^F}{4}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{8}, \frac{3 \cdot N_{slot}^F}{8}; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{2}, \frac{3 N_{slot}^F}{4}; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{5 N_{slot}^F}{8}, \frac{7 N_{slot}^F}{8}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = \frac{N_{symb}^{RB} - 1}{2}; n_s \bmod N_{slot}^F = 0, \frac{N_{slot}^F}{4}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$

-continued $$N_{sc}^{SS} - 1; l = \frac{N_{symb}^{RB} - 1}{2}; n_s \bmod N_{slot}^F = \frac{N_{slot}^F}{8}, \frac{3 \cdot N_{slot}^F}{8}; \Big\}$$

$$REG_3 = \Big\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = \frac{N_{slot}^F}{2}, \frac{3N_{slot}^F}{4}; \Big\}$$

$$REG_4 = \Big\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = \frac{5N_{slot}^F}{8}, \frac{7N_{slot}^F}{8}; \Big\}$$

or $$REG_1 = \Big\{(k, l, n_s, n_f) \mid k = n - \frac{N_{sc}^{SS}}{2} + \frac{N_{RB}^{BW} N_{sc}^{RB}}{2}, n = 0,$$

$$\ldots, N_{sc}^{SS} - 1; l = \frac{N_{symb}^{RB} - 1}{2}; n_s \bmod N_{slot}^F = 0, \frac{N_{slot}^F}{4}; \Big\}$$

$$REG_2 = \Big\{(k, l, n_s, n_f) \mid k = n - \frac{N_{sc}^{SS}}{2} + \frac{N_{RB}^{BW} N_{sc}^{RB}}{2}, n = 0,$$

$$\ldots, N_{sc}^{SS} - 1; l = N_{symb}^{RB} - 1; n_s \bmod N_{slot}^F = 0, \frac{N_{slot}^F}{4}; \Big\}$$

$$REG_3 = \Big\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = \frac{N_{slot}^F}{2}, \frac{3N_{slot}^F}{4}; \Big\}$$

$$REG_4 = \Big\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = N_{symb}^{RB} - 1; n_s \bmod N_{slot}^F = \frac{N_{slot}^F}{2}, \frac{3N_{slot}^F}{4}; \Big\}$$

or $$REG_1 = \Big\{(k, l, n_s, n_f) \mid k = n - \frac{N_{sc}^{SS}}{2} + \frac{N_{RB}^{BW} N_{sc}^{RB}}{2}, n = N_{offset}, \ldots,$$

$$N_{offset} + N_{sc}^{SS} - 1; l = N_{symb}^{RB} - 1; n_s \bmod N_{slot}^F = 0, \frac{N_{slot}^F}{4}; \Big\}$$

$$REG_2 = \Big\{(k, l, n_s, n_f) \mid k = n - 31 + \frac{N_{RB}^{BW} N_{sc}^{RB}}{2}, n = -N_{offset}, \ldots,$$

$$-N_{offset} + N_{sc}^{SS} - 1; l = N_{symb}^{RB} - 1; n_s \bmod N_{slot}^F = 0, \frac{N_{slot}^F}{4}; \Big\}$$

$$REG_3 = \Big\{(k, l, n_s, n_f) \mid k = n - \frac{N_{sc}^{SS}}{2} + \frac{N_{RB}^{BW} N_{sc}^{RB}}{2}, n = N_{offset}, \ldots,$$

$$N_{offset} + N_{sc}^{SS} - 1; l = N_{symb}^{RB} - 1; n_s \bmod N_{slot}^F = \frac{N_{slot}^F}{2}, \frac{3N_{slot}^F}{4}; \Big\}$$

$$REG_4 = \Big\{(k, l, n_s, n_f) \mid k = n - 31 + \frac{N_{RB}^{BW} N_{sc}^{RB}}{2}, n = -N_{offset}, \ldots,$$

$$-N_{offset} + N_{sc}^{SS} - 1; l = N_{symb}^{RB} - 1; n_s \bmod N_{slot}^F = \frac{N_{slot}^F}{2}, \frac{3N_{slot}^F}{4}; \Big\}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{offset}$ is a subcarrier position offset of the synchronization signal.

With reference to the eighth or the ninth possible implementation of the first aspect, in a tenth possible implementation of the first aspect, a synchronization signal transmitted on each of the at least two resource element groups included in the resource configuration of the synchronization signal further carries at least one piece of indication information, where the indication information is used to indicate information about a resource used by the synchronization signal or indicate information about a physical channel or a resource of a physical channel used by the user equipment, and the physical channel is at least one of the following: a physical broadcast channel (PBCH), a physical control format indicator channel (PCFICH), a physical downlink control channel (PDCCH), an enhanced physical downlink control channel (ePDCCH), or a physical uplink control channel (PUCCH).

With reference to the tenth possible implementation of the first aspect, in an eleventh possible implementation of the first aspect, the indication information is represented by a ZC sequence or a computer-generated (CG) sequence or an m-sequence or a Gold sequence or a cyclic shift of the foregoing sequence or a combination of the foregoing sequences.

With reference to any one of the first aspect, and the first to the seventh possible implementations of the first aspect, in a twelfth possible implementation of the first aspect, the communication signal is a broadcast channel, and the same information is at least one of the following: a system bandwidth, a part or all of information of a system frame number (SFN), physical channel configuration indication information, and a master information block (MIB).

With reference to the twelfth possible implementation of the first aspect, in a thirteenth possible implementation of the first aspect, at least two different resource element groups included in a resource configuration of the broadcast channel are respectively located in different OFDM symbols or slots or subframes or radio frames or system frames.

With reference to the thirteenth possible implementation of the first aspect, in a fourteenth possible implementation of the first aspect, the resource configuration of the broadcast channel includes at least two different resource element groups REG$_1$ and REG$_2$, where $$REG_1 = \Big\{(k, l, n_s, n_f) \mid k = \frac{N_{RB}^{BW} N_{sc}^{RB}}{2} - 36 + k',$$

$$k' = 0, 1, \ldots, 71; l = 0, 1, 2, 3; n_s = 1, n_f \bmod(4N) = i; \Big\}$$

$$REG_2 = \Big\{(k, l, n_s, n_f) \mid k = \frac{N_{RB}^{BW} N_{sc}^{RB}}{2} - 36 + k', k' = 0,$$

$$1, \ldots, 71; l = 0, 1, 2, 3; n_s = 3, n_f \bmod(4N) = i; \Big\}$$

or $$REG_1 = \Big\{(k, l, n_s, n_f) \mid k = \frac{N_{RB}^{BW} N_{sc}^{RB}}{2} - 36 + k',$$

$$k' = 0, 1, \ldots, 71; l = 0, 1, 2, 3; n_s = 1, n_f \bmod(4N) = i; \Big\}$$

-continued $$REG_2 = \left\{(k, l, n_s, n_f) \mid k = \frac{N_{RB}^{BW} N_{sc}^{RB}}{2} - 36 + k', k' = 0,\right.$$
$$\left. 1, \ldots, 71; l = 4, 5, 6; n_s = 1, n_f \bmod(4N) = i;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 3, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} + 36 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 108 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 6, 8, n_f \bmod(4N) = i;\right\}$$

or $$REG_1 = \left\{(k, l, n_s, n_f) \mid k = \frac{N_{RB}^{BW} N_{sc}^{RB}}{2} - 18 + k', k' = 0,\right.$$

$$\left. 1, \ldots, 36; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 4, 5, 6; n_s = 1, 3, n_f \bmod(4N) = i;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 6, 8, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} + 18 + k', k' = 0,\right.$$
$$\left. 1, \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 54 + k', k' = 0,\right.$$
$$\left. 1, \ldots, 35; l = 0, 1, 2, 3; n_s = 1, 3, n_f \bmod(4N) = j;\right\}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, a parameter i is not equal to a parameter j, values of the parameters i and j are both in a range of 0 to 4N−1, and N is a positive integer.

With reference to any one of the twelfth to the fourteenth possible implementations of the first aspect, in a fifteenth possible implementation of the first aspect, a broadcast channel transmitted on each of the at least two resource element groups included in the resource configuration of the broadcast channel further carries at least one piece of indication information, where the indication information indicates information about a resource used by the broadcast channel or indicates information about a physical channel or a resource of a physical channel used by the user equipment, and the physical channel is at least one of the following: a physical control format indicator channel (PCFICH), a physical downlink control channel (PDCCH), an enhanced physical downlink control channel (ePDCCH), or a physical uplink control channel (PUCCH).

With reference to the fifteenth possible implementation of the first aspect, in a sixteenth possible implementation of the first aspect, the indication information is carried in a broadcast message of the broadcast channel or represented by using different cyclic redundancy check masks.

With reference to any one of the first aspect, and the first to the sixth possible implementations of the first aspect, in a seventeenth possible implementation of the first aspect, the communication signal is a control channel, and the same information is downlink control information of a system information block, or downlink control information carried in a common search space CSS, or format indicator information of a downlink control channel.

With reference to the seventeenth possible implementation of the first aspect, in an eighteenth possible implementation of the first aspect, at least two different resource element groups included in a resource configuration of the control channel are respectively located in different OFDM symbols or slots or subframes or system frames or radio frames or control channel elements CCEs or CCE sets or enhanced control channel elements eCCEs or eCCE sets.

With reference to the seventeenth or the eighteenth possible implementation of the first aspect, in a nineteenth possible implementation of the first aspect, a control channel transmitted on each of the at least two resource element groups included in the resource configuration of the control channel further carries at least one piece of indication information, where the indication information indicates information about a resource used by the control channel or indicates information about a physical channel or a resource of a physical channel used by the user equipment, and the physical channel is at least one of the following: a physical control channel PDCCH or an enhanced physical control channel ePDCCH carried in a user equipment specific search space USS, or a physical uplink control channel PUCCH.

With reference to the nineteenth possible implementation of the first aspect, in a twentieth possible implementation of the first aspect, the indication information is carried in control information of the control channel or represented by using different cyclic redundancy check CRC masks.

With reference to any one of the twelfth to the twentieth possible implementations of the first aspect, in a twenty-first possible implementation of the first aspect, the communication signal is the broadcast channel or the control channel, and the transmitting unit is further configured to: transmit a synchronization signal set to the user equipment, where the synchronization signal set includes at least one synchronization signal corresponding to the communication signal transmitted on the at least one resource element group in the resource configuration of the communication signal.

With reference to the twenty-first possible implementation of the first aspect, in a twenty-second possible implementation of the first aspect, the at least one synchronization signal included in the synchronization signal set carries at least one piece of indication information, where the indication information is used to indicate information about a resource used by the communication signal that is transmitted on the at least one resource element group and corresponds to the synchronization signal.

With reference to any one of the seventeenth to the twenty-first possible implementations of the first aspect, in a twenty-third possible implementation of the first aspect, the communication signal is the control channel, and the transmitting unit is further configured to: transmit a broadcast channel set to the user equipment, where the broadcast channel set includes at least one broadcast channel corresponding to a control channel transmitted on at least one resource element group in the resource configuration of the control channel.

With reference to the twenty-second possible implementation of the first aspect, in a twenty-fourth possible implementation of the first aspect, the at least one broadcast channel included in the broadcast channel set carries at least one piece of indication information, where the indication information is used to indicate information about a resource used by the control channel transmitted on the at least one resource element group and corresponding to the broadcast channel.

According to a second aspect, the present invention provides user equipment, including: a processing unit, configured to determine, from a resource configuration of a communication signal, at least one resource element group for the communication signal, where the resource configuration of the communication signal includes at least two different resource element groups, the communication signal transmitted on each resource element group included in the resource configuration carries at least one piece of same information, and the same information is cell specific or user equipment group specific information; and a receiving unit, configured to receive the communication signal based on the at least one resource element group.

In the present invention, the user equipment determines and receives the communication signal transmitted by a base station on the at least one resource element group, to obtain the cell specific or user equipment group specific same information carried in the communication signal. The user equipment can determine at least one resource element group with favorable channel condition for the user equipment, and receive the communication signal from the at least one resource element group. Therefore, transmission reliability of the specific information or the communication signal between a user equipment within a cell (or a user equipment group) and the base station is improved.

With reference to the second aspect, in a first possible implementation of the second aspect, the processing unit is configured to: determine, from the resource configuration of the communication signal, the at least one resource element group for the communication signal based on signal quality of the communication signal on the resource element group; or determine, from the resource configuration of the communication signal, the at least one resource element group for the communication signal based on signal quality of a reference signal corresponding to the communication signal on the resource element group; or determine, from the resource configuration of the communication signal, the at least one resource element group for the communication signal based on detection or decoding performance of the communication signal on the resource element group; or determine, from the resource configuration of the communication signal, the at least one resource element group for the communication signal based on indication information carried in another physical channel or physical signal; or determine, from the resource configuration of the communication signal, the at least one resource element group for the communication signal based on a reference signal set transmitted by a base station and received by the receiving unit.

With reference to the first possible implementation of the second aspect, in a second possible implementation of the second aspect, the signal quality is received power or a strength indicator or received quality.

With reference to any one of the second aspect, and the first and the second possible implementations of the second aspect, in a third possible implementation of the second aspect, the communication signal transmitted on each of the at least two resource element groups included in the resource configuration further carries at least one piece of indication information; and the processing unit is configured to obtain, from the communication signal received by the receiving unit, the at least one piece of indication information carried in the communication signal, where the indication information is used to indicate information about a resource used by the communication signal, or used to indicate one or more physical channels used by the user equipment, or used to indicate information about a resource used by one or more physical channels used by the user equipment.

With reference to the third possible implementation of the second aspect, in a fourth possible implementation of the second aspect, the information about the resource used by the communication signal is at least one of the following: identification information of the communication signal, information about a resource element group used by the communication signal, information about a sequence or a sequence group used by the communication signal, information about an antenna port or an antenna port group used by the communication signal, information about a time-frequency position used by the communication signal, information about precoding used by the communication signal, and information about a beam group used by the communication signal; and the information about the resource used by the one or more physical channels used by the user equipment or the information about the resource used by the one or more physical signals used by the user equipment is at least one of the following: identification information of the physical channel or the physical signal, information about a resource element group used by the physical channel or the physical signal, information about an antenna port or information about a reference signal used by the physical channel or the physical signal, information about a sequence or a sequence group used by the physical channel or the physical signal, information about an antenna port or an antenna port group used by the physical channel or the physical signal, information about a time-frequency position used by the physical channel or the physical signal, information about precoding used by the physical channel or the physical signal, and information about a beam group used by the physical channel or the physical signal.

With reference to any one of the second aspect, and the first to the fourth possible implementations of the second aspect, in a fifth possible implementation of the second aspect, the communication signals transmitted on the at least two resource element groups included in the resource configuration use different sequence groups or different antenna port groups; and the receiving unit is configured to: receive the communication signal based on the sequence group or the antenna port group used by the communication signal on the at least one resource element group.

With reference to any one of the second aspect, and the first to the fifth possible implementations of the second aspect, in a sixth possible implementation of the second aspect, the communication signals transmitted on the at least two resource element groups included in the resource configuration use different precoding or different beam groups; and the receiving unit is configured to: receive the communication signal based on precoding or a beam group used by the communication signal on the at least one resource element group; or receive, based on the at least one resource element group, the communication signals transmitted by the base station by using different precoder or beam groups.

With reference to any one of the second aspect, and the first to the sixth possible implementations of the second aspect, in a seventh possible implementation of the second aspect, the at least two resource element groups included in the resource configuration are located in different radio frames, or different system frames, or different subframes, or different slots, or different orthogonal frequency division multiplexing OFDM symbols, or different subcarriers, or different physical resource blocks PRBs; and the receiving unit is configured to: receive the communication signal based on a radio frame, or a system frame, or a subframe, or a slot, or an orthogonal frequency division multiplexing OFDM symbol, or a subcarrier, or a physical resource block PRB in which the at least one resource element group is located.

With reference to any one of the second aspect, and the first to the seventh possible implementations of the second aspect, in an eighth possible implementation of the second aspect, the communication signal is a synchronization signal, and the same information is a 11 or a part of information of a cell identifier, or all or a part of information of a user equipment group identifier.

With reference to the eighth possible implementation of the second aspect, in a ninth possible implementation of the second aspect, at least two different resource element groups included in a resource configuration of the synchronization signal are respectively located in different OFDM symbols or slots or subframes or radio frames or system frames; and the receiving unit is configured to: receive the synchronization signal based on an OFDM symbol or a slot or a subframe or a radio frame or a system frame in which the at least one resource element group is located.

With reference to the ninth possible implementation of the second aspect, in a tenth possible implementation of the second aspect, the resource configuration of the synchronization signal includes at least two different resource element groups $REG_1$ and $REG_2$, where $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = N_{symb}^{RB} - 1; n_s \bmod N_{slot}^F = 0, \frac{N_{slot}^F}{2}; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{4}, \frac{3 \cdot N_{slot}^F}{4}; \right\}$$

or

-continued $$REG_1 = \left\{(k,l,n_s,n_f) \mid k = n - \frac{N_{sc}^{SS}}{2} + \frac{N_{RB}^{BW} N_{sc}^{RB}}{2}, n = 0,\right.$$

$$\left....,N_{sc}^{SS}-1; l = \frac{N_{symb}^{RB}-1}{2}; n_s \bmod N_{slot}^F = 0, \frac{N_{slot}^F}{2};\right\}$$

$$REG_2 = \left\{(k,l,n_s,n_f) \mid k = n - \frac{N_{sc}^{SS}}{2} + \frac{N_{RB}^{BW} N_{sc}^{RB}}{2}, n = 0, ...,\right.$$

$$\left. N_{sc}^{SS}-1; l = \frac{N_{symb}^{RB}-1}{2}; n_s \bmod N_{slot}^F = \frac{N_{slot}^F}{4}, \frac{3\cdot N_{slot}^F}{4};\right\}$$

or $$REG_1 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = N_{symb}^{RB}-1; n_s \bmod N_{slot}^F = 0, \frac{N_{slot}^F}{2}, n_f \bmod 2 = 0;\right\}$$

$$REG_2 = \left\{(k,l,n_s,n_f) \mid k = n - \frac{N_{sc}^{SS}}{2} + \frac{N_{RB}^{BW} N_{sc}^{RB}}{2}, n = 0, ...,\right.$$

$$\left. N_{sc}^{SS}-1; l = N_{symb}^{RB}-1; n_s \bmod N_{slot}^F = 0, \frac{N_{slot}^F}{2}, n_f \bmod 2 = 1;\right\}$$

or $$REG_1 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = 0, \frac{N_{slot}^F}{2}, n_f \bmod 2 = 0;\right\}$$

$$REG_2 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = 0, \frac{N_{slot}^F}{2}, n_f \bmod 2 = 1;\right\}$$

or $$REG_1 = \left\{(k,l,n_s,n_f) \mid k = n - \frac{N_{sc}^{SS}}{2} + \frac{N_{RB}^{BW} N_{sc}^{RB}}{2}, n = 0,\right.$$

$$\left. ..., N_{sc}^{SS}-1; l = \frac{N_{symb}^{RB}-1}{2}; n_s \bmod N_{slot}^F = 0, \frac{N_{slot}^F}{2};\right\}$$

$$REG_2 = \left\{(k,l,n_s,n_f) \mid k = n - \frac{N_{sc}^{SS}}{2} + \frac{N_{RB}^{BW} N_{sc}^{RB}}{2}, n = 0,\right.$$

$$\left. ..., N_{sc}^{SS}-1; l = N_{symb}^{RB}-1; n_s \bmod N_{slot}^F = 0, \frac{N_{slot}^F}{2};\right\}$$

or $$REG_1 = \left\{(k,l,n_s,n_f) \mid k = n - \frac{N_{sc}^{SS}}{2} + \frac{N_{RB}^{BW} N_{sc}^{RB}}{2}, n = N_{\text{offset}}, ...,\right.$$

$$\left. N_{\text{offset}} + N_{sc}^{SS}-1; l = N_{symb}^{RB}-1; n_s \bmod N_{slot}^F = 0, \frac{N_{slot}^F}{2};\right\}$$

$$REG_2 = \left\{(k,l,n_s,n_f) \mid k = n - 31 + \frac{N_{RB}^{BW} N_{sc}^{RB}}{2}, n = -N_{\text{offset}}, ...,\right.$$

$$\left. -N_{\text{offset}} + N_{sc}^{SS}-1; l = N_{symb}^{RB}-1; n_s \bmod N_{slot}^F = 0, \frac{N_{slot}^F}{2};\right\}$$

where a position of each resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{\text{offset}}$ is a subcarrier position offset of the synchronization signal; or the resource configuration of the synchronization signal includes at least four different resource element groups $REG_1$, $REG_2$, $REG_3$, and $REG_4$, where $$REG_1 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = N_{symb}^{RB}-1; n_s \bmod N_{slot}^F = 0, \frac{N_{slot}^F}{2}, n_f \bmod 2 = 0;\right\}$$

$$REG_2 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = N_{symb}^{RB}-1; n_s \bmod N_{slot}^F = \frac{N_{slot}^F}{4}, \frac{3\cdot N_{slot}^F}{4}, n_f \bmod 2 = 0;\right\}$$

$$REG_3 = \left\{(k,l,n_s,n_f) \mid k = n - \frac{N_{sc}^{SS}}{2} + \frac{N_{RB}^{BW} N_{sc}^{RB}}{2}, n = 0, ...,\right.$$

$$\left. N_{sc}^{SS}-1; l = N_{symb}^{RB}-1; n_s \bmod N_{slot}^F = 0, \frac{N_{slot}^F}{2}, n_f \bmod 2 = 1;\right\}$$

$$REG_4 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = N_{symb}^{RB}-1; n_s \bmod N_{slot}^F = \frac{N_{slot}^F}{4}, \frac{3\cdot N_{slot}^F}{4}, n_f \bmod 2 = 1;\right\}$$

or $$REG_1 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = 0, \frac{N_{slot}^F}{2}, n_f \bmod 2 = 0;\right\}$$

$$REG_2 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = \frac{N_{slot}^F}{4}, \frac{3\cdot N_{slot}^F}{4}, n_f \bmod 2 = 0;\right\}$$

$$REG_3 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = 0, \frac{N_{slot}^F}{2}, n_f \bmod 2 = 1;\right\}$$

$$REG_4 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = \frac{N_{slot}^F}{4}, \frac{3\cdot N_{slot}^F}{4}, n_f \bmod 2 = 1;\right\}$$

or $$REG_1 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = 0, \frac{N_{slot}^F}{2}, n_f \bmod 2 = 0;\right\}$$

$$REG_2 = \left\{(k,l,n_s,n_f) \mid k = n - \frac{N_{sc}^{SS}}{2} + \frac{N_{RB}^{BW} N_{sc}^{RB}}{2}, n = 0, ..., N_{sc}^{SS}-1;\right.$$

$$\left. l = \frac{N_{symb}^{RB}-1}{2}; n_s \bmod N_{slot}^F = \frac{N_{slot}^F}{4}, \frac{3\cdot N_{slot}^F}{4}, n_f \bmod 2 = 0;\right\}$$

-continued $$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, \right.$$
$$n = N_{offset}, \ldots, N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, \right.$$
$$n = N_{offset}, \ldots, N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, \right.$$
$$n = N_{offset}, \ldots, N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, \right.$$
$$n = N_{offset}, \ldots, N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = N_{symb}^{RB} - 1; n_s \bmod N_{slot}^F = 0, \frac{N_{slot}^F}{4}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{8}, \frac{3 \cdot N_{slot}^F}{8}; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{2}, \frac{3 N_{slot}^F}{4}; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{5 N_{slot}^F}{8}, \frac{7 N_{slot}^F}{8}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$

$$\ldots, N_{sc}^{SS} - 1; l = \frac{N_{symb}^{RB} - 1}{2}; n_s \bmod N_{slot}^F = 0, \frac{N_{slot}^F}{4}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = \frac{N_{slot}^F}{8}, \frac{3 \cdot N_{slot}^F}{8}; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = \frac{N_{slot}^F}{2}, \frac{3 N_{slot}^F}{4}; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = \frac{5 N_{slot}^F}{8}, \frac{7 N_{slot}^F}{8}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = \frac{N_{symb}^{RB} - 1}{2}; n_s \bmod N_{slot}^F = 0, \frac{N_{slot}^F}{4}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = N_{symb}^{RB} - 1; n_s \bmod N_{slot}^F = 0, \frac{N_{slot}^F}{4}; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = \frac{N_{slot}^F}{2}, \frac{3 N_{slot}^F}{4}; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{2}, \frac{3 N_{slot}^F}{4}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = N_{offset}, \ldots, \right.$$
$$\left. N_{offset} + N_{sc}^{SS} - 1; l = N_{symb}^{RB} - 1; n_s \bmod N_{slot}^F = 0, \frac{N_{slot}^F}{4}; \right\}$$

$$REG_2 = \left\{(k, l, n_s, n_f) \mid k = n - 31 + \frac{N_{RB}^{BW} N_{sc}^{RB}}{2}, n = -N_{offset}, \ldots, \right.$$
$$\left. -N_{offset} + N_{sc}^{SS} - 1; l = N_{symb}^{RB} - 1; n_s \bmod N_{slot}^F = 0, \frac{N_{slot}^F}{4}; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = N_{offset}, \ldots, \right.$$
$$\left. N_{offset} + N_{sc}^{SS} - 1; l = N_{symb}^{RB} - 1; n_s \bmod N_{slot}^F = \frac{N_{slot}^F}{2}, \frac{3 N_{slot}^F}{4}; \right\}$$

$$REG_4 = \left\{(k, l, n_s, n_f) \mid k = n - 31 + \frac{N_{RB}^{BW} N_{sc}^{RB}}{2}, n = -N_{offset}, \ldots, \right.$$
$$\left. -N_{offset} + N_{sc}^{SS} - 1; l = N_{symb}^{RB} - 1; n_s \bmod N_{slot}^F = \frac{N_{slot}^F}{2}, \frac{3 N_{slot}^F}{4}; \right\}$$

where a position of a resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols included in each resource block, $N_{slot}^{SF}$ denotes a quantity of slots included in a subframe, $N_{sc}^{SS}$ is a quantity of subcarriers occupied by the synchronization signal, and $N_{offset}$ is a subcarrier position offset of the synchronization signal.

With reference to any one of the eighth to the tenth possible implementations of the second aspect, in an eleventh possible implementation of the second aspect, a synchronization signal transmitted on each of the at least two different resource element groups included in the resource configuration of the synchronization signal carries at least one piece of indication information; and the processing unit is configured to obtain, from the synchronization signal received by the receiving unit, the at least one piece of indication information carried in the synchronization signal, where the indication information indicates information about a resource used by the synchronization signal or indicates information about a physical channel or a resource of a physical channel used by the user equipment, and the physical channel is at least one of the following: a physical broadcast channel (PBCH), a physical control format indicator channel (PCFICH), a physical downlink control channel (PDCCH), an enhanced physical downlink control channel (ePDCCH), or a physical uplink control channel (PUCCH).

With reference to the eleventh possible implementation of the second aspect, in a twelfth possible implementation of the second aspect, the indication information is represented by a ZC sequence or a computer-generated (CG) sequence or an m-sequence or a cyclic shift of the foregoing sequence or a combination of the foregoing sequences.

With reference to any one of the second aspect, and the first to the seventh possible implementations of the second aspect, in a thirteenth possible implementation of the second aspect, the communication signal is a broadcast channel, and the same information is at least one of the following: a system bandwidth, a part or all of information of a system frame number SFN, physical channel configuration indication information, and a master information block MIB.

With reference to the thirteenth possible implementation of the second aspect, in a fourteenth possible implementation of the second aspect, at least two different resource element groups included in a resource configuration of the broadcast channel are respectively located in different OFDM symbols or slots or subframes or radio frames or system frames; and the receiving unit is configured to: receive the broadcast channel based on an OFDM symbol or a slot or a subframe or a radio frame or a system frame in which the at least one resource element group is located.

With reference to the fourteenth possible implementation of the second aspect, in a fifteenth possible implementation of the second aspect, the resource configuration of the synchronization signal includes at least two different resource element groups $REG_1$ and $REG_2$, where $$REG_1 = \left\{(k, l, n_s, n_f) \mid k = \frac{N_{RB}^{BW} N_{sc}^{RB}}{2} - 36 + k',\right.$$

-continued $$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots, 71; l = 0, 1, 2, 3; n_s = 3, n_f \bmod(4N) = i;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots, 71; l = 4, 5, 6; n_s = 1, n_f \bmod(4N) = i;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots, 71; l = 0, 1, 2, 3; n_s = 3, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} + 36 + k', k' = 0,\right.$$

$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 108 + k', k' = 0,\right.$$

$$\left. 1, \ldots, 71; l = 0, 1, 2, 3; n_s = 1, n_f \bmod(4N) = j;\right\}$$

or

-continued $$REG_1 = \left\{(k, l, n_s, n_f) \mid k = \frac{N_{RB}^{BW} N_{sc}^{RB}}{2} - 18 + k', k' = 0,\right.$$

$$\left. 1, \ldots, 35; l = 0, 1, 2, 3; n_s = 1, 3, n_f \mod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1,\right.$$

$$\left. \ldots, 35; l = 0, 1, 2, 3; n_s = 6, 8, n_f \mod(4N) = i;\right\}$$

or $$REG_1 = \left\{(k, l, n_s, n_f) \mid k = \frac{N_{RB}^{BW} N_{sc}^{RB}}{2} - 18 + k', k' = 0,\right.$$

$$\left. 1, \ldots, 36; l = 0, 1, 2, 3; n_s = 1, 3, n_f \mod(4N) = i;\right\}$$

$$REG_2 = \left\{(k, l, n_s, n_f) \mid k = \frac{N_{RB}^{BW} N_{sc}^{RB}}{2} - 18 + k', k' = 0,\right.$$

$$\left. 1, \ldots, 35; l = 4, 5, 6; n_s = 1, 3, n_f \mod(4N) = i;\right\}$$

or $$REG_1 = \left\{(k, l, n_s, n_f) \mid k = \frac{N_{RB}^{BW} N_{sc}^{RB}}{2} - 18 + k', k' = 0,\right.$$

$$\left. 1, \ldots, 35; l = 0, 1, 2, 3; n_s = 1, 3, n_f \mod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1,\right.$$

$$\left. \ldots, 35; l = 0, 1, 2, 3; n_s = 1, 3, n_f \mod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$

$$\left. 1, \ldots, 35; l = 0, 1, 2, 3; n_s = 6, 8, n_f \mod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1,\right.$$

$$\left. \ldots, 35; l = 0, 1, 2, 3; n_s = 1, 3, n_f \mod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$

$$\left. 1, \ldots, 35; l = 0, 1, 2, 3; n_s = 1, 3, n_f \mod(4N) = i;\right\}$$

$$REG_2 = \left\{(k, l, n_s, n_f) \mid k = \frac{N_{RB}^{BW} N_{sc}^{RB}}{2} + 18 + k', k' = 0, 1,\right.$$

$$\left. \ldots, 35; l = 0, 1, 2, 3; n_s = 1, 3, n_f \mod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$

$$\left. 1, \ldots, 35; l = 0, 1, 2, 3; n_s = 1, 3, n_f \mod(4N) = i;\right\}$$

$$REG_2 = \left\{(k, l, n_s, n_f) \mid k = \frac{N_{RB}^{BW} N_{sc}^{RB}}{2} - 54 + k', k' = 0,\right.$$

$$\left. 1, \ldots, 35; l = 0, 1, 2, 3; n_s = 1, 3, n_f \mod(4N) = j;\right\}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, a parameter i is not equal to a parameter j, values of the parameters i and j are both in a range of 0 to 4N−1, and N is a positive integer.

With reference to any one of the thirteenth to the fifteenth possible implementations of the second aspect, in a sixteenth possible implementation of the second aspect, a broadcast channel transmitted on each of the at least two different resource element groups included in the resource configuration of the broadcast channel carries at least one piece of indication information; and the processing unit is configured to obtain, from the broadcast channel received by the receiving unit, the at least one piece of indication information carried in the broadcast channel, where the indication information indicates information about a resource used by the broadcast channel or indicates information about a physical channel or a resource of a physical channel used by the user equipment, and the physical channel is at least one of the following: a physical control format indicator channel (PCFICH), a physical downlink control channel (PDCCH), an enhanced physical downlink control channel (ePDCCH), or a physical uplink control channel (PUCCH).

With reference to the sixteenth possible implementation of the second aspect, in a seventeenth possible implementation of the second aspect, the indication information is carried in a broadcast message of the broadcast channel, or the indication information is represented by using different cyclic redundancy check masks.

With reference to any one of the second aspect, and the first to the seventh possible implementations of the second aspect, in an eighteenth possible implementation of the second aspect, the communication signal is a control channel, and the same information is downlink control information of a system information block, or downlink control information carried in a common search space (CSS), or format indicator information of a downlink control channel.

With reference to the eighteenth possible implementation of the second aspect, in a nineteenth possible implementation of the second aspect, at least two different resource element groups included in a resource configuration of the control channel are respectively located in different OFDM symbols or slots or subframes or system frames or radio frames or control channel elements (CCEs) or CCE sets or enhanced control channel elements (eCCEs) or eCCE sets; and the receiving unit is configured to: receive the control channel based on an OFDM symbol or a slot or a subframe or a system frame or a radio frame or a control channel element (CCE) or a CCE set or an enhanced channel control channel element (eCCE) or an eCCE set in which the at least one resource element group is located.

With reference to the eighteenth or the nineteenth possible implementation of the second aspect, in a twentieth possible implementation of the second aspect, a control channel transmitted on each of the at least two different resource element groups included in the resource configuration of the control channel carries at least one piece of indication information; and the processing unit is configured to obtain, from the control channel received by the receiving unit, the at least one piece of indication information carried in the control channel, where the indication information indicates information about a resource used by the control channel or indicates information about a physical channel or a resource of a physical channel used by the user equipment, and the physical channel is at least one of the following: a physical control channel (PDCCH) or an enhanced physical control channel (ePDCCH) carried in a user equipment specific search space (USS), or a physical uplink control channel (PUCCH).

With reference to the twentieth possible implementation of the second aspect, in a twenty-first possible implementation of the second aspect, the indication information is carried in control information of the control channel, or the indication information is represented by using different cyclic redundancy check masks.

With reference to any one of the thirteenth to the twenty-first possible implementations of the second aspect, in a twenty-second possible implementation of the second aspect, the communication signal is the broadcast channel or the control channel; the receiving unit is configured to: receive a synchronization signal set transmitted by the base station, where the synchronization signal set includes at least one synchronization signal corresponding to the communication signal on the at least one resource element group in the resource configuration of the communication signal; and the processing unit is configured to: determine, from the resource configuration of the communication signal, the at least one resource element group for the communication signal, where the at least one resource element group corresponds to the at least one synchronization signal used by the user equipment.

With reference to the twenty-second possible implementation of the second aspect, in a twenty-third possible implementation of the second aspect, the at least one synchronization signal included in the synchronization signal set carries at least one piece of indication information, where the indication information is used to indicate information about a resource used by the communication signal received on the at least one resource element group.

With reference to any one of the eighteenth to the twenty-third possible implementations of the second aspect, in a twenty-fourth possible implementation of the second aspect, the communication signal is the control channel, and the receiving unit is configured to: receive a broadcast channel set transmitted by the base station, where the broadcast channel set includes at least one broadcast channel corresponding to the control channel transmitted on the at least one resource element group in the resource configuration of the control channel; and the processing unit is configured to: determine, from the resource configuration of the control channel, the at least one resource element group for the control channel, where the at least one resource element group corresponds to the at least one broadcast channel used by the user equipment.

With reference to the twenty-fourth possible implementation of the second aspect, in a twenty-fifth possible implementation of the second aspect, the at least one broadcast channel included in the broadcast channel set carries at least one piece of indication information, where the indication information is used to indicate information about a resource used for receiving the control channel on the at least one resource element group.

According to a third aspect, the present invention provides a communication signal transmitting method, including: determining a resource configuration of a communication signal, where the resource configuration includes at least two different resource element groups; and transmitting the communication signal on each resource element group included in the resource configuration to user equipment, where the communication signal transmitted on each resource element group carries at least one piece of same information, and the same information is cell specific or user equipment group specific information.

In the present invention, the communication signal is transmitted on each resource element group included in the resource configuration of the communication signal to the user equipment, and the communication signals transmitted on the at least two different resource element groups use two different antenna port groups respectively. User equipment in a cell (or a user equipment group) can measure, by using at least two different antenna port groups separately, a communication signal transmitted on a resource element group with favorable channel condition for the user equipment, and take advantage of space diversity gain provided by different antenna port groups to receive the cell (or user equipment group) specific same information, or utilize combinatorial reception of the communication signals transmitted on the at least two resource element groups to receive the cell (or user equipment group) specific same information. Therefore, transmission reliability of the cell (or user equipment group) specific information or the communication signal is effectively improved.

With reference to the third aspect, in a first possible implementation of the third aspect, the communication signal transmitted on each of the at least two resource element groups included in the resource configuration further carries at least one piece of indication information, where the indication information is used to indicate information about a resource used by the communication signal, or used to indicate one or more physical channels used by the user equipment, or used to indicate information about a resource used by one or more physical channels used by the user equipment, or used to indicate information about a resource used by one or more physical signals used by the user equipment.

With reference to the first possible implementation of the third aspect, in a second possible implementation of the third aspect, the information about the resource used by the communication signal is at least one of the following: identification information of the communication signal, information about a resource element group used by the communication signal, information about a sequence or a sequence group used by the communication signal, information about an antenna port or an antenna port group used by the communication signal, information about a time-frequency position used by the communication signal, information about precoding used by the communication signal, and information about a beam group used by the communication signal; and the information about the resource used by the one or more physical channels used by the user equipment or the information about the resource used by the one or more physical signals used by the user equipment is at least one of the following: identification information used by the physical channel or the physical signal, information about a resource element group used by the physical channel or the physical signal, information about an antenna port used by the physical channel or the physical signal, information about a reference signal used by the physical channel or the physical signal, information about a sequence or a sequence group used by the physical channel or the physical signal, information about an antenna port or an antenna port group used by the physical channel or the physical signal, information about a time-frequency position used by the physical channel or the physical signal, information about precoding used by the physical channel or the physical signal, and information about a beam group used by the physical channel or the physical signal.

With reference to any one of the third aspect, and the first and the second possible implementations of the third aspect, in a third possible implementation of the third aspect, the communication signals transmitted on the at least two resource element groups included in the resource configuration use different sequence groups or different antenna port groups.

With reference to any one of the third aspect, and the first to the third possible implementations of the third aspect, in a fourth possible implementation of the third aspect, the communication signals transmitted on the at least two resource element groups included in the resource configuration use different precoding or different beam groups.

With reference to any one of the third aspect, and the first to the fourth possible implementations of the third aspect, in a fifth possible implementation of the third aspect, the method further includes: transmitting a reference signal set to the user equipment, so that the user equipment determines at least one resource element group in the resource configuration of the communication signal based on the reference signal set and receives the communication signal on the determined at least one resource element group.

With reference to the fifth possible implementation of the third aspect, in a sixth possible implementation of the third aspect, the reference signal set is a cell specific reference signal set or a channel state information reference signal set.

With reference to any one of the third aspect, and the first to the sixth possible implementations of the third aspect, in a seventh possible implementation of the third aspect, the communication signal is a synchronization signal, and the same information is all or a part of information of a cell identifier, or all or a part of information of a user equipment group identifier.

With reference to the seventh possible implementation of the third aspect, in an eighth possible implementation of the third aspect, at least two different resource element groups included in a resource configuration of the synchronization signal are respectively located in different OFDM symbols or slots or subframes or radio frames or system frames.

With reference to the eighth possible implementation of the third aspect, in a ninth possible implementation of the third aspect, the resource configuration of the synchronization signal includes at least two different resource element groups $REG_1$ and $REG_2$, where $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = N_{symb}^{RB} - 1; n_s \bmod N_{slot}^F = 0, \frac{N_{slot}^F}{2}; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = N_{symb}^{RB} - 1; n_s \bmod N_{slot}^F = \frac{N_{slot}^F}{4}, \frac{3 \cdot N_{slot}^F}{4}; \right\}$$

or

-continued $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = \frac{N_{symb}^{RB} - 1}{2}; n_s \bmod N_{slot}^F = 0, \frac{N_{slot}^F}{2}; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = \frac{N_{symb}^{RB} - 1}{2}; n_s \bmod N_{slot}^F = \frac{N_{slot}^F}{4}, \frac{3 \cdot N_{slot}^F}{4}; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = N_{symb}^{RB} - 1; n_s \bmod N_{slot}^F = 0, \frac{N_{slot}^F}{2}, n_f \bmod 2 = 0; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = N_{symb}^{RB} - 1; n_s \bmod N_{slot}^F = 0, \frac{N_{slot}^F}{2}, n_f \bmod 2 = 1; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = \frac{N_{symb}^{RB} - 1}{2}; n_s \bmod N_{slot}^F = 0, \frac{N_{slot}^F}{2}, n_f \bmod 2 = 0; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = \frac{N_{symb}^{RB} - 1}{2}; n_s \bmod N_{slot}^F = 0, \frac{N_{slot}^F}{2}, n_f \bmod 2 = 1; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = \frac{N_{symb}^{RB} - 1}{2}; n_s \bmod N_{slot}^F = 0, \frac{N_{slot}^F}{2}; \right\}$$

$$REG_2 = \left\{ (k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = N_{symb}^{RB} - 1; n_s \bmod N_{slot}^F = 0, \frac{N_{slot}^F}{2}; \right\}$$

or $$REG_1 = \left\{ (k, l, n_s, n_f) \mid k = n - \frac{N_{sc}^{SS}}{2} + \frac{N_{RB}^{BW} N_{sc}^{RB}}{2}, n = N_{offset}, \ldots, \right.$$

$$\left. N_{offset} + N_{sc}^{SS} - 1; l = N_{symb}^{RB} - 1; n_s \bmod N_{slot}^F = 0, \frac{N_{slot}^F}{2}; \right\}$$

$$REG_2 = \left\{ (k, l, n_s, n_f) \mid k = n - 31 + \frac{N_{RB}^{BW} N_{sc}^{RB}}{2}, n = -N_{offset}, \ldots, \right.$$

$$\left. -N_{offset} + N_{sc}^{SS} - 1; l = N_{symb}^{RB} - 1; n_s \bmod N_{slot}^F = 0, \frac{N_{slot}^F}{2}; \right\}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{offset}$ is a subcarrier position offset of the synchronization signal; or the resource configuration of the synchronization signal includes at least four different resource element groups $REG_1$, $REG_2$, $REG_3$, and $REG_4$, where $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^{F} = 0, \frac{N_{slot}^{F}}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^{F} = \frac{N_{slot}^{F}}{4}, \frac{3 \cdot N_{slot}^{F}}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^{F} = 0, \frac{N_{slot}^{F}}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^{F} = \frac{N_{slot}^{F}}{4}, \frac{3 \cdot N_{slot}^{F}}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^{F} = 0, \frac{N_{slot}^{F}}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^{F} = \frac{N_{slot}^{F}}{4}, \frac{3 \cdot N_{slot}^{F}}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^{F} = 0, \frac{N_{slot}^{F}}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^{F} = \frac{N_{slot}^{F}}{4}, \frac{3 \cdot N_{slot}^{F}}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^{F} = 0, \frac{N_{slot}^{F}}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^{F} = 0, \frac{N_{slot}^{F}}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^{F} = 0, \frac{N_{slot}^{F}}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^{F} = 0, \frac{N_{slot}^{F}}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = N_{offset}, \ldots, N_{offset} + N_{sc}^{SS} - 1; l = N_{symb}^{RB} - 1; \right.$$
$$\left. n_s \bmod N_{slot}^{F} = 0, \frac{N_{slot}^{F}}{2}, n_f \bmod 2 = 0; \right\}$$

$$REG_2 = \left\{(k, l, n_s, n_f) \mid k = n - 31 + \frac{N_{RB}^{BW} N_{sc}^{RB}}{2}, \right.$$
$$\left. n = N_{offset}, \ldots, -N_{offset} + N_{sc}^{SS} - 1; l = N_{symb}^{RB} - 1; \right.$$
$$\left. n_s \bmod N_{slot}^{F} = 0, \frac{N_{slot}^{F}}{2}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = N_{offset}, \ldots, N_{offset} + N_{sc}^{SS} - 1; l = N_{symb}^{RB} - 1; \right.$$
$$\left. n_s \bmod N_{slot}^{F} = 0, \frac{N_{slot}^{F}}{2}, n_f \bmod 2 = 1; \right\}$$

$$REG_4 = \left\{(k, l, n_s, n_f) \mid k = n - 31 + \frac{N_{RB}^{BW} N_{sc}^{RB}}{2}, \right.$$
$$\left. n = N_{offset}, \ldots, -N_{offset} + N_{sc}^{SS} - 1; l = N_{symb}^{RB} - 1; \right.$$
$$\left. n_s \bmod N_{slot}^{F} = 0, \frac{N_{slot}^{F}}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = N_{symb}^{RB} - 1; n_s \bmod N_{slot}^{F} = 0, \frac{N_{slot}^{F}}{4}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^{F} = \frac{N_{slot}^{F}}{8}, \frac{3 \cdot N_{slot}^{F}}{8}; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^{F} = \frac{N_{slot}^{F}}{2}, \frac{3N_{slot}^{F}}{4}; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^{F} = \frac{5N_{slot}^{F}}{8}, \frac{7N_{slot}^{F}}{8}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$

-continued $$\ldots, N_{sc}^{SS}-1; l=\frac{N_{symb}^{RB}-1}{2}; n_s \bmod N_{slot}^F=0, \frac{N_{slot}^F}{4};\Bigg\}$$

$$REG_2=\Bigg\{(k,l,n_s,n_f)\mid k=n-\frac{N_{sc}^{SS}}{2}+\frac{N_{RB}^{BW}N_{sc}^{RB}}{2}, n=0,\ldots,$$

$$N_{sc}^{SS}-1; l=\frac{N_{symb}^{RB}-1}{2}; n_s \bmod N_{slot}^F=\frac{N_{slot}^F}{8}, \frac{3\cdot N_{slot}^F}{8};\Bigg\}$$

$$REG_3=\Bigg\{(k,l,n_s,n_f)\mid k=n-\frac{N_{sc}^{SS}}{2}+\frac{N_{RB}^{BW}N_{sc}^{RB}}{2}, n=0,\ldots,$$

$$N_{sc}^{SS}-1; l=\frac{N_{symb}^{RB}-1}{2}; n_s \bmod N_{slot}^F=\frac{N_{slot}^F}{2}, \frac{6N_{slot}^F}{8};\Bigg\}$$

$$REG_4=\Bigg\{(k,l,n_s,n_f)\mid k=n-\frac{N_{sc}^{SS}}{2}+\frac{N_{RB}^{BW}N_{sc}^{RB}}{2}, n=0,\ldots,$$

$$N_{sc}^{SS}-1; l=\frac{N_{symb}^{RB}-1}{2}; n_s \bmod N_{slot}^F=\frac{5N_{slot}^F}{8}, \frac{7N_{slot}^F}{8};\Bigg\}$$

or $$REG_1=\Bigg\{(k,l,n_s,n_f)\mid k=n-\frac{N_{sc}^{SS}}{2}+\frac{N_{RB}^{BW}N_{sc}^{RB}}{2}, n=0,$$

$$\ldots, N_{sc}^{SS}-1; l=\frac{N_{symb}^{RB}-1}{2}; n_s \bmod N_{slot}^F=0, \frac{N_{slot}^F}{4};\Bigg\}$$

$$REG_2=\Bigg\{(k,l,n_s,n_f)\mid k=n-\frac{N_{sc}^{SS}}{2}+\frac{N_{RB}^{BW}N_{sc}^{RB}}{2}, n=0,$$

$$\ldots, N_{sc}^{SS}-1; l=N_{symb}^{RB}-1; n_s \bmod N_{slot}^F=0, \frac{N_{slot}^F}{4};\Bigg\}$$

$$REG_3=\Bigg\{(k,l,n_s,n_f)\mid k=n-\frac{N_{sc}^{SS}}{2}+\frac{N_{RB}^{BW}N_{sc}^{RB}}{2}, n=0,\ldots,$$

$$N_{sc}^{SS}-1; l=\frac{N_{symb}^{RB}-1}{2}; n_s \bmod N_{slot}^F=\frac{N_{slot}^F}{2}, \frac{3N_{slot}^F}{4};\Bigg\}$$

$$REG_4=\Bigg\{(k,l,n_s,n_f)\mid k=n-\frac{N_{sc}^{SS}}{2}+\frac{N_{RB}^{BW}N_{sc}^{RB}}{2}, n=0,\ldots,$$

$$N_{sc}^{SS}-1; l=N_{symb}^{RB}-1; n_s \bmod N_{slot}^F=\frac{N_{slot}^F}{2}, \frac{3N_{slot}^F}{4};\Bigg\}$$

or $$REG_1=\Bigg\{(k,l,n_s,n_f)\mid k=n-\frac{N_{sc}^{SS}}{2}+\frac{N_{RB}^{BW}N_{sc}^{RB}}{2}, n=N_{offset},\ldots,$$

$$N_{offset}+N_{sc}^{SS}-1; l=N_{symb}^{RB}-1; n_s \bmod N_{slot}^F=0, \frac{N_{slot}^F}{4};\Bigg\}$$

$$REG_2=\Bigg\{(k,l,n_s,n_f)\mid k=n-31+\frac{N_{RB}^{BW}N_{sc}^{RB}}{2}, n=-N_{offset},\ldots,$$

$$-N_{offset}+N_{sc}^{SS}-1; l=N_{symb}^{RB}-1; n_s \bmod N_{slot}^F=0, \frac{N_{slot}^F}{4};\Bigg\}$$

$$REG_3=\Bigg\{(k,l,n_s,n_f)\mid k=n-\frac{N_{sc}^{SS}}{2}+\frac{N_{RB}^{BW}N_{sc}^{RB}}{2}, n=N_{offset},\ldots,$$

$$N_{offset}+N_{sc}^{SS}-1; l=N_{symb}^{RB}-1; n_s \bmod N_{slot}^F=\frac{N_{slot}^F}{2}, \frac{3N_{slot}^F}{4};\Bigg\}$$

$$REG_4=\Bigg\{(k,l,n_s,n_f)\mid k=n-31+\frac{N_{RB}^{BW}N_{sc}^{RB}}{2}, n=-N_{offset},\ldots,$$

$$-N_{offset}+N_{sc}^{SS}-1; l=N_{symb}^{RB}-1; n_s \bmod N_{slot}^F=\frac{N_{slot}^F}{2}, \frac{3N_{slot}^F}{4};\Bigg\}$$

where a position of each resource element included in each resource element group is represented by a 4-tuple (k,l,$n_s$,$n_f$), where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{offset}$ is a subcarrier position offset of the synchronization signal.

With reference to the eighth or the ninth possible implementation of the third aspect, in a tenth possible implementation of the third aspect, a synchronization signal transmitted on each of the at least two resource element groups included in the resource configuration of the synchronization signal further carries at least one piece of indication information, where the indication information is used to indicate information about a resource used by the synchronization signal or indicate information about a physical channel or a resource of a physical channel used by the user equipment, and the physical channel is at least one of the following: a physical broadcast channel (PBCH), a physical control format indicator channel (PCFICH), a physical downlink control channel (PDCCH), an enhanced physical downlink control channel (ePDCCH), or a physical uplink control channel (PUCCH).

With reference to the tenth possible implementation of the third aspect, in an eleventh possible implementation of the third aspect, the indication information is represented by a ZC sequence or a computer-generated (CG) sequence or an m-sequence or a Gold sequence or a cyclic shift of the foregoing sequence or a combination of the foregoing sequences.

With reference to any one of the third aspect, and the first to the seventh possible implementations of the third aspect, in a twelfth possible implementation of the third aspect, the communication signal is a broadcast channel, and the same information is at least one of the following: a system bandwidth, a part or all of information of a system frame number (SFN), physical channel configuration indication information, and a master information block (MIB).

With reference to the twelfth possible implementation of the third aspect, in a thirteenth possible implementation of the third aspect, at least two different resource element groups included in a resource configuration of the broadcast channel are respectively located in different OFDM symbols or slots or subframes or radio frames or system frames.

With reference to the thirteenth possible implementation of the third aspect, in a fourteenth possible implementation of the third aspect, the resource configuration of the broadcast channel includes at least two different resource element groups $REG_1$ and $REG_2$, where $$REG_1=\Bigg\{(k,l,n_s,n_f)\mid k=\frac{N_{RB}^{BW}N_{sc}^{RB}}{2}-36+k',$$

$$k'=0,1,\ldots,71; l=0,1,2,3; n_s=1, n_f\bmod(4N)=i;\Bigg\}$$

$$REG_2=\Bigg\{(k,l,n_s,n_f)\mid k=\frac{N_{RB}^{BW}N_{sc}^{RB}}{2}-36+k', k'=0,$$

$$1,\ldots,71; l=0,1,2,3; n_s=3, n_f\bmod(4N)=i;\Bigg\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$
$$\left. 1, \ldots, 71; l = 4, 5, 6; n_s = 1, n_f \bmod(4N) = i;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 3, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} + 36 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$
$$\left. k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 108 + k', k' = 0,\right.$$
$$\left. 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1,\right.$$
$$\left. \ldots, 35; l = 0, 1, 2, 3; n_s = 6, 8, n_f \bmod(4N) = i;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 36; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 4, 5, 6; n_s = 1, 3, n_f \bmod(4N) = i;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1,\right.$$
$$\left. \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 6, 8, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1,\right.$$
$$\left. \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} + 18 + k', k' = 0, 1,\right.$$
$$\left. \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0,\right.$$
$$\left. 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 54 + k', k' = 0,\right.$$
$$\left. 1, \ldots, 35; l = 0, 1, 2, 3; n_s = 1, 3, n_f \bmod(4N) = j;\right\}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, a parameter i is not equal to a parameter j, values of the parameters i and j are both in a range of 0 to 4N−1, and N is a positive integer.

With reference to any one of the twelfth to the fourteenth possible implementations of the third aspect, in a fifteenth possible implementation of the third aspect, a broadcast channel transmitted on each of the at least two resource element groups included in the resource configuration of the broadcast channel further carries at least one piece of indication information, where the indication information indicates information about a resource used by the broadcast channel or indicates information about a physical channel or a resource of a physical channel used by the user equipment, and the physical channel is at least one of the following: a physical control format indicator channel (PCFICH), a physical downlink control channel (PDCCH), an enhanced physical downlink control channel (ePDCCH), or a physical uplink control channel (PUCCH).

With reference to the fifteenth possible implementation of the third aspect, in a sixteenth possible implementation of the third aspect, the indication information is carried in a broadcast message of the broadcast channel or represented by using different cyclic redundancy check masks.

With reference to any one of the third aspect, and the first to the sixth possible implementations of the third aspect, in a seventeenth possible implementation of the third aspect, the communication signal is a control channel, and the same information is downlink control information of a system information block, or downlink control information carried in a common search space CSS, or format indicator information of a downlink control channel.

With reference to the seventeenth possible implementation of the third aspect, in an eighteenth possible implementation of the third aspect, at least two different resource element groups included in a resource configuration of the control channel are respectively located in different OFDM symbols or slots or subframes or radio frames or system frames or control channel elements (CCEs) or CCE sets or enhanced control channel elements (eCCEs) or eCCE sets.

With reference to the seventeenth or the eighteenth possible implementation of the third aspect, in a nineteenth possible implementation of the third aspect, a control channel transmitted on each of the at least two resource element groups included in the resource configuration of the control channel further carries at least one piece of indication information, where the indication information indicates information about a resource used by the control channel or indicates information about a physical channel or a resource of a physical channel used by the user equipment, and the physical channel is at least one of the following: a physical control channel (PDCCH) or an enhanced physical control channel (ePDCCH) carried in a user equipment specific search space (USS), or a physical uplink control channel (PUCCH).

With reference to the nineteenth possible implementation of the third aspect, in a twentieth possible implementation of the third aspect, the indication information is carried in control information of the control channel or represented by using different cyclic redundancy check CRC masks.

With reference to any one of the twelfth to the twentieth possible implementations of the third aspect, in a twenty-first possible implementation of the third aspect, the communication signal is the broadcast channel or the control channel, and the method further includes: transmitting a synchronization signal set to the user equipment, where the synchronization signal set includes at least one synchronization signal corresponding to the communication signal transmitted on the at least one resource element group in the resource configuration of the communication signal.

With reference to the twenty-first possible implementation of the third aspect, in a twenty-second possible implementation of the third aspect, the at least one synchronization signal included in the synchronization signal set carries at least one piece of indication information, where the indication information is used to indicate information about a resource used by the communication signal that is transmitted on the at least one resource element group and corresponds to the synchronization signal.

With reference to any one of the seventeenth to the twenty-first possible implementations of the third aspect, in a twenty-third possible implementation of the third aspect, the communication signal is the control channel, and the method further includes: transmitting a broadcast channel set to the user equipment, where the broadcast channel set includes at least one broadcast channel corresponding to a control channel transmitted on at least one resource element group in the resource configuration of the control channel.

With reference to the twenty-second possible implementation of the third aspect, in a twenty-fourth possible implementation of the third aspect, the at least one broadcast channel included in the broadcast channel set carries at least one piece of indication information, where the indication information is used to indicate information about a resource used by the control channel transmitted on the at least one resource element group and corresponding to the broadcast channel.

According to a fourth aspect, the present invention provides a communication signal receiving method, including: determining, from a resource configuration of a communication signal, at least one resource element group for the communication signal, where the resource configuration of the communication signal includes at least two different resource element groups, the communication signal transmitted on each resource element group included in the resource configuration carries at least one piece of same information, and the same information is cell specific or user equipment group specific information; and receiving the communication signal based on the at least one resource element group.

In the present invention, the communication signal transmitted by a base station on at least one resource element group is determined and received, to obtain the cell specific or user equipment group specific same information carried in the communication signal. Therefore, at least one resource element group with favorable channel condition for user equipment can be determined, and the communication signal is received from the at least one resource element group. Therefore, reliability of transmitting the specific information or the communication signal between a user equipment within a cell (or a user equipment group) and the base station is improved.

With reference to the fourth aspect, in a first possible implementation of the fourth aspect, the determining, from a resource configuration of a communication signal, at least one resource element group for the communication signal includes: determining, from the resource configuration of the communication signal, the at least one resource element group for the communication signal based on signal quality of the communication signal on the resource element group; or determining, from the resource configuration of the communication signal, the at least one resource element group for the communication signal based on signal quality of a reference signal corresponding to the communication signal on the resource element group; or determining, from the resource configuration of the communication signal, the at least one resource element group for the communication signal based on detection or decoding performance of the communication signal on the resource element group; or determining, from the resource configuration of the communication signal, the at least one resource element group for the communication signal based on indication information carried in another physical channel or physical signal; or determining, from the resource configuration of the communication signal, the at least one resource element group for the communication signal based on a reference signal set transmitted by a base station.

With reference to the first possible implementation of the fourth aspect, in a second possible implementation of the fourth aspect, the signal quality is received power or a strength indicator or received quality.

With reference to any one of the fourth aspect, and the first and the second possible implementations of the fourth aspect, in a third possible implementation of the fourth aspect, the communication signal transmitted on each of the at least two resource element groups included in the resource configuration further carries at least one piece of indication information; and the receiving the communication signal based on the at least one resource element group includes: receiving the communication signal based on the at least one resource element group, and obtaining, from the received communication signal, the at least one piece of indication information carried in the communication signal, where the indication information is used to indicate information about a resource used by the communication signal, or used to indicate one or more physical channels used by user equipment, or used to indicate information about a resource used by one or more physical channels used by user equipment.

With reference to the third possible implementation of the fourth aspect, in a fourth possible implementation of the fourth aspect, the information about the resource used by the communication signal is at least one of the following: identification information of the communication signal, information about a resource element group used by the communication signal, information about a sequence or a sequence group used by the communication signal, information about an antenna port or an antenna port group used by the communication signal, information about a time-frequency position used by the communication signal, information about precoding used by the communication signal, and information about a beam group used by the communication signal; and the information about the resource used by the one or more physical channels used by the user equipment or the information about the resource used by the one or more physical signals used by the user equipment is at least one of the following: identification information of the physical channel or the physical signal, information about a resource element group used by the physical channel or the physical signal, information about an antenna port or information about a reference signal used by the physical channel or the physical signal, information about a sequence or a sequence group used by the physical channel or the physical signal, information about an antenna port or an antenna port group used by the physical channel or the physical signal, information about a time-frequency position used by the physical channel or the physical signal, information about precoding used by the physical channel or the physical signal, and information about a beam group used by the physical channel or the physical signal.

With reference to any one of the fourth aspect, and the first to the fourth possible implementations of the fourth aspect, in a fifth possible implementation of the fourth aspect, the communication signals transmitted on the at least two resource element groups included in the resource configuration use different sequence groups or different antenna port groups; and the receiving the communication signal based on the at least one resource element group further includes: receiving the communication signal based on the sequence group or the antenna port group used by the communication signal on the at least one resource element group.

With reference to any one of the fourth aspect, and the first to the fifth possible implementations of the fourth aspect, in a sixth possible implementation of the fourth aspect, the communication signals transmitted on the at least two resource element groups included in the resource configuration use different precoding or different beam groups; and the receiving the communication signal based on the at least one resource element group further includes: receiving the communication signal based on precoding or a beam group used by the communication signal on the at least one resource element group; or receiving, based on the at least one resource element group, the communication signals transmitted by the base station by using different precoding or beam groups.

With reference to any one of the fourth aspect, and the first to the sixth possible implementations of the fourth aspect, in a seventh possible implementation of the fourth aspect, the at least two resource element groups included in the resource configuration are located in different radio frames, or different system frames, or different subframes, or different slots, or different orthogonal frequency division multiplexing (OFDM) symbols, or different subcarriers, or different physical resource blocks (PRBs); and the receiving the communication signal based on the at least one resource element group includes: receiving the communication signal based on a radio frame, or a system frame, or a subframe, or a slot, or an orthogonal frequency division multiplexing (OFDM) symbol, or a subcarrier, or a physical resource block (PRB) in which the at least one resource element group is located.

With reference to any one of the fourth aspect, and the first to the seventh possible implementations of the fourth aspect, in an eighth possible implementation of the fourth aspect, the communication signal is a synchronization signal, and the same information is all or a part of information of a cell identifier, or all or a part of information of a user equipment group identifier.

With reference to the eighth possible implementation of the fourth aspect, in a ninth possible implementation of the fourth aspect, at least two different resource element groups included in a resource configuration of the synchronization signal are respectively located in different OFDM symbols or slots or subframes or radio frames or system frames; and the receiving the communication signal based on the at least one resource element group includes: receiving the synchronization signal based on an OFDM symbol or a slot or a subframe or a radio frame or a system frame in which the at least one resource element group is located.

With reference to the ninth possible implementation of the fourth aspect, in a tenth possible implementation of the fourth aspect, the resource configuration of the synchronization signal includes at least two different resource element groups $REG_1$ and $REG_2$, where $$REG_1 = \left\{(k, l, n_s, n_f) \mid k = n - \frac{N_{sc}^{SS}}{2} + \frac{N_{RB}^{BW} N_{sc}^{RB}}{2}, n = 0,\right.$$

$$\left.\ldots, N_{sc}^{SS} - 1; l = N_{symb}^{RB} - 1; n_s \bmod N_{slot}^F = 0, \frac{N_{slot}^F}{2};\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = N_{symb}^{RB} - 1; n_s \bmod N_{slot}^F = \frac{N_{slot}^F}{4}, \frac{3 \cdot N_{slot}^F}{4};\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0,\right.$$

$$\left.\ldots, N_{sc}^{SS} - 1; l = \frac{N_{symb}^{RB} - 1}{2}; n_s \bmod N_{slot}^F = 0, \frac{N_{slot}^F}{2};\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = \frac{N_{symb}^{RB} - 1}{2}; n_s \bmod N_{slot}^F = \frac{N_{slot}^F}{4}, \frac{3 \cdot N_{slot}^F}{4};\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = N_{symb}^{RB} - 1; n_s \bmod N_{slot}^F = 0, \frac{N_{slot}^F}{2}, n_f \bmod 2 = 0;\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = N_{symb}^{RB} - 1; n_s \bmod N_{slot}^F = 0, \frac{N_{slot}^F}{2}, n_f \bmod 2 = 1;\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 0;\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 1;\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0,\right.$$

$$\left.\ldots, N_{sc}^{SS} - 1; l = \frac{N_{symb}^{RB} - 1}{2}; n_s \bmod N_{slot}^F = 0, \frac{N_{slot}^F}{2};\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0,\right.$$

$$\left.\ldots, N_{sc}^{SS} - 1; l = N_{symb}^{RB} - 1; n_s \bmod N_{slot}^F = 0, \frac{N_{slot}^F}{2};\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = N_{offset},\right.$$

$$\left.\ldots, N_{offset} + N_{sc}^{SS} - 1; l = N_{symb}^{RB} - 1; n_s \bmod N_{slot}^F = 0, \frac{N_{slot}^F}{2};\right\}$$

-continued $$REG_2 = \left\{(k, l, n_s, n_f) \mid k = n - 31 + N_{RB}^{BW} N_{sc}^{RB}, n = -N_{offset}, \ldots,\right.$$

$$\left. -N_{offset} + N_{sc}^{SS} - 1; l = N_{symb}^{RB} - 1; n_s \bmod N_{slot}^F = 0, \frac{N_{slot}^F}{2};\right\}$$

where a position of each resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{offset}$ is a subcarrier position offset of the synchronization signal;

or the resource configuration of the synchronization signal includes at least four different resource element groups $REG_1$, $REG_2$, $REG_3$, and $REG_4$, where $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = N_{symb}^{RB} - 1; n_s \bmod N_{slot}^F = 0, \frac{N_{slot}^F}{2}, n_f \bmod 2 = 0;\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1;\right.$$

$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 0;\right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = N_{symb}^{RB} - 1; n_s \bmod N_{slot}^F = 0, \frac{N_{slot}^F}{2}, n_f \bmod 2 = 1;\right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1;\right.$$

$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 1;\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 0;\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1;\right.$$

$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 0;\right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 1;\right\}$$

-continued $$REG_4 = \left\{(k, l, n_s, n_f) \,|\, k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 1;\right\}$$

or $$REG_1 = \left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 0;\right\}$$

$$REG_2 = \left\{(k, l, n_s, n_f) \,|\, k = n - \frac{N_{sc}^{SS}}{2} + \frac{N_{RB}^{BWRB} }{2}, n = 0, \ldots, \right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 0;\right\}$$

$$REG_3 = \left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 1;\right\}$$

$$REG_4 = \left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 1;\right\}$$

or $$REG_1 = \left\{(k, l, n_s, n_f) \,|\, k = n - \frac{N_{sc}^{SS}}{2} + \frac{N_{RB}^{BW} N_{sc}^{RB}}{2}, n = N_{offset}, \ldots, \right.$$
$$\left. N_{offset} + N_{sc}^{SS} - 1; l = N_{symb}^{RB} - 1; n_s \bmod N_{slot}^F = 0, \frac{N_{slot}^F}{2}, n_f \bmod 2 = 0;\right\}$$

$$REG_2 = \left\{(k, l, n_s, n_f) \,|\, k = n - 31 + \frac{N_{RB}^{BW} N_{sc}^{RB}}{2}, \right.$$
$$n = -N_{offset}, \ldots, -N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 0;\right\}$$

$$REG_3 = \left\{(k, l, n_s, n_f) \,|\, k = n - \frac{N_{sc}^{SS}}{2} + \frac{N_{RB}^{BW} N_{sc}^{RB}}{2}, n = N_{offset}, \ldots, \right.$$
$$\left. N_{offset} + N_{sc}^{SS} - 1; l = N_{symb}^{RB} - 1; n_s \bmod N_{slot}^F = 0, \frac{N_{slot}^F}{2}, n_f \bmod 2 = 1;\right\}$$

$$REG_4 = \left\{(k, l, n_s, n_f) \,|\, k = n - 31 + \frac{N_{RB}^{BW} N_{sc}^{RB}}{2}, \right.$$
$$n = -N_{offset}, \ldots, -N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 1;\right\}$$

or $$REG_1 = \left\{(k, l, n_s, n_f) \,|\, k = n - \frac{N_{sc}^{SS}}{2} + \frac{N_{RB}^{BW} N_{sc}^{RB}}{2}, \right.$$
$$\left. n = 0, \ldots, N_{sc}^{SS} - 1; l = N_{symb}^{RB} - 1; n_s \bmod N_{slot}^F = 0, \frac{N_{slot}^F}{4};\right\}$$

$$REG_2 = \left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{8}, \frac{3 \cdot N_{slot}^F}{8};\right\}$$

$$REG_3 = \left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{2}, \frac{3 N_{slot}^F}{4};\right\}$$

$$REG_4 = \left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{5 N_{slot}^F}{8}, \frac{7 N_{slot}^F}{8};\right\}$$

or $$REG_1 = \left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = 0, \frac{N_{slot}^F}{4};\right\}$$

$$REG_2 = \left\{(k, l, n_s, n_f) \,|\, k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{8}, \frac{3 \cdot N_{slot}^F}{8};\right\}$$

$$REG_3 = \left\{(k, l, n_s, n_f) \,|\, k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{2}, \frac{6 N_{slot}^F}{8};\right\}$$

$$REG_4 = \left\{(k, l, n_s, n_f) \,|\, k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{5 N_{slot}^F}{8}, \frac{7 N_{slot}^F}{8};\right\}$$

or $$REG_1 =$$
$$\left\{(k, l, n_s, n_f) \,|\, k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = 0, \frac{N_{slot}^F}{4};\right\}$$

$$REG_2 = \left\{(k, l, n_s, n_f) \,|\, k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = 0, \frac{N_{slot}^F}{4};\right\}$$

$$REG_3 = \left\{(k, l, n_s, n_f) \,|\, k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{2}, \frac{3 N_{slot}^F}{4};\right\}$$

$$REG_4 = \left\{(k, l, n_s, n_f) \,|\, k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = \frac{N_{slot}^F}{2}, \frac{3 N_{slot}^F}{4};\right\}$$

or $$REG_1 =$$
$$\left\{(k, l, n_s, n_f) \,|\, k = n - \frac{N_{sc}^{SS}}{2} + \frac{N_{RB}^{BW} N_{sc}^{RB}}{2}, \right.$$
$$n = N_{offset}, \ldots, N_{offset} + N_{sc}^{SS} - 1;$$

-continued $$l = N_{symb}^{RB} - 1; n_s \bmod N_{slot}^F = 0, \frac{N_{slot}^F}{4};\}$$

$$REG_2 = \{(k, l, n_s, n_f) \mid k = n - 31 + \frac{N_{RB}^{BW} N_{sc}^{RB}}{2}, n = -N_{offset}, \dots ,$$

$$-N_{offset} + N_{sc}^{SS} - 1; l = N_{symb}^{RB} - 1;$$

$$n_s \bmod N_{slot}^F = 0, \frac{N_{slot}^F}{4};\}$$

$$REG_3 = \{(k, l, n_s, n_f) \mid k = n - \frac{N_{sc}^{SS}}{2} + \frac{N_{RB}^{BW} N_{sc}^{RB}}{2}, n = N_{offset}, \dots ,$$

$$N_{offset} + N_{sc}^{SS} - 1; l = N_{symb}^{RB} - 1;$$

$$n_s \bmod N_{slot}^F = \frac{N_{slot}^F}{2}, \frac{3N_{slot}^F}{4};\}$$

$$REG_4 = \{(k, l, n_s, n_f) \mid k = n - 31 + \frac{N_{RB}^{BW} N_{sc}^{RB}}{2}, n = -N_{offset}, \dots ,$$

$$-N_{offset} + N_{sc}^{SS} - 1; l = N_{symb}^{RB} - 1;$$

$$n_s \bmod N_{slot}^F = \frac{N_{slot}^F}{2}, \frac{3N_{slot}^F}{4};\}$$

where a position of a resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols included in each resource block, $N_{slot}^{SF}$ denotes a quantity of slots included in a subframe, $N_{sc}^{SS}$ is a quantity of subcarriers occupied by the synchronization signal, and $N_{offset}$ is a subcarrier position offset of the synchronization signal.

With reference to any one of the eighth to the tenth possible implementations of the fourth aspect, in an eleventh possible implementation of the fourth aspect, a synchronization signal transmitted on each of the at least two different resource element groups included in the resource configuration of the synchronization signal carries at least one piece of indication information; and the receiving the synchronization signal based on the at least one resource element group includes: receiving the synchronization signal based on the at least one resource element group, and obtaining, from the received synchronization signal, the at least one piece of indication information carried in the synchronization signal, where the indication information indicates information about a resource used by the synchronization signal or indicates information about a physical channel or a resource of a physical channel used by the user equipment, and the physical channel is at least one of the following: a physical broadcast channel (PBCH), a physical control format indicator channel (PCFICH), a physical downlink control channel (PDCCH), an enhanced physical downlink control channel (ePDCCH), or a physical uplink control channel (PUCCH).

With reference to the eleventh possible implementation of the fourth aspect, in a twelfth possible implementation of the fourth aspect, the indication information is represented by a ZC sequence or a computer-generated CG sequence or an m-sequence or a cyclic shift of the foregoing sequence or a combination of the foregoing sequences.

With reference to any one of the fourth aspect, and the first to the seventh possible implementations of the fourth aspect, in a thirteenth possible implementation of the fourth aspect, the communication signal is a broadcast channel, and the same information is at least one of the following: a system bandwidth, a part or all of information of a system frame number SFN, physical channel configuration indication information, and a master information block MIB.

With reference to the thirteenth possible implementation of the fourth aspect, in a fourteenth possible implementation of the fourth aspect, at least two different resource element groups included in a resource configuration of the broadcast channel are respectively located in different OFDM symbols or slots or subframes or radio frames or system frames; and the receiving the communication signal based on the at least one resource element group includes: receiving the broadcast channel based on an OFDM symbol or a slot or a subframe or a radio frame or a system frame in which the at least one resource element group is located.

With reference to the fourteenth possible implementation of the fourth aspect, in a fifteenth possible implementation of the fourth aspect, the resource configuration of the broadcast channel includes at least two different resource element groups $REG_1$ and $REG_2$, where $$REG_1 = \{(k, l, n_s, n_f) \mid k = \frac{N_{RB}^{BW} N_{sc}^{RB}}{2} - 36 + k', k' = 0,$$

$$1, \dots , 71; l = 0, 1, 2, 3; n_s = 1, n_f \bmod(4N) = i;\}$$

$$REG_2 = \{(k, l, n_s, n_f) \mid k = \frac{N_{RB}^{BW} N_{sc}^{RB}}{2} - 36 + k', k' = 0,$$

$$1, \dots , 71; l = 0, 1, 2, 3; n_s = 3, n_f \bmod(4N) = i;\}$$

or $$REG_1 = \{(k, l, n_s, n_f) \mid k = \frac{N_{RB}^{BW} N_{sc}^{RB}}{2} - 36 + k', k' = 0,$$

$$1, \dots , 71; l = 0, 1, 2, 3; n_s = 1, n_f \bmod(4N) = i;\}$$

$$REG_2 = \{(k, l, n_s, n_f) \mid k = \frac{N_{RB}^{BW} N_{sc}^{RB}}{2} - 36 + k', k' = 0,$$

$$1, \dots , 71; l = 4, 5, 6; n_s = 1, n_f \bmod(4N) = i;\}$$

or $$REG_1 = \{(k, l, n_s, n_f) \mid k = \frac{N_{RB}^{BW} N_{sc}^{RB}}{2} - 36 + k', k' = 0,$$

$$1, \dots , 71; l = 0, 1, 2, 3; n_s = 1, n_f \bmod(4N) = i;\}$$

$$REG_2 = \{(k, l, n_s, n_f) \mid k = \frac{N_{RB}^{BW} N_{sc}^{RB}}{2} - 36 + k', k' = 0,$$

$$1, \dots , 71; l = 0, 1, 2, 3; n_s = 1, n_f \bmod(4N) = j;\}$$

or $$REG_1 = \{(k, l, n_s, n_f) \mid k = \frac{N_{RB}^{BW} N_{sc}^{RB}}{2} - 36 + k', k' = 0,$$

$$1, \dots , 71; l = 0, 1, 2, 3; n_s = 3, n_f \bmod(4N) = i;\}$$

$$REG_2 = \{(k, l, n_s, n_f) \mid k = \frac{N_{RB}^{BW} N_{sc}^{RB}}{2} - 36 + k', k' = 0,$$

-continued $$1, \ldots, 71; l = 0, 1, 2, 3; n_s = 1, n_f \bmod(4N) = j; \}$$

or $$REG_1 = \left\{(k, l, n_s, n_f) \mid k = \frac{N_{RB}^{BW} N_{sc}^{RB}}{2} + 36 + k', k' = 0,\right.$$

$$1, \ldots, 71; l = 0, 1, 2, 3; n_s = 1, n_f \bmod(4N) = i; \}$$

$$REG_2 = \left\{(k, l, n_s, n_f) \mid k = \frac{N_{RB}^{BW} N_{sc}^{RB}}{2} + 36 + k', k' = 0,\right.$$

$$1, \ldots, 71; l = 0, 1, 2, 3; n_s = 1, n_f \bmod(4N) = j; \}$$

or $$REG_1 = \left\{(k, l, n_s, n_f) \mid k = \frac{N_{RB}^{BW} N_{sc}^{RB}}{2} - 36 + k', k' = 0,\right.$$

$$1, \ldots, 71; l = 0, 1, 2, 3; n_s = 1, n_f \bmod(4N) = i; \}$$

$$REG_2 = \left\{(k, l, n_s, n_f) \mid k = \frac{N_{RB}^{BW} N_{sc}^{RB}}{2} - 108 + k', k' = 0,\right.$$

$$1, \ldots, 71; l = 0, 1, 2, 3; n_s = 1, n_f \bmod(4N) = j; \}$$

or $$REG_1 = \left\{(k, l, n_s, n_f) \mid k = \frac{N_{RB}^{BW} N_{sc}^{RB}}{2} - 18 + k', k' = 0,\right.$$

$$1, \ldots, 35; l = 0, 1, 2, 3; n_s = 1, 3, n_f \bmod(4N) = i; \}$$

$$REG_2 = \left\{(k, l, n_s, n_f) \mid k = \frac{N_{RB}^{BW} N_{sc}^{RB}}{2} - 18 + k', k' = 0,\right.$$

$$1, \ldots, 35; l = 0, 1, 2, 3; n_s = 6, 8, n_f \bmod(4N) = i; \}$$

or $$REG_1 = \left\{(k, l, n_s, n_f) \mid k = \frac{N_{RB}^{BW} N_{sc}^{RB}}{2} - 18 + k', k' = 0,\right.$$

$$1, \ldots, 36; l = 0, 1, 2, 3; n_s = 1, 3, n_f \bmod(4N) = i; \}$$

$$REG_2 = \left\{(k, l, n_s, n_f) \mid k = \frac{N_{RB}^{BW} N_{sc}^{RB}}{2} - 18 + k', k' = 0,\right.$$

$$1, \ldots, 35; l = 4, 5, 6; n_s = 1, 3, n_f \bmod(4N) = i; \}$$

or $$REG_1 = \left\{(k, l, n_s, n_f) \mid k = \frac{N_{RB}^{BW} N_{sc}^{RB}}{2} - 18 + k', k' = 0,\right.$$

$$1, \ldots, 35; l = 0, 1, 2, 3; n_s = 1, 3, n_f \bmod(4N) = i; \}$$

$$REG_2 = \left\{(k, l, n_s, n_f) \mid k = \frac{N_{RB}^{BW} N_{sc}^{RB}}{2} - 18 + k', k' = 0,\right.$$

$$1, \ldots, 35; l = 0, 1, 2, 3; n_s = 1, 3, n_f \bmod(4N) = j; \}$$

or $$REG_1 = \left\{(k, l, n_s, n_f) \mid k = \frac{N_{RB}^{BW} N_{sc}^{RB}}{2} - 18 + k', k' = 0,\right.$$

$$1, \ldots, 35; l = 0, 1, 2, 3; n_s = 6, 8, n_f \bmod(4N) = i; \}$$

$$REG_2 = \left\{(k, l, n_s, n_f) \mid k = \frac{N_{RB}^{BW} N_{sc}^{RB}}{2} - 18 + k', k' = 0,\right.$$

$$1, \ldots, 35; l = 0, 1, 2, 3; n_s = 1, 3, n_f \bmod(4N) = j; \}$$

or $$REG_1 = \left\{(k, l, n_s, n_f) \mid k = \frac{N_{RB}^{BW} N_{sc}^{RB}}{2} - 18 + k', k' = 0,\right.$$

$$1, \ldots, 35; l = 0, 1, 2, 3; n_s = 1, 3, n_f \bmod(4N) = i; \}$$

$$REG_2 = \left\{(k, l, n_s, n_f) \mid k = \frac{N_{RB}^{BW} N_{sc}^{RB}}{2} + 18 + k', k' = 0,\right.$$

$$1, \ldots, 35; l = 0, 1, 2, 3; n_s = 1, 3, n_f \bmod(4N) = j; \}$$

or $$REG_1 = \left\{(k, l, n_s, n_f) \mid k = \frac{N_{RB}^{BW} N_{sc}^{RB}}{2} + 18 + k', k' = 0,\right.$$

$$1, \ldots, 35; l = 0, 1, 2, 3; n_s = 1, 3, n_f \bmod(4N) = i; \}$$

$$REG_2 = \left\{(k, l, n_s, n_f) \mid k = \frac{N_{RB}^{BW} N_{sc}^{RB}}{2} - 54 + k', k' = 0,\right.$$

$$1, \ldots, 35; l = 0, 1, 2, 3; n_s = 1, 3, n_f \bmod(4N) = j; \}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, a parameter i is not equal to a parameter j, values of the parameters i and j are both in a range of 0 to 4N−1, and N is a positive integer.

With reference to any one of the thirteenth to the fifteenth possible implementations of the fourth aspect, in a sixteenth possible implementation of the fourth aspect, a broadcast channel transmitted on each of the at least two different resource element groups included in the resource configuration of the broadcast channel carries at least one piece of indication information; and the receiving the communication signal based on the at least one resource element group includes: receiving the broadcast channel based on the at least one resource element group, and obtaining, from the received broadcast channel, the at least one piece of indication information carried in the broadcast channel, where the indication information indicates information about a resource used by the broadcast channel or indicates information about a physical channel or a resource of a physical channel used by the user equipment, and the physical channel is at least one of the following: a physical control format indicator channel (PCFICH), a physical downlink control channel (PDCCH), an enhanced physical downlink control channel (ePDCCH), or a physical uplink control channel (PUCCH).

With reference to the sixteenth possible implementation of the fourth aspect, in a seventeenth possible implementation of the fourth aspect, the indication information is carried in a broadcast message of the broadcast channel, or the indication information is represented by using different cyclic redundancy check masks.

With reference to any one of the fourth aspect, and the first to the seventh possible implementations of the fourth aspect, in an eighteenth possible implementation of the fourth aspect, the communication signal is a control channel, and the same information is downlink control information of a system information block, or downlink control information carried in a common search space (CSS), or format indicator information of a downlink control channel.

With reference to the eighteenth possible implementation of the fourth aspect, in a nineteenth possible implementation of the fourth aspect, at least two different resource element groups included in a resource configuration of the control channel are respectively located in different OFDM symbols or slots or subframes or radio frames or system frames or control channel elements (CCEs) or CCE sets or enhanced control channel elements (eCCEs) or eCCE sets; and the receiving the communication signal based on the at least one resource element group includes: receiving the control channel based on an OFDM symbol or a slot or a subframe or a radio frame or a system frame or a control channel element (CCE) or a CCE set or an enhanced channel control channel element (eCCE) or an eCCE set in which the at least one resource element group is located.

With reference to the eighteenth or the nineteenth possible implementation of the fourth aspect, in a twentieth possible implementation of the fourth aspect, a control channel transmitted on each of the at least two different resource element groups included in the resource configuration of the control channel carries at least one piece of indication information; and the receiving the communication signal based on the at least one resource element group includes: receiving the control channel based on the at least one resource element group, and obtaining, from the received control channel, the at least one piece of indication information carried in the control channel, where the indication information indicates information about a resource used by the control channel or indicates information about a physical channel or a resource of a physical channel used by the user equipment, and the physical channel is at least one of the following: a physical control channel (PDCCH) or an enhanced physical control channel (ePDCCH) carried in a user equipment specific search space (USS), or a physical uplink control channel (PUCCH).

With reference to the twentieth possible implementation of the fourth aspect, in a twenty-first possible implementation of the fourth aspect, the indication information is carried in control information of the control channel, or the indication information is represented by using different cyclic redundancy check masks.

With reference to any one of the thirteenth to the twenty-first possible implementations of the fourth aspect, in a twenty-second possible implementation of the fourth aspect, the communication signal is the broadcast channel or the control channel; and the determining, from a resource configuration of a communication signal, at least one resource element group for the communication signal includes: receiving a synchronization signal set transmitted by the base station, where the synchronization signal set includes at least one synchronization signal corresponding to the communication signal on the at least one resource element group in the resource configuration of the communication signal; and determining, from the resource configuration of the communication signal, the at least one resource element group for the communication signal, where the at least one resource element group corresponds to the at least one synchronization signal used by the user equipment.

With reference to the twenty-second possible implementation of the fourth aspect, in a twenty-third possible implementation of the fourth aspect, the at least one synchronization signal included in the synchronization signal set carries at least one piece of indication information, where the indication information is used to indicate information about a resource used by the communication signal received on the at least one resource element group.

With reference to any one of the eighteenth to the twenty-third possible implementations of the fourth aspect, in a twenty-fourth possible implementation of the fourth aspect, the communication signal is the control channel, and the determining, from a resource configuration of a communication signal, at least one resource element group for the communication signal includes: receiving a broadcast channel set transmitted by the base station, where the broadcast channel set includes at least one broadcast channel corresponding to the control channel transmitted on the at least one resource element group in the resource configuration of the control channel; and determining, from the resource configuration of the control channel, the at least one resource element group for the control channel, where the at least one resource element group corresponds to the at least one broadcast channel used by the user equipment.

With reference to the twenty-fourth possible implementation of the fourth aspect, in a twenty-fifth possible implementation of the fourth aspect, the at least one broadcast channel included in the broadcast channel set carries at least one piece of indication information, where the indication information is used to indicate information about a resource used for receiving the control channel on the at least one resource element group.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that, the technical solutions provided in the embodiments of the present invention may be applied to various communications systems, such as: a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

It should be further understood that in the embodiments of the present invention, user equipment (UE) may be referred to as a terminal, a mobile station, a mobile terminal, or the like. The user equipment may communicate with one or more core networks through a radio access network (RAN). For example, the user equipment may be a mobile phone (also referred to as a "cellular" phone) or a computer having a mobile terminal. For example, the user equipment may alternatively be a portable, pocket-sized, handheld, computer built-in, or in-vehicle mobile apparatus, which exchanges voice and/or data with the radio access network.

In the embodiments of the present invention, a base station may be a base transceiver station (BTS) in a GSM or CDMA, may be a NodeB in WCDMA, or may be an evolved NodeB (eNB or e-NodeB) or a relay in LTE. This is not limited in the present invention. However, for ease of description, an eNB is used as an example for description in the following embodiments.

Figure 1:
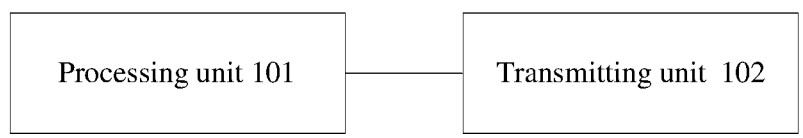
FIG. 1 is a schematic structural diagram of a base station according to an embodiment of the present invention.

FIG. 1 is a schematic diagram of a base station according to an embodiment of the present invention. As shown in FIG. 1, the base station includes a processing unit 101 and a transmitting unit 102.

The processing unit 101 is configured to determine a resource configuration of a communication signal, where the resource configuration includes at least two different resource element groups.

Optionally, the resource configuration of the communication signal may be predefined, and is known by both the base station and user equipment; or the resource configuration of the communication signal may be notified by the base station to user equipment by broadcast. It should be understood that, different communication signals generally use different resource configurations. For example, a synchronization signal and a broadcast channel occupy different resource element groups.

The transmitting unit 102 is configured to transmit the communication signal on each resource element group included in the resource configuration to user equipment, where the communication signal transmitted on each resource element group carries at least one piece of same information, and the same information is cell specific or user equipment group specific information.

The communication signal transmitted on each resource element group carries at least one piece of same information, that is, in information carried in the communication signal transmitted on each resource element group, at least one piece of information is the same.

Optionally, the communication signal in this embodiment of the present invention may be a physical signal or a physical channel; and a resource element used by the physical signal is used by a physical layer but does not carry information from a higher layer, for example, a synchronization signal. A resource element used by the physical channel carries information from the higher layer. The physical channel is generally an interface between the physical layer and the higher layer, for example, a broadcast channel or a shared channel or a control channel or a synchronization channel.

Specifically, the cell specific or user equipment group specific information may be a system broadcast message, for example, may be a master information block (MIB), or a system information block (SIB), for example, a SIB1, or may be system configuration information, for example, a system frame number (SFN). The cell specific or user equipment group specific information may alternatively be a part or all of information of a cell identifier or a virtual cell identifier, or configuration information of a physical control format indicator channel (PCFICH) or configuration information of another physical channel or a reference signal, or a message for a specific user group, for example, a message for an MBMS (Multimedia Broadcast Multicast Service) user group.

In addition, it should be pointed out that, the cell specific or user equipment group specific information (same information) carried in the communication signal may be explicit information, for example, the foregoing various messages, or may be implicit information, namely, information implied by a parameter, a physical resource position or the like used by the communication signal, for example, a period or a hopping pattern of a resource that is used by another physical channel and indirectly indicated by the resource position of the communication signal.

In this embodiment of the present invention, the transmitting unit 102 of the base station transmits the communication signal on each resource element group included in the resource configuration of the communication signal to the user equipment, where the resource configuration includes at least two different resource element groups, each communication signal carries at least one piece of same information, and the communication signal carries cell specific or user equipment group specific (UE group specific) same information. User equipment in a cell (or a user equipment group) either receives, by measuring a communication signal transmitted on a resource element group with favorable channel condition for the user equipment, the cell (or user equipment group) specific same information carried in the communication signal, or receives the cell (or user equipment group) specific same information by combinatorial reception of the communication signals transmitted on the at least two resource element groups. Therefore, according to the base station provided in this embodiment of the present invention, reliability of transmitting the communication signal between the cell (or the user equipment group) and the base station and reliability of receiving the cell specific or user equipment group specific information carried in the communication signal can be effectively improved.

Optionally, the communication signals transmitted on the at least two resource element groups included in the resource configuration use different sequence groups or different antenna port groups.

Optionally, the communication signals transmitted on the at least two resource element groups included in the resource configuration may use different precoding or different beam groups.

For example, the communication signals use same or different antenna port groups but different precoding or beam groups, or same or different sequences but different precoding or beam groups.

Assuming that the resource configuration includes two different resource element groups, the following describes use of different antenna port groups, or different precoding, or different beam groups, or same or different antenna port groups but different precoding or beam groups for transmitting the communication signals on the at least two resource element groups included in the resource configuration. Cases of more resource element groups may be deduced by analogy.

The following is described by using an example in which the resource configuration of the communication signal includes two different resource element groups: a first resource element group $REG_1$ and a second resource element group $REG_2$.

Optionally, a communication signal transmitted by the transmitting unit 102 on the first resource element group $REG_1$ and a communication signal transmitted on the second resource element group $REG_2$ may use same or different antenna port groups, where the antenna port group includes at least one antenna port.

Specifically, the communication signal transmitted on the first resource element group $REG_1$ uses a first antenna port group (PG) $PG_1$; and the communication signal transmitted on the first resource element group $REG_2$ uses a second antenna port group $PG_2$, where the antenna port group $PG_1$ or $PG_2$ includes at least one antenna port.

The antenna port groups $PG_1$ and $PG_2$ may be the same. For example, the antenna port groups $PG_1$ and $PG_2$ use a same pair of antenna ports, and reference signals corresponding to the two antenna ports are an $RS_1$ and an $RS_2$ respectively. The $RS_1$ and the $RS_2$ may be two cell specific reference signals respectively, for example, similar to a $CRS_0$ and a $CRS_1$ defined in LTE R8-R11 systems.

The antenna port groups $PG_1$ and $PG_2$ may be different. For example, the antenna port group $PG_1$ uses two antenna ports, and reference signals corresponding to the two antenna ports are an $RS_{11}$ and an $RS_{12}$ respectively; and the antenna port group $PG_2$ uses two antenna ports, and reference signals corresponding to the two antenna ports are an $RS_{21}$ and an $RS_{22}$ respectively. The $RS_{11}$, $RS_{12}$, $RS_{21}$, and $RS_{22}$ may be cell specific reference signals. For example, they may be respectively similar to the $CRS_0$, $CRS_1$, $CRS_2$, and $CRS_3$ defined in the LTE R8-R11 systems. They may also be similar to any four reference signals in a CSI RS set defined in the LTE R10 system.

Further, resource elements used by the reference signals corresponding to the antenna ports in the antenna port group $PG_1$ form a third resource element group $REG_3$, and resource elements used by the reference signals corresponding to the antenna ports in the $PG_2$ form a fourth resource element group $REG_4$. The third resource element group $REG_3$ is different from the fourth resource element group $REG_4$.

Specifically, that the third resource element group $REG_3$ is different from the fourth resource element group $REG_4$ may be: resource elements in the $REG_3$ and the $REG_4$ may be respectively located in different subframes or slots, or different slots in a same subframe or different OFDM symbols; or resource elements REs in the $REG_3$ and the $REG_4$ may be respectively located in different subbands in a system bandwidth, or different subframes or slots or OFDM symbols or subcarriers in one or more same subbands.

In addition, when the communication signal is transmitted at different time or in different subframes, a predefined relationship may exist between the resource element group and the antenna port group. Specifically, the following relationship exists between a resource element group $REG_i$, an antenna port group $PG_j$, and a precoding matrix $W_j$ that are used by the communication signal:

$$j=i \bmod N_{REG} \text{ or } i=j \bmod N_{PG} \text{ or } (i+n) \bmod N_{REG} = (j+n) \bmod N_{PG} \quad \text{formula (1)}$$

where $N_{REG}$ is a total quantity of resource element groups, $N_{PG}$ is a total quantity of antenna port groups, n is an index or a count value of a subframe or an OFDM symbol or a subcarrier or a PRB or a resource element group, and mod indicates a modulo operation.

It should be further pointed out that, a reference signal corresponding to each antenna port in the antenna port group $PG_1$ (or the antenna port group $PG_2$) may use same or different time-frequency resources or sequences or a combination thereof. This is not limited in the present invention.

In this embodiment of the present invention, the transmitting unit 102 of the base station transmits the communication signal on each resource element group included in the resource configuration of the communication signal to the user equipment, and the communication signals transmitted on the at least two different resource element groups use two different antenna port groups respectively. The user equipment in the cell (or the user equipment group) can measure, by using at least two different antenna port groups separately, a communication signal transmitted on a resource element group with favorable channel condition for the user equipment, and take advantage of space diversity gain provided by different antenna port groups to receive the cell (or user equipment group) specific same information, or utilize combinatorial reception of the communication signals transmitted on the at least two resource element groups to receive the cell (or user equipment group) specific same information. Therefore, transmission reliability of the cell (or user equipment group) specific information or the communication signal is effectively improved.

Optionally, the communication signal transmitted on the first resource element group $REG_1$ and the communication signal transmitted on the second resource element group $REG_2$ may use same or different precoding or beam groups, where the beam group includes at least one beam, and the precoding uses a precoding matrix or vector.

Specifically, the communication signal transmitted on the first resource element group $REG_1$ uses a beam group $BG_1$; and the communication signal transmitted on the second resource element group $REG_2$ uses a beam group $BG_2$.

In addition, when the communication signal is transmitted at different time or in different subframes, a coverage area is scanned by using a beam sequence, so that a determined relationship may exist between the beam group and the subframe that are used by the communication signal. For example, scanning is performed cyclically, or a fixed hopping pattern exists. Specifically, the following relationship exists between the resource element group $REG_i$, a beam group $BG_j$, and the precoding matrix $W_j$ that are used by the communication signal:

$$j=i \bmod N_{REG} \text{ or } i=j \bmod N_B \text{ or } (i+n) \bmod N_{REG} = (j+n) \bmod N_B \quad \text{formula (2)}$$

where $N_{REG}$ is a total quantity of resource element groups, $N_B$ is a total quantity of beam groups or precoding matrices, n is an index or a count value of a subframe or an OFDM symbol or a subcarrier or a PRB or a resource element group, and mod denotes a modulo operation.

In this embodiment of the present invention, the transmitting unit 102 of the base station transmits the communication signal on each resource element group included in the resource configuration of the communication signal to the user equipment, and the communication signals transmitted on the at least two resource element groups in the resource configuration use two different beam groups or precoding. The user equipment within the cell (or the user equipment group) can measure a communication signal transmitted on a resource element group with favorable channel condition for the user equipment, separately in at least two different beam groups, and take advantage of space diversity gains or array gains provided by different beam groups to receive the cell (or user equipment group) specific same information, or utilize combinatorial reception of the communication signals transmitted on the at least two resource element groups to receive the cell (or user equipment group) specific same information. Therefore, transmission reliability of the cell (or user equipment group) specific information or the communication signal is effectively improved.

Optionally, the communication signal transmitted on the first resource element group $REG_1$ and the communication signal transmitted on the second resource element group $REG_2$ may use a same antenna port group, that is, $PG_1=PG_2$; and the same antenna port group uses different precoding or beam groups when transmitting the communication signal transmitted on the first resource element group $REG_1$ and the communication signal transmitted on the second resource element group $REG_2$, where specifically, the same antenna port group uses the beam group $BG_1$ when transmitting the communication signal transmitted on the first resource element group $REG_1$, and uses the beam group $BG_2$ when transmitting communication signal transmitted on the second resource element group $REG_2$; or the communication signal transmitted on the first resource element group $REG_1$ and the communication signal transmitted on the second resource element group $REG_2$ may respectively use different antenna port groups $PG_1$ and $PG_2$; and the antenna port groups $PG_1$ and $PG_2$ use different precoding or beam groups, where specifically, when the antenna port group $PG_1$ transmits the communication signal transmitted on the first resource element group $REG_1$, the antenna port in the antenna port group $PG_1$ uses the beam group $BG_1$; and when the antenna port group $PG_2$ transmits the communication signal transmitted on the second resource element group $REG_2$, the antenna port in the antenna port group $PG_2$ uses the beam group $BG_2$.

Further, the following relationship exists between an antenna port group $PG_i$, the used beam group $BG_j$, and the used precoding matrix W:

$$j=i \bmod N_{PG} \text{ or } i=j \bmod N_B \text{ or } (i+n)\bmod N_{PG}=(j+n) \bmod N_B \qquad \text{formula (3)}$$

where $N_{PG}$ is a total quantity of antenna port groups, $N_B$ is a total quantity of beam groups or precoding matrices, n is an index or a count value of a subframe or an OFDM symbol or a subcarrier or a PRB or a resource element group, and mod denotes a modulo operation.

As described above, the beam group $BG_1$ and the beam group $BG_2$ are beam groups that do not overlap or partially overlap. Beams in the beam group $BG_1$ and the beam group $BG_2$ respectively point to different areas in the cell or different local areas in an area in which the user equipment group is located. It should be understood that the beam group includes at least one beam. For the beam, different weights may be used for a plurality of physical antennas to obtain different beam directions or beam widths. How to combine a plurality of physical antennas or antenna ports to form beams with different directions or widths belongs to the prior art. Details are not further described herein.

In this embodiment of the present invention, the transmitting unit 102 of the base station transmits the communication signal on each resource element group included in the resource configuration of the communication signal to the user equipment, and the communication signals transmitted on the at least two resource element groups use different antenna port groups, or a same antenna port group but different precoding or beam groups. The transmitting unit of the base station can transmit, on the at least two different resource element groups separately by using different antenna port groups or a same antenna port group but different beam groups or precoding, the communication signals and the same information carried in the communication signals. The user equipment in the cell (or the user equipment group) can measure, separately by using the antenna port groups, a communication signal transmitted on a resource element group with favorable channel condition for the user equipment, and therefore can receive, by using array gains and directional gains provided by the base station by using different beams or precoding (the array gains and directional gains provided by different beams or precoding cause different signal quality), the communication signals transmitted on the at least two different resource element groups and the cell (or user equipment group) specific same information carried in the communication signals. Therefore, transmission reliability of the cell (or user equipment group) specific information or the communication signal is improved.

Assuming that the resource configuration of the communication signal includes two different resource element groups, the following describes use of different sequence groups for transmitting the communication signals on the at least two resource element groups included in the resource configuration of the communication signal.

The following is described by using an example in which the resource configuration of the communication signal includes two different resource element groups: a first resource element group $REG_1$ and a second resource element group $REG_2$. The communication signal transmitted on the first resource element group $REG_1$ and the communication signal transmitted on the second resource element group $REG_2$ respectively use different sequence groups $SG_1$ and $SG_2$, where the sequence groups $SG_1$ and $SG_2$ respectively include at least one sequence.

Specifically, that the communication signal transmitted on the first resource element group $REG_1$ and the communication signal transmitted on the second resource element group $REG_2$ respectively use different sequence groups $SG_1$ and $SG_2$ may be: all or a part of information of the cell or user equipment group specific same information carried in the communication signal transmitted on the first resource element group $REG_1$ is mapped to the sequence group $SG_1$; and all or a part of information of the cell or user equipment group specific same information carried in the communication signal transmitted on the second resource element group $REG_2$ is mapped to the sequence group $SG_2$, where the sequence group $SG_1$ and the sequence group $SG_2$ are different sequence groups; or all or a part of information of the cell or user equipment group specific same information carried in the communication signal transmitted on the first resource element group $REG_1$ is scrambled by using the sequence group $SG_1$; and all or a part of information of the cell or user equipment group specific same information carried in the communication signal transmitted on the second resource element group $REG_2$ is scrambled by using the sequence group $SG_2$, where the sequence group $SG_1$ and the sequence group $SG_2$ are different sequence groups, where specifically, that all or a part of information of the cell or user equipment group specific same information is scrambled by using different sequence groups may be that all or a part of information of the cell or user equipment group specific same information is scrambled by using different sequence groups after being encoded (for example, turbo codes or convolutional codes or block codes or RM codes); or all or a part of information of the cell or user equipment group specific same information carried in the communication signal transmitted on the first resource element group $REG_1$ or a CRC part thereof is masked (Mask) by using the sequence group $SG_1$; and all or a part of information of the cell or user equipment group specific same information carried in the communication signal transmitted on the second resource element group $REG_2$ or a CRC part thereof is masked by using the sequence group $SG_2$, where the sequence groups $SG_1$ and $SG_2$ are different sequence groups.

Specifically, the sequence included in the foregoing sequence group may be a Walsh (Walsh) sequence, a CAZAC sequence or a Golden sequence or an m-sequence or a computer-generated (CG) sequence or a pseudo random sequence or the like or a combination thereof. It should be pointed out that, all or a part of information of the cell or user equipment group specific same information carried in the communication signal transmitted on the first resource element group $REG_1$ (or the $REG_2$) may use one or more same or different sequences. This is not limited in the present invention. In addition, it should be understood that, the foregoing sequence group may include only one sequence; in this case, mapping or scrambling or masking by using the sequence group corresponds to performing the foregoing operation by using the sequence. In addition, it should be understood that, that the sequence group $SG_1$ and the sequence group $SG_2$ are different sequence groups means that the sequence group $SG_1$ and the sequence group $SG_2$ include mutually different sequences, or that the sequence group $SG_1$ and the sequence group $SG_2$ use different root sequences, or that the sequence group $SG_1$ and the sequence group $SG_2$ use different sequence shifts, or that the sequence group $SG_1$ and the sequence group $SG_2$ are obtained by cutting off different segments or subsequences of a long sequence.

Optionally, the communication signal transmitted on the first resource element group $REG_1$ and the communication signal transmitted on the second resource element group $REG_2$ respectively use different sequence groups $SG_1$ and $SG_2$, and the communication signal transmitted on the first resource element group $REG_1$ and the communication signal transmitted on the second resource element group $REG_2$ are transmitted respectively by using different antenna port groups $PG_1$ and $PG_2$ or transmitted respectively by using different beam groups $BG_1$ and $BG_2$ or transmitted respectively by using different precoding matrices $W_1$ and $W_2$.

Specifically, the following relationship exists between a sequence group $SG_i$ and the used antenna port group PG:

$$j=i \bmod N_{SG} \text{ or } i=j \bmod N_{PG} \text{ or } (i+n) \bmod N_{SG}=(j+n) \bmod N_{PG} \quad \text{formula (4)}$$

where $N_{SG}$ is a total quantity of sequence groups, $N_{PG}$ is a total quantity of antenna port groups, n is an index or a count value of a subframe or an OFDM symbol or a subcarrier or a PRB or a resource element group, and mod denotes a modulo operation.

Further, the following relationship exists between the sequence group $SG_i$, the used beam group $BG_j$, and the used precoding matrix W:

$$j=i \bmod N_{SG} \text{ or } i=j \bmod N_B \text{ or } (i+n) \bmod N_{SG}=(j+n) \bmod N_B \quad \text{formula (5)}$$

where $N_{SG}$ is a total quantity of sequence groups, $N_B$ is a total quantity of beam groups or precoding matrices, n is an index or a count value of a subframe or an OFDM symbol or a subcarrier or a PRB or a resource element group, and mod denotes a modulo operation.

In this embodiment of the present invention, the transmitting unit 102 of the base station transmits the communication signal on each resource element group included in the resource configuration of the communication signal to the user equipment, and the communication signals transmitted on the at least two resource element groups use different sequence groups. The transmitting unit 102 of the base station can transmit the same information carried in the communication signals by using at least two different sequence groups respectively. The user equipment in the cell (or the user equipment group) can measure, by measuring or detecting the at least two sequence groups, a communication signal transmitted on a resource element group with favorable channel condition for the user equipment, and therefore can distinguish and select the communication signal transmitted on the resource element group suitable for the user equipment, and receive the cell (or user equipment group) specific same information in a user equipment specific resource configuration (for example, the resource element group suitable for the user equipment). Therefore, complexity of detection or reception by the user equipment is reduced, and reliability of transmitting the specific information or the communication signal between the cell (or the user equipment group) and the base station can be ensured.

It should be understood that, based on any one of the foregoing embodiments, optionally, the resource element groups may be respectively located in different radio frames (radio frame), or different system frames, or different subframes, or different slots, or different orthogonal frequency division multiplexing (OFDM) symbols, or different subcarriers, or different physical resource blocks. Specifically, for example, the resource element groups may be different subframes in a same radio frame, or different slots in a same subframe, or different OFDM symbols in a same slot, or different subcarriers in a same slot, or different physical resource blocks in a same slot, or the like. The resource element groups may also be located in different subbands in a system bandwidth, or different subframes in one or more same subbands, or different slots in a same subframe, or different OFDM symbols in a same slot, or different subcarriers in a same slot, or different subcarriers in a same slot, or the like.

Optionally, the communication signal transmitted on each of the at least two resource element groups included in the resource configuration further carries at least one piece of indication information, where the indication information is used to indicate information about a resource used by the communication signal, or used to indicate one or more physical channels used by the user equipment, or used to indicate information about a resource used by one or more physical channels used by the user equipment, or used to indicate information about a resource used by one or more physical signals used by the user equipment.

Optionally, the information about the resource used by the communication signal is at least one of the following: identification information of the communication signal, information about a resource element group used by the communication signal, information about a sequence or a sequence group used by the communication signal, information about an antenna port or an antenna port group used by the communication signal, information about a time-frequency position used by the communication signal, information about precoding used by the communication signal, and information about a beam group used by the communication signal.

Optionally, the information about the resource used by the one or more physical channels used by the user equipment or the information about the resource used by the one or more physical signals used by the user equipment is at least one of the following: identification information used by the physical channel or the physical signal, information about a resource element group used by the physical channel or the physical signal, information about an antenna port used by the physical channel or the physical signal, information about a reference signal used by the physical channel or the physical signal, information about a sequence or a sequence group used by the physical channel or the physical signal, information about an antenna port or an antenna port group used by the physical channel or the physical signal, information about a time-frequency position used by the physical channel or the physical signal, information about precoding used by the physical channel or the physical signal, and information about a beam group used by the physical channel or the physical signal.

Optionally, the transmitting unit 102 is further configured to: transmit a reference signal set to the user equipment, so that the user equipment determines at least one resource element group in the resource configuration of the communication signal based on the reference signal set and receives the communication signal on the determined at least one resource element group.

The reference signal set is a cell specific reference signal set or a channel state information reference signal set.

Specifically, the transmitting unit 102 transmits the reference signal set to the user equipment, so that the user equipment determines one or more resource indications based on the reference signal set, where the resource indication is used to indicate the information about the resource used by the communication signal.

Specifically, the one or more resource indications may be channel state information (CSI), and the CSI includes a rank indicator RI and/or a precoding matrix indicator PMI.

Specifically, the information about the resource used by the communication signal may be: identification information of the communication signal, or information about a resource element group in the resource configuration of the communication signal, or an antenna port group used by the communication signal, or a sequence group used by the communication signal, or a beam group used by the communication signal, or information about precoding used by the communication signal, or the like.

Optionally, a correspondence between the resource indication and the information about the resource used by the communication signal may be predefined, and is known by both the base station and the user equipment; or a correspondence between the resource indication and the information about the resource used by the communication signal may be notified by the base station to the user equipment by using higher layer signaling such as RRC signaling or downlink control information (DCI).

Optionally, the reference signal set may be a cell specific reference signal set or a channel state information reference signal set, for example, a CRS or a CSI RS in LTE R8 or R10.

In this embodiment of the present invention, the transmitting unit 102 of the base station further transmits the reference signal set to the user equipment in addition to transmitting the communication signals on multiple resources including the at least two resource element groups, so that the user equipment determines one or more resource indications based on the reference signal set, where the resource indication is used to indicate the information about the resource used by the communication signal. Therefore, the user equipment can obtain, based on the reference signal set, a resource indication of a resource configuration that is favorable for the user equipment, to obtain the information about the resource element group, or the information about the antenna port group, or the sequence group, or the physical channel or the physical signal associated with the communication signal, used when the transmitting unit 102 of the base station transmits the communication signal. Therefore, complexity of detection or reception by the user equipment is reduced, and reliability of transmitting the specific information or the communication signal between the cell (or the user equipment group) and the base station can be ensured.

Optionally, the communication signal may be a synchronization signal, and the same information carried in the communication signal transmitted on each resource element group may be all or a part of information of a cell identifier, or all or a part of information of a user equipment group identifier, or a combination thereof; or the communication signal may be a broadcast channel, and the same information carried in the communication signal transmitted on each resource element group may be at least one of the following: a master information block (MIB), a part of information of a system frame number (SFN) or all information of an SFN, a system bandwidth, and physical channel configuration indication information; or the communication signal may be a control channel, and the same information carried in the communication signal transmitted on each resource element group may be downlink control information of a system information block, or downlink control information carried in a common search space (CSS), or format indicator information of a downlink control channel.

Optionally, the communication signal is a synchronization signal, and at least two resource element groups in a resource configuration of the synchronization signal may be respectively located in different radio frames, or different system frames, or different subframes, or different slots, or different OFDM symbols, or different subcarriers, or different physical resource blocks, or respectively located in different subframes, or different slots in a same subframe, or different OFDM symbols in a same slot, or different subcarriers in a same slot, or different physical resource blocks in a same slot.

Optionally, the resource configuration of the synchronization signal includes at least two different resource element groups $REG_1$ and $REG_2$, where $$REG_1 = \left\{(k, l, n_s, n_f) \mid k = n - \frac{N_{sc}^{SS}}{2} + \frac{N_{RB}^{BW} N_{sc}^{RB}}{2}, \right.$$

$$\left. n = 0, \ldots, N_{sc}^{SS} - 1; l = N_{symb}^{RB} - 1; n_s \bmod N_{slot}^F = 0, \frac{N_{slot}^F}{2}; \right\}$$

-continued $$REG_2 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = N_{symb}^{RB} - 1; n_s \bmod N_{slot}^F = \frac{N_{slot}^F}{4}, \frac{3 \cdot N_{slot}^F}{4}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = \frac{N_{symb}^{RB} - 1}{2}; n_s \bmod N_{slot}^F = 0, \frac{N_{slot}^F}{2}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = \frac{N_{symb}^{RB} - 1}{2}; n_s \bmod N_{slot}^F = \frac{N_{slot}^F}{4}, \frac{3 \cdot N_{slot}^F}{4}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$
$$\left. \ldots, N_{sc}^{SS} - 1; l = \frac{N_{symb}^{RB} - 1}{2}; n_s \bmod N_{slot}^F = 0, \frac{N_{slot}^F}{2}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = 0, \ldots, N_{sc}^{SS} - 1; l = N_{symb}^{RB} - 1; n_s \bmod N_{slot}^F = 0, \frac{N_{slot}^F}{2}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = N_{offset}, \right.$$
$$\left. \ldots, N_{offset} + N_{sc}^{SS} - 1; l = N_{symb}^{RB} - 1; n_s \bmod N_{slot}^F = 0, \frac{N_{slot}^F}{2}; \right\}$$

$$REG_2 = \left\{(k, l, n_s, n_f) \mid k = n - 31 + \frac{N_{RB}^{BW} N_{sc}^{RB}}{2}, n = -N_{offset}, \ldots, \right.$$
$$\left. -N_{offset} + N_{sc}^{SS} - 1; l = N_{symb}^{RB} - 1; n_s \bmod N_{slot}^F = 0, \frac{N_{slot}^F}{2}; \right\}$$

where a position of each resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{offset}$ is a subcarrier position offset of the synchronization signal;

or the resource configuration of the synchronization signal includes at least four different resource element groups $REG_1$, $REG_2$, $REG_3$, and $REG_4$, where $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 1; \right\}$$

-continued $$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1;\right.$$
$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 1;\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1;\right.$$
$$\left. l = \frac{N_{symb}^{RB} - 1}{2}; n_s \bmod N_{slot}^F = 0, \frac{N_{slot}^F}{2}, n_f \bmod 2 = 0;\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 0;\right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 1;\right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = 0, \frac{N_{slot}^F}{2}, n_f \bmod 2 = 1;\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = N_{offset}, \ldots N_{offset} + N_{sc}^{SS} - 1;\right.$$
$$\left. l = N_{symb}^{RB} - 1; n_s \bmod N_{slot}^F = 0, \frac{N_{slot}^F}{2}, n_f \bmod 2 = 0;\right\}$$

$$REG_2 = \left\{(k, l, n_s, n_f) \mid k = n - 31 + \frac{N_{RB}^{BW} N_{sc}^{RB}}{2},\right.$$
$$\left. n = -N_{offset}, \ldots, -N_{offset} + N_{sc}^{SS} - 1; l = N_{symb}^{RB} - 1;\right.$$
$$\left. n_s \bmod N_{slot}^F = 0, \frac{N_{slot}^F}{2}, n_f \bmod 2 = 0;\right\}$$

$$REG_3 = \left\{(k, l, n_s, n_f) \mid k = n - \frac{N_{sc}^{SS}}{2} + \frac{N_{RB}^{BW} N_{sc}^{RB}}{2},\right.$$
$$\left. N_{offset}, \ldots, N_{offset} + N_{sc}^{SS} - 1; l = N_{symb}^{RB} - 1;\right.$$
$$\left. n_s \bmod N_{slot}^F = 0, \frac{N_{slot}^F}{2}, n_f \bmod 2 = 1;\right\}$$

$$REG_4 = \left\{(k, l, n_s, n_f) \mid k = n - 31 + \frac{N_{RB}^{BW} N_{sc}^{RB}}{2},\right.$$
$$\left. n = -N_{offset}, \ldots, -N_{offset} + N_{sc}^{SS} - 1; l = N_{symb}^{RB} - 1;\right.$$
$$\left. n_s \bmod N_{slot}^F = 0, \frac{N_{slot}^F}{2}, n_f \bmod 2 = 1;\right\}$$

or $$REG_1 = \left\{(k, l, n_s, n_f) \mid k = n - \frac{N_{sc}^{SS}}{2} + \frac{N_{RB}^{BW} N_{sc}^{RB}}{2},\right.$$
$$\left. n = 0, \ldots, N_{sc}^{SS} - 1; l = N_{symb}^{RB} - 1; n_s \bmod N_{slot}^F = 0, \frac{N_{slot}^F}{4};\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$

-continued $$\left. N_{sc}^{SS} - 1; l = N_{symb}^{RB} - 1; n_s \bmod N_{slot}^F = \frac{N_{slot}^F}{8}, \frac{3 \cdot N_{slot}^F}{8};\right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = \frac{N_{slot}^F}{2}, \frac{3 N_{slot}^F}{4};\right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = \frac{5 N_{slot}^F}{8}, \frac{7 N_{slot}^F}{8};\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0,\right.$$
$$\left. \ldots, N_{sc}^{SS} - 1; l = \frac{N_{symb}^{RB} - 1}{2}; n_s \bmod N_{slot}^F = 0, \frac{N_{slot}^F}{4};\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = \frac{N_{symb}^{RB} - 1}{2}; n_s \bmod N_{slot}^F = \frac{N_{slot}^F}{8}, \frac{3 \cdot N_{slot}^F}{8};\right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = \frac{N_{symb}^{RB} - 1}{2}; n_s \bmod N_{slot}^F = \frac{N_{slot}^F}{2}, \frac{6 N_{slot}^F}{8};\right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = \frac{N_{symb}^{RB} - 1}{2}; n_s \bmod N_{slot}^F = \frac{5 N_{slot}^F}{8}, \frac{7 N_{slot}^F}{8};\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0,\right.$$
$$\left. \ldots, N_{sc}^{SS} - 1; l = \frac{N_{symb}^{RB} - 1}{2}; n_s \bmod N_{slot}^F = 0, \frac{N_{slot}^F}{4};\right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = 0, \frac{N_{slot}^F}{4};\right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = \frac{N_{symb}^{RB} - 1}{2}; n_s \bmod N_{slot}^F = \frac{N_{slot}^F}{2}, \frac{3 N_{slot}^F}{4};\right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = \frac{N_{slot}^F}{2}, \frac{3 N_{slot}^F}{4};\right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = N_{offset}, \ldots,\right.$$
$$\left. N_{offset} + N_{sc}^{SS} - 1; l = N_{symb}^{RB} - 1; n_s \bmod N_{slot}^F = 0, \frac{N_{slot}^F}{4};\right\}$$

-continued
$$REG_2 = \left\{(k, l, n_s, n_f) \mid k = n - 31 + \frac{N_{RB}^{BW} N_{sc}^{RB}}{2}, n = -N_{offset}, \ldots ,\right.$$

$$\left. -N_{offset} + N_{sc}^{SS} - 1; l = N_{symb}^{RB} - 1; n_s \bmod N_{slot}^F = 0, \frac{N_{slot}^F}{4};\right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = N_{offset}, \ldots ,\right.$$

$$\left. N_{offset} + N_{sc}^{SS} - 1; l = N_{symb}^{RB} - 1; n_s \bmod N_{slot}^F = \frac{N_{slot}^F}{2}, \frac{3N_{slot}^F}{4};\right\}$$

$$REG_4 = \left\{(k, l, n_s, n_f) \mid k = n - 31 + \frac{N_{RB}^{BW} N_{sc}^{RB}}{2}, n = -N_{offset}, \ldots ,\right.$$

$$\left. -N_{offset} + N_{sc}^{SS} - 1; l = N_{symb}^{RB} - 1; n_s \bmod N_{slot}^F = \frac{N_{slot}^F}{2}, \frac{3N_{slot}^F}{4};\right\}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{SS}$ is a quantity of subcarriers occupied by the synchronization signal, and $N_{offset}$ is a subcarrier position offset of the synchronization signal.

Further, a synchronization signal transmitted on each of the at least two resource element groups included in the resource configuration of the synchronization signal may carry at least one piece of indication information in addition to the same information, where the indication information may be used to indicate information about a resource used by the synchronization signal, or the indication information is used to indicate one or more physical channels used by the user equipment or information about a resource used by one or more physical channels used by the user equipment.

Optionally, the one or more physical channels used by the user equipment may be a broadcast channel, or a downlink control channel (PDCCH), or an uplink control channel (PUCCH), or a control format indicator channel (PCFICH), or the like.

Optionally, the indication information respectively carried in the synchronization signals transmitted on the at least two resource element groups included in the resource configuration of the synchronization signal may be represented by different (Zadoff-Chu) ZC sequences or computer-generated (CG) sequences or m-sequences or different cyclic shifts thereof or Gold sequences or different combinations thereof.

Optionally, the communication signal is a broadcast channel, and at least two resource element groups in a resource configuration of the broadcast channel may be respectively located in different radio frames, or different system frames, or different subframes, or different slots, or different OFDM symbols, or different subcarriers, or different physical resource blocks, or respectively located in different subframes, or different slots in a same subframe, or different OFDM symbols in a same slot, or different subcarriers in a same slot, or different physical resource blocks in a same slot, or the like.

Optionally, the resource configuration of the broadcast channel includes at least two different resource element groups $REG_1$ and $REG_2$, where $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots , 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots , 71; l = 0, 1, 2, 3; n_s = 3, n_f \bmod(4N) = i;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots , 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots , 71; l = 4, 5, 6; n_s = 1, n_f \bmod(4N) = i;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots , 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots , 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots , 71; l = 0, 1, 2, 3; n_s = 3, n_f \bmod(4N) = i;\right\}$$

$$REG_2 = \left\{(k, l, n_s, n_f) \mid k = \frac{N_{RB}^{BW} N_{sc}^{RB}}{2} - 36 + k', k' = 0,\right.$$

$$\left. 1, \ldots , 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots , 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} + 36 + k', k' = 0,\right.$$

$$\left. 1, \ldots , 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 36 + k',\right.$$

$$\left. k' = 0, 1, \ldots , 71; l = 0, 1, 2, 3; n_s = 1, n_f \bmod(4N) = i;\right\}$$

-continued $$REG_2 = \left\{(k, l, n_s, n_f) \mid k = \frac{N_{RB}^{BW} N_{sc}^{RB}}{2} - 108 + k', k' = 0, \right.$$

$$\left. 1, \ldots, 71; l = 0, 1, 2, 3; n_s = 1, n_f \bmod(4N) = j; \right\}$$

or $$REG_1 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 6, 8, n_f \bmod(4N) = i; \right\}$$

or $$REG_1 = \left\{(k, l, n_s, n_f) \mid k = \frac{N_{RB}^{BW} N_{sc}^{RB}}{2} - 18 + k', k' = 0, \right.$$

$$\left. 1, \ldots, 36; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 4, 5, 6; n_s = 1, 3, n_f \bmod(4N) = i; \right\}$$

or $$REG_1 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 1, 3, n_f \bmod(4N) = j; \right\}$$

or $$REG_1 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 6, 8, n_f \bmod(4N) = i; \right\}$$

$$REG_2 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 1, 3, n_f \bmod(4N) = j; \right\}$$

or $$REG_1 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} + 18 + k', k' = 0, \right.$$

$$\left. 1, \ldots, 35; l = 0, 1, 2, 3; n_s = 1, 3, n_f \bmod(4N) = j; \right\}$$

or $$REG_1 = \left\{(k, l, n_s, n_f) \mid k = \frac{N_{RB}^{BW} N_{sc}^{RB}}{2} - 18 + k', k' = 0, \right.$$

$$\left. 1, \ldots, 35; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} - 54 + k', k' = 0, \right.$$

$$\left. 1, \ldots, 35; l = 0, 1, 2, 3; n_s = 1, 3, n_f \bmod(4N) = j; \right\}$$

where a position of each resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, a parameter i is not equal to a parameter j, values of the parameters i and j are both in a range of 0 to 4N−1, and N is a positive integer.

Further, a broadcast channel transmitted on each of the at least two resource element groups included in the resource configuration of the broadcast channel may further carry at least one piece of indication information in addition to the same information, where the indication information may be used to indicate information about a resource used by the broadcast channel, or the indication information is used to indicate one or more physical channels used by the user equipment, or information about a resource used by one or more physical channels used by the user equipment, or information about a resource used by one or more physical signals used by the user equipment.

Optionally, the one or more physical channels used by the user equipment may be a downlink control channel (PD-CCH), or an uplink control channel (PUCCH), or a control format indicator channel (PCFICH), or the like.

Optionally, the indication information carried in the broadcast channel transmitted on each of the at least two resource element groups included in the resource configuration of the broadcast channel is carried in a broadcast message of the broadcast channel.

Optionally, the indication information carried in the broadcast channel transmitted on each of the at least two resource element groups included in the resource configuration of the broadcast channel may be further represented by different cyclic redundancy check masks.

Optionally, the communication signal is a control channel, and at least two resource element groups included in a resource configuration of the control channel may be respectively located in different radio frames, or different system frames, or different subframes, or different slots, or different OFDM symbols, or different subcarriers, or different physical resource blocks, or respectively located in different subframes, or different slots in a same subframe, or different OFDM symbols in a same slot, or different subcarriers in a same slot, or different physical resource blocks in a same slot, or respectively located in different control channel elements CCEs (Control Channel Element) or CCE sets, or enhanced control channel elements (eCCE) or eCCE sets.

Further, a control channel transmitted on each of the at least two resource element groups included in the resource configuration of the control channel may carry at least one piece of indication information in addition to the same information, where the indication information may be used to indicate information about a resource used by the control channel, or the indication information is used to indicate at least one of the following physical channels used by the user equipment or information about a resource used by a physical channel: a physical control channel (PDCCH) or an enhanced physical control channel (ePDCCH) carried in a user equipment specific search space (USS), or a physical uplink control channel (PUCCH).

Optionally, the indication information carried in the control channel transmitted on each of the at least two resource element groups included in the resource configuration of the control channel is carried in control information of the control channel.

Optionally, the indication information carried in the control channel transmitted on each of the at least two resource element groups included in the resource configuration of the control channel may be represented by different cyclic redundancy check masks.

Optionally, the communication signal is a broadcast channel or a control channel; and the transmitting unit 102 is further configured to transmit a synchronization signal set to the user equipment, where the synchronization signal set includes at least one synchronization signal corresponding to the communication signal transmitted on the at least one resource element group in the resource configuration of the communication signal.

Optionally, a correspondence between the synchronization signal and the communication signal (the broadcast channel or the control channel) may be predefined. The following uses an example in which the resource configuration of the communication signal includes two resource element groups: a first resource element group and a second resource element group. The synchronization signal set includes two synchronization signals: a first synchronization signal $SS_1$ and a second synchronization signal $SS_2$. In this case, the communication signal transmitted on the first resource element group corresponds to the first synchronization signal $SS_1$, and the communication signal transmitted on the second resource element group corresponds to the second synchronization signal $SS_2$. Optionally, a fixed resource correspondence may exist between the first synchronization signal $SS_1$ and the first resource element group $REG_1$. For example, a fixed time sequence relationship exists between the first synchronization signal $SS_1$ and the first resource element group $REG_1$. Specifically, the time sequence relationship may be: a first OFDM symbol in which the first resource element group $REG_1$ is located is always located in a symbol position previous to a first OFDM symbol used by the first synchronization signal $SS_1$. Correspondingly, a similar correspondence exists between the second synchronization signal $SS_2$ and the second resource element group $REG_2$.

Optionally, a resource correspondence between a synchronization signal $SS_j$ and the resource element group $REG_i$ may also be:

$$j=i \bmod N_{SS} \text{ or } i=j \bmod N_{REG} \text{ or } (i+n)\bmod N_{SS}=(j+n)\bmod N_{REG} \quad \text{formula (5')}$$

where $N_{SS}$ is a total quantity of synchronization signals, $N_{REG}$ is a total quantity of resource element groups, n is an index or a count value of a subframe or an OFDM symbol or a subcarrier or a PRB or a resource element group, and mod denotes a modulo operation.

Optionally, the correspondence between the synchronization signal and the communication signal may be notified by the base station to the user equipment, for example, may be notified by using a broadcast message, or higher layer signaling such as RRC signaling, or downlink control information DCI.

Optionally, the at least one synchronization signal included in the synchronization signal set separately carries at least one piece of indication information, where the indication information is used to indicate information about a resource used by the communication signal transmitted on the at least one resource element group, and the information about the resource may be: identification information of the communication signal, or information about a resource element group used by the communication signal, or information about an antenna port or an antenna port group used by the communication signal, or information about a sequence or a sequence group used by the communication signal, or information about a beam group used by the communication signal, or information about a time-frequency position used by the communication signal; or the indication information is used to indicate information about a resource used by one or more physical channels used by the user equipment, or information about a resource used by one or more physical signals used by the user equipment. The information about the resource used by the physical channel or the physical signal may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or information about an antenna port group used by the physical channel or the physical signal, or information about precoding used by the physical channel or the physical signal, or information about a beam group used by the physical channel or the physical signal, or information about a time-frequency position used by the physical channel or the physical signal, for example, an antenna port used by the broadcast channel or the control channel.

Optionally, the communication signal is a control channel; and the transmitting unit 102 is further configured to transmit a broadcast channel set to the user equipment, where the broadcast channel set includes at least one broadcast channel corresponding to a control channel transmitted on at least one resource element group in the resource configuration of the control channel.

Optionally, a correspondence between the broadcast channel and the communication signal may be predefined. For details, refer to the corresponding part in the embodiment shown in FIG. 2. Alternatively, the correspondence may be notified by the base station by using a broadcast message, or higher layer signaling such as RRC signaling, or downlink control information DCI.

Optionally, each broadcast channel included in the broadcast channel set further carries at least one piece of indication information, where the indication information is used to indicate information about a resource used by the control channel transmitted on the at least one resource element group and corresponding to the broadcast channel. The information about the resource may be: identification information of the control channel, or information about a resource element group used by the control channel, or information about an antenna port or an antenna port group used by the control channel, or information about a sequence or a sequence group used by the control channel, or information about a beam group used by the control channel, or one or more physical channels used by the user equipment, or information about an antenna port used by one or more physical channels.

Optionally, the at least one piece of indication information carried in the broadcast channel may be represented by a CRC mask corresponding to the broadcast channel.

Figure 2:
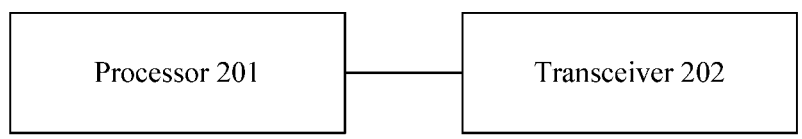
FIG. 2 is a schematic structural diagram of another base station according to an embodiment of the present invention.

FIG. 2 shows another base station in an embodiment of the present invention. As shown in FIG. 2, the base station includes a processor 201 and a transceiver 202.

The processor 201 is configured to determine a resource configuration of a communication signal, where the resource configuration includes at least two different resource element groups.

Optionally, the resource configuration of the communication signal may be predefined, and is known by both the base station and user equipment; or the resource configuration of the communication signal may be notified by the base station to user equipment by broadcast. It should be understood that, different communication signals generally use different resource configurations. For example, a synchronization signal and a broadcast channel occupy different resource element groups.

The transceiver 202 is configured to transmit the communication signal on each resource element group included in the resource configuration to user equipment, where the communication signal transmitted on each resource element group carries at least one piece of same information, and the same information is cell specific or user equipment group specific information.

The base station shown in FIG. 2 may be implemented with reference to the base station embodiment shown in FIG. 1. Details are not further described herein.

Figure 3:
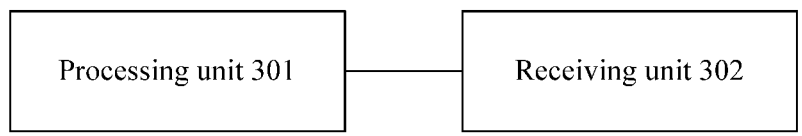
FIG. 3 is a schematic structural diagram of user equipment according to an embodiment of the present invention.

FIG. 3 shows user equipment in an embodiment of the present invention. As shown in FIG. 3, the user equipment includes: a processing unit 301, configured to determine, from a resource configuration of a communication signal, at least one resource element group for the communication signal, where the resource configuration of the communication signal includes at least two different resource element groups, the communication signal transmitted on each resource element group included in the resource configuration carries at least one piece of same information, and the at least one piece of same information may be cell specific or user equipment group specific information; and a receiving unit 302, configured to receive the communication signal based on the at least one resource element group.

Specifically, for the resource configuration of the communication signal, positions of different resource element groups, and the cell specific or user equipment group specific information, refer to the descriptions in the embodiment shown in FIG. 1. Details are not further described herein.

Optionally, that the processing unit 301 determines, from a resource configuration of a communication signal, at least one resource element group for the communication signal may include but is not limited to the following implementations.

Implementation 1: The processing unit 301 determines, from the resource configuration of the communication signal, the at least one resource element group based on signal quality of the communication signal on the resource element group, where the resource element group belongs to the resource configuration of the communication signal.

The signal quality of the communication signal may be: signal quality of the received signal or signal quality of the detected signal.

The signal quality of the communication signal may be received power, or received strength, or received quality of the communication signal, where the received quality may be a carrier-to-interference ratio or a signal-to-noise ratio of the signal.

Specifically, the signal quality of the communication signal on the resource element group may be signal quality signal on one or more resource elements included in the resource element group, or may be an average value of signal quality on all or a plurality of resource elements included in the resource element group; or may be a filter value of signal quality in a time window or a resource window, for example, using an alpha filter or a moving average, where a filter parameter may be notified by using higher layer signaling such as RRC signaling or downlink control information DCI. The specific implementation is not limited in the present invention.

For example, the processing unit 301 determines, by comparing signal quality of the communication signal transmitted on a first resource element group with signal quality of the communication signal transmitted on a second resource element group, that the signal quality of the communication signal transmitted on the first resource element group is higher, and the receiving unit 302 receives the communication signal on the first resource element group.

Implementation 2: The processing unit 301 determines, from the resource configuration of the communication signal, the at least one resource element group for the communication signal based on signal quality of a reference signal corresponding to the communication signal on the resource element group, where the determined at least one resource element group belongs to the resource configuration of the communication signal.

The signal quality of the reference signal may be reference signal received power (RSRP) or a reference signal strength indicator (RSSI) or reference signal received quality (RSRQ).

Implementation 3: The processing unit 301 determines, from the resource configuration of the communication signal, the at least one resource element group for the communication signal based on detection or decoding performance of the communication signal on the resource element group, where the determined at least one resource element group belongs to the resource configuration of the communication signal.

Specifically, the detection or decoding performance of the communication signal on the resource element group may be correlation detection performance or matched filtering detection performance of a communication signal sequence on the resource element group, or may be a signal to interference plus noise ratio (SINR) or a log-likelihood ratio (LLR) of each modulation symbol on the resource element group, or a signal to interference plus noise ratio or a log-likelihood ratio of each code bit, or an effective signal to interference plus noise ratio corresponding to a signal to interference plus noise ratio of all modulation symbols on the resource element group, or a block error rate (BLER) corresponding to an effective signal to interference plus noise ratio SINR. The effective signal to interference plus noise ratio may be obtained by using a method such as an exponential effective signal to noise ratio mapping (EESM) or mutual information based effective signal to noise ratio mapping (MI-ESM).

In addition, determining a specific position of a resource element group may be implemented by blind detection or blind decoding. Specifically, the implementation may be: performing a hypothesis test based on a position relationship between resource element groups included in the resource configuration of the communication signal and based on a possible position of each resource element group, and determining, from the resource configuration of the communication signal, the at least one resource element group for the communication signal based on the detection or decoding performance, where the determined at least one resource element group belongs to the resource configuration of the communication signal.

Implementation 4: The processing unit 301 determines, from the resource configuration of the communication signal, the at least one resource element group for the communication signal based on indication information carried in another physical channel or physical signal, where the determined at least one resource element group belongs to the resource configuration of the communication signal.

Specifically, a correspondence exists between the indication information carried in the another physical channel or physical signal and the resource element groups in the resource configuration of the communication signal. By using the correspondence, the at least one resource element group is determined from the indication information carried in the another physical channel or physical signal.

Implementation 5: The receiving unit 302 receives a reference signal set transmitted by a base station; and the processing unit 301 determines, from the resource configuration of the communication signal, the at least one resource element group for the communication signal based on the reference signal set transmitted by the base station and received by the receiving unit 302.

Specifically, the processing unit 301 of the user equipment determines one or more resource indications based on the reference signal set transmitted by the base station and received by the receiving unit 302, where the one or more resource indications are used to indicate information about a resource used by the communication signal.

Specifically, the information about the resource used by the communication signal may be: identification information of the communication signal, or information about a resource element group in the resource configuration of the communication signal, or an antenna port group used by the communication signal, or a sequence group used by the communication signal, or a beam group used by the communication signal, or information about precoding used by the communication signal, or the like.

The processing unit 301 obtains, based on the reference signal set received by the receiving unit 302, the information about the resource used by the communication signal, and determines the at least one resource element group for the communication signal based on the obtained resource information.

Optionally, a correspondence between the resource indication and the information about the resource used by the communication signal may be predefined, or may be notified by signaling. Based on the correspondence, the user equipment may determine, based on the resource indication, the information about the resource used by the communication signal. Specifically, the resource indication may be CSI, and the CSI includes an RI and/or PMI.

Optionally, the at least one resource element group is one resource element group, and the receiving unit 302 is further configured to receive the communication signal based on the resource element group.

In addition, the receiving unit 302 may obtain, based on the received communication signal, the at least one piece of same information carried in the communication signal. Specifically, an operation such as demodulation or decoding or a sequence correlation operation may be performed based on the received signal to obtain the at least one piece of same information that is carried.

Alternatively, optionally, the at least one resource element group is two resource element groups, and the receiving unit 302 receives the communication signals based on the two resource element groups.

Certainly, if the resource configuration of the communication signal includes more resource element groups, the processing unit 301 may determine at least two resource element groups, and therefore the receiving unit 302 receives the communication signals.

In addition, the receiving unit 302 may receive the communication signals on the at least two resource element groups, and the processing unit 301 obtains the at least one piece of same information carried in the communication signals.

Specifically, the processing unit 301 may perform operations such as demodulation or decoding or sequence correlation operations respectively on the signals received by the receiving unit 302 on the at least two resource element groups, to respectively obtain the at least one piece of same information that is carried. Further, a mutual check may be performed on the information obtained on each resource element group. Alternatively, the processing unit 301 may obtain soft demodulation information respectively from the signals received by the receiving unit 302 on the at least two resource element groups, and combine the soft demodulation information of the signals received on the at least two resource element groups. For example, log-likelihood ratios of corresponding modulation symbols obtained on the at least two resource element groups respectively are summated; or soft decoding information is obtained from the at least two resource element groups respectively, and soft decoding information of the signals received on the at least two resource element groups is combined. For example, log-likelihood ratios of corresponding code bits obtained on the at least two resource element groups are summated; or sequence correlation information is separately obtained from the at least two resource element groups, and the sequence correlation information of the signals received on the at least two resource element groups is combined. For example, corresponding sequence correlation values obtained on the at least two resource element groups are summated, and the at least one piece of same information that is carried is obtained.

In this embodiment of the present invention, the user equipment determines and receives the communication signal transmitted by the base station on the at least one resource element group, to obtain the cell specific or user equipment group specific same information carried in the communication signal. The user equipment can determine at least one resource element group whose signal is favorable for the user equipment, and receive the communication signal from the at least one resource element group. Therefore, reliability of transmitting the specific information or the communication signal between a user equipment within a cell (or a user equipment group) and the base station is improved.

It should be pointed out that, the at least one resource element group determined by the user equipment may be obtained in a communication signal receiving process, and is used for receiving the communication signal currently. Preferably, the user equipment may further store information about the resource element group determined currently, for use in next transmission. The information about the resource element group determined currently is recorded or stored, and is used in a plurality of subsequent communication signal receiving processes. Generally, coverage of the communication signal depends on a large-scale parameter related to radio channel propagation, and the large-scale parameter generally changes slowly. Therefore, by recording or storing the information about the resource element group determined currently, implementation complexity of a user equipment can be reduced generally while signal coverage is ensured.

Optionally, the communication signals transmitted on the at least two resource element groups included in the resource configuration may respectively use different sequence groups, or different antenna port groups, or different precoding, or different beam groups, or different combinations thereof: for example, the same or different antenna port groups but different precoding or beam groups, or the same or different sequence groups and the same or different antenna port groups or precoding or beam groups.

The following is described by using an example in which the resource configuration of the communication signal includes two different resource element groups: a first resource element group $REG_1$ and a second resource element group $REG_2$. Cases of more resource element groups may be deduced by analogy.

Optionally, the communication signal transmitted on the first resource element group $REG_1$ and the communication signal transmitted on the second resource element group $REG_2$ may respectively use a first antenna port group $PG_1$ and a second antenna port group $PG_2$ that are same or different antenna port groups, where the antenna port group $PG_1$ or $PG_2$ includes at least one antenna port.

Specifically, for use of the resource element group and the antenna port group, refer to the descriptions in the embodiment shown in FIG. 1. Details are not further described herein. In addition, when the communication signal is transmitted at different time or in different subframes, a predefined relationship may exist between the resource element group and the antenna port group. Specifically, the relationship shown in formula (1) exists between a resource element group $REG_i$, an antenna port group $PG_j$, and a precoding matrix $W_j$ that are used by the communication signal.

The receiving unit 302 of the user equipment can receive the communication signals on the resource element groups respectively from the antenna port groups based on use of the resource element groups and the antenna port groups. Therefore, the cell (or user equipment group) specific same information can be received by using space diversity gains provided by different antenna port groups, and transmission reliability of the cell (or user equipment group) specific information or the communication signal is effectively improved.

Optionally, the communication signal transmitted on the first resource element group $REG_1$ and the communication signal transmitted on the second resource element group $REG_2$ may use same or different precoding or beam groups, where the beam group includes at least one beam, and the precoding uses a precoding matrix or vector. Specifically, for use of the resource element group and precoding or the beam group, refer to the descriptions in the embodiment shown in FIG. 1. Details are not further described herein. In addition, when the communication signal is transmitted at different time or in different subframes, a predefined relationship may exist between the resource element group and the precoding or the beam group. Specifically, the relationship shown in formula (2) exists between the resource element group $REG_i$, a beam group $BG_j$, and the precoding matrix $W_j$ that are used by the communication signal.

The receiving unit 302 of the user equipment can receive the communication signals on the resource element groups respectively from the antenna port group(s) based on use of the resource element groups and the precoding or the beam group(s). Therefore, the cell (or user equipment group) specific same information can be received by using coding gains or beam directional gains provided by different precoding or beam groups, and transmission reliability of the cell (or user equipment group) specific information or the communication signal is effectively improved.

Optionally, that the communication signal transmitted on the first resource element group $REG_1$ and the communication signal transmitted on the second resource element group $REG_2$ may use same or different antenna port groups may further include: the communication signals transmitted on the two resource element groups may use a same antenna port group; and different precoding or beam groups are used when the same antenna port group is used to transmit the communication signals transmitted on the two resource element groups; or the communication signals transmitted on the two resource element groups may use different antenna port groups; and different precoding or beam groups are used when different antenna port groups are used to transmit the communication signals transmitted on the two resource element groups. For details, refer to the embodiment shown in FIG. 1. Details are not further described herein. Further, the relationship shown in formula (3) exists between an antenna port group $PG_i$, the used beam group $BG_j$, and the used precoding matrix $W_j$.

The receiving unit 302 of the user equipment can receive the communication signals on the resource element groups respectively from the antenna port group(s) based on use of the resource element groups and the antenna port group(s) and the precoding or beam group(s). Therefore, the cell (or user equipment group) specific same information can be received by using space diversity gains of different antenna port groups and array gains formed by different precoding or beam groups, and transmission reliability of the cell (or user equipment group) specific information or the communication signal is effectively improved.

Optionally, the communication signal transmitted on the first resource element group $REG_1$ and the communication signal transmitted on the second resource element group $REG_2$ respectively use different sequence groups $SG_1$ and $SG_2$, where the sequence groups $SG_1$ and $SG_2$ respectively include at least one sequence.

Specifically, the communication signal transmitted on the first resource element group $REG_1$ and the communication signal transmitted on the second resource element group $REG_2$ may respectively use different sequence groups $SG_1$ and $SG_2$. For how two different resource element groups respectively use different sequence groups and for the specific sequence groups, refer to the descriptions in the embodiment shown in FIG. 1. Details are not further described herein.

Optionally, the communication signal transmitted on the first resource element group $REG_1$ and the communication signal transmitted on the second resource element group $REG_2$ respectively use different sequence groups $SG_1$ and $SG_2$, and the communication signal transmitted on the first resource element group $REG_1$ and the communication signal transmitted on the second resource element group $REG_2$ are transmitted respectively by using different antenna port groups $PG_1$ and $PG_2$ or transmitted respectively by using different beam groups $BG_1$ and $BG_2$ or transmitted respectively by using different precoding matrices $W_1$ and $W_2$. Further, the relationship shown in formula (4) exists between a sequence group $SG_i$ and the used antenna port group PG; or the relationship shown in formula (5) exists between a sequence group $SG_i$, the used beam group $BG_j$, and the used precoding matrix $W_j$.

The receiving unit 302 of the user equipment can receive the communication signals on the resource element groups respectively from the antenna port group(s) based on use of the resource element groups and communication signal sequence groups or antenna port group(s) and precoding or beam group(s) and by using communication signal sequences. Therefore, the cell (or user equipment group) specific same information can be received by using space diversity gains of different antenna port groups and array gains formed by different precoding or beam groups, and transmission reliability of the cell (or user equipment group) specific information or the communication signal is effectively improved.

It should be understood that, optionally, the resource element groups may be respectively located in different radio frames, or different system frames, or different subframes, or different slots, or different orthogonal frequency division multiplexing (OFDM) symbols, or different subcarriers, or different physical resource blocks. For details, refer to the descriptions in the embodiment shown in FIG. 1.

Optionally, the communication signal transmitted on each of the at least two resource element groups included in the resource configuration further carries at least one piece of indication information; and the receiving unit is configured to receive the communication signal based on the at least one resource element group; and the processing unit is configured to obtain, from the communication signal received by the receiving unit, the at least one piece of indication information carried in the communication signal.

Optionally, the indication information is used to indicate information about a resource used by the communication signal. Specifically, the information about the resource used by the communication signal may be at least one of the following: identification information of the communication signal, information about a resource element group used by the communication signal, information about a sequence or a sequence group used by the communication signal, information about an antenna port or an antenna port group used by the communication signal, information about precoding used by the communication signal, information about a beam group used by the communication signal, and information about a time-frequency position used by the communication signal. For the specific information about the resource, refer to the descriptions in the embodiment shown in FIG. 1. Details are not further described herein.

Optionally, the indication information is used to indicate one or more physical channels used by the user equipment. For a specific physical channel, refer to the descriptions in the embodiment shown in FIG. 1. Details are not further described herein.

Optionally, the indication information indicates information about a resource used by one or more physical channels used by the user equipment, or information about a resource used by one or more physical signals used by the user equipment. Specifically, the information about the resource used by the one or more physical channels used by the user equipment or the information about the resource used by the one or more physical signals used by the user equipment may be information about a resource used by a physical channel or a physical signal associated with the transmitted communication signal. For the specific information about the resource, refer to the descriptions in the embodiment shown in FIG. 1. Details are not further described herein.

In this embodiment of the present invention, the processing unit 301 determines a resource element group with signal favorable for the user equipment, and the receiving unit 302 of the user equipment receives a communication signal transmitted on the resource element group; therefore, the processing unit 301 can obtain information carried in the communication signal, and then use information corresponding to the communication signal, or select a physical channel or a physical signal associated with the communication signal. Therefore, complexity of detection or reception by the user equipment is reduced, and reliability of transmitting the specific information or the communication signal between the cell (or the user equipment group) and the base station can be ensured.

Based on any one of the foregoing communication signal receiving method embodiments, the communication signal is a synchronization signal, and the same information is all or a part of information of a cell identifier, or all or a part of information of a user equipment group identifier.

The communication signal is a broadcast channel, and the same information is at least one of the following: a system bandwidth, a part or all of information of a system frame number (SFN), physical channel configuration indication information, and a master information block (MIB).

The communication signal is a control channel, and the same information is downlink control information of a system information block, or downlink control information carried in a common search space (CSS), or format indicator information of a downlink control channel.

Optionally, the communication signal is a synchronization signal, and at least two different resource element groups included in a resource configuration of the synchronization signal are respectively located in different OFDM symbols or slots or subframes or radio frames or system frames; and the receiving unit 302 is configured to receive the synchronization signal based on an OFDM symbol or a slot or a subframe or a radio frame or a system frame in which the at least one resource element group is located.

Optionally, the resource configuration of the synchronization signal includes at least two different resource element groups $REG_1$ and $REG_2$, where $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right.$$

$$\left. \ldots, N_{sc}^{SS} - 1; l = N_{symb}^{RB} - 1; n_s \bmod N_{slot}^{F} = 0, \frac{N_{slot}^{F}}{2}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = N_{symb}^{RB} - 1; n_s \bmod N_{slot}^{F} = \frac{N_{slot}^{F}}{4}, \frac{3 \cdot N_{slot}^{F}}{4}; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = \frac{N_{symb}^{RB} - 1}{2}; n_s \bmod N_{slot}^{F} = 0, \frac{N_{slot}^{F}}{2}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = \frac{N_{symb}^{RB} - 1}{2}; n_s \bmod N_{slot}^{F} = \frac{N_{slot}^{F}}{4}, \frac{3 \cdot N_{slot}^{F}}{4}; \right\}$$

or $$REG_1 = \left\{(k, l, n_s, n_f) \mid k = n - \frac{N_{sc}^{SS}}{2} + \frac{N_{sc}^{BW} N_{sc}^{RB}}{2}, \right.$$

$$n = 0, \ldots, N_{sc}^{SS} - 1; l = N_{symb}^{RB} - 1;$$

$$\left. n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, \right.$$

$$n = 0, \ldots N_{sc}^{SS} - 1; l = N_{symb}^{RB} - 1;$$

$$\left. n_s \bmod N_{slot}^F = 0, \frac{N_{slot}^F}{2}, n_f \bmod 2 = 1; \right\}$$

or $$REG_1 =$$

$$\left\{(k, l, n_s, n_f) \mid k = n - \frac{N_{sc}^{SS}}{2} + \frac{N_{RB}^{BW} N_{sc}^{RB}}{2}, \right.$$

$$n = 0, \ldots, N_{sc}^{SS} - 1; l = \frac{N_{symb}^{RB} - 1}{2};$$

$$\left. n_s \bmod N_{slot}^F = 0, \frac{N_{slot}^F}{2}, n_f \bmod 2 = 0; \right\}$$

$$REG_2 = \left\{(k, l, n_s n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$l = \frac{N_{symb}^{RB} - 1}{2}; n_s \bmod N_{slot}^F = 0,$$

$$\left. \frac{N_{slot}^F}{2}, n_f \bmod 2 = 1; \right\}$$

or $$REG_1 =$$

$$\left\{(k, l, n_s, n_f) \mid k = n - \frac{N_{sc}^{SS}}{2} + \frac{N_{RB}^{BW} N_{sc}^{RB}}{2}, \right.$$

$$n = 0, \ldots, N_{sc}^{SS} - 1; l = \frac{N_{symb}^{RB} - 1}{2};$$

$$\left. n_s \bmod N_{slot}^F = 0, \frac{N_{slot}^F}{2}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$

$$N_{sc}^{SS} - 1; l = N_{symb}^{RB} - 1;$$

$$\left. n_s \bmod N_{slot}^F = 0, \frac{N_{slot}^F}{2}; \right\}$$

or $$REG_1 = \left\{(k, l, n_s, n_f) \mid k = n - \frac{N_{sc}^{SS}}{2} + \right.$$

$$\frac{N_{RB}^{BW} N_{sc}^{RB}}{2}, n = N_{offset}, \ldots,$$

$$N_{offset} + N_{sc}^{SS} - 1; l = N_{symb}^{RB} - 1;$$

$$\left. n_s \bmod N_{slot}^F = 0, \frac{N_{slot}^F}{2}; \right\}$$

$$REG_2 = \left\{(k, l, n_s, n_f) \mid n - 31 + \frac{N_{RB}^{BW} N_{sc}^{RB}}{2}, n = -N_{offset}, \ldots, \right.$$

$$-N_{offset} + N_{sc}^{SS} - 1; l = N_{symb}^{RB} - 1;$$

$$\left. n_s \bmod N_{slot}^F = 0, \frac{N_{slot}^F}{2}; \right\}$$

where a position of each resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols in each resource block, $N_{slot}^{SF}$ denotes a quantity of slots in a subframe, $N_{sc}^{RB}$ is a quantity of subcarriers occupied by the synchronization signal, and $N_{offset}$ is a subcarrier position offset of the synchronization signal;

or the resource configuration of the synchronization signal includes at least four different resource element groups $REG_1$, $REG_2$, $REG_3$, and $REG_4$, where $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = N_{symb}^{RB} - 1; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = N_{symb}^{RB} - 1; n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = N_{symb}^{RB} - 1; n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = \frac{N_{symb}^{RB} - 1}{2}; n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

$$\left. l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$

$$\left. N_{sc}^{SS} - 1; l = \frac{N_{symb}^{RB} - 1}{2}; n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1; \right.$$

-continued $$l = \frac{N_{symb}^{RB} - 1}{2}; n_s \bmod N_{slot}^F = \frac{N_{slot}^F}{4}, \frac{3 \cdot N_{slot}^F}{4}, n_f \bmod 2 = 1;\bigg\}$$

or $$REG_1 = \bigg\{(k, l, n_s, n_f) \mid k = n - \frac{N_{sc}^{SS}}{2} + \frac{N_{RB}^{BW} N_{sc}^{RB}}{2}, n = 0, \ldots, N_{sc}^{SS} - 1;$$

$$l = \frac{N_{symb}^{RB} - 1}{2}; n_s \bmod N_{slot}^F = 0, \frac{N_{slot}^F}{2}, n_f \bmod 2 = 0;\bigg\}$$

$$REG_2 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = N_{symb}^{RB} - 1; n_s \bmod N_{slot}^F = 0, \frac{N_{slot}^F}{4}, n_f \bmod 2 = 0;\bigg\}$$

$$REG_3 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = 0, \frac{N_{slot}^F}{4}, n_f \bmod 2 = 1;\bigg\}$$

$$REG_4 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = N_{symb}^{RB} - 1; n_s \bmod N_{slot}^F = 0, \frac{N_{slot}^F}{4}, n_f \bmod 2 = 1;\bigg\}$$

or $$REG_1 = \bigg\{(k, l, n_s, n_f) \mid k = n - \frac{N_{sc}^{SS}}{2} + \frac{N_{RB}^{BW} N_{sc}^{RB}}{2},$$

$$n = N_{offset}, \ldots, N_{offset} + N_{sc}^{SS} - 1; l = N_{symb}^{RB} - 1;$$

$$n_s \bmod N_{slot}^F = 0, \frac{N_{slot}^F}{2}, n_f \bmod 2 = 0;\bigg\}$$

$$REG_2 = \bigg\{(k, l, n_s, n_f) \mid k = n - 31 + \frac{N_{RB}^{BW} N_{sc}^{RB}}{2},$$

$$n = -N_{offset}, \ldots, -N_{offset} + N_{sc}^{SS} - 1; l = N_{symb}^{RB} - 1;$$

$$n_s \bmod N_{slot}^F = 0, \frac{N_{slot}^F}{2}, n_f \bmod 2 = 0;\bigg\}$$

$$REG_3 = \bigg\{(k, l, n_s, n_f) \mid k = n - \frac{N_{sc}^{SS}}{2} + \frac{N_{RB}^{BW} N_{sc}^{RB}}{2},$$

$$n = N_{offset}, \ldots, N_{offset} + N_{sc}^{SS} - 1; l = N_{symb}^{RB} - 1;$$

$$n_s \bmod N_{slot}^F = 0, \frac{N_{slot}^F}{2}, n_f \bmod 2 = 1;\bigg\}$$

$$REG_4 = \bigg\{(k, l, n_s, n_f) \mid k = n - 31 + \frac{N_{RB}^{BW} N_{sc}^{RB}}{2},$$

$$n = -N_{offset}, \ldots, -N_{offset} + N_{sc}^{SS} - 1; l = N_{symb}^{RB} - 1;$$

$$n_s \bmod N_{slot}^F = 0, \frac{N_{slot}^F}{2}, n_f \bmod 2 = 1;\bigg\}$$

or $$REG_1 = \bigg\{(k, l, n_s, n_f) \mid k = n - \frac{N_{sc}^{SS}}{2} + \frac{N_{RB}^{BW} N_{sc}^{RB}}{2}, n = 0,$$

$$\ldots, N_{sc}^{SS} - 1; l = N_{symb}^{RB} - 1; n_s \bmod N_{slot}^F = 0, \frac{N_{slot}^F}{4};\bigg\}$$

$$REG_2 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = N_{symb}^{RB} - 1; n_s \bmod N_{slot}^F = \frac{N_{slot}^F}{8}, \frac{3 \cdot N_{slot}^F}{8};\bigg\}$$

$$REG_3 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = N_{symb}^{RB} - 1; n_s \bmod N_{slot}^F = \frac{N_{slot}^F}{2}, \frac{3N_{slot}^F}{4};\bigg\}$$

$$REG_4 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = N_{symb}^{RB} - 1; n_s \bmod N_{slot}^F = \frac{5N_{slot}^F}{5}, \frac{7N_{slot}^F}{8};\bigg\}$$

or $$REG_1 = \bigg\{(k, l, n_s, n_f) \mid k = n - \frac{N_{sc}^{SS}}{2} + \frac{N_{RB}^{BW} N_{sc}^{RB}}{2}, n = 0,$$

$$\ldots, N_{sc}^{SS} - 1; l = \frac{N_{symb}^{RB} - 1}{2}; n_s \bmod N_{slot}^F = 0, \frac{N_{slot}^F}{4};\bigg\}$$

$$REG_2 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = \frac{N_{slot}^F}{8}, \frac{3 \cdot N_{slot}^F}{8};\bigg\}$$

$$REG_3 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = \frac{N_{slot}^F}{2}, \frac{6N_{slot}^F}{4};\bigg\}$$

$$REG_4 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = \frac{5N_{slot}^F}{8}, \frac{7N_{slot}^F}{8};\bigg\}$$

or $$REG_1 = \bigg\{(k, l, n_s, n_f) \mid k = n - \frac{N_{sc}^{SS}}{2} + \frac{N_{RB}^{BW} N_{sc}^{RB}}{2}, n = 0,$$

$$\ldots, N_{sc}^{SS} - 1; l = \frac{N_{symb}^{RB} - 1}{2}; n_s \bmod N_{slot}^F = 0, \frac{N_{slot}^F}{4};\bigg\}$$

$$REG_2 = \bigg\{(k, l, n_s, n_f) \mid k = n - \frac{N_{sc}^{SS}}{2} + \frac{N_{RB}^{BW} N_{sc}^{RB}}{2}, n = 0,$$

$$\ldots, N_{sc}^{SS} - 1; l = N_{symb}^{RB} - 1; n_s \bmod N_{slot}^F = 0, \frac{N_{slot}^F}{4};\bigg\}$$

$$REG_3 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = \frac{N_{symb}^{RB} - 1}{2}; n_s \bmod N_{slot}^F = \frac{N_{slot}^F}{2}, \frac{3N_{slot}^F}{4};\bigg\}$$

$$REG_4 = \bigg\{(k, l, n_s, n_f) \mid k = n - \frac{N_{sc}^{SS}}{2} + \frac{N_{RB}^{BW} N_{sc}^{RB}}{2}, n = 0, \ldots,$$

$$N_{sc}^{SS} - 1; l = N_{symb}^{RB} - 1; n_s \bmod N_{slot}^F = \frac{N_{slot}^F}{2}, \frac{3N_{slot}^F}{4};\bigg\}$$

or $$REG_1 = \bigg\{(k, l, n_s, n_f) \mid k = n - \frac{N_{sc}^{SS}}{2} + \frac{N_{RB}^{BW} N_{sc}^{RB}}{2}, n = N_{offset}, \ldots,$$

$$N_{offset} + N_{sc}^{SS} - 1; l = N_{symb}^{RB} - 1; n_s \bmod N_{slot}^F = 0, \frac{N_{slot}^F}{4};\bigg\}$$

$$REG_2 = \bigg\{(k, l, n_s, n_f) \mid k = n - 31 + \frac{N_{RB}^{BW} N_{sc}^{RB}}{2}, n = -N_{offset}, \ldots,$$

-continued $$-N_{offset} + N_{sc}^{SS} - 1; l = N_{symb}^{RB} - 1; n_s \mod N_{slot}^{F} = 0, \frac{N_{slot}^{F}}{4};\}$$

$$REG_3 = \{(k, l, n_s, n_f) \mid k = n - \frac{N_{sc}^{SS}}{2} + \frac{N_{RB}^{BW} N_{sc}^{RB}}{2}, n = N_{offset}, \ldots ,$$

$$N_{offset} + N_{sc}^{SS} - 1; l = N_{symb}^{RB} - 1; n_s \mod N_{slot}^{F} = \frac{N_{slot}^{F}}{2}, \frac{3N_{slot}^{F}}{4};\}$$

$$REG_4 = \{(k, l, n_s, n_f) \mid k = n - 31 + \frac{N_{RB}^{BW} N_{sc}^{RB}}{2}, n = N_{offset}, \ldots ,$$

$$N_{offset} + N_{sc}^{SS} - 1; l = N_{symb}^{RB} - 1; n_s \mod N_{slot}^{F} = \frac{N_{slot}^{F}}{2}, \frac{3N_{slot}^{F}}{4};\}$$

where a position of a resource element included in each resource element group is represented by a 4-tuple $(k,l,n_s,n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, $N_{symb}^{RB}$ denotes a quantity of OFDM symbols included in each resource block, $N_{slot}^{SF}$ denotes a quantity of slots included in a subframe, $N_{sc}^{SS}$ is a quantity of subcarriers occupied by the synchronization signal, and $N_{offset}$ is a subcarrier position offset of the synchronization signal.

Optionally, the communication signal is a synchronization signal, and a synchronization signal transmitted on each of the at least two different resource element groups included in the resource configuration of the synchronization signal carries at least one piece of indication information; the receiving unit 302 receives the synchronization signal based on the at least one resource element group; and the processing unit 301 obtains, from the synchronization signal received by the receiving unit 302, the at least one piece of indication information carried in the synchronization signal, where the indication information indicates information about a resource used by the synchronization signal or indicates information about a physical channel or a resource of a physical channel used by the user equipment, and the physical channel is at least one of the following: a physical broadcast channel (PBCH), a physical control format indicator channel (PCFICH), a physical downlink control channel (PDCCH), an enhanced physical downlink control channel (ePDCCH), or a physical uplink control channel (PUCCH).

Optionally, a synchronization signal transmitted on each of the at least two different resource element groups included in the resource configuration of the synchronization signal carries at least one piece of indication information; the receiving unit 302 receives the synchronization signal based on the at least one resource element group; and the processing unit 301 obtains, from the received synchronization signal, the at least one piece of indication information carried in the synchronization signal, where the indication information is represented by a ZC sequence or a computer-generated CG sequence or an m-sequence or a cyclic shift of the foregoing sequence or a combination of the foregoing sequences.

Optionally, the communication signal is a broadcast channel, and at least two different resource element groups included in a resource configuration of the broadcast channel are respectively located in different OFDM symbols or slots or subframes or radio frames or system frames; and the receiving unit 302 is configured to receive the broadcast channel based on an OFDM symbol or a slot or a subframe or a radio frame or a system frame in which the at least one resource element group is located.

Optionally, the resource configuration of the broadcast channel includes at least two different resource element groups $REG_1$ and $REG_2$, where $$REG_1 = \{(k, l, n_s, n_f) \mid k = \frac{N_{RB}^{BW} N_{sc}^{RB}}{2} - 36 + k', k' = 0,$$

$$1, \ldots , 71; l = 0, 1, 2, 3, n_s = 1, n_f \mod(4N) = i;\}$$

$$REG_2 = \{(k, l, n_s, n_f) \mid k = \frac{N_{RB}^{BW} N_{sc}^{RB}}{2} - 36 + k', k' = 0,$$

$$1, \ldots , 71; l = 0, 1, 2, 3; n_s = 3, n_f \mod(4N) = i;\}$$

or $$REG_1 =$$

$$\{(k, l, n_s, n_f) \mid k = \frac{N_{RB}^{BW} N_{sc}^{RB}}{2} - 36 + k', k' = 0, 1, \ldots , 71; l = 0,$$

$$1, 2, 3, n_s = 1, n_f \mod(4N) = i;\}$$

$$REG_2 = \{(k, l, n_s, n_f) \mid k = \frac{N_{RB}^{BW} N_{sc}^{RB}}{2} - 36 + k', k' = 0,$$

$$1, \ldots , 71; l = 4, 5, 6; n_s = 1, n_f \mod(4N) = i;\}$$

or $$REG_1 = \{(k, l, n_s, n_f) \mid k = \frac{N_{RB}^{BW} N_{sc}^{RB}}{2} - 36 + k', k' = 0,$$

$$1, \ldots , 71; l = 0, 1, 2, 3; n_s = 1, n_f \mod(4N) = i;\}$$

$$REG_2 = \{(k, l, n_s, n_f) \mid k = \frac{N_{RB}^{BW} N_{sc}^{RB}}{2} - 36 + k', k' = 0,$$

$$1, \ldots , 71; l = 0, 1, 2, 3; n_s = 1, n_f \mod(4N) = j;\}$$

or $$REG_1 = \{(k, l, n_s, n_f) \mid k = \frac{N_{RB}^{BW} N_{sc}^{RB}}{2} - 36 + k', k' = 0,$$

$$1, \ldots , 71; l = 0, 1, 2, 3; n_s = 3, n_f \mod(4N) = i;\}$$

$$REG_2 = \{(k, l, n_s, n_f) \mid k = \frac{N_{RB}^{BW} N_{sc}^{RB}}{2} - 36 + k', k' = 0,$$

$$1, \ldots , 71; l = 0, 1, 2, 3; n_s = 1, n_f \mod(4N) = j;\}$$

or $$REG_1 = \{(k, l, n_s, n_f) \mid k = \frac{N_{RB}^{RW} N_{sc}^{RB}}{2} - 36 + k',$$

$$k' = 0, 1, \ldots , 71; l = 0, 1, 2,$$

$$3; n_s = 1, n_f \mod(4N) = i;\}$$

$$REG_2 = \{(k, l, n_s, n_f) \mid k = \frac{N_{RB}^{BW} N_{sc}^{RB}}{2} + 36 + k', k' = 0, 1, \ldots , 71;$$

$$l = 0, 1, 2, 3; n_s = 1, n_f \mod(4N) = j;\}$$

-continued or $$REG_1 = \left\{(k, l, n_s, n_f) \mid k = \frac{N_{RB}^{BW} N_{sc}^{RB}}{2} - 36 + k', k' = 0, 1, \ldots, 71; l = 0, 1, 2, 3; n_s = 1, n_f \bmod(4N) = i;\right\}$$

$$REG_2 = \left\{(k, l, n_s, n_f) \mid k = \frac{N_{RB}^{BW} N_{sc}^{RB}}{2} - 108 + k', k' = 0, 1, \ldots, 71; l = 0, 1, 2, 3; n_s = 1, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 6, 8, n_f \bmod(4N) = i;\right\}$$

or $$REG_1 = \left\{(k, l, n_s, n_f) \mid k = \frac{N_{RB}^{BW} N_{sc}^{RB}}{2} - 18 + k', k' = 0, 1, \ldots, 36; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1, \ldots, 35; l = 4, 5, 6; n_s = 1, 3, n_f \bmod(4N) = i;\right\}$$

or $$REG_1 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 6, 8, n_f \bmod(4N) = i;\right\}$$

$$REG_2 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} + 18 + k', k' = 0, 1, \ldots, 35; l = 0, 1, 2, 3; n_s = 1, 3, n_f \bmod(4N) = j;\right\}$$

or $$REG_1 = \left\{(k, l, n_s, n_f) \mid k = \frac{N_{RB}^{BW} N_{sc}^{RB}}{2} - 18 + k', k' = 0, 1, \ldots, 35; l = 0, 1, 2, 3; n_s = 1, 3, n_f \bmod(4N) = i;\right\}$$

$$REG_2 = \left\{(k, l, n_s, n_f) \mid k = \frac{N_{RB}^{BW} N_{sc}^{RB}}{2} - 54 + k', k' = 0, 1, \ldots, 35; l = 0, 1, 2, 3; n_s = 1, 3, n_f \bmod(4N) = j;\right\}$$

where a position of each resource element included in each resource element group is represented by a 4-tuple $(k, l, n_s, n_f)$, where k denotes a subcarrier index of the resource element, l denotes an OFDM symbol index of the resource element, $n_s$ denotes a slot index of the resource element, $n_f$ denotes a system frame number of the resource element, $N_{RB}^{BW}$ denotes a quantity of resource blocks included in a system bandwidth, $N_{sc}^{RB}$ denotes a quantity of subcarriers included in each resource block, a parameter i is not equal to a parameter j, values of the parameters i and j are both in a range of 0 to 4N−1, and N is a positive integer.

Optionally, the communication signal is a broadcast channel, and a broadcast channel transmitted on each of the at least two different resource element groups included in the resource configuration of the broadcast channel carries at least one piece of indication information; and the receiving unit 302 receives the broadcast channel based on the at least one resource element group; and the processing unit 301 obtains, from the received broadcast channel, the at least one piece of indication information carried in the broadcast channel, where the indication information indicates information about a resource used by the broadcast channel or indicates information about a physical channel or a resource of a physical channel used by the user equipment, and the physical channel is at least one of the following: a physical control format indicator channel (PCFICH), a physical downlink control channel (PDCCH), an enhanced physical downlink control channel (ePDCCH), or a physical uplink control channel (PUCCH).

Optionally, a broadcast channel transmitted on each of the at least two different resource element groups included in the resource configuration of the broadcast channel carries at least one piece of indication information; and the receiving unit 302 receives the broadcast channel based on the at least one resource element group; and the processing unit 301 obtains, from the broadcast channel received by the receiving unit, the at least one piece of indication information carried in the broadcast channel, where the indication information is carried in a broadcast message of the broadcast channel, or the indication information is represented by using different cyclic redundancy check masks.

Optionally, the communication signal is a control channel, and at least two different resource element groups included in a resource configuration of the control channel are respectively located in different OFDM symbols or slots or subframes or system frames or radio frames or control channel elements (CCEs) or CCE sets or enhanced control channel elements (eCCEs) or eCCE sets; and the receiving unit 302 receives the control channel based on an OFDM symbol or a slot or a subframe or a system frame or a radio frame or a control channel element (CCE) or a CCE set or an enhanced channel control channel element (eCCE) or an eCCE set in which the at least one resource element group is located.

Optionally, the communication signal is a control channel, and a control channel transmitted on each of the at least two different resource element groups included in the resource configuration of the control channel carries at least one piece of indication information; and the receiving unit 302 receives the control channel based on the at least one resource element group; and the processing unit 301 obtains, from the control channel received by the receiving unit 302, the at least one piece of indication information carried in the control channel, where the indication information indicates information about a resource used by the control channel or indicates information about a physical channel or a resource of a physical channel used by the user equipment, and the physical channel is at least one of the following: a physical control channel (PDCCH) or an enhanced physical control channel (ePDCCH) carried in a user equipment specific search space (USS), or a physical uplink control channel (PUCCH).

Optionally, the communication signal is a control channel, and a control channel transmitted on each of the at least two different resource element groups included in the resource configuration of the control channel carries at least one piece of indication information; and the receiving unit 302 receives the control channel based on the at least one resource element group; and the processing unit 301 obtains, from the control channel received by the receiving unit 302, the at least one piece of indication information carried in the control channel, where the indication information is carried in control information of the control channel, or the indication information is represented by using different cyclic redundancy check masks.

Optionally, the communication signal may be a broadcast channel or a control channel, and the receiving unit 302 is configured to receive a synchronization signal set transmitted by the base station, where the synchronization signal set includes at least one synchronization signal corresponding to the communication signal transmitted on the at least one resource element group in the resource configuration of the communication signal; and the processing unit 301 is configured to determine, from the resource configuration of the communication signal, the at least one resource element group for the communication signal, where the at least one resource element group corresponds to the at least one synchronization signal used by the user equipment.

Optionally, a correspondence between the synchronization signal and the communication signal may be predefined. For details, refer to the corresponding part in the embodiment shown in FIG. 1. Alternatively, the correspondence may be notified by the base station by using a broadcast message, or higher layer signaling such as RRC signaling, or downlink control information DCI.

Optionally, the at least one synchronization signal included in the synchronization signal set may further carry at least one piece of indication information, where the indication information is used to indicate information about a resource used by the communication signal transmitted on the at least one resource element group; and the processing unit 301 is configured to determine, from the resource configuration of the communication signal, the at least one resource element group for the communication signal, where the at least one resource element group corresponds to the at least one synchronization signal used by the user equipment.

Specifically, the indication information is used to indicate information about a resource used by the communication signal transmitted on the at least one resource element group; and the user equipment obtains, based on the information about the resource that is obtained from the synchronization signal, the communication signal on the resource element group or resource element corresponding to the synchronization signal. The information about the resource may be: identification information of the communication signal, or information about a resource element group used by the communication signal, or information about an antenna port or an antenna port group used by the communication signal, or information about a sequence or a sequence group used by the communication signal, or information about a beam group used by the communication signal. Alternatively, the indication information is used to indicate one or more physical channels used by the user equipment, or information about an antenna port used by one or more physical channels, or the like, for example, an antenna port used by the broadcast channel or the control channel.

Optionally, the communication signal is a control channel, and the receiving unit 302 is configured to receive a broadcast channel set transmitted by the base station, where the broadcast channel set includes at least one broadcast channel corresponding to the control channel transmitted on the at least one resource element group included in the resource configuration of the communication signal; and the processing unit 301 is configured to determine, from the resource configuration of the communication signal, the at least one resource element group for the communication signal, where the at least one resource element group corresponds to the at least one broadcast channel used by the user equipment.

Optionally, a correspondence between the broadcast channel and the communication signal may be predefined. The following uses an example in which the resource configuration of the communication signal includes two resource element groups: a first resource element group and a second resource element group. The broadcast channel set includes two broadcast channels: a first broadcast channel $BCH_1$ and a second broadcast channel $BCH_1$. In this case, the communication signal transmitted on the first resource element group corresponds to the first broadcast channel $BCH_1$, and the communication signal transmitted on the second resource element group corresponds to the second broadcast channel $BCH_2$. Optionally, a fixed resource correspondence may exist between the first broadcast channel $BCH_1$ and the first resource element group. For example, a fixed time sequence relationship exists between the first broadcast channel and the first resource element group. Specifically, the time sequence relationship may be: a first OFDM symbol in which the first resource element group $REG_1$ is located is always located in a symbol position previous to a first OFDM symbol used by the first broadcast channel $BCH_1$. Correspondingly, a similar correspondence exists between the second broadcast channel $BCH_2$ and the second resource element group $REG_2$. Optionally, a resource correspondence between a broadcast channel $BCH_j$ and the resource element group $REG_i$ may also be:

$$j=i \bmod N_{BCH} \text{ or } i=j \bmod N_{REG} \text{ or } (i+n) \bmod N_{BCH}= (+n) \bmod N_{REG}$$

where $N_{BCH}$ is a total quantity of broadcast channels BCHs, $N_{REG}$ is a total quantity of resource element groups REGs, n is an index or a count value of a subframe or an OFDM symbol or a subcarrier or a PRB or a resource element group, and mod indicates a modulo operation.

Optionally, the correspondence between the broadcast channel and the communication signal may be notified by the base station to the user equipment, for example, may be notified by using a broadcast message, or higher layer signaling such as RRC signaling, or downlink control information DCI.

Optionally, the at least one broadcast channel included in the broadcast channel set may further carry at least one piece of indication information, where the indication information is used to indicate information about a resource used by the communication signal transmitted on the at least one resource element group; and the processing unit 301 is configured to determine, from the resource configuration of the communication signal, the at least one resource element group for the communication signal, where the at least one resource element group corresponds to the at least one broadcast channel used by the user equipment.

Specifically, the indication information is used to indicate information about a resource used by the communication signal transmitted on the at least one resource element group; and the processing unit 301 of the user equipment obtains, based on the information about the resource that is obtained from the broadcast channel, the communication signal on the resource element group or resource element corresponding to the broadcast channel. The information about the resource may be: identification information of the communication signal, or information about a resource element group used by the communication signal, or information about an antenna port or an antenna port group used by the communication signal, or information about a sequence or a sequence group used by the communication signal, or information about a beam group used by the communication signal. Alternatively, the indication information is used to indicate one or more physical channels used by the user equipment, or information about an antenna port used by one or more physical channels, for example, an antenna port used by the control channel.

Figure 4:
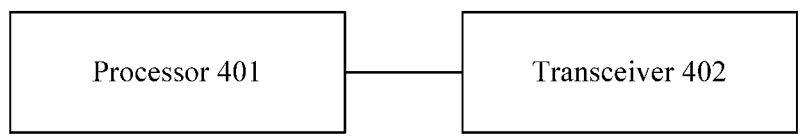
FIG. 4 is a schematic structural diagram of another user equipment according to an embodiment of the present invention.

FIG. 4 shows another user equipment in an embodiment of the present invention. As shown in FIG. 4, the user equipment includes: a processor 401, configured to determine, from a resource configuration of a communication signal, at least one resource element group for the communication signal, where the resource configuration of the communication signal includes at least two different resource element groups, the communication signal transmitted on each resource element group included in the resource configuration carries at least one piece of same information, and the at least one piece of same information may be cell specific or user equipment group specific information; and a transceiver 402, configured to receive the communication signal based on the at least one resource element group.

The user equipment shown in FIG. 4 may be implemented with reference to the user equipment embodiment shown in FIG. 3. Details are not further described herein.

Figure 5:
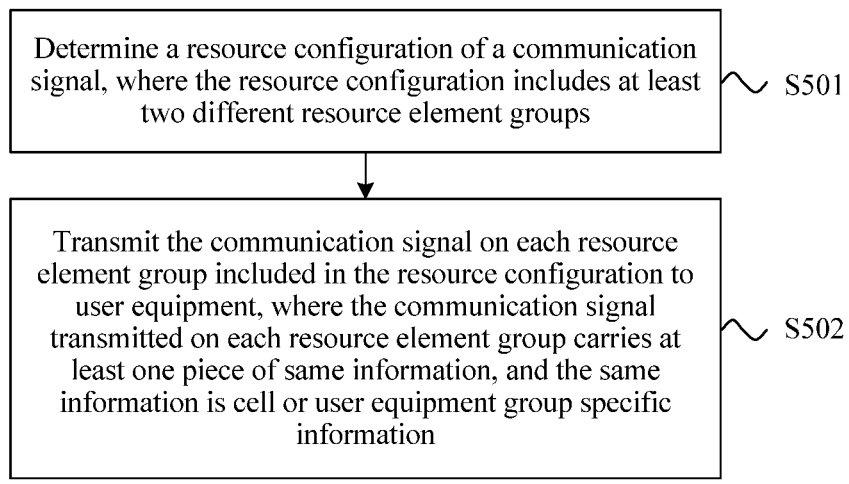
FIG. 5 is a flowchart of a communication signal transmitting method according to an embodiment of the present invention.

FIG. 5 is a schematic flowchart of a communication signal transmitting method according to an embodiment of the present invention. The method may be performed by a base station. As shown in FIG. 5, the method includes the following steps.

S501. Determine a resource configuration of a communication signal, where the resource configuration includes at least two different resource element groups.

For example, the resource configuration includes a first resource element group $REG_1$ and a second resource element group $REG_2$, and the two resource element groups are different.

Optionally, the resource configuration of the communication signal may be predefined, and is known by both the base station and user equipment; or the resource configuration of the communication signal may be notified by the base station to user equipment by broadcast. It should be understood that, different communication signals generally use different resource configurations. For example, a synchronization signal and a broadcast channel occupy different resource element groups.

S502. Transmit the communication signal on each resource element group included in the resource configuration to user equipment, where the communication signal transmitted on each resource element group carries at least one piece of same information, and the same information is cell specific or user equipment group specific information.

Optionally, the communication signal in this embodiment of the present invention may be a physical signal or a physical channel; and a resource element used by the physical signal is used by a physical layer but does not carry information from a higher layer, for example, a synchronization signal. A resource element used by the physical channel carries information from the higher layer. The physical channel is generally an interface between the physical layer and the higher layer, for example, a broadcast channel or a shared channel or a control channel or a synchronization channel.

Specifically, the cell specific or user equipment group specific information may be a system broadcast message, for example, may be a master information block (MIB), or a system information block (SIB), for example, a SIB1, or may be system configuration information, for example, a system frame number (SFN). The cell specific or user equipment group specific information may be a part or all of information of a cell identifier or a virtual cell identifier, or configuration information of a physical control format indicator channel (PCFICH) or configuration information of another physical channel or a reference signal, or a message for a specific user group, for example, a message for an MBMS (Multimedia Broadcast Multicast Service) user group.

In addition, it should be pointed out that, the cell specific or user equipment group specific information (same information) carried in the communication signal may be explicit information, for example, the foregoing various messages, or may be implicit information, namely, information implied by a parameter, a physical resource position, or the like used by the communication signal, for example, a period or a hopping pattern of a resource that is used by another physical channel and indirectly indicated by the resource position of the communication signal.

In this embodiment of the present invention, the base station transmits the communication signal on each resource element group included in the resource configuration of the communication signal to the user equipment, where the resource configuration includes at least two different resource element groups, each communication signal carries at least one piece of same information, and the communication signal carries cell specific or user equipment group specific (UE group specific) specific same information. User equipment in a cell (or a user equipment group) either receives, by measuring a communication signal transmitted on a resource element group with favorable channel condition for the user equipment, the cell (or user equipment group) specific same information carried in the communication signal, or receives the cell (or user equipment group) specific same information by combinatorially receiving the communication signals transmitted on the at least two resource element groups. Therefore, according to the method provided in this embodiment of the present invention, reliability of transmitting the communication signal between the cell (or the user equipment group) and the base station and reliability of receiving the cell specific or user equipment group specific information carried in the communication signal can be effectively improved.

Optionally, the communication signal transmitted on each resource element group may be detected separately or decoded separately, so that the user equipment obtains information carried in the communication signal.

Optionally, the communication signals transmitted on the at least two resource element groups included in the resource configuration use different sequence groups or different antenna port groups.

Optionally, the communication signals transmitted on the at least two resource element groups included in the resource configuration may use different precoding or different beam groups.

For example, the communication signals use same or different antenna port groups but different precoding or beam groups, or same or different sequences but different precoding or beam groups.

Assuming that the resource configuration includes two different resource element groups, the following describes use of different antenna port groups, or different precoding, or different beam groups, or same or different antenna port groups but different precoding or beam groups for transmitting the communication signals on the at least two resource element groups included in the resource configuration. Cases of more resource element groups may be deduced by analogy.

The following is described by using an example in which the resource configuration of the communication signal includes two different resource element groups: a first resource element group $REG_1$ and a second resource element group $REG_2$.

Optionally, the communication signal transmitted on the first resource element group $REG_1$ and the communication signal transmitted on the second resource element group $REG_2$ may use same or different antenna port groups, where the antenna port group includes at least one antenna port.

Specifically, the communication signal transmitted on the first resource element group $REG_1$ uses a first antenna port group (PG) $PG_1$; and the communication signal transmitted on the first resource element group $REG_2$ uses a second antenna port group $PG_2$, where the antenna port group $PG_1$ or $PG_2$ includes at least one antenna port.

The antenna port groups $PG_1$ and $PG_2$ may be the same. For example, the antenna port groups $PG_1$ and $PG_2$ use a same pair of antenna ports, and reference signals corresponding to the two antenna ports are an $RS_1$ and an $RS_2$ respectively. The $RS_1$ and the $RS_2$ may be two cell specific reference signals respectively, for example, similar to a $CRS_0$ and a $CRS_1$ defined in LTE R8-R11 systems.

The antenna port groups $PG_1$ and $PG_2$ may be different. For example, the antenna port group $PG_1$ uses two antenna ports, and reference signals corresponding to the two antenna ports are an $RS_{11}$ and an $RS_{12}$ respectively; and the antenna port group $PG_2$ uses two antenna ports, and reference signals corresponding to the two antenna ports are an $RS_{21}$ and an $RS_{22}$ respectively. The $RS_{11}$, $RS_{12}$, $RS_{21}$, and $RS_{22}$ may be cell specific reference signals. For example, they may be respectively similar to the $CRS_0$, $CRS_1$, $CRS_2$, and $CRS_3$ defined in the LTE R8-R11 systems. They may also be similar to any four reference signals in a CSI RS set defined in the LTE R10 system.

Further, resource elements used by the reference signals corresponding to the antenna ports in the antenna port group $PG_1$ form a third resource element group $REG_3$, and resource elements used by the reference signals corresponding to the antenna ports in the $PG_2$ form a fourth resource element group $REG_4$. The third resource element group $REG_3$ is different from the fourth resource element group $REG_4$.

Specifically, that the third resource element group $REG_3$ is different from the fourth resource element group $REG_4$ may be: resource elements in the $REG_3$ and the $REG_4$ may be respectively located in different subframes or slots, or different slots in a same subframe or different OFDM symbols; or resource elements REs in the $REG_3$ and the $REG_4$ may be respectively located in different subbands in a system bandwidth, or different subframes or slots or OFDM symbols or subcarriers in one or more same subbands.

In addition, when the communication signal is transmitted at different time or in different subframes, a predefined relationship may exist between the resource element group and the antenna port group. Specifically, the relationship shown in formula (1) exists between a resource element group $REG_i$, an antenna port group $PG_j$, and a precoding matrix $W_j$ that are used by the communication signal.

It should be further pointed out that, a reference signal corresponding to each antenna port in the antenna port group $PG_1$ (or the antenna port group $PG_2$) may use same or different time-frequency resources or sequences or a combination thereof. This is not limited in the present invention.

In this embodiment of the present invention, the base station transmits the communication signal on each resource element group included in the resource configuration of the communication signal to the user equipment, and the communication signals transmitted on the at least two different resource element groups use two different antenna port groups respectively. The user equipment in the cell (or the user equipment group) can measure, by using at least two different antenna port groups separately, a communication signal transmitted on a resource element group with favorable channel condition for the user equipment, and take advantage of space diversity gains provided by different antenna port groups to receive the cell (or user equipment group) specific same information, or utilize combinatorial reception of the communication signals transmitted on the at least two resource element groups to receive the cell (or user equipment group) specific same information. Therefore, transmission reliability of the cell (or user equipment group) specific information or the communication signal is effectively improved.

Optionally, the communication signal transmitted on the first resource element group $REG_1$ and the communication signal transmitted on the second resource element group $REG_2$ may use same or different precoding or beam groups, where the beam group includes at least one beam, and the precoding uses a precoding matrix or vector.

Specifically, the communication signal transmitted on the first resource element group $REG_1$ uses a beam group $BG_1$; and the communication signal transmitted on the second resource element group $REG_2$ uses a beam group $BG_2$.

In addition, when the communication signal is transmitted at different time or in different subframes, a coverage area is scanned by using a beam sequence, so that a determined relationship may exist between the beam group and the subframe that are used by the communication signal. For example, scanning is performed cyclically, or a fixed hopping pattern exists. Specifically, the relationship shown in formula (2) exists between the resource element group $REG_i$, a beam group $BG_j$, and the precoding matrix $W_j$ that are used by the communication signal.

In this embodiment of the present invention, the base station transmits the communication signal on each resource element group included in the resource configuration of the communication signal to the user equipment, and the communication signals transmitted on the at least two resource element groups in the resource configuration use two different beam groups or precoding. The user equipment in the cell (or the user equipment group) can measure a communication signal transmitted on a resource element group with favorable channel condition for the user equipment, separately in at least two different beam groups, and take advantage of the space diversity gains or array gains provided by different beam groups to receive the cell (or user equipment group) specific same, or utilize combinatorial reception of the communication signals transmitted on the at least two resource element groups to receive the cell (or user equipment group) specific same information. Therefore, transmission reliability of the cell (or user equipment group) specific information or the communication signal is effectively improved.

Optionally, that the communication signal transmitted on the first resource element group $REG_1$ and the communication signal transmitted on the second resource element group $REG_2$ may use same or different antenna port groups may further include: the communication signal transmitted on the first resource element group $REG_1$ and the communication signal transmitted on the second resource element group $REG_2$ may use a same antenna port group, that is, $PG_1=PG_2$; and the same antenna port group uses different precoders or beam groups when transmitting the communication signal transmitted on the first resource element group $REG_1$ and the communication signal transmitted on the second resource element group $REG_2$, where specifically, the same antenna port group uses the beam group $BG_1$ when transmitting the communication signal transmitted on the first resource element group $REG_1$, and uses the beam group $BG_2$ when transmitting communication signal transmitted on the second resource element group $REG_2$; or the communication signal transmitted on the first resource element group $REG_1$ and the communication signal transmitted on the second resource element group $REG_2$ may respectively use different antenna port groups $PG_1$ and $PG_2$; and the antenna port groups $PG_1$ and $PG_2$ use different precoding or beam groups, where specifically, when the antenna port group $PG_1$ transmits the communication signal transmitted on the first resource element group $REG_1$, the antenna port in the antenna port group $PG_1$ uses the beam group $BG_1$; and when the antenna port group $PG_2$ transmits the communication signal transmitted on the second resource element group $REG_2$, the antenna port in the antenna port group $PG_2$ uses the beam group $BG_2$.

Further, the relationship shown in formula (3) exists between an antenna port group $PG_i$, the used beam group $BG_j$, and the used precoding matrix $W_j$. As described above, the beam group $BG_1$ and the beam group $BG_2$ are beam groups that do not overlap or partially overlap. Beams in the beam group $BG_1$ and the beam group $BG_2$ respectively point to different areas in the cell or different local areas in an area in which the user equipment group is located. It should be understood that the beam group includes at least one beam. For the beam, different weights may be used for a plurality of physical antennas to obtain different beam directions or beam widths. How to combine a plurality of physical antennas or antenna ports to form beams with different directions or widths belongs to the prior art. Details are not further described herein.

In this embodiment of the present invention, the base station transmits the communication signal on each resource element group included in the resource configuration of the communication signal to the user equipment, and the communication signals transmitted on the at least two resource element groups use different antenna port groups, or a same antenna port group but different precoding or beam groups. The base station can transmit, on the at least two different resource element groups respectively by using different antenna port groups or a same antenna port group but different beam groups or precoding, the communication signals and the same information carried in the communication signals. The user equipment in the cell (or the user equipment group) can measure, separately by using the antenna port groups, a communication signal transmitted on a resource element group with favorable channel condition for the user equipment, and therefore can receive, by using array gains and directional gains provided by the base station by using different beams or precoding (the array gains and directional gains provided by different beams or precoding cause different signal quality), the communication signals transmitted on the at least two different resource element groups and the cell (or user equipment group) specific same information carried in the communication signals. Therefore, transmission reliability of the cell (or user equipment group) specific information or the communication signal is effectively improved.

Assuming that the resource configuration of the communication signal includes two different resource element groups, the following describes use of different sequence groups for transmitting the communication signals on the at least two resource element groups included in the resource configuration of the communication signal.

The following is described by using an example in which the resource configuration of the communication signal includes two different resource element groups: a first resource element group $REG_1$ and a second resource element group $REG_2$. The communication signal transmitted on the first resource element group $REG_1$ and the communication signal transmitted on the second resource element group $REG_2$ respectively use different sequence groups $SG_1$ and $SG_2$, where the sequence groups $SG_1$ and $SG_2$ respectively include at least one sequence.

Specifically, that the communication signal transmitted on the first resource element group $REG_1$ and the communication signal transmitted on the second resource element group $REG_2$ respectively use different sequence groups $SG_1$ and $SG_2$ may be: all or a part of information of the cell or user equipment group specific same information carried in the communication signal transmitted on the first resource element group $REG_1$ is mapped to the sequence group $SG_1$; and all or a part of information of the cell or user equipment group specific same information carried in the communication signal transmitted on the second resource element group $REG_2$ is mapped to the sequence group $SG_2$, where the sequence group $SG_1$ and the sequence group $SG_2$ are different sequence groups; or all or a part of information of the cell or user equipment group specific same information carried in the communication signal transmitted on the first resource element group $REG_1$ is scrambled by using the sequence group $SG_1$; and all or a part of information of the cell or user equipment group specific same information carried in the communication signal transmitted on the second resource element group $REG_2$ is scrambled by using the sequence group $SG_2$, where the sequence group $SG_1$ and the sequence group $SG_2$ are different sequence groups, where specifically, that all or a part of information of the cell or user equipment group specific same information is scrambled by using different sequence groups may be that all or a part of information of the cell or user equipment group specific same information is scrambled by using different sequence groups after being encoded (for example, turbo codes or convolutional codes or block codes or RM codes); or all or a part of information of the cell or user equipment group specific same information carried in the communication signal transmitted on the first resource element group $REG_1$ or a CRC part thereof is masked by using the sequence group $SG_1$; and all or a part of information of the cell or user equipment group specific same information carried in the communication signal transmitted on the second resource element group $REG_2$ or a CRC part thereof is masked by using the sequence group $SG_2$, where the sequence groups $SG_1$ and $SG_2$ are different sequence groups.

Specifically, the sequence included in the foregoing sequence group may be a Walsh (Walsh) sequence, a CAZAC sequence or a Golden sequence or an m-sequence or a computer-generated (CG) sequence or a pseudo random sequence or the like or a combination thereof. It should be pointed out that, all or a part of information of the cell or user equipment group specific same information carried in the communication signal transmitted on the first resource element group $REG_1$ (or the $REG_2$) may use one or more same or different sequences. This is not limited in the present invention. In addition, it should be understood that, the foregoing sequence group may include only one sequence; in this case, mapping or scrambling or masking by using the sequence group corresponds to performing the foregoing operation by using the sequence. In addition, it should be understood that, that the sequence group $SG_1$ and the sequence group $SG_2$ are different sequence groups means that the sequence group $SG_1$ and the sequence group $SG_2$ include mutually different sequences, or that the sequence group $SG_1$ and the sequence group $SG_2$ use different root sequences, or that the sequence group $SG_1$ and the sequence group $SG_2$ use different sequence shifts, or that the sequence group $SG_1$ and the sequence group $SG_2$ are obtained by cutting off different segments or subsequences of a long sequence.

Optionally, the communication signal transmitted on the first resource element group $REG_1$ and the communication signal transmitted on the second resource element group $REG_2$ respectively use different sequence groups $SG_1$ and $SG_2$, and the communication signal transmitted on the first resource element group $REG_1$ and the communication signal transmitted on the second resource element group $REG_2$ are transmitted respectively by using different antenna port groups $PG_1$ and $PG_2$ or transmitted respectively by using different beam groups $BG_1$ and $BG_2$ or transmitted respectively by using different precoding matrices $W_1$ and $W_2$.

Specifically, the relationship shown in formula (4) exists between a sequence group $SG_i$ and the used antenna port group $PG_j$.

Further, the relationship shown in formula (5) exists between the sequence group $SG_i$, the used beam group $BG_j$, and the used precoding matrix $W_j$.

In this embodiment of the present invention, the base station transmits the communication signal on each resource element group included in the resource configuration of the communication signal to the user equipment, where the communication signals transmitted on the at least two resource element groups use different sequence groups. The base station can transmit the same information carried in the communication signal by using at least two different sequence groups respectively. The user equipment in the cell (or the user equipment group) can measure, by measuring or detecting the at least two sequence groups, a communication signal transmitted on a resource element group with favorable channel condition for the user equipment, and therefore can distinguish and select the communication signal transmitted on the resource element group suitable for the user equipment, and receive the cell (or user equipment group) specific same information in a user equipment specific resource configuration (for example, the resource element group suitable for the user equipment). Therefore, complexity of detection or reception by the user equipment is reduced, and reliability of transmitting the specific information or the communication signal between the cell (or the user equipment group) and the base station can be ensured.

It should be understood that, based on any one of the foregoing embodiments, optionally, the resource element groups may be respectively located in different radio frames (radio frame), or different system frames, or different subframes (subframe), or different slots, or different orthogonal frequency division multiplexing (OFDM) symbols, or different subcarriers, or different physical resource blocks. Specifically, for example, the resource element groups may be different subframes in a same radio frame, or different slots in a same subframe, or different OFDM symbols in a same slot, or different subcarriers in a same slot, or different physical resource blocks in a same slot, or the like. The resource element groups may also be located in different subbands (subband) in a system bandwidth, or different subframes in one or more same subbands, or different slots in a same subframe, or different OFDM symbols in a same slot, or different subcarriers (subcarrier) in a same slot, or different subcarriers in a same slot.

Optionally, the method provided in the present invention may further include: the communication signal transmitted on each of the at least two resource element groups in the resource configuration further carries at least one piece of indication information.

Optionally, the method provided in the present invention includes: the communication signal transmitted on each of the at least two resource element groups included in the resource configuration further carries at least one piece of indication information, where the indication information is used to indicate information about a resource used by the communication signal.

Specifically, the information about the resource used by the communication signal may be at least one of the following: identification information of the communication signal, information about a resource element group used by the communication signal, information about a sequence or a sequence group used by the communication signal, information about an antenna port or an antenna port group used by the communication signal, information about precoding used by the communication signal, information about a beam group used by the communication signal, and information about a time-frequency position used by the communication signal.

For example, an identifier of the communication signal may be 1, 2, 3, ..., N. A specific identification method is not limited in the present invention. For example, identifiers of communication signals corresponding to the resource element group $REG_i$ are 1, 2, and 3 respectively, where i=1, 2, 3.

The information about the resource element group used by the communication signal may be a number or an index of the used resource element group.

The information about the sequence or the sequence group used by the communication signal may be a type of the sequence (such as a ZC sequence or an m-sequence) used by the communication signal or an initial value of the sequence or a cyclic shift value (Cyclic Shift) of the sequence or a quantity of sequences in the sequence group or an initial value of a root sequence or the like.

The information about the antenna port or the information about the antenna port group used by the communication signal may be an antenna port number, information about an antenna port array structure such as a quantity of antenna ports or an arrangement manner of antenna ports or a polarization type of antenna ports (vertical polarization or cross polarization or interleaved polarization), or a reference signal sequence group used by the antenna port or a beam group used by the antenna port or precoding used by the antenna port.

The information about the beam group used by the communication signal may be an index of the beam group, or a quantity of beams, or a specific parameter of a beam such as a beam width, or a weight vector used for implementing the used beam, or the like.

The information about the precoding used by the communication signal may be an index of a precoding matrix, or a quantity of layers or a quantity of columns of a precoding matrix, or a rank (Rank) of the precoding, or the like.

The information about the time-frequency position used by the communication signal may be a period of transmitting the communication signal and an offset in the period, or a subframe, or a slot, or an OFDM symbol, or a subcarrier, or a physical resource block, or the like for transmitting the communication signal on each resource element group.

Optionally, the method includes: the communication signal transmitted on each of the at least two resource element groups included in the resource configuration further carries at least one piece of indication information, where the indication information is used to indicate information about a resource used by one or more physical channels used by the user equipment, or information about a resource used by one or more physical signals used by the user equipment.

Specifically, the information about the resource used by the one or more physical channels used by the user equipment, or the information about the resource used by the one or more physical signals used by the user equipment, or the information about the resource used by the physical signal used by the one or more physical channels used by the user equipment may be information about the physical channel or the physical signal associated with the transmitted communication signal. For example, the physical channel or the physical signal associated with the transmitted communication signal may be a physical channel or a physical signal having a fixed time sequence relationship or a resource position relationship with the transmitted communication signal. Alternatively, the information about the resource is the information about the resource of the physical channel or the physical signal, for example, may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or an antenna port group used by the physical channel or the physical signal, or information about precoding used by the physical channel or the physical signal, or information about a beam group used by the physical channel or the physical signal, or information about a time-frequency position used by the physical channel or the physical signal.

In this embodiment of the present invention, the communication signal transmitted on each of the at least two resource element groups included in the resource configuration carries the at least one piece of indication information, and the indication information is used to indicate the information about the resource used by the communication signal, or used to indicate the one or more physical channels or physical signals used by the user equipment or the information about the resource used by the one or more physical channels or physical signals. The base station transmits the information carried in the communication signal transmitted on each resource element group. The user equipment in the cell (or the user equipment group) can measure a communication signal transmitted on a resource element group with favorable channel condition for the user equipment, to obtain the information carried in the communication signal, and then use the information corresponding to the communication signal, or select a physical channel or a physical signal associated with the communication signal. Therefore, complexity of detection or reception by the user equipment is reduced, and reliability of transmitting the specific information or the communication signal between the cell (or the user equipment group) and the base station can be ensured.

Based on any one of the foregoing method embodiments, optionally, the method provided in the present invention may further include: transmitting a reference signal set to the user equipment, so that the user equipment determines at least one resource element group in the resource configuration of the communication signal based on the reference signal set and receives the communication signal on the determined at least one resource element group.

Specifically, this step may be: transmitting the reference signal set to the user equipment, so that the user equipment determines one or more resource indications based on the reference signal set, where the resource indication is used to indicate the information about the resource used by the communication signal.

Specifically, the one or more resource indications may be channel state information CSI, and the CSI includes a rank indicator (RI) and/or a precoding matrix indicator PMI.

Specifically, the information about the resource used by the communication signal may be: identification information of the communication signal, or information about a resource element group in the resource configuration of the communication signal, or an antenna port group used by the communication signal, or a sequence group used by the communication signal, or a beam group used by the communication signal, or information about precoding used by the communication signal, or the like.

Optionally, a correspondence between the resource indication and the information about the resource used by the communication signal may be predefined, and is known by both the base station and the user equipment; or a correspondence between the resource indication and the information about the resource used by the communication signal may be notified by the base station to the user equipment by using higher layer signaling such as RRC signaling or downlink control information (DCI).

Optionally, the reference signal set may be a cell specific reference signal set or a channel state information reference signal set, for example, a CRS or a CSI RS in LTE R8 or R10.

In this embodiment of the present invention, the base station further transmits the reference signal set to the user equipment in addition to transmitting the communication signal by using a plurality of resources including the at least two resource element groups, so that the user equipment determines one or more resource indications based on the reference signal set, where the resource indication is used to indicate the information about the resource used by the communication signal. Therefore, the user equipment can obtain, based on the reference signal set, a resource indication of a resource configuration that is favorable for the user equipment, to obtain the information about the resource element group, or the information about the antenna port group, or the sequence group, or the physical channel or the physical signal associated with the communication signal, used when the base station transmits the communication signal. Therefore, complexity of detection or reception by the user equipment is reduced, and reliability of transmitting the specific information or the communication signal between the cell (or the user equipment group) and the base station can be ensured.

Based on any one of the foregoing embodiments, the communication signal may be a synchronization signal, and the same information carried in the communication signal transmitted on each resource element group may be all or a part of information of a cell identifier, or all or a part of information of a user equipment group identifier, or a combination thereof; or the communication signal may be a broadcast channel, and the same information carried in the communication signal transmitted on each resource element group may be at least one of the following: a master information block (MIB), a part of information of a system frame number (SFN) or all information of an SFN, a system bandwidth, and physical channel configuration indication information; or the communication signal may be a control channel, and the same information carried in the communication signal transmitted on each resource element group may be downlink control information of a system information block, or downlink control information carried in a common search space (CSS), or format indicator information of a downlink control channel.

Optionally, the communication signal is a synchronization signal, and at least two resource element groups in a resource configuration of the synchronization signal may be respectively located in different radio frames, or different system frames, or different subframes, or different slots, or different OFDM symbols, or different subcarriers, or different physical resource blocks, or respectively located in different subframes, or different slots in a same subframe, or different OFDM symbols in a same slot, or different subcarriers in a same slot, or different physical resource blocks in a same slot.

Further, a synchronization signal transmitted on each of the at least two resource element groups included in the resource configuration of the synchronization signal may carry at least one piece of indication information in addition to the same information, where the indication information may be used to indicate information about a resource used by the synchronization signal, or the indication information is used to indicate one or more physical channels used by the user equipment or information about a resource used by one or more physical channels used by the user equipment.

Optionally, the one or more physical channels used by the user equipment may be a broadcast channel, or a downlink control channel PDCCH, or an uplink control channel PUCCH, or a control format indicator channel PCFICH, or the like.

Optionally, the indication information respectively carried in the synchronization signals transmitted on the at least two resource element groups included in the resource configuration of the synchronization signal may be represented by different (Zadoff-Chu) ZC sequences or computer-generated (CG) sequences or m-sequences or different cyclic shifts thereof or Gold sequences or different combinations thereof.

Optionally, the communication signal is a broadcast channel, and at least two resource element groups included in a resource configuration of the broadcast channel may be respectively located in different system frames, or different radio frames, or different subframes, or different slots, or different OFDM symbols, or different subcarriers, or different physical resource blocks, or respectively located in different subframes, or different slots in a same subframe, or different OFDM symbols in a same slot, or different subcarriers in a same slot, or different physical resource blocks in a same slot.

Further, a broadcast channel transmitted on each of the at least two resource element groups included in the resource configuration of the broadcast channel may carry at least one piece of indication information in addition to the same information, where the indication information may be used to indicate information about a resource used by the broadcast channel, or the indication information is used to indicate one or more physical channels used by the user equipment, or information about a resource used by one or more physical channels used by the user equipment, or information about a resource used by one or more physical signals used by the user equipment.

Optionally, the one or more physical channels used by the user equipment may be a downlink control channel PDCCH, or an uplink control channel PUCCH, or a control format indicator channel PCFICH, or the like.

Optionally, the indication information carried in the broadcast channel transmitted on each of the at least two resource element groups included in the resource configuration of the broadcast channel is carried in a broadcast message of the broadcast channel. The indication information may be used to indicate information about a resource used by the broadcast channel, or the indication information is used to indicate one or more physical channels used by the user equipment, or information about a resource used by one or more physical channels used by the user equipment, or information about a resource used by one or more physical signals used by the user equipment.

Optionally, the indication information carried in the broadcast channel transmitted on each of the at least two resource element groups included in the resource configuration of the broadcast channel may be further represented by different cyclic redundancy check (Cyclic Redundancy Check) masks. The indication information may be used to indicate information about a resource used by the broadcast channel, or the indication information is used to indicate one or more physical channels used by the user equipment, or information about a resource used by one or more physical channels used by the user equipment, or information about a resource used by one or more physical signals used by the user equipment.

Optionally, the communication signal is a control channel, and at least two resource element groups included in a resource configuration of the control channel may be respectively located in different radio frames, or different system frames, or different subframes, or different slots, or different OFDM symbols, or different subcarriers, or different physical resource blocks, or respectively located in different subframes, or different slots in a same subframe, or different OFDM symbols in a same slot, or different subcarriers in a same slot, or different physical resource blocks in a same slot, or respectively located in different control channel elements CCEs (Control Channel Element) or CCE sets, or enhanced control channel elements (eCCE) or eCCE sets.

Further, a control channel transmitted on each of the at least two resource element groups included in the resource configuration of the control channel may carry at least one piece of indication information in addition to the same information, where the indication information may be used to indicate information about a resource used by the control channel, or the indication information is used to indicate at least one of the following physical channels used by the user equipment or information about a resource used by a physical channel: a physical control channel (PDCCH) or an enhanced physical control channel (ePDCCH) carried in a user equipment specific search space (USS), or a physical uplink control channel (PUCCH).

Optionally, the indication information carried in the control channel transmitted on each of the at least two resource element groups included in the resource configuration of the control channel is carried in control information of the control channel. The indication information may be used to indicate information about a resource used by the control channel, or the indication information is used to indicate at least one of the following physical channels used by the user equipment or information about a resource used by a physical channel.

Optionally, the indication information carried in the control channel transmitted on each of the at least two resource element groups included in the resource configuration of the control channel is carried in control information of the control channel. The indication information may be used to indicate information about a resource used by the control channel, or the indication information is used to indicate at least one of the following physical channels used by the user equipment or information about a resource used by a physical channel: a physical downlink control channel (PDCCH), or an enhanced physical downlink control channel (ePDCCH), or a physical uplink control channel (PUCCH), carried in a user equipment specific search space (USS).

Optionally, the indication information carried in the control channel transmitted on each of the at least two resource element groups included in the resource configuration of the control channel may be represented by different cyclic redundancy check (Cyclic Redundancy Check) masks (Mask). The indication information may be used to indicate information about a resource used by the control channel, or the indication information is used to indicate at least one of the following physical channels used by the user equipment or information about a resource used by a physical channel: a physical downlink control channel (PDCCH), or an enhanced physical downlink control channel (ePDCCH), or a physical uplink control channel (PUCCH), carried in a user equipment specific search space (USS).

Optionally, the communication signal is the broadcast channel or the control channel, and the method further includes: transmitting a synchronization signal set to the user equipment, where the synchronization signal set includes at least one synchronization signal corresponding to the communication signal transmitted on the at least one resource element group in the resource configuration of the communication signal.

Optionally, a correspondence between the synchronization signal and the communication signal (the broadcast channel or the control channel) may be predefined. The following uses an example in which the resource configuration of the communication signal includes two resource element groups: a first resource element group and a second resource element group. The synchronization signal set includes two synchronization signals: a first synchronization signal $SS_1$ and a second synchronization signal $SS_2$. In this case, the communication signal transmitted on the first resource element group corresponds to the first synchronization signal $SS_1$, and the communication signal transmitted on the second resource element group corresponds to the second synchronization signal $SS_2$. Optionally, a fixed resource correspondence may exist between the first synchronization signal $SS_1$ and the first resource element group $REG_1$. For example, a fixed time sequence relationship exists between the first synchronization signal $SS_1$ and the first resource element group $REG_1$. Specifically, the time sequence relationship may be: a first OFDM symbol in which the first resource element group $REG_1$ is located is always located in a symbol position previous to a first OFDM symbol used by the first synchronization signal $SS_1$. Correspondingly, a similar correspondence exists between the second synchronization signal $SS_2$ and the second resource element group $REG_2$.

Optionally, a resource correspondence between a synchronization signal $SS_j$ and the resource element group $REG_i$ may also be the relationship shown in formula (5').

Optionally, the correspondence between the synchronization signal and the communication signal may be notified by the base station to the user equipment, for example, may be notified by using a broadcast message, or higher layer signaling such as RRC signaling, or downlink control information DCI.

Optionally, the at least one synchronization signal included in the synchronization signal set separately carries at least one piece of indication information, where the indication information is used to indicate information about a resource used by the communication signal transmitted on the at least one resource element group, and the information about the resource may be: identification information of the communication signal, or information about a resource element group used by the communication signal, or information about an antenna port or an antenna port group used by the communication signal, or information about a sequence or a sequence group used by the communication signal, or information about a beam group used by the communication signal, or information about a time-frequency position used by the communication signal; or the indication information is used to indicate information about a resource used by one or more physical channels used by the user equipment, or information about a resource used by one or more physical signals used by the user equipment. The information about the resource used by the physical channel or the physical signal may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or information about an antenna port group used by the physical channel or the physical signal, or information about precoding used by the physical channel or the physical signal, or information about a beam group used by the physical channel or the physical signal, or information about a time-frequency position used by the physical channel or the physical signal, for example, an antenna port used by the broadcast channel or the control channel.

Optionally, the communication signal is a control channel, and the method further includes: transmitting a broadcast channel set to the user equipment, where the broadcast channel set includes at least one broadcast channel corresponding to a control channel transmitted on at least one resource element group in the resource configuration of the control channel.

Optionally, a correspondence between the broadcast channel and the communication signal may be predefined. For details, refer to the corresponding part in the embodiment shown in FIG. 2. Alternatively, the correspondence may be notified by the base station by using a broadcast message, or higher layer signaling such as RRC signaling, or downlink control information DCI.

Optionally, each broadcast channel included in the broadcast channel set further carries at least one piece of indication information, where the indication information is used to indicate information about a resource used by the control channel transmitted on the at least one resource element group and corresponding to the broadcast channel. The information about the resource may be: identification information of the control channel, or information about a resource element group used by the control channel, or information about an antenna port or an antenna port group used by the control channel, or information about a sequence or a sequence group used by the control channel, or information about a beam group used by the control channel, or one or more physical channels used by the user equipment, or information about an antenna port used by one or more physical channels.

Optionally, the at least one piece of indication information carried in the broadcast channel may be represented by a CRC mask corresponding to the broadcast channel.

The foregoing describes in detail the communication signal transmitting method according to the embodiment of the present invention from a perspective of the base station with reference to FIG. 5. The following describes in detail a communication signal receiving method according to an embodiment of the present invention from a perspective of user equipment with reference to FIG. 6.

Figure 6:
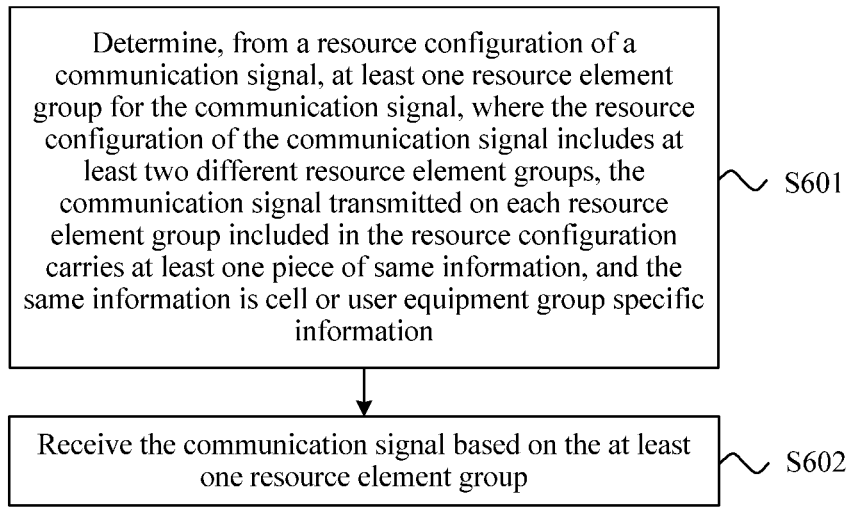
FIG. 6 is a flowchart of a communication signal receiving method according to an embodiment of the present invention.

FIG. 6 shows a communication signal receiving method according to an embodiment of the present invention. The method may be performed by user equipment. As shown in FIG. 6, the method includes the following steps.

S601. Determine, from a resource configuration of a communication signal, at least one resource element group for the communication signal, where the resource configuration of the communication signal includes at least two different resource element groups, the communication signal transmitted on each resource element group included in the resource configuration carries at least one piece of same information, and the at least one piece of same information may be cell specific or user equipment group specific information.

S602. Receive the communication signal based on the at least one resource element group.

Specifically, for the resource configuration of the communication signal, positions of different resource element groups, and the cell specific or user equipment group specific information, refer to the descriptions in the embodiment shown in FIG. 5. Details are not further described herein.

Optionally, the determining, from a resource configuration of a communication signal, at least one resource element group for the communication signal in step S601 may include but is not limited to the following implementations.

Implementation 1: Determine, from the resource configuration of the communication signal, the at least one resource element group based on signal quality of the communication signal on the resource element group, where the resource element group belongs to the resource configuration of the communication signal.

The signal quality of the communication signal may be: signal quality of the received signal or signal quality of the detected signal.

The signal quality of the communication signal may be received power, or received strength, or received quality of the communication signal, where the received quality may be a carrier-to-interference ratio or a signal-to-noise ratio of the signal.

Specifically, the signal quality of the communication signal on the resource element group may be signal quality on one or more resource elements included in the resource element group, or may be an average value of signal quality on all or a plurality of resource elements included in the resource element group; or may be a filter value of signal quality in a time window or a resource window, for example, using an alpha filter or a moving average, where a filter parameter may be notified by using higher layer signaling such as RRC signaling or downlink control information DCI. The specific implementation is not limited in the present invention.

For example, it is determined, by comparing signal quality of the communication signal transmitted on a first resource element group with signal quality of the communication signal transmitted on a second resource element group, that the signal quality of the communication signal transmitted on the first resource element group is higher, and the communication signal is received on the first resource element group.

Implementation 2: Determine, from the resource configuration of the communication signal, the at least one resource element group for the communication signal based on signal quality of a reference signal corresponding to the communication signal on the resource element group, where the determined at least one resource element group belongs to the resource configuration of the communication signal.

The signal quality of the reference signal may be reference signal received power (RSRP) or a reference signal strength indicator (Reference Signal Strength Indicator, RSSI for short) or reference signal received quality (RSRQ).

Implementation 3: Determine, from the resource configuration of the communication signal, the at least one resource element group for the communication signal based on detection or decoding performance of the communication signal on the resource element group, where the determined at least one resource element group belongs to the resource configuration of the communication signal.

Specifically, the detection or decoding performance of the communication signal on the resource element group may be correlation detection performance or matched filtering detection performance of a communication signal sequence on the resource element group, or may be a signal to interference plus noise ratio (SINR) or a log-likelihood ratio (LLR) of each modulation symbol on the resource element group, or a signal to interference plus noise ratio or a log-likelihood ratio of each code bit, or an effective signal to interference plus noise ratio corresponding to a signal to interference plus noise ratio of all modulation symbols on the resource element group, or a block error rate (BLER) corresponding to an effective signal to interference plus noise ratio SINR. The effective signal to interference plus noise ratio may be obtained by using a method such as an exponential effective signal to noise ratio mapping (EESM) or mutual information based effective signal to noise ratio mapping (MI-ESM).

In addition, determining a specific position of a resource element group may be implemented by blind detection or blind decoding. Specifically, the implementation may be: performing a hypothesis test based on a position relationship between resource element groups included in the resource configuration of the communication signal and based on a possible position of each resource element group, and determining, from the resource configuration of the communication signal, the at least one resource element group for the communication signal based on the detection or decoding performance, where the determined at least one resource element group belongs to the resource configuration of the communication signal.

Implementation 4: Determine, from the resource configuration of the communication signal, the at least one resource element group for the communication signal based on indication information carried in another physical channel or physical signal, where the determined at least one resource element group belongs to the resource configuration of the communication signal.

Specifically, a correspondence exists between the indication information carried in the another physical channel or physical signal and the resource element groups in the resource configuration of the communication signal. By using the correspondence, the at least one resource element group is determined from the indication information carried in the another physical channel or physical signal.

Implementation 5: Determine, from the resource configuration of the communication signal, the at least one resource element group for the communication signal based on a reference signal set transmitted by a base station.

Specifically, the user equipment determines one or more resource indications based on the received reference signal set transmitted by the base station, where the one or more resource indications are used to indicate information about a resource used by the communication signal.

Specifically, the information about the resource used by the communication signal may be: identification information of the communication signal, or information about a resource element group in the resource configuration of the communication signal, or an antenna port group used by the communication signal, or a sequence group used by the communication signal, or a beam group used by the communication signal, or information about precoding used by the communication signal, or the like.

The information about the resource used by the communication signal is obtained based on the received reference signal set, and the at least one resource element group is determined for the communication signal based on the obtained resource information.

Optionally, a correspondence between the resource indication and the information about the resource used by the communication signal may be predefined, or may be notified by signaling. Based on the correspondence, the user equipment may determine, based on the resource indication, the information about the resource used by the communication signal. Specifically, the resource indication may be CSI, and the CSI includes an RI and/or PMI.

Optionally, the receiving the communication signal based on the at least one resource element group in step S602 may specifically include: if the at least one resource element group is one resource element group, receiving the communication signal based on the resource element group.

In addition, the user equipment may obtain, based on the received communication signal, the at least one piece of same information carried in the communication signal. Specifically, an operation such as demodulation or decoding or a sequence correlation operation may be performed based on the signal received by the user equipment, to obtain the at least one piece of same information that is carried.

Alternatively, optionally, the receiving the communication signal based on the at least one resource element group in step S602 may specifically include: if the at least one resource element group is two resource element groups, receiving the communication signals based on the two resource element groups.

Certainly, if the resource configuration of the communication signal includes more resource element groups, more than two resource element groups may be determined, to receive the communication signals.

In addition, the user equipment may obtain, based on the communication signals received on the at least two resource element groups, the at least one piece of same information carried in the communication signals.

Specifically, the user equipment may perform operations such as demodulation or decoding or sequence correlation operations separately on the signals received on the at least two resource element groups, to separately obtain the at least one piece of same information that is carried. Further, a mutual check may be performed on the information obtained on each resource element group. Alternatively, the user equipment may obtain soft demodulation information separately from the signals received on the at least two resource element groups, and combine the soft demodulation information of the signals received on the at least two resource element groups. For example, log-likelihood ratios of corresponding modulation symbols obtained on the at least two resource element groups are summated; or soft decoding information is separately obtained from the at least two resource element groups, and soft decoding information of the signals received on the at least two resource element groups is combined. For example, log-likelihood ratios of corresponding code bits obtained on the at least two resource element groups are summated; or sequence correlation information is separately obtained from the at least two resource element groups, and the sequence correlation information of the signals received on the at least two resource element groups is combined. For example, corresponding sequence correlation values obtained on the at least two resource element groups are summated, and the at least one piece of same information that is carried is obtained.

In this embodiment of the present invention, the user equipment determines and receives the communication signal transmitted by the base station on the at least one resource element group, to obtain the cell specific or user equipment group specific same information carried in the communication signal. The user equipment can determine at least one resource element group with favorable channel condition for the user equipment, and receive the communication signal from the at least one resource element group. Therefore, reliability of transmitting the specific information or the communication signal between a user equipment within a cell (or a user equipment group) and the base station is improved.

It should be pointed out that, the at least one resource element group determined by the user equipment may be obtained in a communication signal receiving process, and is used for receiving the communication signal currently. Preferably, the user equipment may further store information about the resource element group determined currently, for use in next transmission. The information about the resource element group determined currently is recorded or stored, and is used in a plurality of subsequent communication signal receiving processes. Generally, coverage of the communication signal depends on a large-scale parameter related to radio channel propagation, and the large-scale parameter generally changes slowly. Therefore, by recording or storing the information about the resource element group determined currently, implementation complexity of a user equipment can be reduced generally while signal coverage is ensured.

Optionally, the communication signals transmitted on the at least two resource element groups included in the resource configuration may respectively use different sequence groups, or different antenna port groups, or different precoding, or different beam groups, or different combinations thereof: for example, the same or different antenna port groups but different precoding or beam groups, or the same or different sequence groups and the same or different antenna port groups or precoding or beam groups.

The following is described by using an example in which the resource configuration of the communication signal includes two different resource element groups: a first resource element group $REG_1$ and a second resource element group $REG_2$. Cases of more resource element groups may be deduced by analogy.

Optionally, the communication signal transmitted on the first resource element group $REG_1$ and the communication signal transmitted on the second resource element group $REG_2$ may respectively use a first antenna port group $PG_1$ and a second antenna port group $PG_2$ that are same or different antenna port groups, where the antenna port group $PG_1$ or $PG_2$ includes at least one antenna port.

Specifically, for use of the resource element group and the antenna port group, refer to the descriptions in the embodiment shown in FIG. 1. Details are not further described herein. In addition, when the communication signal is transmitted at different time or in different subframes, a predefined relationship may exist between the resource element group and the antenna port group. Specifically, the relationship shown in formula (1) exists between a resource element group $REG_i$, an antenna port group $PG_j$, and a precoding matrix $W_j$ that are used by the communication signal.

The user equipment can receive the communication signals on the resource element groups respectively from the antenna port groups based on use of the resource element groups and the antenna port groups. Therefore, the cell (or user equipment group) specific same information can be received by using space diversity gains provided by different antenna port groups, and transmission reliability of the cell (or user equipment group) specific information or the communication signal is effectively improved.

Optionally, the communication signal transmitted on the first resource element group $REG_1$ and the communication signal transmitted on the second resource element group $REG_2$ may use same or different precoding or beam groups, where the beam group includes at least one beam, and the precoding uses a precoding matrix or vector. Specifically, for use of the resource element group and precoding or the beam group, refer to the descriptions in the embodiment shown in FIG. 5. Details are not further described herein. In addition, when the communication signal is transmitted at different time or in different subframes, a predefined relationship may exist between the resource element group and the precoding or the beam group. Specifically, the relationship shown in formula (2) exists between the resource element group $REG_i$, a beam group $BG_j$, and the precoding matrix $W_j$ that are used by the communication signal.

The user equipment can receive the communication signals on the resource element groups respectively from the antenna port group(s) based on use of the resource element groups and the precoding or the beam groups. Therefore, the cell (or user equipment group) specific same information can be received by using coding gains or beam directional gains provided by different precoding or beam groups, and transmission reliability of the cell (or user equipment group) specific information or the communication signal is effectively improved.

Optionally, that the communication signal transmitted on the first resource element group $REG_1$ and the communication signal transmitted on the second resource element group $REG_2$ may use same or different antenna port groups may further include: the communication signals transmitted on the two resource element groups may use a same antenna port group; and different precoding or beam groups are used when the same antenna port group is used to transmit the communication signals transmitted on the two resource element groups; or the communication signals transmitted on the two resource element groups may use different antenna port groups; and different precoding or beam groups are used when different antenna port groups are used to transmit the communication signals transmitted on the two resource element groups. For details, refer to the embodiment shown in FIG. 1. Details are not further described herein. Further, the relationship shown in formula (3) exists between an antenna port group $PG_i$, the used beam group $BG_j$, and the used precoding matrix $W_j$.

The user equipment can receive the communication signals on the resource element groups respectively from the antenna port group(s) based on use of the resource element groups and the antenna port group(s) and the precoding or beam group(s). Therefore, the cell (or user equipment group) specific same information can be received by using space diversity gains of different antenna port groups and array gains formed by different precoding or beam groups, and transmission reliability of the cell (or user equipment group) specific information or the communication signal is effectively improved.

Optionally, the communication signal transmitted on the first resource element group $REG_1$ and the communication signal transmitted on the second resource element group $REG_2$ respectively use different sequence groups $SG_1$ and $SG_2$, where the sequence groups $SG_1$ and $SG_2$ respectively include at least one sequence.

Specifically, the communication signal transmitted on the first resource element group $REG_1$ and the communication signal transmitted on the second resource element group $REG_2$ may respectively use different sequence groups $SG_1$ and $SG_2$. For how two different resource element groups respectively use different sequence groups and for the specific sequence groups, refer to the descriptions in the embodiment shown in FIG. 1. Details are not further described herein.

Optionally, the communication signal transmitted on the first resource element group $REG_1$ and the communication signal transmitted on the second resource element group $REG_2$ respectively use different sequence groups $SG_1$ and $SG_2$, and the communication signal transmitted on the first resource element group $REG_1$ and the communication signal transmitted on the second resource element group $REG_2$ are transmitted respectively by using different antenna port groups $PG_1$ and $PG_2$ or transmitted respectively by using different beam groups $BG_1$ and $BG_2$ or transmitted respectively by using different precoding matrices $W_1$ and $W_2$. Further, the relationship shown in formula (4) exists between a sequence group $SG_i$ and the used antenna port group PG; or the relationship shown in formula (5) exists between a sequence group $SG_i$, the used beam group $BG_j$, and the used precoding matrix $W_j$.

The user equipment can receive the communication signals on the resource element groups respectively from the antenna port group(s) based on use of the resource element groups and communication signal sequence group(s) or antenna port group(s) and precoding or beam group(s) and by using communication signal sequence(s). Therefore, the cell (or user equipment group) specific same information can be received by using space diversity gains of different antenna port groups and array gains formed by different precoding or beam groups, and transmission reliability of the cell (or user equipment group) specific information or the communication signal is effectively improved.

It should be understood that, based on any one of the foregoing embodiments, optionally, the resource element groups may be respectively located in different radio frames (radio frame), or different subframes (subframe), or different slots, or different orthogonal frequency division multiplexing (OFDM) symbols, or different subcarriers, or different physical resource blocks. For details, refer to the descriptions in the embodiment shown in FIG. 1.

Optionally, the method provided in the present invention may further include: the communication signal transmitted on each of the at least two resource element groups included in the resource configuration further carries at least one piece of indication information; and the receiving the communication signal based on the at least one resource element group includes: receiving the communication signal based on the at least one resource element group, and obtaining, from the received communication signal, the at least one piece of indication information carried in the communication signal.

Optionally, the indication information is used to indicate information about a resource used by the communication signal. Specifically, the information about the resource used by the communication signal may be at least one of the following: identification information of the communication signal, information about a resource element group used by the communication signal, information about a sequence or a sequence group used by the communication signal, information about an antenna port or an antenna port group used by the communication signal, information about precoding used by the communication signal, information about a beam group used by the communication signal, and information about a time-frequency position used by the communication signal. For the specific information about the resource, refer to the descriptions in the embodiment shown in FIG. 1. Details are not further described herein.

Optionally, the indication information is used to indicate one or more physical channels used by the user equipment. For a specific physical channel, refer to the descriptions in the embodiment shown in FIG. 1. Details are not further described herein.

Optionally, the indication information indicates information about a resource used by one or more physical channels used by the user equipment, or information about a resource used by one or more physical signals used by the user equipment. Specifically, the information about the resource used by the one or more physical channels or physical signals used by the user equipment may be information about a resource used by a physical channel or a physical signal associated with the transmitted communication signal. For the specific information about the resource, refer to the descriptions in the embodiment shown in FIG. 1. Details are not further described herein.

In this embodiment of the present invention, the user equipment can determine a communication signal transmitted on a resource element group with signal favorable for the user equipment, to obtain information carried in the communication signal, and then use information corresponding to the communication signal, or select a physical channel or a physical signal associated with the communication signal. Therefore, complexity of detection or reception by the user equipment is reduced, and reliability of transmitting the specific information or the communication signal between the cell (or the user equipment group) and the base station can be ensured.

Based on any one of the foregoing communication signal receiving method embodiments, the communication signal is a synchronization signal, and the same information is all or a part of information of a cell identifier, or all or a part of information of a user equipment group identifier.

The communication signal is a broadcast channel, and the same information is at least one of the following: a system bandwidth, a part or all of information of a system frame number SFN, physical channel configuration indication information, and a master information block MIB.

The communication signal is a control channel, and the same information is downlink control information of a system information block, or downlink control information carried in a common search space (CSS), or format indicator information of a downlink control channel.

Optionally, the communication signal is a synchronization signal, and at least two different resource element groups included in a resource configuration of the synchronization signal are respectively located in different OFDM symbols or slots or subframes or radio frames or system frames; and the receiving the communication signal based on the at least one resource element group includes: receiving the synchronization signal based on an OFDM symbol or a slot or a subframe or a radio frame or a system frame in which the at least one resource element group is located.

Optionally, the communication signal is a synchronization signal, and a synchronization signal transmitted on each of the at least two different resource element groups included in the resource configuration of the synchronization signal carries at least one piece of indication information; and the receiving the communication signal based on the at least one resource element group includes: receiving the synchronization signal based on the at least one resource element group, and obtaining, from the received synchronization signal, the at least one piece of indication information carried in the synchronization signal, where the indication information indicates information about a resource used by the synchronization signal or indicates information about a physical channel or a resource of a physical channel used by the user equipment, and the physical channel is at least one of the following: a physical broadcast channel (PBCH), a physical control format indicator channel (PCFICH), a physical downlink control channel (PDCCH), an enhanced physical downlink control channel (ePDCCH), or a physical uplink control channel (PUCCH).

Optionally, a synchronization signal transmitted on each of the at least two different resource element groups included in the resource configuration of the synchronization signal carries at least one piece of indication information; and the receiving the synchronization signal based on the at least one resource element group includes: receiving the synchronization signal based on the at least one resource element group, and obtaining, from the received synchronization signal, the at least one piece of indication information carried in the synchronization signal, where the indication information is represented by a ZC sequence or a computer-generated CG sequence or an m-sequence or a cyclic shift of the foregoing sequence or a combination of the foregoing sequences.

Optionally, the communication signal is a broadcast channel, and at least two different resource element groups included in a resource configuration of the broadcast channel are respectively located in different OFDM symbols or slots or subframes or system frames or radio frames; and the receiving the communication signal based on the at least one resource element group includes: receiving the broadcast channel based on an OFDM symbol or a slot or a subframe or a system frame or a radio frame in which the at least one resource element group is located.

Optionally, the communication signal is a broadcast channel, and a broadcast channel transmitted on each of the at least two different resource element groups included in the resource configuration of the broadcast channel carries at least one piece of indication information; and the receiving the communication signal based on the at least one resource element group includes: receiving the broadcast channel based on the at least one resource element group, and obtaining, from the received broadcast channel, the at least one piece of indication information carried in the broadcast channel, where the indication information indicates information about a resource used by the broadcast channel or indicates information about a physical channel or a resource of a physical channel used by the user equipment, and the physical channel is at least one of the following: a physical control format indicator channel (PCFICH), a physical downlink control channel (PDCCH), an enhanced physical downlink control channel (ePDCCH), or a physical uplink control channel (PUCCH).

Optionally, a broadcast channel transmitted on each of the at least two different resource element groups included in the resource configuration of the broadcast channel carries at least one piece of indication information; and the receiving the communication signal based on the at least one resource element group includes: receiving the broadcast channel based on the at least one resource element group, and obtaining, from the received broadcast channel, the at least one piece of indication information carried in the broadcast channel, where the indication information is carried in a broadcast message of the broadcast channel, or the indication information is represented by using different cyclic redundancy check masks.

Optionally, the communication signal is a control channel, and at least two different resource element groups included in a resource configuration of the control channel are respectively located in different OFDM symbols or slots or subframes or system frames or radio frames or control channel elements CCEs or CCE sets or enhanced control channel elements eCCEs or eCCE sets; and the receiving the communication signal based on the at least one resource element group includes: receiving the control channel based on an OFDM symbol or a slot or a subframe or a system frame or a radio frame or a control channel element CCE or a CCE set or an enhanced channel control channel element eCCE or an eCCE set in which the at least one resource element group is located.

Optionally, the communication signal is a control channel, and a control channel transmitted on each of the at least two different resource element groups included in the resource configuration of the control channel carries at least one piece of indication information; and the receiving the communication signal based on the at least one resource element group includes: receiving the control channel based on the at least one resource element group, and obtaining, from the received control channel, the at least one piece of indication information carried in the control channel, where the indication information indicates information about a resource used by the control channel or indicates information about a physical channel or a resource of a physical channel used by the user equipment, and the physical channel is at least one of the following: a physical control channel PDCCH or an enhanced physical control channel ePDCCH carried in a user equipment specific search space USS, or a physical uplink control channel PUCCH.

Optionally, the communication signal is a control channel, and a control channel transmitted on each of the at least two different resource element groups included in the resource configuration of the control channel carries at least one piece of indication information; and after the receiving the communication signal based on the at least one resource element group, the method further includes: obtaining, from the received control channel, the at least one piece of indication information carried in the control channel, where the indication information is carried in control information of the control channel, or the indication information is represented by using different cyclic redundancy check masks.

Based on any one of the foregoing communication signal receiving method embodiments, the communication signal may be the broadcast channel or the control channel, and the method further includes: receiving a synchronization signal set transmitted by the base station, where the synchronization signal set includes at least one synchronization signal corresponding to the communication signal transmitted on the at least one resource element group in the resource configuration of the communication signal; and the determining, from a resource configuration of a communication signal, at least one resource element group for the communication signal specifically includes: determining, from the resource configuration of the communication signal, the at least one resource element group for the communication signal, where the at least one resource element group corresponds to the at least one synchronization signal used by the user equipment.

Optionally, a correspondence between the synchronization signal and the communication signal may be predefined. For details, refer to the corresponding part in the embodiment shown in FIG. 1. Alternatively, the correspondence may be notified by the base station by using a broadcast message, or higher layer signaling such as RRC signaling, or downlink control information DCI.

Optionally, the at least one synchronization signal included in the synchronization signal set may further carry at least one piece of indication information, where the indication information is used to indicate information about a resource used by the communication signal transmitted on the at least one resource element group; and the determining, from a resource configuration of a communication signal, at least one resource element group for the communication signal specifically includes: determining, from the resource configuration of the communication signal, the at least one resource element group for the communication signal, where the at least one resource element group corresponds to the at least one synchronization signal used by the user equipment.

Specifically, the indication information is used to indicate information about a resource used by the communication signal transmitted on the at least one resource element group; and the user equipment obtains, based on the information about the resource that is obtained from the synchronization signal, the communication signal on the resource element group or resource element corresponding to the synchronization signal. The information about the resource may be: identification information of the communication signal, or information about a resource element group used by the communication signal, or information about an antenna port or an antenna port group used by the communication signal, or information about a sequence or a sequence group used by the communication signal, or information about a beam group used by the communication signal. Alternatively, the indication information is used to indicate one or more physical channels used by the user equipment, or information about an antenna port used by one or more physical channels, or the like, for example, an antenna port used by the broadcast channel or the control channel.

Optionally, the communication signal is a control channel, and the method further includes: receiving a broadcast channel set transmitted by the base station, where the broadcast channel set includes at least one broadcast channel corresponding to the control channel transmitted on the at least one resource element group included in the resource configuration of the control channel; and the determining, from a resource configuration of a communication signal, at least one resource element group for the communication signal specifically includes: determining, from the resource configuration of the communication signal, the at least one resource element group for the communication signal, where the at least one resource element group corresponds to the at least one broadcast channel used by the user equipment.

Optionally, a correspondence between the broadcast channel and the communication signal may be predefined. The following uses an example in which the resource configuration of the communication signal includes two resource element groups: a first resource element group and a second resource element group. The broadcast channel set includes two broadcast channels: a first broadcast channel $BCH_1$ and a second broadcast channel $BCH_2$. In this case, the communication signal transmitted on the first resource element group corresponds to the first broadcast channel $BCH_1$, and the communication signal transmitted on the second resource element group corresponds to the second broadcast channel $BCH_2$. Optionally, a fixed resource correspondence may exist between the first broadcast channel $BCH_1$ and the first resource element group. For example, a fixed time sequence relationship exists between the first broadcast channel and the first resource element group. Specifically, the time sequence relationship may be: a first OFDM symbol in which the first resource element group $REG_1$ is located is always located in a symbol position previous to a first OFDM symbol used by the first broadcast channel $BCH_1$. Correspondingly, a similar correspondence exists between the second broadcast channel $BCH_2$ and the second resource element group $REG_2$. Optionally, a resource correspondence between a broadcast channel $BCH_j$ and the resource element group $REG_i$ may also be:

$$j=i \bmod N_{BCH} \text{ or } i=j \bmod N_{REG} \text{ or } (i+n) \bmod N_{BCH}=(j+n) \bmod N_{REG}$$

where $N_{BCH}$ is a total quantity of broadcast channels BCHs, $N_{REG}$ is a total quantity of resource element groups REGs, n is an index or a count value of a subframe or an OFDM symbol or a subcarrier or a PRB or a resource element group, and mod denotes a modulo operation.

Optionally, the correspondence between the broadcast channel and the communication signal may be notified by the base station to the user equipment, for example, may be notified by using a broadcast message, or higher layer signaling such as RRC signaling, or downlink control information DCI.

Optionally, the at least one broadcast channel included in the broadcast channel set may further carry at least one piece of indication information, where the indication information is used to indicate information about a resource used by the communication signal transmitted on the at least one resource element group; and the determining, from a resource configuration of a communication signal, at least one resource element group for the communication signal specifically includes: determining, from the resource configuration of the communication signal, the at least one resource element group for the communication signal, where the at least one resource element group corresponds to the at least one broadcast channel used by the user equipment.

Specifically, the indication information is used to indicate information about a resource used by the communication signal transmitted on the at least one resource element group; and the user equipment obtains, based on the information about the resource that is obtained from the broadcast channel, the communication signal on the resource element group or resource element corresponding to the broadcast channel. The information about the resource may be: identification information of the communication signal, or information about a resource element group used by the communication signal, or information about an antenna port or an antenna port group used by the communication signal, or information about a sequence or a sequence group used by the communication signal, or information about a beam group used by the communication signal. Alternatively, the indication information is used to indicate one or more physical channels used by the user equipment, or information about an antenna port used by one or more physical channels, for example, an antenna port used by the control channel.

The following describes in detail the embodiments of the present invention with reference to specific application scenarios.

First, an LTE system is used as an example to describe a frame structure, a slot structure, and a resource grid structure. In the LTE system, uplink/downlink transmission is organized into a radio frame. Duration of each radio frame is 10 milliseconds, and the radio frame includes 10 subframes, each with duration of 1 millisecond, or includes 20 slots (slot), each with duration of 0.5 milliseconds, where the slots are numbered 0 to 19. A subframe is defined as two consecutive slots. A signal transmitted in each slot may be represented by one or several resource grids (resource grid). Using a downlink system as an example, $N_{RB}^{DL} N_{sc}^{RB}$ consecutive subcarriers and $N_{symb}^{DL}$ consecutive OFDM symbols form a resource grid structure. $N_{RB}^{DL}$ is a system bandwidth in units of resource blocks RBs, $N_{sc}^{RB}$ is a quantity of subcarriers in an RB, and $N_{symb}^{DL}$ is a quantity of OFDM symbols in a downlink slot. Each element in a resource grid is referred to as a resource element (Resource Element, RE for short), and each RE may be identified by an index pair (k,l) in a slot uniquely, where k=0, . . . , $N_{sc}^{RB}-1$ is a frequency domain index in the slot, and l=0, . . . , $N_{symb}^{DL}-1$ is a time domain index in the slot. $N_{symb}^{DL}$ consecutive OFDM symbols in a time domain and $N_{sc}^{RB}$ consecutive subcarriers in a frequency domain are defined as a resource block (Resource Block, RB for short).

In addition, in the LTE system, an antenna port is defined such that the channel over which a symbol on the antenna port is transmitted can be inferred from the channel over which another symbol on the same antenna port is transmitted. Each antenna port has a resource grid. Actually, each antenna port may correspond to a physical antenna, or may correspond to a virtual antenna, that is, a combination of a plurality of physical antennas. Antenna ports may have same or different antenna patterns. For example, antenna ports with different beam directions or beam widths may be obtained by changing downtilts of different antenna arrays in a horizontal or vertical direction, or by weighting or phase-shifting different combinations of a plurality of physical antennas.

It should be pointed out that, the present invention is not limited to the frame structure, the slot structure, and the physical resource grid structure that are shown. For example, in a future high frequency system, a frame structure may include more slots or OFDM symbols, or a subcarrier spacing is larger. For example, a radio frame structure may include 40 or 80 slots, or a subcarrier spacing is 60 kHz.

The following uses a synchronization signal as an example to describe in detail the transmitting method shown in FIG. 1. The communication signal in the transmitting method shown in FIG. 1 is a synchronization signal, and the at least one piece of same information is a cell identifier, or a part of information of a cell identifier, or a user equipment group identifier, or a part of information of a user equipment group identifier.

Specifically, the synchronization signal may be a primary synchronization signal (PSS) or a secondary synchronization signal (SSS); and the at least one piece of same information is a cell identifier or a part of information of a cell identifier, and may be a cell ID $N_{ID}^{cell}$ or $\lfloor N_{ID}^{cell}/M \rfloor$ or $N_{ID}^{cell}$ mod M, where $\lfloor N_{ID}^{cell}/M \rfloor$ indicates a largest integer not less than $N_{ID}^{cell}/M$, and M is a positive integer, for example, M=3. The at least one piece of same information may also be a user equipment group identifier or a part of information of a user equipment group identifier, and may be a user equipment group ID $N_{ID}^{UEG}$ or $\lfloor N_{ID}^{UEG}/M \rfloor$ or $N_{ID}^{UEG}$ mod M, where $\lfloor N_{ID}^{UEG}/M \rfloor$ indicates a largest integer not less than $N_{ID}^{UEG}/M$, and M is a positive integer, for example, M=1, 2, 3, . . . . For example, $N_{ID}^{UEG}$ may be a PLMN number.

Without loss of generality, the system bandwidth may include $N_{RB}^{BW}$ resource blocks RBs, where each RB may include $N_{sc}^{RB}$ subcarriers and $N_{symb}^{RB}$ OFDM symbols. In addition, a system frame or a radio frame may include $N_{slot}^{F}$ slots, and a subframe includes $N_{slot}^{SF}$ slots. It is easily known that, a radio frame includes $N_{SF}^{F}=N_{slot}^{F}/N_{slot}^{SF}$ subframes, for example, $N_{slot}^{SF}=2$ or $N_{slot}^{SF}=4$.

The following may use an example in which $N_{sc}^{RB}=12$, $N_{symb}^{RB}=7$, and $N_{slot}^{F}=20$, or $N_{sc}^{RB}=6$, $N_{symb}^{RB}=7$, and $N_{slot}^{F}=40$ for description, where a radio frame or a system frame may be 2 ms or 2.5 ms or 5 ms or 10 ms or 20 ms, a subcarrier spacing may be 15 kHz, 30 kHz, 60 kHz, 75 kHz, or the like, and the system frame structure may be a combination of the foregoing parameters.

For ease of description, each resource element group may be represented by a set of position 4-tuples (k,l,$n_s$,$n_f$) of used resource elements, where k indicates an index of a subcarrier (relative to the direct current DC subcarrier in the system bandwidth) of the resource element, l denotes an index of an OFDM symbol (in a slot) of the resource element, $n_s$ denotes an index of a slot (in a radio frame or a system frame) in which the resource element is located, and $n_f$ denotes a number of a system frame in which the resource element is located.

Specifically, at least two resource element groups in the resource configuration of the synchronization signal may be respectively located in different radio frames, or different system frames, or different subframes, or different slots, or different OFDM symbols, or different subcarriers, or different physical resource blocks, or different slots in a same subframe, or different OFDM symbols in a same slot, or different subcarriers in a same slot, or different physical resource blocks in a same slot. Assuming that the resource configuration of the communication signal includes two resource element groups $REG_1$ and $REG_2$, the first resource element group $REG_1$ and the first resource element group $REG_2$ may be respectively:

$$REG_1 = \left\{ (k,l,n_s,n_f) \mid k = n - \frac{N_{sc}^{SS}}{2} + \frac{N_{RB}^{BW} N_{sc}^{RB}}{2}, n = 0, \right. \quad \text{formula (6)}$$
$$\left. \ldots, N_{sc}^{SS} - 1; l = N_{symb}^{RB} - 1; n_s \bmod N_{slot}^{F} = 0, \frac{N_{slot}^{F}}{2}; \right\}$$

$$REG_2 = \quad \text{formula (7)}$$
$$\left\{ (k,l,n_s,n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^{F} = \frac{N_{slot}^{F}}{4}, \frac{3 \cdot N_{slot}^{F}}{4}; \right\}$$

or $$REG_1 = \left\{ (k,l,n_s,n_f) \mid k = n - \frac{N_{sc}^{SS}}{2} + \frac{N_{RB}^{BW} N_{sc}^{RB}}{2}, n = 0, \right. \quad \text{formula (8)}$$
$$\left. \ldots, N_{sc}^{SS} - 1; l = \frac{N_{symb}^{RB} - 1}{2}; n_s \bmod N_{slot}^{F} = 0, \frac{N_{slot}^{F}}{2}; \right\}$$

$$REG_2 = \quad \text{formula (9)}$$
$$\left\{ (k,l,n_s,n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^{F} = \frac{N_{slot}^{F}}{4}, \frac{3 \cdot N_{slot}^{F}}{4}; \right\}$$

or $$REG_1 = \left\{ (k,l,n_s,n_f) \mid k = n - \frac{N_{sc}^{SS}}{2} + \frac{N_{RB}^{BW} N_{sc}^{RB}}{2}, \right. \quad \text{formula (10)}$$
$$n = 0, \ldots, N_{sc}^{SS} - 1; l = N_{symb}^{RB} - 1;$$
$$\left. n_s \bmod N_{slot}^{F} = 0, \frac{N_{slot}^{F}}{2}, n_f \bmod 2 = 0; \right\}$$

$$REG_2 = \left\{ (k,l,n_s,n_f) \mid k = n - \frac{N_{sc}^{SS}}{2} + \frac{N_{RB}^{BW} N_{sc}^{RB}}{2}, \right. \quad \text{formula (11)}$$
$$n = 0, \ldots, N_{sc}^{SS} - 1; l = N_{symb}^{RB} - 1;$$
$$\left. n_s \bmod N_{slot}^{F} = 0, \frac{N_{slot}^{F}}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, \right. \quad \text{formula (12)}$$
$$n = 0, \ldots, N_{sc}^{SS} - 1; l = \frac{N_{symb}^{RB} - 1}{2};$$
$$\left. n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, \right. \quad \text{formula (13)}$$
$$n = 0, \ldots, N_{sc}^{SS} - 1; l = \frac{N_{symb}^{RB} - 1}{2};$$
$$\left. n_s \bmod N_{slot}^F = 0, \frac{N_{slot}^F}{2}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = 0, \right. \quad \text{formula (14)}$$
$$\left. \ldots, N_{sc}^{SS} - 1; l = \frac{N_{symb}^{RB} - 1}{2}; n_s \bmod N_{slot}^F = 0, \frac{N_{slot}^F}{2}; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \right. \quad \text{formula (15)}$$
$$\left. \ldots, N_{sc}^{SS} - 1; l = N_{symb}^{RB} - 1; n_s \bmod N_{slot}^F = 0, \frac{N_{slot}^F}{2}; \right\}$$

or $$REG_1 = \quad \text{formula (16)}$$
$$\left\{(k, l, n_s, n_f) \mid k = n - \frac{N_{sc}^{SS}}{2} + \frac{N_{RB}^{BW} N_{sc}^{RB}}{2}, n = N_{offset}, \ldots, \right.$$
$$\left. N_{offset} + N_{sc}^{SS} - 1; l = N_{symb}^{RB} - 1; n_s \bmod N_{slot}^F = 0, \frac{N_{slot}^F}{2}; \right\}$$

$$REG_2 = \quad \text{formula (17)}$$
$$\left\{(k, l, n_s, n_f) \mid k = n - 31 + \frac{N_{RB}^{BW} N_{sc}^{RB}}{2}, n = -N_{offset}, \ldots, \right.$$
$$\left. -N_{offset} + N_{sc}^{SS} - 1; l = N_{symb}^{RB} - 1; n_s \bmod N_{slot}^F = 0, \frac{N_{slot}^F}{2}; \right\}$$

where $N_{sc}^{SS}$ is a quantity of subcarriers occupied by the synchronization signal, and $N_{offset}$ is a subcarrier position offset, for example, $N_{sc}^{SS}=62$, and $N_{offset}=72$. The system frame number $n_f$ in formulas (6) to (9) and the formulas (14) to (17) is not limited, and in formulas (6) to (17), values of parameters may be: $N_{sc}^{RB}=12$, $N_{symb}^{RB}=7$, and $N_{slot}^F=20$.

For example, the resource configuration of the communication signal includes four resource element groups $REG_i$, where i=1, 2, 3, 4. The $REG_i$, where i=1, 2, 3, 4, may be respectively:

$$REG_1 = \left\{(k, l, n_s, n_f) \mid k = n - \frac{N_{sc}^{SS}}{2} + \frac{N_{RB}^{BW} N_{sc}^{RB}}{2}, \right. \quad \text{formula (18)}$$
$$n = 0, \ldots, N_{sc}^{SS} - 1; l = N_{symb}^{RB} - 1;$$
$$\left. n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, \right. \quad \text{formula (19)}$$
$$n = 0, \ldots, N_{sc}^{SS} - 1; l = N_{symb}^{RB} - 1;$$
$$\left. n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, \right. \quad \text{formula (20)}$$
$$n = 0, \ldots, N_{sc}^{SS} - 1; l = N_{symb}^{RB} - 1;$$
$$\left. n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, \right. \quad \text{formula (21)}$$
$$n = 0, \ldots, N_{sc}^{SS} - 1; l = N_{symb}^{RB} - 1;$$
$$\left. n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, \right. \quad \text{formula (22)}$$
$$n = 0, \ldots, N_{sc}^{SS} - 1; l = \frac{N_{symb}^{RB} - 1}{2};$$
$$\left. n_s \bmod N_{slot}^F = 0, \frac{N_{slot}^F}{2}, n_f \bmod 2 = 0; \right\}$$

$$REG_2 = \left\{(k, l, n_s, n_f) \mid k = n - \frac{N_{sc}^{SS}}{2} + \frac{N_{RB}^{BW} N_{sc}^{RB}}{2}, \right. \quad \text{formula (23)}$$
$$n = 0, \ldots, N_{sc}^{SS} - 1; l = \frac{N_{symb}^{RB} - 1}{2};$$
$$\left. n_s \bmod N_{slot}^F = \frac{N_{slot}^F}{4}, \frac{3 \cdot N_{slot}^F}{4}, n_f \bmod 2 = 0; \right\}$$

$$REG_3 = \left\{(k, l, n_s, n_f) \mid k = n - \frac{N_{sc}^{SS}}{2} + \frac{N_{RB}^{BW} N_{sc}^{RB}}{2}, \right. \quad \text{formula (24)}$$
$$n = 0, \ldots, N_{sc}^{SS} - 1; l = \frac{N_{symb}^{RB} - 1}{2};$$
$$\left. n_s \bmod N_{slot}^F = 0, \frac{N_{slot}^F}{2}, n_f \bmod 2 = 1; \right\}$$

$$REG_4 = \left\{(k, l, n_s, n_f) \mid k = n - \frac{N_{sc}^{SS}}{2} + \frac{N_{RB}^{BW} N_{sc}^{RB}}{2}, \right. \quad \text{formula (25)}$$
$$n = 0, \ldots, N_{sc}^{SS} - 1; l = \frac{N_{symb}^{RB} - 1}{2};$$
$$\left. n_s \bmod N_{slot}^F = \frac{N_{slot}^F}{4}, \frac{3 \cdot N_{slot}^F}{4}, n_f \bmod 2 = 1; \right\}$$

or $$REG_1 = \left\{(k, l, n_s, n_f) \mid k = n - \frac{N_{sc}^{SS}}{2} + \frac{N_{RB}^{BW} N_{sc}^{RB}}{2}, \right. \quad \text{formula (26)}$$
$$n = 0, \ldots, N_{sc}^{SS} - 1; l = \frac{N_{symb}^{RB} - 1}{2};$$
$$\left. n_s \bmod N_{slot}^F = 0, \frac{N_{slot}^F}{2}, n_f \bmod 2 = 0; \right\}$$

-continued $$REG_2 = \left\{(k, l, n_s, n_f) \mid k = n - \frac{N_{sc}^{SS}}{2} + \frac{N_{RB}^{BW} N_{sc}^{RB}}{2},\right.$$
$$n = 0, \ldots, N_{sc}^{SS} - 1; l = N_{symb}^{RB} - 1;$$
$$\left. n_s \bmod N_{slot}^F = 0, \frac{N_{slot}^F}{2}, n_f \bmod 2 = 0; \right\} \quad \text{formula (27)}$$

$$REG_3 = \left\{(k, l, n_s, n_f) \mid k = n - \frac{N_{sc}^{SS}}{2} + \frac{N_{RB}^{BW} N_{sc}^{RB}}{2},\right.$$
$$n = 0, \ldots, N_{sc}^{SS} - 1; l = \frac{N_{symb}^{RB} - 1}{2};$$
$$\left. n_s \bmod N_{slot}^F = 0, \frac{N_{slot}^F}{2}, n_f \bmod 2 = 1; \right\} \quad \text{formula (28)}$$

$$REG_4 = \left\{(k, l, n_s, n_f) \mid k = n - \frac{N_{sc}^{SS}}{2} + \frac{N_{RB}^{BW} N_{sc}^{RB}}{2},\right.$$
$$n = 0, \ldots, N_{sc}^{SS} - 1; l = N_{symb}^{RB} - 1;$$
$$\left. n_s \bmod N_{slot}^F = 0, \frac{N_{slot}^F}{2}, n_f \bmod 2 = 1; \right\} \quad \text{formula (29)}$$

or $$REG_1 = \left\{(k, l, n_s, n_f) \mid k = n - \frac{N_{sc}^{SS}}{2} + \frac{N_{RB}^{BW} N_{sc}^{RB}}{2},\right.$$
$$n = N_{offset}, \ldots, N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 0; \right\} \quad \text{formula (30)}$$

$$REG_2 = \left\{(k, l, n_s, n_f) \mid k = n - 31 + \frac{N_{RB}^{BW} N_{sc}^{RB}}{2},\right.$$
$$n = -N_{offset}, \ldots, -N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 0; \right\} \quad \text{formula (31)}$$

$$REG_3 = \left\{(k, l, n_s, n_f) \mid k = n - \frac{N_{sc}^{SS}}{2} + \frac{N_{RB}^{BW} N_{sc}^{RB}}{2},\right.$$
$$n = N_{offset}, \ldots, N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 1; \right\} \quad \text{formula (32)}$$

$$REG_4 = \left\{(k, l, n_s, n_f) \mid k = n - 31 + \frac{N_{RB}^{BW} N_{sc}^{RB}}{2},\right.$$
$$n = -N_{offset}, \ldots, -N_{offset} + N_{sc}^{SS} - 1; l = N_{symb}^{RB} - 1;$$
$$\left. n_s \bmod N_{slot}^F = 0, \frac{N_{slot}^F}{2}, n_f \bmod 2 = 1; \right\} \quad \text{formula (33)}$$

For example, $N_{sc}^{RB} = 12$, $N_{symb}^{RB} = 7$, and $N_{slot}^F = 20$.

For example, the resource configuration of the communication signal includes four resource element groups $REG_i$, where $i = 1, 2, 3, 4$. The $REG_i$, $i = 1, 2, 3, 4$, may be respectively:

$$REG_1 = \left\{(k, l, n_s, n_f) \mid k = n - \frac{N_{sc}^{SS}}{2} + \frac{N_{RB}^{BW} N_{sc}^{RB}}{2},\right.$$
$$\left. n = 0, \ldots, N_{sc}^{SS} - 1; l = N_{symb}^{RB} - 1; n_s \bmod N_{slot}^F = 0, \frac{N_{slot}^F}{4}; \right\} \quad \text{formula (34)}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = \frac{N_{slot}^F}{8}, \frac{3 \cdot N_{slot}^F}{8}; \right\} \quad \text{formula (35)}$$

$$REG_3 = \left\{(k, l, n_s, n_f) \mid k = n - \frac{N_{sc}^{SS}}{2} + \frac{N_{RB}^{BW} N_{sc}^{RB}}{2},\right.$$
$$\left. n = 0, \ldots, N_{sc}^{SS} - 1; l = N_{symb}^{RB} - 1; n_s \bmod N_{slot}^F = \frac{N_{slot}^F}{2}, \frac{3N_{slot}^F}{4}; \right\} \quad \text{formula (36)}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = N_{symb}^{RB} - 1; n_s \bmod N_{slot}^F = \frac{5N_{slot}^F}{8}, \frac{7N_{slot}^F}{8}; \right\} \quad \text{formula (37)}$$

or $$REG_1 = \left\{(k, l, n_s, n_f) \mid k = n - \frac{N_{sc}^{SS}}{2} + \frac{N_{RB}^{BW} N_{sc}^{RB}}{2},\right.$$
$$\left. n = 0, \ldots, N_{sc}^{SS} - 1; l = \frac{N_{symb}^{RB} - 1}{2}; n_s \bmod N_{slot}^F = 0, \frac{N_{slot}^F}{4}; \right\} \quad \text{formula (38)}$$

$$REG_2 = \left\{(k, l, n_s, n_f) \mid k = n - \frac{N_{sc}^{SS}}{2} + \frac{N_{RB}^{BW} N_{sc}^{RB}}{2}, n = 0, \ldots,\right.$$
$$\left. N_{sc}^{SS} - 1; l = \frac{N_{symb}^{RB} - 1}{2}; n_s \bmod N_{slot}^F = \frac{N_{slot}^F}{8}, \frac{3 \cdot N_{slot}^F}{8}; \right\} \quad \text{formula (39)}$$

-continued $$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = \frac{N_{slot}^F}{2}, \frac{6N_{slot}^F}{8};\right\} \quad \text{formula (40)}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = \frac{5N_{slot}^F}{8}, \frac{7N_{slot}^F}{8};\right\} \quad \text{formula (41)}$$

or $$REG_1 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = 0, \ldots, N_{sc}^{SS} - 1; l = \frac{N_{symb}^{RB} - 1}{2}; n_s \bmod N_{slot}^F = 0, \frac{N_{slot}^F}{4};\right\} \quad \text{formula (42)}$$

$$REG_2 = \left\{(k, l, n_s, n_f) \mid k = n - \frac{N_{sc}^{SS}}{2} + \frac{N_{RB}^{BW} N_{sc}^{RB}}{2}, \right.$$
$$\left. n = 0, \ldots, N_{sc}^{SS} - 1; l = N_{symb}^{RB} - 1; n_s \bmod N_{slot}^F = 0, \frac{N_{slot}^F}{4};\right\} \quad \text{formula (43)}$$

$$REG_3 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = \frac{N_{symb}^{RB} - 1}{2}; n_s \bmod N_{slot}^F = \frac{N_{slot}^F}{2}, \frac{3N_{slot}^F}{4};\right\} \quad \text{formula (44)}$$

$$REG_4 = \left\{(k, l, n_s, n_f) \mid k = n - \frac{N_{sc}^{SS}}{2} + \frac{N_{RB}^{BW} N_{sc}^{RB}}{2}, n = 0, \ldots, \right.$$
$$\left. N_{sc}^{SS} - 1; l = N_{symb}^{RB} - 1; n_s \bmod N_{slot}^F = \frac{N_{slot}^F}{2}, \frac{3N_{slot}^F}{4};\right\} \quad \text{formula (45)}$$

or $$REG_1 = \left\{(k, l, n_s, n_f) \mid k = n - \frac{N_{sc}^{SS}}{2} + \frac{N_{RB}^{BW} N_{sc}^{RB}}{2}, n = N_{offset}, \ldots, \right.$$
$$\left. N_{offset} + N_{sc}^{SS} - 1; l = N_{symb}^{RB} - 1; n_s \bmod N_{slot}^F = 0, \frac{N_{slot}^F}{4};\right\} \quad \text{formula (46)}$$

$$REG_2 = \left\{(k, l, n_s, n_f) \mid k = n - 31 + \frac{N_{RB}^{BW} N_{sc}^{RB}}{2}, n = -N_{offset}, \ldots, \right.$$
$$\left. -N_{offset} + N_{sc}^{SS} - 1; l = N_{symb}^{RB} - 1; n_s \bmod N_{slot}^F = 0, \frac{N_{slot}^F}{4};\right\} \quad \text{formula (47)}$$

$$REG_3 = \left\{(k, l, n_s, n_f) \mid k = n - \frac{N_{sc}^{SS}}{2} + \frac{N_{RB}^{BW} N_{sc}^{RB}}{2}, n = N_{offset}, \ldots, \right.$$
$$\left. N_{offset} + N_{sc}^{SS} - 1; l = N_{symb}^{RB} - 1; n_s \bmod N_{slot}^F = \frac{N_{slot}^F}{2}, \frac{3N_{slot}^F}{4};\right\} \quad \text{formula (48)}$$

$$REG_4 = \left\{(k, l, n_s, n_f) \mid k = n - 31 + \frac{N_{RB}^{BW} N_{sc}^{RB}}{2}, n = -N_{offset}, \ldots, \right.$$
$$\left. -N_{offset} + N_{sc}^{SS} - 1; l = N_{symb}^{RB} - 1; n_s \bmod N_{slot}^F = \frac{N_{slot}^F}{2}, \frac{3N_{slot}^F}{4};\right\} \quad \text{formula (49)}$$

where $N_{sc}^{SS}$ is a quantity of subcarriers occupied by the synchronization signal, and $N_{offset}$ is a subcarrier position offset, for example, $N_{sc}^{RB}=6$, $N_{symb}^{RB}=7$, and $N_{slot}^{F}=40$. $N_{sc}^{SS}=62$ and $N_{offset}=72$; or $N_{sc}^{SS}=29$ and $N_{offset}=36$, or $N_{sc}^{SS}=30$ and $N_{offset}=36$.

In addition, the resource element group used by the PSS or the SSS may further include all REs used by an OFDM symbol in which REs used by a CSI RS are located.

Optionally, synchronization signals transmitted on the at least two resource element groups included in the resource configuration of the synchronization signal may be transmitted by using different antenna ports. Specifically, the synchronization signal transmitted on the resource element group $REG_i$ may be transmitted by using an antenna port $P_j$.

Specifically, the following relationship exists between the resource element group $REG_i$ and the used antenna port $P_j$:

$$(i+n) \bmod N_{REG} = (j+n) \bmod N_P \qquad \text{formula (50)}$$

where $N_{REG}$ is a total quantity of resource element groups, $N_P$ is a total quantity of antenna ports, n is an index or a count value of a subframe or an OFDM symbol or a subcarrier or a PRB or a resource element group, and mod denotes a modulo operation.

Optionally, synchronization signals transmitted on the at least two resource element groups included in the resource configuration of the synchronization signal may be transmitted by using different beams. Specifically, the synchronization signal transmitted on the resource element group $REG_i$ may be transmitted by using a beam $B_j$.

Specifically, the following relationship exists between the resource element group $REG_i$ and the used beam $B_j$:

$$(i+n) \bmod N_{REG} = (j+n) \bmod N_B \qquad \text{formula (51)}$$

where $N_{REG}$ is a total quantity of resource element groups, $N_B$ is a total quantity of beams, n is an index or a count value of a subframe or an OFDM symbol or a subcarrier or a PRB or a resource element group, and mod denotes a modulo operation.

Specifically, using synchronization signals transmitted on four resource element groups $REG_i$, where i=0, 1, 2, 3, as an example: the synchronization signals transmitted on the four resource element groups $REG_i$, where i=0, 1, 2, 3, may be transmitted by using beams $B_i$, where i=0, 1, 2, 3. Specifically, which different beam shapes or beam directions are used in the system may be designed flexibly according to deployment. For example, more beams are used, so that the beams evenly cover the cell or the area in which the user equipment group is located.

Further, the synchronization signals transmitted on each of the at least two resource element groups may carry at least one piece of indication information in addition to the same information, where the indication information may be used to indicate information about a resource used by the synchronization signal. Specifically, the information about the resource used by the synchronization signal may be at least one or a combination of the following: identification information of the synchronization signal, where for example, an identifier of the synchronization signal may be 1, 2, 3, . . . , N, and a specific identification method is not limited in the present invention, for example, identifiers of the synchronization signals using the resource element group $REG_i$, where i=1, 2, 3, are 1, 2, and 3 respectively; information about a resource element group used by the synchronization signal, for example, a label or an index of the used resource element group; information about a sequence or a sequence group used by the synchronization signal, for example, a root index value of a ZC sequence used by the synchronization signal or an initial value of the sequence or a cyclic shift value (Cyclic Shift) of the sequence, or an index value of a combination of two m-sequences used by the synchronization signal, or the like; information about an antenna port or an antenna port group used by the synchronization signal, for example, an antenna port number, information about an antenna port array structure such as a quantity of antenna ports or an arrangement manner of antenna ports or a polarization type of antenna ports (vertical polarization or cross polarization or interleaved polarization), or a reference signal sequence group used by the antenna port or a beam group used by the antenna port or precoding used by the antenna port; information about a beam used by the synchronization signal, for example, an index of a beam group, or a quantity of beams, or a specific parameter of a beam such as a beam width, or a weight vector used for implementing the used beam, or the like; information about precoding used by the synchronization signal, which may be an index of a precoding matrix, or a quantity of layers or a quantity of columns of a precoding matrix, or a rank of the precoding, or the like; and information about a time-frequency position used by the synchronization signal, for example, an offset of a slot or a subframe or an OFDM symbol of the synchronization signal transmitted on the resource element group in a transmission period of the synchronization signal, or an offset of a subcarrier or a physical resource block relative to a used subband or a system center subcarrier. For example, slot offsets in formulas (6) and (7) are 0 and 5 respectively; slot offsets in formulas (8) and (9) are 0 and 5 respectively; subframe offsets in formulas (10) and (11) are 0 and 10 respectively; subframe offsets in formulas (12) and (13) are 0 and 10 respectively; OFDM symbol offsets in formulas (14) and (15) are 0 and 3 respectively; and offsets of subcarriers relative to the used subband or system center in formulas (16) and (17) are 72 and −72 respectively, or PRB offsets are 6 and −6 respectively. It should be noted that, the offset may be represented by a code. For example, 0 and 1 indicate slot offsets 0 and 5 respectively.

Optionally, the synchronization signal transmitted on each of the at least two resource element groups further carries at least one piece of indication information, where the indication information is used to indicate one or more physical channels used by the user equipment, or information about a resource used by one or more physical channels used by the user equipment; and the information about the resource of the physical channel or the physical signal may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or information about an antenna port group used by the physical channel or the physical signal, or information about precoding used by the physical channel or the physical signal, or information about a beam group used by the physical channel or the physical signal, or information about a time-frequency position used by the physical channel or the physical signal.

Optionally, the one or more physical channels used by the user equipment may be a broadcast channel, or a downlink control channel PDCCH, or an uplink control channel PUCCH, or a control format indicator channel PCFICH, or the like.

For example, the indication information is used to indicate information about an antenna port used by one or more physical channels used by the user equipment. For example, the indication information indicates information about an antenna port or information about a reference signal used by a physical broadcast channel (PBCH) or a physical control format indicator channel (PCFICH) or a physical downlink control channel (PDCCH) or an enhanced physical downlink control channel (ePDCCH) or a physical uplink control channel (PUCCH).

Specifically, the information about the antenna port may be an antenna port associated with a CRS or a DMRS. For example, resource identification information 0 and 1 are respectively used to indicate that CRSs or DMRSs correspondingly used by antenna ports used by the physical channels are respectively a $CRS_0$ and a $CRS_1$, or CRS sets $\{CRS_{00}, CRS_{01}\}$ and $\{CRS_{10}, CRS_{11}\}$, or a $DMRS_0$ and a $DMRS_1$, or DMRS sets $\{DMRS_{00}, DMRS_{01}\}$ and $\{DMRS_{10}, DMRS_{11}\}$. Implementations and correspondences of the foregoing RSs are not specifically limited in the present invention.

The following uses an example in which the at least one piece of same information carried in the synchronization signals transmitted on the at least two resource element groups is a cell identifier, and the same information may be mapped to a (Zadoff-Chu) ZC sequence, for example, may be mapped to a ZC sequence whose sequence length is not less than 36. Specifically, the same information may be mapped to a sequence $d(0), \ldots, d(N_{SS}-1)$, where $d(n)$ is:

$$d(n)=x_q(n \bmod N_{ZC}), 0 \leq n < N_{SS} \quad \text{formula (52)}$$

where a $q^{th}$ root ZC sequence is defined as:

$$x_q(m) = e^{-j\frac{\pi q m(m+1)}{N_{ZC}}}, 0 \leq m \leq N_{ZC} - 1 \quad \text{formula (53)}$$

$$q = \lfloor \bar{q} + 1/2 \rfloor + v \cdot (-1)^{\lfloor 2\bar{q} \rfloor} \quad \text{formula (54)}$$

$$\bar{q} = N_{ZC} \cdot (u+1)/31 \quad \text{formula (55)}$$

where a length $N_{ZC}$ of the ZC sequence is a largest prime number that satisfies $N_{ZC} \leq N_{SS}$ or $N_{ZC} < N_{SS}$, and $N_{SS}$ is a length of a synchronization signal sequence.

Specifically, using $N_{SS}=62$ as an example, the same information may be mapped to the following ZC sequence:

$$d_u(n) = \begin{bmatrix} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{bmatrix} \quad \text{formula (56)}$$

Optionally, the same information may be mapped to a CG sequence, for example, may be mapped to a CG sequence whose sequence length is less than 36. Specifically, the same information may be mapped to a sequence $d(0), \ldots, d(N_{SS}-1)$, where $d(n)$ is:

$$d(n)=e^{j\varphi(n)\pi/4}, 0 \leq n < N_{SS} \quad \text{formula (57)}$$

where $N_{SS}$ is a length of a synchronization signal sequence. Specifically, using $N_{SS}=12$ and $N_{SS}=24$ as an example, parameters $\varphi(n)$ are shown in Table 1 and Table 2 respectively.

TABLE 1

| u | $\varphi(0), \ldots, \varphi(11)$ |
|---|---|
| 0  | −1  1  3 −3  3  3  1  1  3  1 −3  3 |
| 1  |  1  1  3  3  3 −1  1 −3 −3  1 −3  3 |
| 2  |  1  1 −3 −3 −3 −1 −3 −3  1 −3  1 −1 |
| 3  | −1  1  1  1  1 −1 −3 −3  1 −3  3 −1 |
| 4  | −1  3  1 −1  1 −1 −3 −1  1 −1  1  3 |
| 5  |  1 −3  3 −1 −1  1  1 −1 −1  3 −3  1 |
| 6  | −1  3 −3 −3 −3  3  1 −1  3  3 −3  1 |
| 7  | −3 −1 −1 −1  1 −3  3 −1  1 −3  3  1 |
| 8  |  1 −3  3  1 −1 −1 −1  1  1  3 −1  1 |
| 9  |  1 −3 −1  3  3 −1 −3  1  1  1  1  1 |
| 10 | −1  3 −1  1  1 −3 −3 −1 −3 −3  3 −1 |
| 11 |  3  1 −1 −1  3  3 −3  1  3  1  3  3 |
| 12 |  1 −3  1  1 −3  1  1  1 −3 −3 −3  1 |
| 13 |  3  3 −3  3 −3  1  1  3 −1 −3  3  3 |
| 14 | −3  1 −1 −3 −1  3  1  3  3  3 −1  1 |
| 15 |  3 −1  1 −3 −1 −1  1  1  3  1 −1 −3 |
| 16 |  1  3  1 −1  1  3  3  3 −1 −1  3 −1 |
| 17 | −3  1  1  3 −3  3 −3 −3  3  1  3 −1 |
| 18 | −3  3  1  1 −3  1 −3 −3 −1 −1  1 −3 |
| 19 | −1  3  1  3  1 −1 −1  3 −3 −1 −3 −1 |
| 20 | −1 −3  1  1  1  1  3  1 −1  1 −3 −1 |
| 21 | −1  3 −1  1 −3 −3 −3 −3 −3  1 −1 −3 |
| 22 |  1  1 −3 −3 −3 −3 −1  3 −3  1 −3  3 |
| 23 |  1  1 −1 −3 −1 −3  1 −1  1  3 −1  1 |
| 24 |  1  1  3  1  3  3 −1  1 −1 −3 −3  1 |
| 25 |  1 −3  3  3  1  3  3  1 −3 −1 −1  3 |
| 26 |  1  3 −3 −3  3 −3  1 −1 −1  3 −1 −3 |
| 27 | −3 −1 −3 −1 −3  3  1 −1  1  3 −3 −3 |
| 28 | −1  3 −3  3 −1  3  3 −3  3  3 −1 −1 |
| 29 |  3 −3 −3 −1 −1 −3 −1  3 −3  3  1 −1 |

TABLE 2

| u | $\varphi(0), \ldots, \varphi(23)$ |
|---|---|
| 0  | −1  3  1 −3  3 −1  1  3 −3  3  1  3 −3  3  1  1 −1  1  3 −3  3 −3 −1 −3 |
| 1  | −3  3 −3 −3 −3  1 −3 −3  3 −1  1  1  1  3  1 −1  3 −3 −3  1  3  1  1 −3 |
| 2  |  3 −1  3  3  1  1 −3  3  3  3  3  1 −1  3 −1  1  1 −1 −3 −1 −1  1  3  3 |
| 3  | −1 −3  1  1  3 −3  1  1 −3 −1 −1  1  3  1  3  1 −1  3  1 −3 −1 −3 −1 |
| 4  | −1 −1 −1 −3 −3 −1  1  1  3  3 −1  3 −1  1 −1 −3  1 −1 −3 −3  1 −3 −1 −1 |
| 5  | −3  1  1  3 −1  1  3  1 −3  1 −3  1  1 −1 −1  3 −1 −3  3 −3 −3 −3  1  1 |
| 6  |  1  1 −1 −1  3 −3 −3  3 −3  1 −1 −1  1 −1  1  1 −1 −3 −1  1 −1  3 −1 −3 |
| 7  | −3  3  3 −1 −1 −3 −1  3  1  3  1  3  1  1 −1  3  1 −1  1  3 −3 −1 −1  1 |
| 8  | −3  1  3 −3  1 −1 −3  3 −3  3 −1 −1 −1 −1  1 −3 −3 −3  1 −3 −3 −3  1 −3 |
| 9  |  1  1 −3  3  3 −1 −3 −1  3 −3  3  3  3 −1  1  1 −3  1 −1  1  1 −3  1  1 |
| 10 | −1  1 −3 −3  3 −1  3 −1 −1 −3 −3 −3 −1 −3 −3  1 −1  1  3  3 −1  1 −1  3 |
| 11 |  1  3  3 −3 −3  1  3  1 −1 −3 −3 −3  3  3 −3  3  3 −1 −3  3 −1  1 −3  1 |

TABLE 2-continued

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Optionally, the same information may be mapped to an m-sequence with different cyclic shifts, for example, may be mapped to an m-sequence whose sequence length is 31. Specifically, the same information may be mapped to a sequence $d^{(m_0)}(0), \ldots, d(N_{SS}-1)$ where d(n) is:

$$d^{(m_0)}(n)=s((n+m_0) \bmod N_{SS}), 0 \le n < N_{SS} \qquad \text{formula (58)}$$

$$s(i)=1-2x(i), 0 \le i < N_{SS} \qquad \text{formula (59)}$$

$$x(\underline{i}+5)=(x(\underline{i}+2)+x(\underline{i})) \bmod 2, 0 \le \underline{i} \le 25 \qquad \text{formula (60)}$$

$$x(0)=0, x(1)=0, x(2)=0, x(3)=0, x(4)=1 \qquad \text{formula (61)}$$

where $N_{SS}$ is a length of a synchronization signal sequence, and $m_0$ is a cyclic shift value.

The following uses an example in which the at least one piece of same information carried in the synchronization signals transmitted on the at least two resource element groups is a part of information $N_{ID}^{cell} \bmod M$ of a cell identifier, where M=3. $N_{ID}^{cell} \bmod M$=0, 1, 2.

Specifically, using the ZC sequence whose length is 62 shown in formula (56) as an example, the sequence may be mapped to the first resource element group $REG_1$ and the second resource element group $REG_2$ respectively. 62 elements in the sequence may be mapped to 62 resource element positions respectively. Using any two resource element groups $REG_1$ and $REG_2$ shown in formulas (6) to (49) as an example, a sequence element in an RE position $(k,l,n_s,n_f)$ in the first resource element group $REG_1$ is:

$$a_{k,l,n_s,n_f}=d(n), (k,l,n_s,n_f) \in REG_1 \qquad \text{formula (62)}$$

A sequence element in an RE position $(k,l,n_s,n_f)$ in the second resource element group $REG_2$ is:

$$a_{k,l,n_s,n_f}=d(n), (k,l,n_s,n_f) \in REG_2 \qquad \text{formula (63)}$$

where d(n) denotes one of the sequences $d_u(n)$ carried in the synchronization signal.

Specifically, the carried information $N_{ID}^{cell} \bmod 3$ may be mapped to sequences of different root indexes according to different values, as shown in Table 3.

TABLE 3

| $N_{ID}^{cell} \bmod 3$ | Root index$^u$ |
|---|---|
| 0 | 25 |
| 1 | 29 |
| 2 | 34 |

Optionally, the synchronization signal transmitted on each of the at least two resource element groups may further carry at least one piece of indication information. For example, the indication information is used to indicate information about a resource identifier used by the synchronization signal. For example, the first resource element group $REG_1$ and the second resource element group $REG_2$ are represented by resource identifiers (ResourceID) 0 and 1 respectively.

Optionally, the indication information respectively carried in the synchronization signals transmitted on the at least two resource element groups may be represented by different ZC sequences or computer-generated CG sequences or m-sequences or different cyclic shifts thereof or different combinations thereof. Specifically, if the indication information is represented by different cyclic shifts of a ZC sequence, as shown in Table 4, a sequence element in an RE position $(k,l,n_s,n_f)$ in the first resource element group $REG_1$ is:

$$a_{k,l,n_s,n_f}=d^{(m_0)}, (k,l,n_s,n_f) \in REG_1 \qquad \text{formula (64)}$$

A sequence element in an RE position $(k,l,n_s,n_f)$ in the second resource element group $REG_2$ is:

$$a_{k,l,n_s,n_f}=d^{(m_1)}, (k,l,n_s,n_f) \in REG_2 \qquad \text{formula (65)}$$

where $d^{(m_0)}(n)$ and $d^{(m_1)}(n)$ indicate cyclic shifts in the sequence d(n) carried in the synchronization signal:

$$d^{(m_0)}=d((n+n_0) \bmod N_{SS}) \qquad \text{formula (66)}$$

$$d^{(m_1)}=d((n+n_1) \bmod N_{SS}) \qquad \text{formula (67)}$$

where $N_{SS}$ represents a length of the sequence d(n), for example, $N_{SS}$=62 herein; $n_0$ and $n_1$ are lengths of two different cyclic shifts respectively, for example, $n_0$=0, $n_1$=1 or $n_0$=0, $n_1$=15, or the like.

TABLE 4

| | Resource identifier (Resource ID) | |
|---|---|---|
| $N_{ID}^{cell} \bmod 3$ | 0 | 1 |
| 0 | (25, $n_0$) | (25, $n_1$) |
| 1 | (29, $n_0$) | (29, $n_1$) |
| 2 | (34, $n_0$) | (34, $n_1$) |

In addition, different transformations may be different phase shifts, and are not further illustrated herein.

A method similar to Table 3 or 4 may be used to map the user equipment group identification information or other indication information to different synchronization signal sequences, for example, the ZC sequences or the CG sequences or the m-sequences or different cyclic shifts thereof or different combinations thereof. A length of the synchronization signal sequence is not limited to the foregoing 62, for example, may be $N_{sc}^{SS}=29$, or $N_{sc}^{SS}=30$, or $N_{sc}^{SS}=31$. A quantity of REs in the resource element group may be 36, as shown in formulas (34) to (49). Therefore, by using the foregoing sequence, same information or other indication information may be carried in the synchronization signal. In addition, the resource element RE in each resource element group is not necessarily limited to the resource grid structure currently defined in LTE. Other configured resource grid structures may be further included. For example, each subframe includes more slots, or duration of each slot is shorter, or each OFDM symbol is shorter, or each subcarrier spacing is longer. For example, K=4, the subcarrier spacing is 30 kHz, and the resource element group is shown in formulas (34) to (49).

In this embodiment of the present invention, the base station transmits the synchronization signal on each of the at least two resource element groups included in the resource configuration of the synchronization signal to the user equipment, where the resource configuration includes at least two different resource element groups, and each synchronization signal carries at least one piece of cell specific or user equipment group specific information. As described above, according to the method provided in this embodiment of the present invention, reliability of transmitting the communication signal between user equipment within the cell (or the user equipment group) and the base station can be effectively improved, and therefore precision of time synchronization and/or frequency synchronization and reliability of receiving the cell specific or user equipment group specific information carried in the synchronization signal are improved.

The following uses a synchronization signal as an example to describe in detail the receiving method shown in FIG. 6, where the communication signal transmitted on each resource element is a synchronization signal. The at least one piece of same information carried in the synchronization signal is all information of a cell identifier, or a part of information of a cell identifier, or a user equipment group identifier, or a part of information of a user equipment group identifier.

Specifically, the synchronization signal may be a primary synchronization signal PSS or a secondary synchronization signal SSS; and the at least one piece of same information is a cell identifier or a part of information of a cell identifier, and may be a cell ID $N_{ID}^{cell}$ or $\lfloor N_{ID}^{cell}/M \rfloor$ or $N_{ID}^{cell} \bmod M$, where $\lfloor N_{ID}^{cell}/M \rfloor$ denotes a largest integer not less than $N_{ID}^{cell}/M$, and M is a positive integer, for example, M=3. The at least one piece of same information may also be a user equipment group identifier or a part of information of a user equipment group identifier, and may be a user equipment group ID $N_{ID}^{EUG}$ or $\lfloor N_{ID}^{UEG}/M \rfloor$ or $N_{ID}^{UEG} \bmod M$, where $\lfloor N_{ID}^{UEG}/M \rfloor$ denotes a largest integer not less than $N_{ID}^{UEG}/M$, and M is a positive integer, for example, M=1, 2, 3, . . . . For example, $N_{ID}^{UEG}$ may be a PLMN number.

Specifically, at least two resource element groups included in the resource configuration of the synchronization signal may be respectively located in different subframes, or different slots in a same subframe, or different OFDM symbols in a same slot, or different subcarriers in a same slot, or physical resource blocks in a same slot, or the like. For example, $N_{sc}^{RB}=12$, $N_{symb}^{RB}=7$, $N_{slot}^{F}=20$, and the resource configuration of the synchronization signal includes two resource element groups $REG_1$ and $REG_2$. The first resource element group $REG_1$ and the first resource element group $REG_2$ may be shown in formulas (6) to (17) respectively. For example, $N_{sc}^{RB}=12$, $N_{symb}^{RB}=7$, $N_{slot}^{F}=20$, and the resource configuration of the synchronization signal includes four resource element groups $REG_i$, where i=1, 2, 3, 4. The $REG_i$, where i=1, 2, 3, 4, may be shown in formulas (18) to (33) respectively. For example, $N_{sc}^{RB}=6$, $N_{symb}^{RB}=7$, $N_{slot}^{F}=40$, and the resource configuration of the synchronization signal includes four resource element groups $REG_i$, where i=1, 2, 3, 4. The $REG_i$, where i=1, 2, 3, 4 may be shown in formulas (34) to (49) respectively.

Optionally, synchronization signals transmitted on the at least two resource element groups included in the resource configuration of the synchronization signal may be transmitted by using different antenna ports. Specifically, the synchronization signal transmitted on the resource element group $REG_i$ may be transmitted by using an antenna port $P_j$. Specifically, the relationship shown in formula (50) exists between the resource element group $REG_i$ and the used antenna port $P_j$. For example, the synchronization signals transmitted on the resource element groups $REG_1$ and $REG_2$ may be transmitted by using different antenna ports $P_1$ and $P_2$. In this case, when receiving the synchronization signals, the user equipment receives the synchronization signals from different antenna ports $P_1$ and $P_2$ respectively.

Optionally, synchronization signals transmitted on the at least two resource element groups included in the resource configuration of the synchronization signal may be transmitted by using different beams. Specifically, the synchronization signal transmitted on the resource element group $REG_i$ may be transmitted by using a beam $B_j$. Specifically, the relationship shown in formula (51) exists between the resource element group $REG_i$ and the used beam $B_j$. For example, synchronization signals transmitted on the resource element group $REG_1$ and the resource element group $REG_2$ may be transmitted by different beams $B_0$ and $B_1$. In this case, when receiving the synchronization signals, the user equipment receives the synchronization signals transmitted by using the beams $B_0$ and $B_1$.

Further, the synchronization signal transmitted on each of the at least two resource element groups further carries at least one piece of indication information in addition to the same information, where the indication information is used to indicate information about a resource used by the synchronization signal. Specifically, the information about the resource used by the synchronization signal may be at least one or a combination of the following: identification information of the synchronization signal, where for example, an identifier of the synchronization signal may be 1, 2, 3, . . . , N, and a specific identification method is not limited in the present invention, for example, identities of the synchronization signals using the resource element group $REG_i$, where i=1, 2, 3, are 1, 2, and 3 respectively; information about a resource element group used by the synchronization signal, for example, a resource identifier, such as a number or an index of the used resource element group; information about a synchronization signal sequence or a synchronization signal sequence group, for example, a root index value of a ZC sequence used by the synchronization signal or an initial value of the sequence or a cyclic shift value (Cyclic Shift) of the sequence, or an index value of a combination of two m-sequences used by the synchronization signal, or the like; information about an antenna port or an antenna port group used by the synchronization signal, for example, an antenna port number, information about an antenna port array structure such as a quantity of antenna ports or an arrangement manner of antenna ports or a polarization type of antenna ports (vertical polarization or cross polarization or interleaved polarization), or a reference signal sequence group used by the antenna port or a beam group used by the antenna port or precoding used by the antenna port; information about a beam used by the synchronization signal, for example, an index of a beam group, or a quantity of beams, or a specific parameter of a beam such as a beam width, or a weight vector used for implementing the used beam, or the like; information about precoding used by the synchronization signal, which may be an index of a precoding matrix, or a quantity of layers or a quantity of columns of a precoding matrix, or a rank (Rank) of the precoding, or the like; and information about a time-frequency position used by the synchronization signal, for example, an offset of a slot or a subframe or an OFDM symbol of the synchronization signal transmitted on the resource element group in a transmission period of the synchronization signal, or an offset of a subcarrier or a physical resource block relative to a used subband or a system center. For example, slot offsets in formulas (6) and (7) are 0 and 5 respectively; slot offsets in formulas (8) and (9) are 0 and 5 respectively; subframe offsets in formulas (10) and (11) are 0 and 10 respectively; subframe offsets in formulas (12) and (13) are 0 and 10 respectively; OFDM symbol offsets in formulas (14) and (15) are 0 and 3 respectively; and offsets of subcarriers relative to the used subband or system center in formulas (16) and (17) are 72 and −72 respectively, or PRB offsets are 6 and −6 respectively. It should be noted that the offset may be represented by a code. For example, 0 and 1 indicate slot offsets 0 and 5 respectively.

The user equipment obtains, from the synchronization signal, the information about the resource used by the synchronization signal. This can reduce synchronization complexity for the user equipment or improve search efficiency of the user equipment. For example, the identification information of the synchronization signal or the information about the resource element group used by the synchronization signal received by the user equipment can be used in a plurality of subsequent synchronization signal receiving processes and does not need to be redetermined. This is because the information changes slowly with propagation of a radio channel. For another example, the information about the time-frequency position used by the user equipment to receive the communication signal can be used to reduce a search scope for time synchronization or frequency synchronization, and therefore reduce complexity of time synchronization or frequency synchronization and improve precision of time synchronization or frequency synchronization.

Optionally, the synchronization signal transmitted on each of the at least two resource element groups further carries at least one piece of indication information in addition to the same information, where the indication information is used to indicate one or more physical channels used by the user equipment, or information about a resource used by one or more physical channels used by the user equipment, or information about a resource used by one or more physical signals used by the user equipment; and the information about the resource of the physical channel or the physical signal may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or information about an antenna port group used by the physical channel or the physical signal, or information about precoding or information about a beam group or information about a time-frequency position used by the physical channel or the physical signal.

Optionally, the one or more physical channels used by the user equipment may be a broadcast channel, or a downlink control channel PDCCH, or an uplink control channel PUCCH, or a control format indicator channel PCFICH, or the like.

For example, the indication information is used to indicate information about an antenna port used by one or more physical channels used by the user equipment. For example, the indication information indicates information about an antenna port or information about a reference signal used by a physical broadcast channel PBCH or a physical control format indicator channel PCFICH or a physical downlink control channel PDCCH or an enhanced physical downlink control channel ePDCCH or a physical uplink control channel.

Specifically, the information about the antenna port may be an antenna port associated with a CRS or a DMRS. For example, resource identification information 0 and 1 are respectively used to indicate that CRSs or DMRSs correspondingly used by antenna ports used by the physical channels are respectively a $CRS_0$ and a $CRS_1$, or CRS sets $\{CRS_{00}, CRS_{01}\}$ and $\{CRS_{00}, CRS_{11}\}$, or a $DMRS_0$ and a $DMRS_1$, or DMRS sets $\{DMRS_{00}, DMRS_{01}\}$ and $\{DMRS_{10}, DMRS_{11}\}$. Implementations and correspondences of the foregoing RSs are not limited in the present invention.

The user equipment obtains, from the synchronization signal, the information about the resource used by the one or more physical channels used by the user equipment. This can improve performance of receiving the one or more physical channels, or reduce implementation complexity of the user equipment, for example, avoid searching or detecting a plurality of similar physical channels.

The following uses an example in which the at least one piece of same information included in the synchronization signals transmitted on the at least two resource element groups is a cell identifier. The same information may be mapped to a ZC sequence, for example, mapped to a ZC sequence whose sequence length is not less than 36. For details, refer to (52) to (55). Using $N_{SS}=62$ as an example, the same information may be mapped to the ZC sequence shown in formula (56).

Optionally, the same information may be further mapped to a computer-generated CG sequence, for example, may be mapped to a CG sequence whose sequence length is less than 36. Specifically, the same information may be mapped to the sequence shown in formula (57). Specifically, using $N_{SS}=12$ and $N_{SS}=24$ as an example, parameters $\varphi(n)$ are shown in Table 1 and Table 2 respectively.

Optionally, the same information may be mapped to an m-sequence with different cyclic shifts, for example, may be mapped to an m-sequence whose sequence length is 31. Specifically, the same information may be mapped to the sequences shown in formulas (58) to (61).

Specifically, for example, the at least one piece of same information carried in the synchronization signals on the at least two resource element groups is a part of information $N_{ID}^{cell}$ mod M of a cell identifier, where M=3, and $N_{ID}^{cell}$ mod M=0, 1, 2. In this case, by using Table 3, the information may be mapped to three ZC sequences respectively as shown in formula (56), where root index (root index) values u of the ZC sequences are 25, 29, and 34 respectively. The sequence shown in formula (56) has a length of 62, and may be mapped to the first resource element group $REG_1$ and the second resource element group $REG_2$ respectively. 62 elements in the sequence may be mapped to 62 resource element positions. Using any two resource element groups $REG_1$ and $REG_2$ shown in formulas (6) to (49) as an example, sequence elements in RE positions $(k,l,n_s,n_f)$ in the resource element groups $REG_1$ and $REG_2$ are shown in formulas (62) and (63) respectively.

Optionally, the communication signals transmitted on the at least two resource element groups included in the resource configuration of the synchronization signal may further respectively carry different indication information, where the indication information may be resource identification information. For example, the first resource element group $REG_1$ and the second resource element group $REG_2$ are represented by resource identities (ResourceID) 0 and 1 respectively. Specifically, the same information $N_{ID}^{cell}$ mod 3 and the resource IDs respectively carried in the first resource element group $REG_1$ and the second resource element group $REG_2$ may be mapped to a same root sequence, but transformations represented on different resources vary. Different transformations may be different cyclic shifts, as shown in Table 4. Sequence elements in RE positions $(k,l,n_s,n_f)$ in the first resource element group $REG_1$ and the second resource element group $REG_2$ are shown in formulas (64) to (67) respectively. In addition, different transformations may be different phase shifts, and are not further illustrated herein. A method similar to Table 3 or 4 may be used to map the user equipment group identification information or other indication information to different synchronization signal sequences, for example, the ZC sequences or the CG sequences or the m-sequences. A length of the synchronization signal sequence is not limited to the foregoing 62, for example, may be $N_{sc}^{SS}=29$, $N_{sc}^{SS}=30$, and $N_{sc}^{SS}=31$. A quantity of REs in the resource element group may be 36, as shown in formulas (34) to (49). Therefore, by using the foregoing sequence, the same information or other indication information may be carried in the synchronization signal. In addition, the resource element RE in each resource element group is not necessarily limited to the resource grid structure currently defined in LTE. Other configured resource grid structures may be further included. For example, each subframe includes more slots, or duration of each slot is shorter, or each OFDM symbol is shorter, or each subcarrier spacing is longer. For example, K=4, the subcarrier spacing is 300 kHz, and the resource element group is shown in formulas (34) to (49).

Optionally, the determining, from a resource configuration of a synchronization signal, at least one resource element group for the synchronization signal may include but is not limited to the following implementations:

Implementation 1: Determine, from the resource configuration of the synchronization signal, the at least one resource element group based on signal quality of the synchronization signal on the resource element group.

For example, the signal quality may be received power. Using four resource element groups as an example, received power of the synchronization signal on the resource element group may be:

$$RP_i = \frac{1}{|REG_i|} \sum_{RE_n \in REG_i} |h_{RE_n}|^2, i = 1, \ldots, 4 \quad \text{formula (68)}$$

where $RP_i$ denotes received power of a synchronization signal on the resource element group $REG_i$, $h_{RE_n}$ is a channel estimation value on a resource element $RE_n$, $RE_n \in REG_i$ denotes that the resource element $RE_n$ belongs to the resource element group $REG_i$, and $|REG_i|$ is a size of the resource element group $REG_i$, namely, a quantity of resource elements included in the resource element group $REG_i$.

The user equipment may determine, from the resource configuration of the synchronization signal, one or two resource element groups with largest received power.

Implementation 2: Determine, from the resource configuration of the synchronization signal, the at least one resource element group based on detection or decoding performance of the synchronization signal on the resource element group.

For example, detection or decoding performance may be correlation detection or matched filtering performance. Using four resource element groups as an example, a sequence correlation value or a matched filtering value of the synchronization signal on the resource element group is:

$$R_i = \max_{j \in S} \frac{1}{|REG_i|} \left\{ \max_{k=1,\ldots,N_{S_j}} \left| \sum_{RE_n \in REG_i} h_{RE_n} d_{j_k}^*(n) \right|^2 \right\}, \quad \text{formula (69)}$$
$$i = 1, \ldots, 4$$

where $R_i$ denotes a sequence correlation value or a matched filtering value of a synchronization signal on a resource element group $REG_i$, and $h_{RE_n}$ is a channel estimation value on a resource element $RE_n$, $d_{j_k}^*(n)$ denotes a conjugate complex number of a $k^{th}$ sequence $d_{j_k}(n)$ used by the synchronization signal on the resource element group $REG_j$, and $N_{S_j}$ denotes a total quantity of sequences used by the synchronization signal on the resource element group $REG_j$, S is a set of indexes j of synchronization signals transmitted on all the resource element groups $REG_j$.

The user equipment may determine, from the resource configuration of the synchronization signal, one or two resource element groups with a largest correlation detection or matched filtering value.

It should be pointed out that, the at least one resource element group determined by the user equipment may be obtained in a synchronization signal receiving process, and is used for receiving the synchronization signal currently. Preferably, the user equipment may further store information about the resource element group determined currently, for use in next reception. The information about the resource element group determined currently is recorded or stored, and is used in a plurality of subsequent synchronization signal receiving processes. A difference in performance of receiving synchronization signals on different resource element groups generally changes slowly with propagation of a radio channel. Therefore, by recording or storing the information about the resource element group determined currently, implementation complexity of the user equipment can be reduced generally when good synchronization performance is ensured.

In addition, it should be pointed out that, by performing a hypothesis test, time or frequency synchronization may be performed by using a method similar to the foregoing.

Specifically, given a resource grid, N resource element group sets $REG_i'$ are obtained correspondingly, and M resource element groups with highest signal quality are selected from the N resource element group sets $REG_i'$. For example, signal quality of the resource element groups may be received power:

$$RP_i' = \frac{1}{|REG_i'|} \sum_{RE_n \in REG_i'} |h_{RE_n}|^2, i = 1, \ldots, N \quad \text{formula (70)}$$

where M is a positive integer less than or equal to N, for example, M=1 or M=2.

Further, based on detection or decoding performance of the synchronization signals on the resource element groups, the M resource element groups with highest signal quality, or indexes or identities of synchronization signals on the M resource element groups are determined. Specifically, the sequence number of the determined resource element group may be obtained according to the following formula:

$$j^* = \arg \max_{j \in S} \left\{ \max_{i=1,\ldots,M} \frac{1}{|REG_j|} \left[ \max_{k=1,\ldots,N_{S_j}} \left| \sum_{RE_n \in REG_{j_i}} h_{RE_n} d_{j_k}^*(n) \right|^2 \right] \right\} \quad \text{formula (71)}$$

where $j^*$ is the sequence number of the determined resource element group. Because resource element group $j^* \in S$, and each resource element RE in the $REG_{j^*}$ is known, positions of subcarriers and OFDM symbols may be obtained based on the obtained $REG_{j^*}$. Further, results of a plurality of slots or subframes or radio frames are accumulated by using the foregoing method, and therefore more precise time synchronization and frequency synchronization are achieved.

In addition, it should be pointed out that, a synchronization signal sequence may be modulated or scrambled and modulated and then carried in a synchronization signal. In this case, the sequences in formulas (69) and (71) are replaced with sequences obtained by modulating or scrambling and modulating synchronization signal sequences.

Optionally, the receiving the synchronization signal based on the at least one resource element group may include: if the at least one resource element group is one resource element group, receiving the synchronization signal based on the resource element group.

Specifically, the receiving the synchronization signal based on the resource element group may include: obtaining a corresponding sequence number by performing sequence correlation or matched filtering. For example, a sequence number of a synchronization signal carried in a resource element group j may be obtained according to the following formula:

$$k^* = \arg \max_{k=1,\ldots,N_{S_j}} \left| \sum_{RE_n \in REG_j} h_{RE_n} d_{j_k}^*(n) \right|^2 \quad \text{formula (72)}$$

where $k^*$ is a number of the synchronization signal carried in the determined resource element group j, and $h_{RE_n}$ is a channel estimation value on the resource element $RE_n$. $d_{j_k}^*(n)$ denotes a conjugate complex number of a $k^{th}$ sequence $d_{j_k}(n)$ used by the synchronization signal on the resource element group $REG_j$, and $N_{S_j}$ denotes a total quantity of sequences used by the synchronization signal on the resource element group $REG_j$. Using the sequence in Table 3 as an example, $d_{j_k}(n)$, k=0, 1, 2 corresponds to root index (root index) values 25, 29, and 34 in Table 3 respectively, and also corresponds to carried information $N_{ID}^{cell}$ mod 3 that is 0, 1, and 2 respectively. Therefore, the sequence with the root index value 25 makes the sequence correlation or matched filtering value $$\left| \sum_{RE_n \in REG_j} h_{RE_n} d_{j_k}^*(n) \right|^2$$

in (72) maximized, and therefore $k^*=0$ is obtained. Therefore, it can be known that $N_{ID}^{cell}$ mod 3 is equal to 0.

Optionally, the receiving the synchronization signal based on the at least one resource element group may specifically include: if the at least one resource element group is two resource element groups, receiving the synchronization signals based on the two resource element groups, where sequence correlation or matched filtering may be performed to obtain corresponding sequence numbers; for example, using two resource element groups i and j as an example, sequence numbers of synchronization signals carried in the resource element groups i and j may be obtained according to the following formula:

$$k^* = \arg \max_{k=1,\ldots,N_{S_j}} \left| \sum_{RE_n \in REG_i} h_{RE_n} d_{j_k}^*(n) + \sum_{RE_n \in REG_j} h_{RE_n} d_{j_k}^*(n) \right|^2 \quad \text{formula (73)}$$

where the synchronization signals carried in the resource element groups i and j have a same sequence, that is, $d_{i_k}(n) = d_{j_k}(n)$. $k^*$ is a number of a synchronization signal carried in the determined resource element group j, and $h_{RE_n}$ n is a channel estimation value on the resource element $RE_n$. $d_{j_k}^*(n)$ denotes a conjugate complex number of a $k^{th}$ sequence $d_{j_k}(n)$ used by the synchronization signal on the resource element group $REG_j$, and $N_{S_j}$ denotes a total quantity of sequences used by the synchronization signal on the resource element group $REG_j$. Using the sequence in Table 3 as an example, $d_{j_k}(n)$, k=0, 1, 2 corresponds root index (root index) values 25, 29, and 34 in Table 3 respectively, and also corresponds to carried information $N_{ID}^{cell}$ mod 3 that is 0, 1, and 2 respectively. Therefore, the sequence with the root index (root index) value 29 makes the sequence correlation or matched filtering value in (73) maximized, and therefore k=1 is obtained. Therefore, it can be known that $N_{ID}^{cell}$ mod is equal to 1.

In this embodiment of the present invention, the user equipment determines and receives the synchronization signal transmitted by the base station on at least one resource element group, to obtain the cell specific or user equipment group specific same information carried in the synchronization signal. The user equipment can determine at least one resource element group with favorable channel condition for the user equipment, and receive the synchronization signal from the at least one resource element group. Therefore, transmission reliability of the specific information or the synchronization signal between a user equipment within a cell (or a user equipment group) and the base station is improved.

The synchronization signal transmitted on each of the at least two resource element groups may further carry at least one piece of indication information. For example, the indication information is used to indicate identification information. The synchronization signals transmitted on the at least two resource element groups may carry at least one piece of indication information in addition to the same information. Assuming that the indication information is used to indicate the identification information used by the synchronization signal, the following describes the synchronization signal receiving method, and the synchronization signal sequence corresponding to the synchronization signal is shown in Table 4.

Optionally, the receiving the synchronization signal based on the at least one resource element group may include: if the at least one resource element group is one resource element group, receiving the synchronization signal based on the resource element group.

Specifically, the receiving the synchronization signal based on the resource element group may include: obtaining a corresponding sequence number by performing sequence correlation or matched filtering. For example, the sequence number of the synchronization signal carried in the resource element group j may be obtained according to the following formula:

$$(k^*, l^*) = \arg\max_{(k,l) \in C_j} \left| \sum_{RE_n \in REG_j} h_{RE_n} d^*_{j(k,l)}(n) \right|^2 \quad \text{formula (74)}$$

where k* and l* are the same information and indication information carried in the synchronization signal on the determined resource element group. For example, the same information and the indication information are $N_{ID}^{cell}$ mod 3 and the resource identifier in Table 4 respectively. $h_{RE_n}$ is a channel estimation value on the resource element RE. $d^*_{j_{(k,l)}}(n)$ denotes a conjugate complex number of a sequence $d_{j_{(k,l)}}(n)$ used by the synchronization signal on the resource element group $REG_j$, and $d_{j_{(k,l)}}(n)$ denotes a sequence corresponding to the same information k and indication information l carried in the synchronization signal on the resource element group $REG_j$. $C_j$ denotes a set of 2-tuples (k,l) of the same information and the indication information carried in the synchronization signal on the resource element group $REG_j$. Using the sequence in Table 4 as an example, k=0, 1, 2 corresponds to root index values 25, 29, and 34 in Table 4 respectively, and also corresponds to the carried information $N_{ID}^{cell}$ mod 3 that is 0, 1, and 2 respectively. l=0, 1 corresponds to cyclic shift values $n_0$ and $n_1$ in Table 4 respectively, and also corresponds to carried resource indication information that is 0 and 1 respectively.

Optionally, the receiving the synchronization signal based on the at least one resource element group may specifically include: if the at least one resource element group is two resource element groups, receiving the synchronization signals based on the two resource element groups, where sequence correlation or matched filtering may be performed to obtain corresponding sequence numbers; for example, using two resource element groups i and j as an example, sequence numbers of synchronization signals carried in the resource element groups i and j may be obtained according to the following formula:

$$(k^*, l_i^*, l_j^*) = \arg\max_{\{(k,l_i,l_j) | (k,l_i) \in C_i, (k,l_j) \in C_j\}} \quad \text{formula (75)}$$

-continued $$\left| \sum_{RE_n \in REG_i} h_{RE_n} d^*_{i(k,l_i)}(n) + \sum_{RE_n \in REG_j} h_{RE_n} d^*_{j(k,l_j)}(n) \right|^2$$

where k* and $l_i^*, l_j^*$ are the same information and two pieces of indication information carried in the synchronization signal on the determined resource element group. For example, the same information and the indication information are $N_{ID}^{cell}$ mod 3 and two resource identities (Resource ID) 0 and 1 in Table 4 respectively. $h_{RE_n}$ is a channel estimation value on the resource element $RE_n$.

$$d^*_{j_{(k,l_j)}}(n)$$

denotes a conjugate complex number of a sequence $$d_{j_{(k,l_j)}}(n)$$

used by the synchronization signal on the resource element group $REG_j$, and $d_{j_{(k,l)}}(n)$ denotes a sequence corresponding to the same information k and indication information $l_j$ carried in the synchronization signal on the resource element group $REG_j$. $C_j$ denotes a set of 2-tuples (k,l) of the same information and the indication information carried in the synchronization signal on the resource element group $REG_j$. Using the sequence in Table 4 as an example, k=0, 1, 2 corresponds to root index (root index) values 25, 29, and 34 in Table 4 respectively, and also corresponds to the carried information $N_{ID}^{cell}$ mod 3 that is 0, 1, and 2 respectively. l=0, 1 corresponds to cyclic shift values $n_0$ and $n_1$ in Table 4 respectively, and also corresponds to carried resource indication information that is 0 and 1 respectively.

In this embodiment of the present invention, the base station transmits the synchronization signal on each resource element group included in the resource configuration of the synchronization signal to the user equipment, where the resource configuration includes at least two different resource element groups, and each synchronization signal carries at least one piece of cell specific or user equipment group specific information and carries at least one piece of indication information. As described above, according to the apparatus provided in this embodiment of the present invention, transmission reliability of the synchronization signal between user equipment within the cell (or the user equipment group) and the base station can be effectively improved, and therefore precision of time synchronization and/or frequency synchronization and reliability of receiving the cell specific or user equipment group specific information carried in the synchronization signal are improved.

The following uses a broadcast channel as an example to describe in detail the transmitting method shown in FIG. 1. The communication signal in the transmitting method shown in FIG. 1 is a broadcast channel.

The at least one piece of same information is at least one of the following: a part or all of information of a system bandwidth, a system frame number, physical channel configuration indication information, or a master information block.

Specifically, the broadcast channel may be a physical broadcast channel. Optionally, the physical channel configuration indication information may be configuration information of a physical channel such as a PCFICH (physical control format indicator channel) or a reference signal set.

For ease of description, in the resource configuration of the broadcast channel, each resource element group may be represented by a set of position 4-tuples $(k,l,n_s,n_f)$ of resource elements. For the frame structure of the system and various related parameters, refer to the embodiment of the synchronization signal transmitting method. Details are not further described herein.

Specifically, at least two resource element groups included in the resource configuration of the broadcast channel may be respectively located in different system frames, or different radio frames, or different subframes, or different slots in a same subframe, or different OFDM symbols in a same slot, or different subcarriers in a same slot, or different physical resource blocks PRBs in a same slot.

For example, $N_{sc}^{RB}=12$, $N_{symb}^{RB}=7$, $N_{slot}^{F}=20$, and the resource configuration of the broadcast channel includes two resource element groups $REG_1$ and $REG_2$. The first resource element group $REG_1$ and the first resource element group $REG_2$ may be respectively:

$$REG_1 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 1, n_f \bmod(4N) = i; \right\} \quad \text{formula (76)}$$

$$REG_2 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 3, n_f \bmod(4N) = i; \right\} \quad \text{formula (77)}$$

or $$REG_1 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 1, n_f \bmod(4N) = i; \right\} \quad \text{formula (78)}$$

$$REG_2 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 4, 5, 6; n_s = 1, n_f \bmod(4N) = i; \right\} \quad \text{formula (79)}$$

or $$REG_1 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 1, n_f \bmod(4N) = i; \right\} \quad \text{formula (80)}$$

$$REG_2 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 1, n_f \bmod(4N) = j; \right\} \quad \text{formula (81)}$$

or $$REG_1 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 3, n_f \bmod(4N) = i; \right\} \quad \text{formula (82)}$$

$$REG_2 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 1, n_f \bmod(4N) = j; \right\} \quad \text{formula (83)}$$

or $$REG_1 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 1, n_f \bmod(4N) = i; \right\} \quad \text{formula (84)}$$

$$REG_2 = \left\{(k, l, n_s, n_f) \mid k = \frac{N_{RB}^{BW} N_{sc}^{RB}}{2} + 36 + k', k' = 0, \right. \\ \left. 1, \ldots, 71; l = 0, 1, 2, 3; n_s = 1, n_f \bmod(4N) = j; \right\} \quad \text{formula (85)}$$

or $$REG_1 = \left\{(k, l, n_s, n_f) \mid k = \frac{N_{RB}^{BW} N_{sc}^{RB}}{2} - 36 + k', k' = 0, \right. \\ \left. 1, \ldots, 71; l = 0, 1, 2, 3; n_s = 1, n_f \bmod(4N) = i; \right\} \quad \text{formula (86)}$$

$$REG_2 = \left\{(k, l, n_s, n_f) \mid k = \frac{N_{RB}^{BW} N_{sc}^{RB}}{2} - 108 + k', k' = 0, \right. \\ \left. 1, \ldots, 71; l = 0, 1, 2, 3; n_s = 1, n_f \bmod(4N) = j; \right\} \quad \text{formula (87)}$$

For example, $N_{sc}^{RB}=6$, $N_{symb}^{RB}=7$, and $N_{slot}^{F}=40$. The two resource element groups $REG_1$ and $REG_2$ included in the resource configuration of the broadcast channel may be respectively:

$$REG_1 = \left\{(k, l, n_s, n_f) \mid k = \frac{N_{RB}^{BW} N_{sc}^{RB}}{2} - 18 + k', k' = 0, \right. \\ \left. 1, \ldots, 35; l = 0, 1, 2, 3; n_s = 1, 3, n_f \bmod(4N) = i; \right\} \quad \text{formula (88)}$$

$$REG_2 = \left\{(k, l, n_s, n_f) \mid k = \frac{N_{RB}^{BW} N_{sc}^{RB}}{2} - 18 + k', k' = 0, \right. \\ \left. 1, \ldots, 35; l = 0, 1, 2, 3; n_s = 6, 8, n_f \bmod(4N) = i; \right\} \quad \text{formula (89)}$$

or $$REG_1 = \left\{(k, l, n_s, n_f) \mid k = \frac{N_{RB}^{BW} N_{sc}^{RB}}{2} - 18 + k', k' = 0, \right. \\ \left. 1, \ldots, 36; l = 0, 1, 2, 3; n_s = 1, 3, n_f \bmod(4N) = i; \right\} \quad \text{formula (90)}$$

$$REG_2 = \left\{(k, l, n_s, n_f) \mid k = \frac{N_{RB}^{BW} N_{sc}^{RB}}{2} - 18 + k', k' = 0, \right. \\ \left. 1, \ldots, 35; l = 4, 5, 6; n_s = 1, 3, n_f \bmod(4N) = i; \right\} \quad \text{formula (91)}$$

or $$REG_1 = \left\{(k, l, n_s, n_f) \mid k = \frac{N_{RB}^{BW} N_{sc}^{RB}}{2} - 18 + k', k' = 0, \right. \quad \text{formula (92)}$$
$$\left. 1, \ldots, 35; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} - 18 + k', k' = 0, \right. \quad \text{formula (93)}$$
$$\left. 1, \ldots, 35; l = 0, 1, 2, 3; n_s = 1, 3, n_f \bmod(4N) = j; \right\}$$

or $$REG_1 = \left\{(k, l, n_s, n_f) \mid k = \frac{N_{RB}^{BW} N_{sc}^{RB}}{2} - 18 + k', k' = 0, \right. \quad \text{formula (94)}$$
$$\left. 1, \ldots, 35; l = 0, 1, 2, 3; n_s = 6, 8, n_f \bmod(4N) = i; \right\}$$

$$REG_2 = \left\{(k, l, n_s, n_f) \mid k = \frac{N_{RB}^{BW} N_{sc}^{RB}}{2} - 18 + k', k' = 0, \right. \quad \text{formula (95)}$$
$$\left. 1, \ldots, 35; l = 0, 1, 2, 3; n_s = 1, 3, n_f \bmod(4N) = j; \right\}$$

or $$REG_1 = \left\{(k, l, n_s, n_f) \mid k = \frac{N_{RB}^{BW} N_{sc}^{RB}}{2} - 18 + k', k' = 0, \right. \quad \text{formula (96)}$$
$$\left. 1, \ldots, 35; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} + 18 + k', k' = 0, \right. \quad \text{formula (97)}$$
$$\left. 1, \ldots, 35; l = 0, 1, 2, 3; n_s = 1, 3, n_f \bmod(4N) = j; \right\}$$

or $$REG_1 = \left\{(k, l, n_s, n_f) \mid k = \frac{N_{RB}^{BW} N_{sc}^{RB}}{2} - 18 + k', k' = 0, \right. \quad \text{formula (98)}$$
$$\left. 1, \ldots, 35; l = 0, 1, 2, 3; n_s = 1, 3, n_f \bmod(4N) = i; \right\}$$

$$REG_2 = \left\{(k, l, n_s, n_f) \mid k = \frac{N_{RB}^{BW} N_{sc}^{RB}}{2} - 54 + k', k' = 0, \right. \quad \text{formula (99)}$$
$$\left. 1, \ldots, 35; l = 0, 1, 2, 3; n_s = 1, 3, n_f \bmod(4N) = j; \right\}$$

where a parameter i is not equal to a parameter j, values of the parameters i and j are both in a range of 0 to 4N−1, and a positive integer N in formulas (76) to (99) is a positive integer greater than or equal to 1.

It should be understood that, optionally, use of resource elements occupied by a reference signal should be avoided on the first resource element group $REG_1$ and the second resource element group $REG_2$. For example, the first resource element group $REG_1$ and the second resource element group $REG_2$ may be resource element groups obtained after resource elements occupied by a reference signal CRS are excluded, as shown in formulas (76) to (99).

Optionally, broadcast channels transmitted on the at least two resource element groups included in the resource configuration of the broadcast channel may be transmitted by using different antenna ports. Specifically, the broadcast channel transmitted on the resource element group $REG_i$ may be transmitted by using an antenna port $P_j$. Specifically, the relationship shown in formula (50) exists between the resource element group $REG_i$ and the used antenna port $P_j$.

Specifically, using broadcast channels transmitted on the first resource element group $REG_1$ and the second resource element group $REG_2$ as an example, the broadcast channel transmitted on the first resource element group $REG_1$ may be transmitted by using the antenna port group $PG_1=\{P_0, P_1\}$, and the broadcast channel transmitted on the second resource element group $REG_2$ may be transmitted by using the antenna port group $PG_2=\{P_2, P_3\}$. Antenna ports $P_0$, $P_1$, $P_2$, and $P_3$ may respectively use cell specific reference signals. For example, the antenna ports $P_0$, $P_1$, $P_2$, and $P_3$ respectively use reference signals $CRS_0$, $CRS_1$, $CRS_2$, and $CRS_3$ in the LTE R8 system. The antenna ports $P_0$, $P_1$, $P_2$, and $P_3$ may also use dedicated reference signals respectively, for example, may respectively correspond to a $DMRS_0$, a $DMRS_1$, a $DMRS_2$, and a $DMRS_3$.

Optionally, broadcast channels transmitted on the at least two resource element groups in the resource configuration of the broadcast channel may be transmitted by using different beams or beam groups. Specifically, the broadcast channel transmitted on the resource element group $REG_i$ may be transmitted by using a beam $B_j$. Specifically, the relationship shown in formula (51) exists between the resource element group $REG_i$ and the used beam $B_j$. Using broadcast channels transmitted on four resource element groups $REG_i$, where i=0, 1, 2, 3, as an example: the broadcast channels transmitted on the resource element groups $REG_i$, where i=0, 1, 2, 3, may be transmitted respectively by using beams $B_i$, where i=0, 1, 2, 3.

Optionally, broadcast channels transmitted on the at least two resource element groups in the resource configuration of the broadcast channel may be transmitted by using a same antenna port group but different precoding or beam groups, where the beam group includes at least one beam. For example, the broadcast channel transmitted on the first resource element group $REG_1$ may be transmitted by using a beam group $BG_0=\{B_0\}$, and the broadcast channel transmitted on the second resource element group $REG_2$ may be transmitted by using a beam group $BG_1=\{B_1\}$.

Further, optionally, the broadcast channels transmitted on the at least two resource element groups in the resource configuration of the broadcast channel may be transmitted by using different antenna port groups, where different antenna port groups may use different beams. For example, the broadcast channel transmitted on the first resource element group $REG_1$ may be transmitted by using the antenna port group $PG_1=\{P_0, P_1\}$, where the signal on the antenna port group $PG_1$ is transmitted by using the beam $B_0$; and the broadcast channel transmitted on the second resource element group $REG_2$ may be transmitted by using the antenna port group $PG_2=\{P_2, P_3\}$, where the signal on the antenna port group $PG_2$ is transmitted by using the beam $B_1$.

Specifically, for the foregoing beam, which different beam shapes or beam directions are used in the system may be designed flexibly according to deployment. For example, more beams are used, so that the beams evenly cover the cell or the area in which the user equipment group is located.

Further, the broadcast channels transmitted on each of the at least two resource element groups may carry at least one piece of indication information in addition to the same information, where the indication information may be used to indicate information about resources used by the broadcast channels. Specifically, the information about the resource used by the broadcast channel may be at least one or a combination of the following: identification information of the broadcast channel, where for example, an identifier of the broadcast channel may be 1, 2, 3, . . . , N, and a specific identification method is not limited in the present invention, for example, identities of the broadcast channels using the resource element group $REG_i$, where i=1, 2, 3, are 1, 2, and 3 respectively; information about a resource element group used by the broadcast channel, for example, a number or an index of the used resource element group; information about an antenna port or an antenna port group used by the broadcast channel, for example, an antenna port number, information about an antenna port array structure such as a quantity of antenna ports or an arrangement manner of antenna ports or a polarization type of antenna ports (vertical polarization or cross polarization or interleaved polarization), or a reference signal used by the antenna port, or a reference signal sequence group used by the antenna port or a beam group used by the antenna port or precoding used by the antenna port; information about a beam used by the broadcast channel, for example, an index of a beam group, or a quantity of beams, or a specific parameter of a beam such as a beam width, or a weight vector used for implementing the used beam, or the like; information about precoding used by the broadcast channel, where the information about the precoding may be an index of a precoding matrix, or a quantity of layers or a quantity of columns of a precoding matrix, or a rank (Rank) of the precoding, or the like; and information about a time-frequency position used by the broadcast channel, for example, an offset of a slot or a subframe or an OFDM symbol of the broadcast channel transmitted on the resource element group in a transmission period of the broadcast channel, or an offset of a subcarrier or a physical resource block relative to a used subband or a system center. It should be understood that the offset may be represented by a code.

Optionally, the broadcast channel transmitted on each of the at least two resource element groups further carries at least one piece of indication information, where the indication information is used to indicate information about a resource used by one or more physical channels used by the user equipment or information about a resource used by one or more physical signals used by the user equipment; and the information about the resource used by the physical channel or the physical signal may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or information about an antenna port group used by the physical channel or the physical signal, or information about precoding used by the physical channel or the physical signal, or information about a beam group used by the physical channel or the physical signal, or information about a time-frequency position used by the physical channel or the physical signal.

For example, the indication information is used to indicate information about an antenna port used by one or more physical channels used by the user equipment. For example, the indication information indicates information about an antenna port or information about a reference signal used by a physical control format indicator channel (PCFICH) or a physical downlink control channel (PDCCH) or an enhanced physical downlink control channel (ePDCCH) or a physical uplink control channel (PUCCH).

Specifically, the information about the antenna port may be an antenna port associated with a CRS or a DMRS. For example, resource identification information 0 and 1 are respectively used to indicate that CRSs or DMRSs correspondingly used by antenna ports used by the physical channels are respectively the $CRS_0$ and the $CRS_1$, or CRS sets $\{CRS_{00}, CRS_{01}\}$ and $\{CRS_{10}, CRS_{11}\}$, or the $DMRS_0$ and the $DMRS_1$, or DMRS sets $\{DMRS_{00}, DMRS_{01}\}$ and $\{DMRS_{10}, DMRS_{11}\}$. Implementations and correspondences of the foregoing RSs are not specifically limited in the present invention.

Optionally, the broadcast channels transmitted on the at least two resource element groups carry at least one piece of same information, and may be encoded by using convolutional codes or turbo codes, and after being modulated, are mapped to resource elements included in the corresponding resource element groups.

Optionally, the broadcast channels transmitted on the at least two resource element groups carry at least one piece of same information, and a cyclic redundancy check may be further added before encoding is performed. The CRC may be 16 bits or 24 bits.

Optionally, the broadcast channels transmitted on the at least two resource element groups may carry at least one piece of indication information in addition to the same information, where the at least one piece of indication information may be carried in broadcast messages of the broadcast channels respectively. Specifically, the carried at least one piece of indication information and the carried at least one piece of same information are jointly encoded. For example, that the at least one piece of indication information and the at least one piece of same information are jointly encoded may be that channel encoding is performed after the at least one piece of indication information and the at least one piece of same information are concatenated, or that channel encoding is performed after the at least one piece of indication information repeatedly encoded and the at least one piece of same information are concatenated. The concatenation may be sequential concatenation or may be interleaved concatenation.

Optionally, the broadcast channels transmitted on the at least two resource element groups may carry at least one piece of indication information in addition to the same information, where the at least one piece of indication information may be represented by different CRC masks (Mask). Specifically, CRC parity bits corresponding to the same information carried in the broadcast channel may be $p_n$, where n=0, 1, 2, . . . , $N_{CRC}-1$ respectively. A CRC mask corresponding to the indication information is $b_n$, where n=0, 1, 2, . . . , $N_{CRC}-1$. In this case, after scrambling is performed by using the CRC mask, the following bit sequence is formed:

$$c_n = (p_n + b_n) \bmod 2, n=0,1,2,\ldots,N_{CRC}-1 \qquad \text{formula (100)}$$

For example, CRC masks corresponding to the 16-bit CRC and the 24-bit CRC are shown in Table 5 and Table 6 respectively. The indication information is the same as that described above. For example, the indication information may be the antenna port group $PG_i$ or the beam group $BG_i$ used by the broadcast channel, or the antenna port group $PG_i$ or the beam group $BG_i$ used by the indicated one or more physical channels such as a control channel, and the indication information i=0, 1, 2, 3 respectively corresponds to the $PG_i$ or the $BG_i$.

TABLE 5

| Indication | CRC mask $<b_0, b_1, \ldots, b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |
| 2 | <0, 1, 0, 1, 0, 1, 0, 1, 0, 1, 0, 1, 0, 1, 0, 1> |
| 3 | <1, 0, 1, 0, 1, 0, 1, 0, 1, 0, 1, 0, 1, 0, 1, 0> |
| 4 | <0, 0, 1, 1, 0, 0, 1, 1, 0, 0, 1, 1, 0, 0, 1, 1> |
| 5 | <1, 1, 0, 0, 1, 1, 0, 0, 1, 1, 0, 0, 1, 1, 0, 0> |

TABLE 6

| Indication | CRC mask $<b_0, b_1, \ldots, b_{23}>$ |
|---|---|
| 0 | <0, 0, 0, 0, 0, 0, 0, 0, 0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1, 1, 1, 1, 1, 1, 1, 1, 1> |
| 2 | <0, 1, 0, 1, 0, 1, 0, 1, 0, 1, 0, 1, 0, 1, 0, 1, 0, 1, 0, 1, 0, 1, 0, 1> |
| 3 | <1, 0, 1, 0, 1, 0, 1, 0, 1, 0, 1, 0, 1, 0, 1, 0, 1, 0, 1, 0, 1, 0, 1, 0> |
| 4 | <0, 0, 1, 1, 0, 0, 1, 1, 0, 0, 1, 1, 0, 0, 1, 1, 0, 0, 1, 1, 0, 0, 1, 1> |
| 5 | <1, 1, 0, 0, 1, 1, 0, 0, 1, 1, 0, 0, 1, 1, 0, 0, 1, 1, 0, 0, 1, 1, 0, 0> |

Optionally, the broadcast channel transmitting method may further include: transmitting a reference signal set to the user equipment, so that the user equipment determines a resource indication based on the reference signal set, where the resource indication corresponds to the broadcast channel transmitted on at least one resource element group in the resource configuration of the broadcast channel.

Optionally, the reference signal set may be a cell specific reference signal set, such as the CRS set in the LTE R8 system or the CSI RS set in the LTE R10 system.

Optionally, the resource indication may be channel state information, and the CSI includes a rank indicator RI and/or a precoding matrix indicator PMI, where the PMI corresponds to a precoding matrix in a codebook, for example, a precoding matrix in a 4-antenna or 8-antenna codebook in the LTE system.

A correspondence between the resource indication and the at least one resource element group included in the resource configuration of the broadcast channel may be predefined (predefined), for example, as shown in Table 7 or Table 8.

TABLE 7

| PMI | Resource element group |
|---|---|
| 0 | $REG_0$ |
| 1 | $REG_1$ |
| 2 | $REG_2$ |
| 3 | $REG_3$ |

TABLE 8

| RI | PMI | Resource element group |
|---|---|---|
| 1 | 0 | $REG_0$ |
|  | 1 | $REG_1$ |
|  | 2 | $REG_2$ |
|  | 3 | $REG_3$ |
| 2 | 0 | $REG_4$ |
|  | 1 | $REG_5$ |
|  | 2 | $REG_6$ |
|  | 3 | $REG_7$ |

The correspondence between the resource indication and the at least one resource element group included in the resource configuration of the broadcast channel may be notified by the base station to the user equipment by using higher layer signaling such as RRC signaling or downlink control information DCI.

Optionally, the broadcast channel transmitting method may further include: transmitting a synchronization signal set to the user equipment, where the synchronization signal set includes at least one synchronization signal corresponding to the broadcast channel transmitted on the at least one resource element group in the resource configuration of the broadcast channel.

Optionally, a correspondence between the synchronization signal and the broadcast channel may be predefined. Specifically, for example, the synchronization signal set includes a first synchronization signal and a second synchronization signal, and the resource configuration of the broadcast channel includes two resource element groups; in this case, the correspondence may be: the first synchronization signal corresponds to the broadcast channel transmitted on the first resource element group $REG_1$, and the second synchronization signal corresponds to the broadcast channel transmitted on the second resource element group $REG_2$. For example, a fixed resource correspondence exists between the first synchronization signal and the first resource element group $REG_1$. For example, a fixed time sequence relationship exists between the first synchronization signal and the first resource element group $REG_1$, and a first OFDM symbol in which the first resource element group $REG_1$ is located is always located in a symbol position previous to a first OFDM symbol used by the first synchronization signal. Correspondingly, a similar resource correspondence exists between the second synchronization signal and the second resource element group $REG_2$. Optionally, a resource correspondence between the synchronization signal $SS_j$ and the resource element group $REG_i$ may also be shown in formula (5').

Optionally, the correspondence between the synchronization signal and the broadcast channel may be notified by the base station to the user equipment, for example, may be notified by using a broadcast message, or higher layer signaling such as RRC signaling, or downlink control information DCI.

Optionally, the at least one synchronization signal included in the synchronization signal set may further carry at least one piece of indication information, where the indication information is used to indicate information about a resource used by the broadcast channel transmitted on the at least one resource element group.

Specifically, the indication information is used to indicate information about a resource used by the broadcast channel transmitted on the at least one resource element group. The information about the resource may be: identification information of the broadcast channel, or information about a resource element group used by the broadcast channel, or information about an antenna port or an antenna port group used by the broadcast channel, or information about a sequence or a sequence group used by the broadcast channel, or information about a beam group used by the broadcast channel, or one or more physical channels used by the user equipment, or information about an antenna port used by one or more physical channels, for example, used to indicate an antenna port used by the broadcast channel or the control channel, or used to indicate an offset of a slot or a subframe or an OFDM symbol in which the resource element group of the broadcast channel is located in a transmission period of the broadcast channel, or an offset of a subcarrier or a physical resource block relative to the used subband or system center. Details are similar to the descriptions in the foregoing synchronization signal transmitting method, and are not further described herein.

In this embodiment of the present invention, the base station transmits the broadcast channels to the user equipment by using a plurality of resources including at least two resource element groups. The user equipment can receive, by measuring a broadcast channel transmitted on a resource element group with favorable channel condition for the user equipment, the cell (or user equipment group) specific same information, or receive the cell (or user equipment group) specific same information via combinatorial reception of the communication signals transmitted on the at least two resource element groups. Therefore, transmission reliability of the cell (or user equipment group) specific information or the broadcast channel is effectively improved.

The following uses a broadcast channel as an example to describe in detail the receiving method shown in FIG. 6. The communication signal in the receiving method shown in FIG. 6 is a broadcast channel. The at least one piece of same information carried in the transmitted broadcast channel is at least one of the following: a part or all of information of a system bandwidth, a system frame number, physical channel configuration indication information, or a master information block.

Specifically, the broadcast channel may be a physical broadcast channel. Optionally, the physical channel configuration indication information may be configuration information of a physical channel such as a PCFICH or a reference signal set.

The user equipment determines at least one resource element group for the broadcast channel, and receives, on the determined resource element group, the broadcast channel transmitted by the base station.

Specifically, at least two resource element groups in the resource configuration of the broadcast channel may be respectively located in different radio frames, or different system frames, or different subframes, or different slots in a same subframe, or different OFDM symbols in a same slot, or different subcarriers in a same slot, or physical resource blocks in a same slot.

For example, $N_{sc}^{RB}=12$, $N_{symb}^{RB}=7$, $N_{slot}^{F}=20$, and the resource configuration of the broadcast channel includes two resource element groups $REG_1$ and $REG_2$. The first resource element group $REG_1$ and the first resource element group $REG_2$ may be shown in formulas (76) to (87) respectively. For example, $N_{sc}^{RB}=6$, $N_{symb}^{RB}=7$, and $N_{slot}^{F}=40$. The two resource element groups included in the resource configuration of the communication signal may be shown in formulas (88) to (99) respectively.

It should be understood that, optionally, use of resource elements occupied by a reference signal should be avoided on the first resource element group $REG_1$ and the second resource element group $REG_2$. For example, the first resource element group $REG_1$ and the second resource element group $REG_2$ may be resource element groups obtained after the resource elements occupied by the reference signal are excluded, as shown in formulas (76) to (99).

Optionally, the user equipment may respectively receive, by using different antenna ports or antenna port groups, broadcast channels transmitted on the at least two resource element groups included in the resource configuration of the broadcast channel. Specifically, the broadcast channel transmitted on the resource element group $REG_i$ may be received by using an antenna port $P_j$. Specifically, the relationship shown in formula (50) exists between the resource element group $REG_i$ and the used antenna port $P_j$.

Specifically, using broadcast channels transmitted on the first resource element group $REG_1$ and the second resource element group $REG_2$ as an example, the broadcast channel transmitted on the first resource element group $REG_1$ may be received by using the antenna port group $PG_1=\{P_0, P_1\}$, and the broadcast channel transmitted on the second resource element group $REG_2$ may be received by using the antenna port group $PG_2=\{P_2, P_3\}$. Antenna ports $P_0$, $P_1$, $P_2$, and $P_3$ may respectively use cell specific reference signals. For example, the antenna ports $P_0$, $P_1$, $P_2$, and $P_3$ respectively use reference signals $CRS_0$, $CRS_1$, $CRS_2$, and $CRS_3$ in the LTE R8 system. The antenna ports $P_0$, $P_1$, $P_2$, and $P_3$ may also use dedicated reference signals respectively, for example, may respectively correspond to a $DMRS_0$, a $DMRS_1$, a $DMRS_2$, and a $DMRS_3$.

Optionally, the user equipment may respectively receive, on the at least two resource element groups in the resource configuration of the broadcast channel, broadcast channels transmitted by using different beams or beam groups. Specifically, the relationship shown in formula (51) exists between the resource element group $REG_i$ and a used beam $B_j$. Based on the relationship, the user equipment may receive, on the resource element group $REG_i$, the broadcast channel transmitted by using the beam $B_j$.

Further, the user equipment may receive, by using a same antenna port group, the broadcast channels transmitted by the base station on the first resource element group $REG_1$ and the second resource element group $REG_2$ respectively by using different precoding or different beam groups, where the beam group includes at least one beam. Alternatively, the user equipment may receive, by using different antenna port groups, the broadcast channels transmitted by the base station on the first resource element group $REG_1$ and the second resource element group $REG_2$ by using different precoding or different beam groups.

Further, the broadcast channels transmitted on the at least two resource element groups may carry at least one piece of indication information in addition to the same information, where the indication information may be used to indicate information about resources used by the broadcast channels. Specifically, the information about the resource used by the broadcast channel may be at least one of the following: identification information of the broadcast channel, where for example, an identifier of the broadcast channel may be 1, 2, 3, . . . , N, and a specific identification method is not limited in the present invention, for example, identifiers of the broadcast channels using the resource element group $REG_i$, where i=1, 2, 3, are 1, 2, and 3 respectively; information about a resource element group used by the broadcast channel, for example, a number or an index of the used resource element group; information about an antenna port or an antenna port group used by the broadcast channel, for example, an antenna port number, information about an antenna port array structure such as a quantity of antenna ports or an arrangement manner of antenna ports or a polarization type of antenna ports (vertical polarization or cross polarization or interleaved polarization), or a reference signal used by the antenna port, or a reference signal sequence group used by the antenna port or a beam group used by the antenna port or precoding used by the antenna port; information about a beam used by the broadcast channel, for example, an index of a beam group, or a quantity of beams, or a specific parameter of a beam such as a beam width, or a weight vector used for implementing the used beam, or the like; information about precoding used by the broadcast channel, where the information about the precoding may be an index of a precoding matrix, or a quantity of layers or a quantity of columns of a precoding matrix, or a rank (Rank) of the precoding, or the like; and information about a time-frequency position used by the broadcast channel, for example, an offset of a slot or a subframe or an OFDM symbol of the broadcast channel transmitted on the resource element group in a transmission period of the broadcast channel, or an offset of a subcarrier or a physical resource block relative to a used subband or a system center subcarrier. It should be understood that the offset may be represented by a code.

Optionally, the broadcast channel transmitted on each of the at least two resource element groups further carries at least one piece of indication information, where the indication information is used to indicate information about a resource used by one or more physical channels used by the user equipment or information about a resource used by one or more physical signals used by the user equipment; and the information about the resource used by the physical channel or the physical signal may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or information about an antenna port group used by the physical channel or the physical signal, or information about precoding used by the physical channel or the physical signal, or information about a beam group used by the physical channel or the physical signal, or information about a time-frequency position used by the physical channel or the physical signal.

For example, the indication information is used to indicate information about an antenna port used by one or more physical channels used by the user equipment. For example, the indication information indicates information about an antenna port or information about a reference signal used by a physical control format indicator channel (PCFICH) or a physical downlink control channel (PDCCH) or an enhanced physical downlink control channel (ePDCCH) or a physical uplink control channel (PUCCH).

Specifically, the information about the antenna port may be an antenna port associated with a CRS or a DMRS. For example, resource identification information 0 and 1 are respectively used to indicate that CRSs or DMRSs correspondingly used by antenna ports used by the physical channels are respectively the $CRS_0$ and the $CRS_1$, or CRS sets $\{CRS_{00}, CRS_{01}\}$ and $\{CRS_{10}, CRS_{11}\}$, or the $DMRS_0$ and the $DMRS_1$, or DMRS sets $\{DMRS_{00}, DMRS_{01}\}$ and $\{DMRS_{10}, DMRS_{11}\}$. Implementations and correspondences of the foregoing RSs are not specifically limited in the present invention.

The user equipment obtains, from the broadcast channel, the information about the resource used by the broadcast channel. This can reduce complexity of receiving the broadcast message by the user or improve reliability of receiving the broadcast message by the user. For example, the identification information of the broadcast channel or the information about the resource element group used by the broadcast channel received by the user equipment can be used in a plurality of subsequent broadcast channel receiving processes and does not need to be redetermined. This is because the information changes slowly with propagation of a radio channel.

Optionally, the determining, from a resource configuration of a communication signal, at least one resource element group for the communication signal may specifically include: determining the at least one resource element group from the resource configuration of the broadcast channel based on signal quality of the broadcast channel on the resource element group.

For example, the signal quality may be received power. Using four resource element groups as an example, received power of the broadcast channel on the resource element group may be shown in formula (68), where $RP_i$ denotes received power of a broadcast channel on the resource element group $REG_i$, $h_{RE_n}$ is a channel estimation value on a resource element $R_{En}$, $RE_n \in REG_i$ denotes that the resource element RE belongs to the resource element group $REG_i$, and $|REG_i|$ is a size of the resource element group $REG_i$, namely, a quantity of resource elements included in the resource element group $REG_i$.

The user equipment may determine, from the resource configuration of the broadcast channel, one or two resource element groups with largest received power.

In addition to received power, the signal quality of the broadcast channel may be received strength or received quality, or may be an average of received power or received strength or received quality on all resource elements in the resource element group corresponding to the broadcast channel. The signal quality of the broadcast channel may also be reference signal received power or a reference signal strength indicator or reference signal received quality corresponding to the broadcast channel.

Optionally, the determining, from a resource configuration of a broadcast channel, at least one resource element group for the communication signal may also specifically include: determining the at least one resource element group from the resource configuration of the broadcast channel based on detection or decoding performance of the broadcast channel on the resource element group.

For example, the detection or decoding performance may be decoding performance of turbo codes or convolutional codes, for example, a CRC check result or BLER performance corresponding to an effective SINR. The user equipment may determine, from the resource configuration of the broadcast channel, one or two resource element groups with highest decoding performance.

It should be pointed out that, the at least one resource element group determined by the user equipment may be obtained in a broadcast channel receiving process, and is used for receiving the broadcast channel currently. Optionally, the user equipment may further store information about the resource element group determined currently, for use in next reception. The information about the resource element group determined currently is recorded or stored, and is used in a plurality of subsequent communication signal receiving processes. A difference in performance of receiving broadcast channels on different resource element groups generally changes slowly with propagation of a radio channel. Therefore, by recording or storing the information about the resource element group determined currently, implementation complexity of the user equipment can be reduced generally.

Optionally, the broadcast channels transmitted on the at least two resource element groups may carry at least one piece of indication information in addition to the same information, where the at least one piece of indication information and the same information are jointly encoded. Specifically, that the at least one piece of indication information and the same information are jointly encoded may be that channel encoding is performed after the at least one piece of indication information and the same information are concatenated, or may be that channel encoding is performed after the at least one piece of indication information repeatedly encoded and the same information are concatenated. The concatenation may be sequential concatenation or may be interleaved concatenation.

The user equipment may obtain the same information and the at least one piece of indication information respectively through decoding according to a jointly encoded form of the at least one piece of indication information and the same information. Specifically, the user equipment may obtain the same information and the at least one piece of indication information respectively according to a concatenated form of the at least one piece of indication information and the same information.

Optionally, the broadcast channels transmitted on the at least two resource element groups may carry at least one piece of indication information in addition to the same information, where the at least one piece of indication information may be represented by different CRC masks (Mask).

Specifically, a bit sequence is formed after CRC parity bits corresponding to the same information carried in the broadcast channel are scrambled by using a CRC mask, as shown in formula (100). CRC masks corresponding to a 16-bit CRC and a 24-bit CRC are shown in Table 5 and Table 6 respectively. The indication information is the same as that described above. For example, the indication information may be the antenna port group $PG_i$ or the beam group $BG_i$ used by the broadcast channel, or the antenna port group $PG_i$ or the beam group $BG_i$ used by the indicated one or more physical channels such as a control channel, and the indication information i=0, 1, 2, 3 respectively corresponds to the $PG_i$ or the $BG_i$.

The user equipment may obtain the carried indication information through a hypothesis test according to formula (100) and Table 5 or Table 6 and based on the bit sequence obtained through decoding. Specifically, using Table 5 as an example, there are six possible hypotheses Hi for indication information 0, 1, 2, . . . , 5, where i=0, 1, 2, . . . , 5, and each hypothesis Hi corresponds to indication information i. In this case, the following step may be performed to check whether the hypothesis Hi is correct and obtain the carried indication information:

Information bits obtained through decoding (for example, turbo decoding or Viterbi decoding) and parity bits after CRC mask scrambling are $a_n'$, n=0, . . . , $N_{IB}$−1 and $c_n'$ respectively, where n=0, . . . , $N_{CRC}$−1. A CRC mask $<b_0, b_1, \ldots, b_{15}>$ corresponding to the Hi may be obtained according to Table 5. The CRC parity bits after descrambling (descramble) may be obtained according to formula (100) and are:

$$p_n'=(c_n'+b_n) \mod 2, n=0,1,2,\ldots,N_{CRC}-1 \quad \text{formula (101)}$$

A CRC check may be performed on the information bits $a_n'$, n=0, . . . , $N_{IB}$−1 by using the CRC parity bits. The CRC check belongs to the prior art, and is not further described herein.

Optionally, the determining, from a resource configuration of a communication signal, at least one resource element group for the communication signal may include: determining the at least one resource element group for the broadcast channel based on a received reference signal set transmitted by the base station; specifically, determining a resource indication based on the received reference signal set transmitted by the base station, where the resource indication indicates the at least one resource element group in the resource configuration of the broadcast channel; and determining the at least one resource element group from the resource configuration of the broadcast channel, where the determined at least one resource element group corresponds to the resource indication.

Optionally, the reference signal set may be a cell specific reference signal set, such as the CRS set in the LTE R8 system or the CSI RS set in the LTE R10 system.

Optionally, the resource indication may be CSI, and the CSI includes a rank indicator RI and/or a precoding matrix indicator PMI, where the PMI corresponds to a precoding matrix in a codebook, for example, a precoding matrix in a 4-antenna or 8-antenna codebook in the LTE system.

The user equipment may obtain corresponding channel estimation between the user equipment and the base station based on the reference signal, and obtain the CSI. How to obtain the CSI based on the reference signal, for example, based on a capacity or throughput or mutual information maximization criterion, belongs to the prior art, and is not described herein.

A correspondence between the resource indication and the at least one resource element group in the resource configuration of the broadcast channel may be predefined (predefined), as shown in Table 7 or Table 8. For example, the user equipment obtains RI=1 and PMI=2 based on the reference signal; in this case, the resource element group $REG_2$ corresponding to the broadcast channel may be obtained according to Table 8.

In addition, the correspondence between the resource indication and the at least one resource element group in the resource configuration of the broadcast channel may be notified by the base station to the user equipment by using higher layer signaling such as RRC signaling or downlink control information DCI. The user equipment may obtain, based on the determined CSI and the correspondence notified by the base station, the resource element group corresponding to the broadcast channel.

Optionally, the determining, from a resource configuration of a communication signal, at least one resource element group for the communication signal specifically includes: receiving a synchronization signal set transmitted by the base station, where the synchronization signal set includes at least one synchronization signal corresponding to the broadcast channel transmitted on the at least one resource element group in the resource configuration of the broadcast channel; and determining, from the resource configuration of the broadcast channel, the at least one resource element group for the broadcast channel, where the at least one resource element group corresponds to the at least one synchronization signal used by the user equipment.

Optionally, a correspondence between the synchronization signal and the broadcast channel may be predefined. Specifically, for example, the synchronization signal set includes a first synchronization signal and a second synchronization signal, and the resource configuration of the broadcast channel includes two resource element groups; the correspondence may be: the first synchronization signal corresponds to the broadcast channel transmitted on the first resource element group, and the second synchronization signal corresponds to the broadcast channel transmitted on the second resource element group. For example, a fixed resource correspondence exists between the first synchronization signal and the first resource element group $REG_1$. For example, a fixed time sequence relationship exists between the first synchronization signal and the first resource element group $REG_1$, and a first OFDM symbol in which the first resource element group $REG_1$ is located is always located in a symbol position previous to a first OFDM symbol used by the first synchronization signal. Correspondingly, a similar resource correspondence exists between the second synchronization signal and the second resource element group $REG_2$. Optionally, a resource correspondence between the synchronization signal $SS_j$ and the resource element group $REG_i$ may also be shown in formula (5').

Optionally, the correspondence between the synchronization signal and the broadcast channel may be notified by the base station to the user equipment, for example, may be notified by using a broadcast message, or higher layer signaling such as RRC signaling, or downlink control information DCI.

Optionally, the at least one synchronization signal included in the synchronization signal set may further carry at least one piece of indication information, where the indication information is used to indicate information about a resource used by the broadcast channel transmitted on the at least one resource element group.

The user equipment may determine, from the resource configuration of the broadcast channel, the at least one resource element group for the broadcast channel, where the at least one resource element group corresponds to the at least one piece of indication information carried in the at least one synchronization signal used by the user equipment.

Specifically, the indication information is used to indicate information about a resource used by the broadcast channel transmitted on the at least one resource element group; and the user equipment obtains, based on the information about the resource that is obtained from the synchronization signal, the broadcast channel on the resource element group or resource element corresponding to the synchronization signal. The information about the resource may be: identification information of the broadcast channel, or information about a resource element group used by the broadcast channel, or information about an antenna port or an antenna port group used by the broadcast channel, or information about a sequence or a sequence group used by the broadcast channel, or information about a beam group used by the broadcast channel, or one or more physical channels used by the user equipment, or information about an antenna port used by one or more physical channels, for example, an antenna port used by the broadcast channel or the control channel, or an offset of a slot or a subframe or an OFDM symbol in which the resource element group of the broadcast channel is located in a transmission period of the broadcast channel, or an offset of a subcarrier or a physical resource block relative to the used subband or system center subcarrier. Details are similar to the descriptions in the foregoing synchronization signal transmitting method, and are not further described herein.

Optionally, the receiving the communication signal based on the at least one resource element group specifically includes: if the at least one resource element group is one resource element group, receiving the broadcast channel based on the resource element group.

Optionally, the receiving the communication signal based on the at least one resource element group may specifically include: if the at least one resource element group is at least two resource element groups, receiving the broadcast channels based on the at least two resource element groups.

Specifically, when broadcast channels are received based on two resource element groups, the broadcast channels transmitted on the two resource element groups may be combinatorially received. For example, after modulation symbol level SINR combination or code bit level LLR combination, demodulation and decoding are performed to obtain the information carried in the broadcast channel. Combinatorial reception on a plurality of resources belongs to the prior art, and is not described herein.

In this embodiment of the present invention, the base station transmits the broadcast channel on each resource element group included in the resource configuration of the broadcast channel to the user equipment, where the resource configuration includes at least two different resource element groups, and each broadcast channel carries at least one piece of cell specific or user equipment group specific information and carries at least one piece of indication information. As described above, according to the apparatus provided in this embodiment of the present invention, reliability of transmitting the broadcast channel between the cell (or the user equipment group) and the base station and reliability of receiving the cell specific or user equipment group specific information carried in the broadcast channel can be effectively improved.

The following uses a control channel as an example to describe in detail the transmitting method shown in FIG. 1. The communication signal in the transmitting method shown in FIG. 1 is a control channel. The at least one piece of same information is downlink control information of a system information block SIB1, or downlink control information carried in a common search space CSS, or format indicator information of a downlink control channel.

Specifically, the control channel may be a physical downlink control channel PDCCH, or an enhanced physical downlink control channel ePDCCH, or a physical uplink control channel PUCCH, or a physical control format indicator channel PCFICH.

Specifically, at least two resource element groups in the resource configuration of the control channel may be respectively located in different slots or subframes or radio frames or system frames or OFDM symbols or subcarriers or physical resource blocks PRBs, or may be located in different slots in a same subframe, or different OFDM symbols in a same slot, or different subcarriers in a same slot, or different physical resource blocks in a same slot, or may be respectively located in different CCEs or CCE sets or eCCEs or eCCE sets.

Assuming that the resource configuration of the control channel includes two resource element groups $REG_1$ and $REG_2$, the first resource element group $REG_1$ and the second resource element group $REG_2$ respectively use first three OFDM symbols of different subframes; the first resource element group $REG_1$ and the second resource element group $REG_2$ respectively use first three OFDM symbols of a same subframe, but are located in different PRBs; the first resource element group $REG_1$ and the second resource element group $REG_2$ respectively use three different subcarriers of a same subframe; or a position of a subcarrier used by the second resource element group $REG_2$ is a shifted frequency domain position of a subcarrier used by the first resource element group $REG_1$.

The control channel element CCE is a predefined resource element that may be used for a control channel. For example, the CCE may be a CCE defined in LTE R8 and used for a PDDCH. The eCCE is a predefined resource element that may be used for an enhanced control channel, or an eCCE defined in LTE R11 and used for an ePDCCH, or the like.

In addition, the first resource element group $REG_1$ and the second resource element group $REG_2$ may be configured by using higher layer signaling, for example, may be configured by using radio resource control (Radio Resource Control, RRC for short) signaling, and are respectively located in different PRBs or PRB pairs. It should be understood that, optionally, use of resource elements occupied by a reference signal should be avoided on the first resource element group $REG_1$ and the second resource element group $REG_2$.

Optionally, control channels transmitted on the at least two resource element groups in the resource configuration of the control channel may be transmitted by using different antenna ports. Optionally, the control channel transmitted on the resource element group $REG_i$ may be transmitted by using an antenna port $P_j$. Specifically, the relationship shown in formula (50) exists between the resource element group $REG_i$ and the used antenna port $P_j$, where $N_{REG}$ is a total quantity of resource element groups, $N_P$ is a total quantity of antenna ports, n is an index or a count value of a subframe or an OFDM symbol or a subcarrier or a PRB or a resource element group, and mod indicates a modulo operation.

Using two resource element groups as an example, the control channel transmitted on the first resource element group $REG_1$ may be transmitted by using an antenna port group $PG_1=\{P_0, P_1\}$, and the control channel transmitted on the second resource element group $REG_2$ may be transmitted by using the antenna port group $PG_2=\{P_2, P_3\}$. Antenna ports $P_0$, $P_1$, $P_2$, and $P_3$ may respectively use cell specific reference signals. For example, the antenna ports $P_0$, $P_1$, $P_2$, and $P_3$ respectively use reference signals $CRS_0$, $CRS_1$, $CRS_2$, and $CRS_3$ in the LTE R8 system. The antenna ports $P_0$, $P_1$, $P_2$, and $P_3$ may also use dedicated reference signals respectively, for example, may respectively correspond to a $DMRS_0$, a $DMRS_1$, a $DMRS_2$, and a $DMRS_3$.

Optionally, control channels transmitted on the at least two resource element groups in the resource configuration of the control channel may be transmitted by using different precoding or beam groups, where the beam group includes at least one beam. For example, the control channel transmitted on the first resource element group $REG_1$ may be transmitted by using a beam group $BG_0=\{B_0\}$, and the control channel transmitted on the second resource element group $REG_2$ may be transmitted by using a beam group $BG_1=\{B_1\}$. Specifically, the control channel transmitted on the resource element group $REG_i$ may be transmitted by using a beam $B_j$. For example, the relationship shown in formula (51) may exist between the resource element group $REG_i$ and the used beam $B_j$, where $N_{REG}$ is a total quantity of resource element groups, $N_B$ is a total quantity of beams, n is an index or a count value of a subframe or an OFDM symbol or a subcarrier or a PRB or a resource element group, and mod denotes a modulo operation. Using control channels transmitted on four resource element groups $REG_i$, where i=0, 1, 2, 3, as an example: the control channels transmitted on the resource element groups $REG_i$, where i=0, 1, 2, 3, may be transmitted respectively by using beams $B_i$, where i=0, 1, 2, 3.

Further, the control channels transmitted on the at least two resource element groups in the resource configuration of the control channel may be transmitted by using a same antenna port group but different precoding or beam groups, where the beam group includes at least one beam. For example, the control channel transmitted on the first resource element group $REG_1$ may be transmitted by using the beam group $BG_0=\{B_0\}$, and the control channel transmitted on the second resource element group $REG_2$ may be transmitted by using the beam group $BG_1=\{B_1\}$.

Further, optionally, the control channels transmitted on the at least two resource element groups in the resource configuration of the control channel may be transmitted by using different antenna port groups, where different antenna port groups may use different beams. For example, the control channel transmitted on the first resource element group $REG_1$ may be transmitted by using the antenna port group $PG_1=\{P_0, P_1\}$, where the signal on the antenna port group $PG_1$ is transmitted by using the beam $B_0$; and the control channel transmitted on the second resource element group $REG_2$ may be transmitted by using the antenna port group $PG_2=\{P_2, P_3\}$, where the signal on the antenna port group $PG_2$ is transmitted by using the beam $B_1$.

Specifically, for the foregoing beam, which different beam shapes or beam directions are used in the system may be designed flexibly according to deployment. For example, more beams are used, so that the beams evenly cover the cell or the area in which the user equipment group is located.

Further, the control channels transmitted on each of the at least two resource element groups may carry at least one piece of indication information in addition to the same information, where the indication information may be used to indicate information about resources used by the control channels. Specifically, the information about the resource used by the control channel may be at least one of the following: identification information of the control channel, where for example, an identifier of the control channel may be 1, 2, 3, . . . , N, and a specific identification method is not limited in the present invention, for example, identities of the communication signals using the resource element group $REG_i$, where i=1, 2, 3, are 1, 2, and 3 respectively; information about a resource element group used by the control channel, for example, a number or an index of a used CCE or a used CCE set; information about an antenna port or an antenna port group used by the control channel, for example, an antenna port number, information about an antenna port array structure such as a quantity of antenna ports or an arrangement manner of antenna ports or a polarization type of antenna ports (vertical polarization or cross polarization or interleaved polarization), or a reference signal used by the antenna port, or a reference signal sequence group used by the antenna port or a beam group used by the antenna port or precoding used by the antenna port; information about a beam used by the control channel, for example, an index of a beam group, or a quantity of beams, or a specific parameter of a beam such as a beam width, or a weight vector used for implementing the used beam, or the like; information about precoding used by the control channel, where the information about the precoding may be an index of a precoding matrix, or a quantity of layers or a quantity of columns of a precoding matrix, or a rank (Rank) of the precoding, or the like; and information about a time-frequency position used by the control channel, for example, an offset of a slot or a subframe or an OFDM symbol of the control channel transmitted on the resource element group in a transmission period of the control channel, or an offset of a subcarrier or a physical resource block relative to a used subband or a system center subcarrier. It should be understood that the offset may be represented by a code.

Optionally, the control channel transmitted on each of the at least two resource element groups further carries at least one piece of indication information, where the indication information is used to indicate information about a resource used by one or more physical channels used by the user equipment or information about a resource used by one or more physical signals used by the user equipment; and the information about the resource used by the physical channel or the physical signal may be identification information used by the physical channel or the physical signal, or information about a resource element group used by the physical channel or the physical signal, or information about an antenna port or information about a reference signal used by the physical channel or the physical signal, or information about a sequence or a sequence group used by the physical channel or the physical signal, or information about an antenna port or information about an antenna port group used by the physical channel or the physical signal, or information about precoding used by the physical channel or the physical signal, or information about a beam group used by the physical channel or the physical signal, or information about a time-frequency position used by the physical channel or the physical signal.

For example, the indication information is used to indicate information about an antenna port used by one or more physical channels used by the user equipment. For example, the indication information indicates information about an antenna port or information about a reference signal used by a physical control format indicator channel (PCFICH) or a physical downlink control channel (PDCCH) or an enhanced physical downlink control channel (ePDCCH) or a physical uplink control channel (PUCCH).

Specifically, the information about the antenna port may be an antenna port associated with a CRS or a DMRS. For example, resource identification information 0 and 1 are respectively used to indicate that CRSs or DMRSs correspondingly used by antenna ports used by the physical channels are respectively the $CRS_0$ and the $CRS_1$, or CRS sets $\{CRS_{00}, CRS_{01}\}$ and $\{CRS_{00}, CRS_{11}\}$, or the $DMRS_0$ and the $DMRS_1$, or DMRS sets $\{DMRS_{00}, DMRS_{01}\}$ and $\{DMRS_{10}, DMRS_{11}\}$. Implementations and correspondences of the foregoing RSs are not specifically limited in the present invention.

Optionally, the control channels transmitted on the at least two resource element groups carry at least one piece of same information, and may be encoded by using convolutional codes or turbo codes, and after being modulated, are mapped to resource elements included in the corresponding resource element groups.

Optionally, before the at least one piece of same information carried in the control channel is encoded, a cyclic redundancy check CRC may be further added. The CRC may be 16 bits or 24 bits.

Optionally, the control channels transmitted on the at least two resource element groups may carry at least one piece of indication information in addition to the same information, where the at least one piece of indication information may be carried in control messages of the control channels respectively. Specifically, the at least one piece of indication information and the same information are jointly encoded. For example, that the at least one piece of indication information and the same information are jointly encoded may be that channel encoding is performed after the at least one piece of indication information and the same information are concatenated, or may be that channel encoding is performed after the at least one piece of indication information repeatedly encoded and the same information are concatenated. The concatenation may be sequential concatenation or may be interleaved concatenation.

Optionally, the control channels transmitted on the at least two resource element groups may carry at least one piece of indication information in addition to the same information, where the at least one piece of indication information may be represented by different CRC masks (Mask). Specifically, CRC parity bits corresponding to the same information carried in the control channel may be $P_n$, where n=0, 1, 2, . . . , $N_{CRC}$−1 respectively. A CRC mask corresponding to the indication information is $b_n$, where n=0, 1, 2, . . . , $N_{CRC}$−1. In this case, after CRC mask scrambling, the bit sequence shown in formula (100) is formed. For example, CRC masks corresponding to the 16-bit CRC and the 24-bit CRC are shown in Table 5 and Table 6 respectively. The indication information is the same as that described above. For example, the indication information may be the antenna port group $PG_i$ or the beam group $BG_i$ used by the control channel, or the antenna port group $PG_i$ or the beam group $BG_i$ used by the indicated one or more physical channels such as the control channel, and the indication information i=0, 1, 2, 3 respectively corresponds to the $PG_i$ or the $BG_i$.

Optionally, the control channel transmitting method may further include: transmitting a synchronization signal set to the user equipment, where the synchronization signal set includes at least one synchronization signal corresponding to the control channel transmitted on at least one resource element group in the resource configuration of the control channel.

Optionally, a correspondence between the synchronization signal and the control channel may be predefined. Specifically, for example, the synchronization signal set includes a first synchronization signal and a second synchronization signal, and the resource configuration of the communication signal includes two resource element groups; the correspondence may be: the first synchronization signal corresponds to the control channel transmitted on the first resource element group $REG_1$, and the second synchronization signal corresponds to the control channel transmitted on the second resource element group $REG_2$. For example, a fixed resource correspondence exists between the first synchronization signal and the first resource element group $REG_1$. For example, a fixed time sequence relationship exists between the first synchronization signal and the first resource element group $REG_1$, and a first OFDM symbol in which the first resource element group $REG_1$ is located is always located in a symbol position previous to a first OFDM symbol used by the first synchronization signal. Correspondingly, a similar resource correspondence exists between the second synchronization signal and the second resource element group $REG_2$. Optionally, a resource correspondence between the synchronization signal $SS_j$ and the resource element group $REG_i$ may also be shown in formula (5').

Optionally, the correspondence between the synchronization signal and the control channel may be notified by the base station to the user equipment, for example, may be notified by using a broadcast message, or higher layer signaling such as RRC signaling, or downlink control information DCI.

Optionally, the at least one synchronization signal included in the synchronization signal set may carry at least one piece of indication information, where the indication information is used to indicate information about a resource used by the control channel transmitted on the at least one resource element group.

Specifically, the indication information is used to indicate information about a resource used by the control channel transmitted on the at least one resource element group. The information about the resource may be: identification information of the control channel, or information about a resource element group used by the control channel, or information about an antenna port or an antenna port group used by the control channel, or information about a sequence or a sequence group used by the control channel, or information about a beam group used by the control channel, or one or more physical channels used by the user equipment, or information about a resource used by one or more physical channels, or information about a resource used by one or more physical signals used by the user equipment, for example, an antenna port used by a broadcast channel or the control channel, or an offset of a slot or a subframe or an OFDM symbol in which the resource element group of the control channel is located in a transmission period of the control channel, or an offset of a subcarrier or a PRB relative to the used subband or system center subcarrier. Details are similar to the descriptions in the foregoing synchronization signal transmitting method, and are not further described herein.

Optionally, the control channel transmitting method may further include: transmitting a broadcast channel set to the user equipment, where the broadcast channel set includes at least one broadcast channel corresponding to the control channel transmitted on at least one resource element group in the resource configuration of the control channel.

Optionally, a correspondence between the broadcast channel and the control channel may be predefined. Specifically, for example, the broadcast channel set includes a first broadcast channel and a second broadcast channel, and the resource configuration of the control channel includes two resource element groups; the correspondence may be: the first broadcast channel corresponds to the control channel transmitted on the first resource element group $REG_1$, and the second broadcast channel corresponds to the control channel transmitted on the second resource element group $REG_2$. For example, a fixed resource correspondence exists between the first broadcast channel and the first resource element group $REG_1$. For example, a fixed time sequence relationship exists between the first broadcast channel and the first resource element group $REG_1$, and a first OFDM symbol in which the first resource element group $REG_1$ is located is always located in a symbol position previous to a first OFDM symbol used by the first broadcast channel. Correspondingly, a similar resource correspondence exists between the second broadcast channel and the second resource element group $REG_2$. Optionally, a resource correspondence between the broadcast channel $BCH_j$ and the resource element group $REG_i$ may also be shown in formula (5"):

$$j=i \bmod N_{BCH} \text{ or } i=j \bmod N_{REG} \text{ or } (i+n) \bmod N_{BCH}= (j+n) \bmod N_{REG} \quad \text{formula (5")}$$

where $N_{BCH}$ is a total quantity of broadcast channels, $N_{REG}$ is a total quantity of resource element groups, n is an index or a count value of a subframe or an OFDM symbol or a subcarrier or a PRB or a resource element group, and mod denotes a modulo operation.

Optionally, the correspondence between the broadcast channel and the control channel may be notified by the base station to the user equipment, for example, may be notified by using a broadcast message, or higher layer signaling such as RRC signaling, or downlink control information DCI.

Optionally, the at least one broadcast channel included in the broadcast channel set may further carry at least one piece of indication information, where the indication information is used to indicate information about a resource used by the control channel transmitted on the at least one resource element group.

Specifically, the indication information is used to indicate information about a resource used by the control channel transmitted on the at least one resource element group. The information about the resource may be: identification information of the control channel, or information about a resource element group used by the control channel, or information about an antenna port or an antenna port group used by the control channel, or information about a sequence or a sequence group used by the control channel, or information about a beam group used by the control channel, or one or more physical channels used by the user equipment, or information about an antenna port used by one or more physical channels, for example, an antenna port used by the broadcast channel or the control channel, or an offset of a slot or a subframe or an OFDM symbol in which the resource element group used by the control channel is located in a transmission period of the control channel, or an offset of a subcarrier or a physical resource block relative to the used subband or system center subcarrier. Details are similar to the descriptions in the foregoing broadcast channel transmitting method, and are not further described herein.

Optionally, the control channel transmitting method may further include: transmitting a reference signal set to the user equipment, so that the user equipment determines a resource indication based on the reference signal set, where the resource indication corresponds to the control channel transmitted on at least one resource element group in the resource configuration of the control channel.

Optionally, the reference signal set may be a cell specific reference signal set, such as the CRS set in the LTE R8 system or the CSI RS set in the LTE R10 system.

Optionally, the resource indication may be CSI, and the CSI includes a rank indicator RI and/or a precoding matrix indicator PMI, where the PMI corresponds to a precoding matrix in a codebook, for example, a precoding matrix in a 4-antenna or 8-antenna codebook in the LTE system.

A correspondence between the resource indication and the at least one resource element group in the resource configuration of the control channel may be predefined (predefined), as shown in Table 7 or Table 8.

The correspondence between the resource indication and the at least one resource element group in the resource configuration of the control channel may be notified by the base station to the user equipment by using higher layer signaling such as RRC signaling or downlink control information DCI.

It should be further pointed out that, as described above, the resource element in each resource element group is not necessarily limited to the resource grid structure currently defined in LTE. Other configured resource grid structures may be further included. For example, each subframe includes more slots, or duration of each slot is shorter, or each OFDM symbol is shorter, or each subcarrier spacing is longer.

In this embodiment of the present invention, the base station transmits the control channels to the user equipment by using a plurality of resource element groups including at least the first resource element group $REG_1$ and the second resource element group $REG_2$, where the first resource element group $REG_1$ and the second resource element group $REG_2$ are different. The user equipment in the cell (or the user equipment group) can receive, by measuring the control channel transmitted on the first resource element group $REG_1$ or the second resource element group $REG_2$ with favorable channel condition for the user equipment, the cell (or user equipment group) specific same information, or receive the cell (or user equipment group) specific same information via combinatorial reception of the communication signals transmitted on at least the first resource element group $REG_1$ and the second resource element group $REG_2$. Therefore, transmission reliability of the cell (or user equipment group) specific information or the communication signal is effectively improved.

The following uses a control channel as an example to describe in detail the receiving method shown in FIG. 6. The communication signal in the receiving method shown in FIG. 6 is a control channel. The at least one piece of same information is downlink control information of a system information block SIB1, or downlink control information carried in a common search space, or format indicator information of a downlink control channel.

Specifically, the control channel may be a physical downlink control channel PDCCH, or an enhanced physical downlink control channel ePDCCH, or a physical uplink control channel PUCCH, or a physical control format indicator channel PCFICH.

Specifically, at least two resource element groups in the resource configuration of the control channel are respectively located in different slots or subframes or radio frames or system frames or OFDM symbols or subcarriers or physical resource blocks PRBs, or may be respectively located in different slots in a same subframe, or different OFDM symbols in a same slot, or different subcarriers in a same slot, or physical resource blocks in a same slot. Assuming that the resource configuration of the control channel includes two resource element groups $REG_1$ and $REG_2$, the first resource element group $REG_1$ and the second resource element group $REG_2$ respectively use first three OFDM symbols of different subframes; or the first resource element group $REG_1$ and the second resource element group $REG_2$ respectively use first three OFDM symbols of a same subframe, but are located in different PRBs; or the first resource element group $REG_1$ and the second resource element group $REG_2$ respectively use three different subcarriers of a same subframe; or a position of a subcarrier used by the second resource element group $REG_2$ is a shifted frequency domain position of a subcarrier used by the first resource element group $REG_1$.

In addition, the first resource element group $REG_1$ and the second resource element group $REG_2$ may be configured by using higher layer signaling, for example, may be configured by using radio resource control signaling, and are respectively located in different PRBs or PRB pairs. It should be understood that, optionally, use of resource elements occupied by a reference signal should be avoided on the first resource element group $REG_1$ and the second resource element group $REG_2$.

Optionally, the user equipment may respectively receive, by using different antenna ports or antenna port groups, control channels transmitted on the at least two resource element groups in the resource configuration of the control channel.

Specifically, the control channel transmitted on the resource element group $REG_i$ may be received by using an antenna port $P_j$. For example, the relationship shown in formula (50) exists between the resource element group $REG_i$ and the used antenna port $P_j$, where $N_{REG}$ and $N_P$ are respectively a total quantity of resource element groups and a total quantity of antenna ports, n is an index or a count value of a subframe or an OFDM symbol or a subcarrier or a PRB or a resource element group, and mod denotes a modulo operation.

Specifically, using the control channels transmitted on the two resource element groups $REG_1$ and $REG_2$ as an example, the control channel transmitted on the first resource element group $REG_1$ may be received by using the antenna port group $PG_1=\{P_0, P_1\}$, and the control channel transmitted on the second resource element group $REG_2$ may be received by using the antenna port group $PG_2=\{P_2, P_3\}$. Antenna ports $P_0$, $P_1$, $P_2$, and $P_3$ may respectively use cell specific reference signals. For example, the antenna ports $P_0$, $P_1$, $P_2$, and $P_3$ respectively use reference signals $CRS_0$, $CRS_1$, $CRS_2$, and $CRS_3$ in the LTE R8 system. The antenna ports $P_0$, $P_1$, $P_2$, and $P_3$ may also use dedicated reference signals respectively, for example, may respectively correspond to $DMRS_0$, $DMRS_1$, $DMRS_2$, and $DMRS_3$.

Optionally, the user equipment may respectively receive, on the at least two resource element groups in the resource configuration of the control channel, control channels transmitted by using different beams or beam groups. Specifically, the relationship shown in formula (51) exists between the resource element group $REG_i$ and a used beam $B_j$. Based on the relationship, the user equipment may receive, on the resource element group $REG_i$, the control channel transmitted by using the beam $B_j$.

Further, the user equipment may receive, by using a same antenna port group, the control channels transmitted by the base station on the first resource element group $REG_1$ and the second resource element group $REG_2$ respectively by using different precoding or different beam groups, where the beam group includes at least one beam. Alternatively, the user equipment may receive, by using different antenna port groups, the control channels transmitted by the base station on the first resource element group $REG_1$ and the second resource element group $REG_2$ by using different precoding or different beam groups.

Optionally, the determining, from a resource configuration of a communication signal, at least one resource element group for the communication signal may specifically include: determining at least one resource element group from the resource configuration of the control channel based on signal quality of the control channel on the resource element group.

For example, the signal quality of the control channel may be received power. Using four resource element groups as an example, received power of the control channel on the resource element group may be shown in formula (68), where $RP_i$ denotes received power of a control channel on the resource element group $REG_i$, $h_{RE_n}$ is a channel estimation value on a resource element $RE_n$, $RE_n \in REG_i$ denotes that the resource element $RE_n$ belongs to the resource element group $REG_i$, and $|REG_i|$ is a size of the resource element group $REG_i$, namely, a quantity of resource elements included in the resource element group $REG_i$.

The user equipment may determine, from the resource configuration of the control channel, one or two resource element groups with largest received power. For example, it is determined, by comparing received quality of the control channel transmitted on the first resource element group with received quality of the control channel transmitted on the second resource element group, that communication quality of the control channel transmitted on the first resource element group is better, and the control channel transmitted on the first resource element group is received.

In addition to received power, the signal quality of the control channel may be received strength or received quality, or may be an average of received power or received strength or received quality on all resource elements in the resource element group corresponding to the control channel. The signal quality of the control channel may also be reference signal received power or a reference signal strength indicator or reference signal received quality corresponding to the control channel.

Optionally, the determining, from a resource configuration of a communication signal, at least one resource element group for the communication signal may also specifically include: determining the at least one resource element group from the resource configuration of the control channel based on detection or decoding performance of the control channel on the resource element group.

For example, the detection or decoding performance may be decoding performance of turbo codes or convolutional codes, for example, a CRC check result or BLER performance corresponding to an effective SINR. The user equipment may determine, from the resource configuration of the control channel, one or two resource element groups with highest decoding performance.

Optionally, the control channels transmitted on the at least two resource element groups may carry at least one piece of indication information in addition to the same information, where the at least one piece of indication information and the same information are jointly encoded. Specifically, that the at least one piece of indication information and the same information are jointly encoded may be that channel encoding is performed after the at least one piece of indication information and the same information are concatenated, or may be that channel encoding is performed after the at least one piece of indication information repeatedly encoded and the same information are concatenated. The concatenation may be sequential concatenation or may be interleaved concatenation.

The user equipment may obtain the same information and the at least one piece of indication information respectively through decoding according to a jointly encoded form of the at least one piece of indication information and the same information. Specifically, the user equipment may obtain the same information and the at least one piece of indication information respectively according to a concatenated form of the at least one piece of indication information and the same information.

Optionally, the control channels transmitted on the at least two resource element groups may carry at least one piece of indication information in addition to the same information, where the at least one piece of indication information may be represented by different CRC masks (Mask).

Specifically, a bit sequence is formed after CRC mask scrambling is performed on CRC parity bits corresponding to the same information carried in the control channel, as shown in formula (98). CRC masks corresponding to a 16-bit CRC and a 24-bit CRC are shown in Table 5 and Table 6 respectively. The indication information is the same as that described above. For example, the indication information may be the antenna port group $PG_i$ or the beam group $BG_i$ used by the control channel, or the antenna port group $PG_i$ or the beam group $BG_i$ used by the indicated one or more physical channels, and the indication information i=0, 1, 2, 3 respectively corresponds to the $PG_i$ or the $BG_i$.

The user equipment may obtain the carried indication information through a hypothesis test according to formula (100) and Table 5 or Table 6 and based on the bit sequence obtained through decoding. Specifically, using Table 5 as an example, there are six possible hypotheses Hi for indication information 0, 1, 2, ..., 5, where i=0, 1, 2, ..., 5, and each hypothesis Hi corresponds to indication information i. In this case, the following step may be performed to check whether the hypothesis Hi is correct and obtain the carried indication information:

Information bits obtained through decoding (for example, turbo decoding or Viterbi decoding) and parity bits after CRC mask scrambling are $a_n'=0, \ldots, N_{IB}-1$ and $c_n'$; respectively, where $n=0, \ldots, N_{CRC}-1$. A CRC mask $<b_0, b_1, \ldots, b_{15}>$ corresponding to the Hi may be obtained according to Table 5. The CRC parity bits after descrambling (descramble) may be obtained according to formula (100), as shown in formula (101). A CRC check may be performed on the information bits $a_n'$, $n=0, \ldots, N_{IB}-1$ by using the CRC parity bits. The CRC check belongs to the prior art, and is not further described herein.

Optionally, the determining, from a resource configuration of a communication signal, at least one resource element group for the communication signal may include: determining the at least one resource element group for the control channel based on a received reference signal set transmitted by the base station; and specifically, determining a resource indication based on the received reference signal set transmitted by the base station, where the resource indication indicates the at least one resource element group in the resource configuration of the control channel.

Optionally, the reference signal set may be a cell specific reference signal set, such as the CRS set in the LTE R8 system or the CSI RS set in the LTE R10 system.

Optionally, the resource indication may be CSI, and the CSI includes a rank indicator RI and/or a precoding matrix indicator PMI, where the PMI corresponds to a precoding matrix in a codebook, for example, a precoding matrix in a 4-antenna or 8-antenna codebook in the LTE system.

The user equipment may obtain corresponding channel estimation between the user equipment and the base station based on the reference signal, and obtain the CSI. How to obtain the CSI based on the reference signal, for example, based on a capacity or throughput or mutual information maximization criterion, belongs to the prior art, and is not described herein.

A correspondence between the resource indication and the at least one resource element group in the resource configuration of the control channel may be predefined (predefined), as shown in Table 7 or Table 8. For example, the user equipment obtains RI=1 and PMI=2 based on the reference signal; in this case, the resource element group $REG_2$ corresponding to the broadcast channel may be obtained according to Table 8.

In addition, the correspondence between the resource indication and the at least one resource element group in the resource configuration of the control channel may be notified by the base station to the user equipment by using higher layer signaling such as RRC signaling or downlink control information DCI. The user equipment may obtain, based on the determined CSI and the correspondence notified by the base station, the resource element group corresponding to the broadcast channel.

Optionally, the determining, from a resource configuration of a communication signal, at least one resource element group for the communication signal specifically includes: receiving a synchronization signal set transmitted by the base station, where the synchronization signal set includes at least one synchronization signal corresponding to the control channel transmitted on the at least one resource element group in the resource configuration of the control channel; determining the at least one resource element group for the control channel based on a correspondence between the control channel transmitted on the at least one resource element group in the resource configuration of the control channel and the synchronization signal, where the determined at least one resource element group corresponds to the synchronization signal used by the user equipment; and determining, from the resource configuration of the control channel, the at least one resource element group for the control channel, where the at least one resource element group corresponds to the at least one synchronization signal used by the user equipment.

Optionally, a correspondence between the synchronization signal and the control channel may be predefined. Specifically, for example, the synchronization signal set includes a first synchronization signal and a second synchronization signal, and the resource configuration of the control channel includes two resource element groups; the correspondence may be: the first synchronization signal corresponds to the control channel transmitted on the first resource element group, and the second synchronization signal corresponds to the control channel transmitted on the second resource element group. For example, a fixed resource correspondence exists between the first synchronization signal and the first resource element group $REG_1$. For example, a fixed time sequence relationship exists between the first synchronization signal and the first resource element group $REG_1$, and a first OFDM symbol in which the first resource element group $REG_1$ is located is always located in a symbol position previous to a first OFDM symbol used by the first synchronization signal. Correspondingly, a similar resource correspondence exists between the second synchronization signal and the second resource element group $REG_2$. Optionally, a resource correspondence between the synchronization signal $SS_j$ and the resource element group $REG_i$ may also be shown in formula (5').

Optionally, the correspondence between the synchronization signal and the control channel may be notified by the base station to the user equipment, for example, may be notified by using a broadcast message, or higher layer signaling such as RRC signaling, or downlink control information DCI.

Optionally, the at least one synchronization signal included in the synchronization signal set may further carry at least one piece of indication information, where the indication information is used to indicate information about a resource used by the control channel transmitted on the at least one resource element group.

The user equipment may determine, from the resource configuration of the control channel, the at least one resource element group for the control channel, where the at least one resource element group corresponds to the at least one synchronization signal used by the user equipment.

Specifically, the indication information is used to indicate information about a resource used by the control channel transmitted on the at least one resource element group; and the user equipment obtains, based on the information about the resource that is obtained from the synchronization signal, the control channel on the resource element group or resource element corresponding to the synchronization signal. The information about the resource may be: identification information of the control channel, or information about a resource element group used by the control channel, or information about an antenna port or an antenna port group used by the control channel, or information about a control channel sequence or a sequence group used by the control channel, or information about a beam group used by the control channel, or one or more physical channels used by the user equipment, or information about an antenna port used by one or more physical channels, for example, an antenna port used by a broadcast channel or the control channel, or a time-frequency position used by the control channel, for example, an offset of a slot or a subframe or an OFDM symbol in which the resource element group of the control channel is located in a transmission period of the control channel, or an offset of a subcarrier or a physical resource block relative to a used subband or a system center subcarrier. Details are similar to the descriptions in the foregoing synchronization signal transmitting method, and are not further described herein.

Optionally, the determining, from a resource configuration of a communication signal, at least one resource element group for the communication signal specifically includes: receiving a broadcast channel set transmitted by the base station, where the broadcast channel set includes at least one broadcast channel corresponding to the control channel transmitted on the at least one resource element group in the resource configuration of the control channel; and determining the at least one resource element group for the control channel based on a correspondence between the control channel transmitted on the at least one resource element group in the resource configuration of the control channel and the broadcast channel, where the at least one resource element group corresponds to the at least one broadcast channel used by the user equipment.

Optionally, the correspondence between the broadcast channel and the control channel may be predefined. Specifically, for example, the broadcast channel set includes a first broadcast channel and a second broadcast channel, and the resource configuration of the control channel includes two resource element groups; the correspondence may be: a fixed resource correspondence exists between the first broadcast channel and the first resource element group $REG_1$ used by the control channel. For example, a fixed time sequence relationship exists between the first broadcast channel and the first resource element group $REG_1$ used by the control channel, and a first OFDM symbol in which the first resource element group $REG_1$ used by the control channel is located is always located in a symbol position previous to a first OFDM symbol used by the first broadcast channel. Correspondingly, a similar resource correspondence exists between the second broadcast channel and the second resource element group $REG_2$ used by the control channel. Optionally, a resource correspondence between the broadcast channel $BCH_j$ and the resource element group $REG_i$ may also be shown in formula (5").

Optionally, the correspondence between the broadcast channel and the control channel may be notified by the base station to the user equipment, for example, may be notified by using a broadcast message, or higher layer signaling such as RRC signaling, or downlink control information DCI.

Further, the at least one broadcast channel included in the broadcast channel set may further carry at least one piece of indication information, where the indication information is used to indicate information about a resource used by the control channel transmitted on the at least one resource element group.

The user equipment may determine, from the resource configuration of the control channel, the at least one resource element group for the control channel, where the at least one resource element group corresponds to the at least one piece of indication information carried in the at least one broadcast channel used by the user equipment.

Specifically, the indication information is used to indicate information about a resource used by the control channel transmitted on the at least one resource element group; and the user equipment obtains, based on the information about the resource that is obtained from the broadcast channel, the control channel on the resource element group or resource element corresponding to the broadcast channel. The information about the resource may be: identification information of the control channel, or information about a resource element group used by the control channel, or information about an antenna port or an antenna port group used by the control channel, or information about a sequence or a sequence group used by the control channel, or information about a beam group used by the control channel, or one or more control channels used by the user equipment, or information about an antenna port used by one or more control channels, for example, a time-frequency resource used by the control channel, for example, an offset of a slot or a subframe or an OFDM symbol in which the resource element group of the control channel is located in a transmission period of the control channel, or an offset of a subcarrier or a physical resource block relative to the used subband or system center subcarrier. Details are similar to the descriptions in the foregoing broadcast channel transmitting method, and are not further described herein.

Optionally, the receiving the communication signal based on the at least one resource element group specifically includes: if the at least one resource element group is one resource element group, receiving the control channel based on the resource element group.

Optionally, the receiving the communication signal based on the at least one resource element group may specifically include: if the at least one resource element group is at least two resource element groups, receiving the broadcast channels based on the at least two resource element groups.

Specifically, when broadcast channels are received based on at least two resource element groups, the control channels transmitted on the at least two resource element groups may be combinatorially received. For example, after modulation symbol level SINR combination or code bit level LLR combination, demodulation and decoding are performed to obtain the information carried in the control channel. Combinatorial reception on a plurality of resources belongs to the prior art, and is not described herein.

It should be further pointed out that, as described above, the resource element RE in each resource element group is not necessarily limited to the resource grid structure currently defined in LTE. Other configured resource grid structures may be further included. For example, each subframe includes more slots, or duration of each slot is shorter, or each OFDM symbol is shorter, or each subcarrier spacing is longer.

In this embodiment of the present invention, the user equipment determines and receives the control channel on at least one resource element group, where the at least one resource element group forms a subset of a resource element group set included in the resource configuration of the communication signal, the resource configuration of the communication signal includes at least two resource element groups, and the first resource element group $REG_1$ and the second resource element group $REG_2$ are different. The base station transmits the control channels to the user equipment by using a plurality of resources including the first resource element group $REG_1$ and the second resource element group $REG_2$. The user equipment in the cell (or the user equipment group) can receive, by measuring the control channel transmitted on the first resource element group $REG_1$ or the second resource element group $REG_2$ with signal favorable for the user equipment, the cell (or user equipment group) specific same information, or receive the cell (or user equipment group) specific same information via combinatorial reception of the communication signals transmitted on at least the first resource element group $REG_1$ and the second resource element group $REG_2$. Therefore, transmission reliability of the cell (or user equipment group) specific information or the communication signal is effectively improved.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A base station, comprising:
   a processor, configured to determine at least two different resource element groups to use to transmit a broadcast channel, each different resource element group of the at least two different resource element groups to be used to separately transmit the broadcast channel; and
   a transmitter, configured to transmit the broadcast channel to user equipment on the at least two different resource element groups, wherein for each resource element group the broadcast channel transmitted on the respective resource element group carries at least one piece of same information and indication information indicating a resource of a physical downlink control channel (PDCCH) used by the user equipment, and the same information is cell specific information.

2. The base station according to claim 1, wherein for each resource element group the broadcast channel transmitted on the respective resource element group further carries at least one piece of second indication information, wherein the second indication information indicates information about a resource used by the broadcast channel carried on the respective resource element group.

3. The base station according to claim 2, wherein the information about the resource used by the broadcast channel carried on the respective resource element group is at least one of the following:
identification information of the broadcast channel carried on the respective resource element group, information about a resource element group used by the broadcast channel carried on the respective resource element group, information about a scrambling sequence or a sequence group used by the broadcast channel carried on the respective resource element group, information about an antenna port or an antenna port group used by the broadcast channel carried on the respective resource element group, information about a time and/or frequency domain position used by the broadcast channel carried on the respective resource element group, information about precoder(s) used by the broadcast channel carried on the respective resource element group, or information about a beam used by the broadcast channel carried on the respective resource element group.

4. The base station according to claim 1, wherein the broadcast channels transmitted on the at least two different resource element groups use different scrambling sequences, wherein the scrambling sequences are Walsh sequences, constant amplitude zero autocorrelation (CAZAC) sequences, Gold sequences, m-sequences, computer-generated sequences, pseudo random sequences, or a combination of the above sequences.

5. The base station according to claim 1, wherein the broadcast channels transmitted on the at least two different resource element groups use a same antenna port with different precoding or different beams.

6. The base station according to claim 1, wherein the same information is at least one of the following:
a system bandwidth, a part or all of information of a system frame number (SFN), physical channel configuration indication information, and a master information block (MIB).

7. The base station according to claim 1, wherein the information about the resource of the PDCCH used by the user equipment is at least one of the following:
information about a resource element group used by the PDCCH or information about a time and/or frequency position used by the PDCCH.

8. The base station according to claim 1, wherein for each resource element group the indication information carried on the respective resource element group is carried in a broadcast message of the broadcast channel carried on the respective resource element group or represented by using different cyclic redundancy check masks.

9. The base station according to claim 1, wherein the transmitter is further configured to:
transmit a synchronization signal set to the user equipment, wherein the synchronization signal set comprises at least one synchronization signal corresponding to the broadcast channel separately transmitted on the at least two different resource element groups; and
wherein each synchronization signal comprised in the synchronization signal set carries at least one piece of third indication information, wherein the third indication information indicates information about a resource used by the broadcast channel that is separately transmitted on the at least two different resource element groups and corresponds to the respective synchronization signal.

10. User equipment, comprising:
a processor, configured to determine, from at least two different resource element groups, at least one resource element group to use to receive a broadcast channel, wherein the broadcast channel is transmitted using the at least two different resource element groups, each different resource element group of the at least two different resource element groups is used to separately transmit the broadcast channel, and wherein, for each resource element group, the broadcast channel transmitted on the respective resource element group carries at least one piece of same information and indication information indicating a resource of a physical downlink control channel (PDCCH) used by the user equipment, and the same information is cell specific information; and
a receiver, configured to receive the broadcast channel based on the at least one resource element group; and
wherein the processor is further configured to obtain, from the received broadcast channel, the indication information carried in the received broadcast channel.

11. The user equipment according to claim 10, wherein, for each resource element group, the broadcast channel transmitted on the respective resource element group further carries at least one piece of second indication information; and
the processor is configured to obtain, from the received broadcast channel received by the receiver, the at least one piece of second indication information carried on the received broadcast channel, wherein the second indication information carried on the received broadcast channel indicates information about a resource used by the received broadcast channel.

12. The user equipment according to claim 11, wherein the information about the resource used by the received broadcast channel is at least one of the following:
identification information of the received broadcast channel, information about a resource element group used by the received broadcast channel, information about a scrambling sequence or a sequence group used by the received broadcast channel, information about an antenna port or an antenna port group used by the received broadcast channel, information about a time and/or frequency position used by the received broadcast channel, information about precoding used by the received broadcast channel, or information about a beam used by the received broadcast channel.

13. The user equipment according to claim 10, wherein the broadcast channels transmitted on the at least two different resource element groups use different scrambling sequences, wherein the scrambling sequences are Walsh sequences, constant amplitude zero autocorrelation (CAZAC) sequences, Gold sequences, m-sequences, computer-generated sequences, pseudo random sequences, or a combination of the above sequences; and the receiver is configured to:
receive the received broadcast channel based on a scrambling sequence used by the received broadcast channel on the at least two different resource element groups.

14. The user equipment according to claim 10, wherein the broadcast channels transmitted on the at least two different resource element groups use same antenna port with different precoding or different beams; and
the receiver is configured to:
receive the received broadcast channel based on precoding or a beam used by the received broadcast channel on the at least one resource element group; or
receive, based on the at least one resource element group, communication signals transmitted by a base station by using different precoding or beams.

15. The user equipment according to claim 10, wherein the same information is at least one of the following:
a system bandwidth, a part or all of information of a system frame number (SFN), physical channel configuration indication information, or a master information block (MIB).

16. The user equipment according to claim 10, wherein the information about the resource of the PDCCH used by the user equipment is at least one of the following:
information about a resource element group used by the PDCCH, or information about a time and/or frequency position used by the PDCCH.

17. The user equipment according to claim 10, wherein, for each resource element group, the indication information carried on the respective resource element group is carried in a broadcast message of the broadcast channel carried on the respective resource element, or the indication information is represented by using different cyclic redundancy check masks.

18. The user equipment according to claim 10, wherein the receiver is configured to:
receive a synchronization signal set transmitted by a base station, wherein the synchronization signal set comprises at least one synchronization signal corresponding to the broadcast channel transmitted on the at least one resource element group; and
the processor is configured to:
determine, from the at least two different resource element groups, the at least one resource element group to use to receive the broadcast channel, wherein the at least one resource element group corresponds to the at least one synchronization signal used by the user equipment; and
wherein the at least one synchronization signal comprised in the synchronization signal set carries at least one piece of third indication information, wherein the third indication information indicates information about a resource used for receiving the received broadcast channel on the at least one resource element group.

19. A communication signal transmitting method, comprising:
determining at least two different resource element groups to use to transmit a broadcast channel, each different resource element group of the at least two different resource element groups to be used to separately transmit the broadcast channel; and
transmitting the broadcast channel to user equipment on the at least two different resource element groups, wherein for each resource element group the broadcast channel transmitted on the respective resource element group carries at least one piece of same information and indication information indicating a resource of a physical downlink control channel (PDCCH) used by the user equipment, and the same information is cell specific information.

20. The method according to claim 19, wherein for each resource element group the broadcast channel transmitted on the respective resource element group further carries at least one piece of second indication information, wherein the second indication information is indicates information about a resource used by the broadcast channel carried on the respective resource element group.

21. The method according to claim 20, wherein the information about the resource used by the broadcast channel carried on the respective resource element group is at least one of the following:
identification information of the broadcast channel carried on the respective resource element group, information about a resource element group used by the broadcast channel carried on the respective resource element group, information about a scrambling sequence used by the broadcast channel carried on the respective resource element group, information about an antenna port or an antenna port group used by the broadcast channel carried on the respective resource element group, information about a time and/or frequency position used by the broadcast channel carried on the respective resource element group, information about precoding used by the broadcast channel carried on the respective resource element group, or information about a beam used by the broadcast channel carried on the respective resource element group.

22. The method according to claim 19, wherein the broadcast channels separately transmitted on the at least two different resource element groups use different scrambling sequences, wherein the scrambling sequences are Walsh sequences, constant amplitude zero autocorrelation (CA-ZAC) sequences, Gold sequences, m-sequences, computer-generated sequences, pseudo random sequences, or a combination of the above sequences.

23. The method according to claim 19, wherein the broadcast channels separately transmitted on the at least two different resource element groups use same antenna port with different precoding or different beams.

24. The method according to claim 19, wherein the same information is at least one of the following:
a system bandwidth, a part or all of information of a system frame number (SFN), physical channel configuration indication information, and a master information block (MIB).

25. The method according to claim 19, wherein the information about the resource of the PDCCH used by the user equipment is at least one of the following:
information about a resource element group used by the PDCCH, or information about a time and/or frequency position used by the PDCCH.

26. The method according to claim 19, wherein for each resource element group the indication information carried on the respective resource element group is carried in a broadcast message of the broadcast channel carried on the respective resource element group or represented by using different cyclic redundancy check masks.

27. The method according to claim 19, wherein the method further comprises:
transmitting a synchronization signal set to the user equipment, wherein the synchronization signal set comprises at least one synchronization signal corresponding to each broadcast channel transmitted on the at least two different resource element groups; and wherein each synchronization signal comprised in the synchronization signal set carries at least one piece of third indication information, wherein the third indication information indicates information about a resource used by the broadcast channel that is transmitted on the at least two different resource element groups and corresponds to the synchronization signal.

28. A communication signal receiving method, comprising:

determining, from at least two different resource element groups, at least one resource element group to use to receive a broadcast channel, wherein the broadcast channel is transmitted using the at least two different resource element groups, each different resource element group of the at least two different resource element groups is used to separately transmit the broadcast channel, and wherein, for each resource element group, the broadcast channel transmitted on the respective resource element group carries at least one piece of same information and indication information indicating a resource of a physical downlink control channel (PDCCH) used by a user equipment, and the same information is cell specific information; and receiving the broadcast channel based on the at least one resource element group, and obtaining, from the received broadcast channel, the indication information carried in the received broadcast channel.

29. The method according to claim 28, wherein, for each resource element group, the broadcast channel transmitted on the respective resource element group further carries at least one piece of second indication information; and the receiving the broadcast channel based on the at least one resource element group, and obtaining, from the received broadcast channel, the indication information carried in the received broadcast channel, comprises:

receiving the broadcast channel based on the at least one resource element group, and obtaining, from the received broadcast channel, the at least one piece of second indication information carried in the received broadcast channel, wherein the second indication information indicates information about a resource used by the received broadcast channel.

30. The method according to claim 29, wherein the information about the resource used by the received broadcast channel is at least one of the following:

identification information of the received broadcast channel, information about a resource element group used by the received broadcast channel, information about a scrambling sequence used by the received broadcast channel, information about an antenna port or an antenna port group used by the received broadcast channel, information about a time and/or frequency position used by the received broadcast channel, information about precoding used by the received broadcast channel, and information about a beam used by the received broadcast channel.

31. The method according to claim 29, wherein the broadcast channels separately transmitted on the at least two different resource element groups use different scrambling sequences, wherein the scrambling sequences are Walsh sequences, constant amplitude zero autocorrelation (CAZAC) sequences, Gold sequences, m-sequences, computer-generated sequences, pseudo random sequences, or a combination of the above sequences; and the receiving the broadcast channel based on the at least one resource element group further comprises:

receiving the broadcast channel based on a scrambling sequence used by the broadcast channel on the at least one resource element group.

32. The method according to claim 29, wherein the broadcast channels separately transmitted on the at least two different resource element groups use different precoding or different beams; and the receiving the broadcast channel based on the at least one resource element group further comprises:

receiving the broadcast channel based on precoding or a beam group used by the received broadcast channel on the at least one resource element group; or receiving, based on the at least one resource element group, the broadcast channel transmitted by a base station by using different precoding or beams.

33. The method according to claim 29, wherein the same information is at least one of the following:

a system bandwidth, a part or all of information of a system frame number (SFN), physical channel configuration indication information, or a master information block (MIB).

34. The method according to claim 29, wherein the information about the resource of the PDCCH used by the user equipment is at least one of the following:

information about a resource element group used by the PDCCH, or information about a time and/or frequency position used by the PDCCH.

35. The method according to claim 29, wherein, for each resource element group, the indication information carried on the respective resource element group is carried in a broadcast message of the received broadcast channel, or the indication information carried on the respective resource element group is represented by using different cyclic redundancy check masks.

36. The method according to claim 29, wherein the determining, from the at least two different resource element groups, the at least one resource element group to use to receive the broadcast channel comprises:

receiving a synchronization signal set transmitted by a base station, wherein the synchronization signal set comprises at least one synchronization signal corresponding to the received broadcast channel transmitted on the at least one resource element group; and determining, from the at least two different resource element groups, the at least one resource element group to use to receive the broadcast channel, wherein the at least one resource element group corresponds to the at least one synchronization signal used by the user equipment.

* * * * *

UNITED STATES PATENT AND TRADEMARK OFFICE
CERTIFICATE OF CORRECTION

PATENT NO. : 10,763,939 B2
APPLICATION NO. : 16/081865
DATED : September 1, 2020
INVENTOR(S) : Yongxing Zhou Page 1 of 1

It is certified that error appears in the above-identified patent and that said Letters Patent is hereby corrected as shown below:

In the Claims

In Column 170, Line 20, Claim 32, delete "a beam group used" and insert --a beam used--.

Signed and Sealed this
First Day of December, 2020

Andrei Iancu
*Director of the United States Patent and Trademark Office*